(12) United States Patent
Bhattacharyya et al.

(10) Patent No.: US 11,232,655 B2
(45) Date of Patent: Jan. 25, 2022

(54) SYSTEM AND METHOD FOR INTERFACING WITH A VEHICULAR CONTROLLER AREA NETWORK

(71) Applicant: ioCurrents, Inc., Seattle, WA (US)

(72) Inventors: Bhaskar Bhattacharyya, Seattle, WA (US); Cosmo King, Bellevue, WA (US); Samuel Friedman, Seattle, WA (US)

(73) Assignee: IOCURRENTS, INC., Bellevue, WA (US)

( * ) Notice: Subject to any disclaimer, the term of this patent is extended or adjusted under 35 U.S.C. 154(b) by 0 days.

(21) Appl. No.: 16/870,471

(22) Filed: May 8, 2020

(65) Prior Publication Data

US 2020/0273268 A1      Aug. 27, 2020

Related U.S. Application Data

(63) Continuation of application No. 15/703,487, filed on Sep. 13, 2017, now Pat. No. 10,650,621.

(60) Provisional application No. 62/394,026, filed on Sep. 13, 2016.

(51) Int. Cl.
| | | |
|---|---|---|
| G07C 5/08 | (2006.01) |
| G07C 5/00 | (2006.01) |
| H04L 12/40 | (2006.01) |
| H04L 29/08 | (2006.01) |
| G06Q 10/06 | (2012.01) |
| H04W 4/40 | (2018.01) |
| G06Q 40/00 | (2012.01) |
| H04L 12/14 | (2006.01) |

(52) U.S. Cl.
CPC ...... *G07C 5/0816* (2013.01); *G06Q 10/06315* (2013.01); *G07C 5/008* (2013.01); *H04L 12/40032* (2013.01); *H04L 67/12* (2013.01); *H04W 4/40* (2018.02); *G06Q 40/12* (2013.12); *H04L 12/1435* (2013.01); *H04L 2012/40215* (2013.01); *H04L 2012/40286* (2013.01)

(58) Field of Classification Search
CPC ....... G07C 5/0816; G07C 5/008; H04W 4/40; G06Q 10/06315; G06Q 40/12; H04L 67/12
USPC .......................................................... 701/21
See application file for complete search history.

(56) References Cited

U.S. PATENT DOCUMENTS

| | | |
|---|---|---|
| 4,101,056 A | 7/1978 | Mattimoe et al. |
| 4,262,209 A | 4/1981 | Berner |
| 4,389,221 A | 6/1983 | Graiff et al. |
| 4,484,543 A | 11/1984 | Maxey |
| 4,607,144 A | 8/1986 | Carmon et al. |
| 4,615,011 A | 9/1986 | Linsker |

(Continued)

*Primary Examiner* — Yazan A Soofi
(74) *Attorney, Agent, or Firm* — Seed IP Law Group LLP

(57) ABSTRACT

A vehicle monitoring system, comprising: an interface configured to at least communicate with a controller area network bus; a remote data telecommunication interface; a database; at least one automated processor, configured to: extract information from the controller area network bus; store records in the database representing the extracted information; process the database to determine operating statistics; selectively communicate at least a portion of the database over the remote data telecommunication interface; and determine at least one of an operating parameter for the vehicle and a predicted net fuel cost based on at least the operating statistics and a fuel unit cost.

29 Claims, 7 Drawing Sheets

(56) References Cited

U.S. PATENT DOCUMENTS

| | | |
|---|---|---|
| 4,813,242 A | 3/1989 | Wicks |
| 4,843,575 A | 6/1989 | Crane |
| 4,972,464 A | 11/1990 | Webb et al. |
| 5,065,393 A | 11/1991 | Sibbitt et al. |
| 5,111,329 A | 5/1992 | Gajewski et al. |
| 5,192,496 A | 3/1993 | Soneda et al. |
| 5,208,912 A | 5/1993 | Nakayama et al. |
| 5,247,615 A | 9/1993 | Mori et al. |
| 5,307,456 A | 4/1994 | MacKay |
| 5,383,116 A | 1/1995 | Lennartsson |
| 5,446,846 A | 8/1995 | Lennartsson |
| 5,453,933 A | 9/1995 | Wright et al. |
| 5,469,150 A | 11/1995 | Sitte |
| 5,537,608 A | 7/1996 | Beatty et al. |
| 5,562,079 A | 10/1996 | Gray, Jr. |
| 5,598,343 A | 1/1997 | Roy et al. |
| 5,668,955 A | 9/1997 | deCiutiis et al. |
| 5,691,486 A | 11/1997 | Behringer et al. |
| 5,695,325 A | 12/1997 | Sperry |
| 5,712,968 A | 1/1998 | Nakayama et al. |
| 5,719,667 A | 2/1998 | Miers |
| 5,726,984 A | 3/1998 | Kubler et al. |
| 5,732,074 A | 3/1998 | Spaur et al. |
| 5,745,308 A | 4/1998 | Spangenberg |
| 5,772,963 A | 6/1998 | Cantatore et al. |
| 5,781,620 A | 7/1998 | Montgomery et al. |
| 5,784,547 A | 7/1998 | Dittmar et al. |
| 5,788,927 A | 8/1998 | Farrell et al. |
| 5,819,702 A | 10/1998 | Mendler |
| 5,844,685 A | 12/1998 | Gontin |
| 5,872,627 A | 2/1999 | Miers |
| 5,873,256 A | 2/1999 | Denniston |
| 5,883,378 A | 3/1999 | Irish et al. |
| 5,901,214 A | 5/1999 | Shaffer et al. |
| 5,908,599 A | 6/1999 | Behringer et al. |
| RE40,073 E | 2/2008 | Breed |
| RE40,479 E | 9/2008 | Wright et al. |
| 7,424,862 B1 | 9/2008 | Wagner |
| 7,442,904 B2 | 10/2008 | Kirby |
| 7,558,574 B2 | 7/2009 | Feher |
| 7,558,668 B2 | 7/2009 | Ammineni et al. |
| 7,561,881 B2 | 7/2009 | Feher |
| 7,561,963 B2 | 7/2009 | Brice et al. |
| 7,565,155 B2 | 7/2009 | Sheha et al. |
| 7,571,036 B2 | 8/2009 | Olsen et al. |
| 7,571,111 B2 | 8/2009 | Ahrens et al. |
| 7,571,128 B1 | 8/2009 | Brown |
| 7,574,867 B2 | 8/2009 | Teets et al. |
| 7,577,938 B2 | 8/2009 | Bent et al. |
| 7,580,384 B2 | 8/2009 | Kubler et al. |
| 7,580,782 B2 | 8/2009 | Breed et al. |
| 7,581,434 B1 | 9/2009 | Discenzo et al. |
| 7,583,618 B2 | 9/2009 | Reinders |
| 7,584,685 B2 | 9/2009 | Crist |
| 7,586,861 B2 | 9/2009 | Kubler et al. |
| 7,586,907 B2 | 9/2009 | Kubler et al. |
| 7,586,953 B2 | 9/2009 | Forest et al. |
| 7,590,589 B2 | 9/2009 | Hoffberg |
| 7,593,733 B2 | 9/2009 | Feher |
| 7,593,999 B2 | 9/2009 | Nathanson |
| 7,594,682 B2 | 9/2009 | Kumar et al. |
| 7,596,242 B2 | 9/2009 | Breed et al. |
| 7,603,125 B2 | 10/2009 | Feher |
| 7,603,471 B2 | 10/2009 | Sodergren |
| 7,603,894 B2 | 10/2009 | Breed |
| 7,606,156 B2 | 10/2009 | DeLangis |
| 7,610,011 B2 | 10/2009 | Albrett |
| 7,610,146 B2 | 10/2009 | Breed |
| 7,620,316 B2 | 11/2009 | Boillot |
| 7,620,516 B2 | 11/2009 | Rozenboim et al. |
| 7,620,603 B2 | 11/2009 | Gilder et al. |
| 7,627,320 B2 | 12/2009 | Feher |
| 7,629,899 B2 | 12/2009 | Breed |
| 7,629,963 B1 | 12/2009 | Wright |
| 7,630,717 B2 | 12/2009 | Feher |
| 7,630,802 B2 | 12/2009 | Breed |
| 7,630,806 B2 | 12/2009 | Breed |
| 7,633,934 B2 | 12/2009 | Kubler et al. |
| 7,634,465 B2 | 12/2009 | Sareen et al. |
| 7,636,410 B2 | 12/2009 | Vandensande |
| 8,194,133 B2 | 6/2012 | DeWind et al. |
| 8,194,541 B2 | 6/2012 | Leppanen et al. |
| 8,194,595 B2 | 6/2012 | Kubler et al. |
| 8,195,148 B2 | 6/2012 | Madhavan et al. |
| 8,195,468 B2 | 6/2012 | Weider et al. |
| 8,195,774 B2 | 6/2012 | Lambeth et al. |
| 8,200,243 B1 | 6/2012 | Feher |
| 8,201,089 B2 | 6/2012 | Perrow et al. |
| 8,203,433 B2 | 6/2012 | Deuber et al. |
| 8,209,073 B2 | 6/2012 | Wijaya et al. |
| 8,209,120 B2 | 6/2012 | Breed |
| 8,209,514 B2 | 6/2012 | Kisel et al. |
| 8,212,685 B2 | 7/2012 | LeFebvre et al. |
| 8,212,691 B2 | 7/2012 | Pudar |
| 8,213,861 B2 | 7/2012 | Tengler et al. |
| 8,213,967 B2 | 7/2012 | Kortge et al. |
| 8,219,312 B2 | 7/2012 | Davidson et al. |
| 8,228,801 B2 | 7/2012 | Delangis |
| 8,228,879 B2 | 7/2012 | Kubler et al. |
| 8,228,954 B2 | 7/2012 | Thubert et al. |
| 8,229,618 B2 | 7/2012 | Tolstedt et al. |
| 8,229,624 B2 | 7/2012 | Breed |
| 8,229,776 B1 | 7/2012 | Woodward et al. |
| 8,229,835 B2 | 7/2012 | Milne et al. |
| 8,231,270 B2 | 7/2012 | Groeneweg et al. |
| 8,238,264 B2 | 8/2012 | Kubler et al. |
| 8,238,896 B2 | 8/2012 | Madhavan et al. |
| 8,238,897 B2 | 8/2012 | Madhavan et al. |
| 8,239,076 B2 | 8/2012 | McGarry et al. |
| 8,243,025 B2 | 8/2012 | Fibaek |
| 8,244,779 B2 | 8/2012 | Borg et al. |
| 8,246,467 B2 | 8/2012 | Huang et al. |
| 8,255,144 B2 | 8/2012 | Breed et al. |
| 8,255,469 B2 | 8/2012 | Leppanen et al. |
| 8,259,822 B1 | 9/2012 | Feher |
| 8,260,537 B2 | 9/2012 | Breed |
| 8,260,736 B1 | 9/2012 | Lear et al. |
| 8,262,019 B2 | 9/2012 | Schmidt et al. |
| 8,265,100 B2 | 9/2012 | Steiner et al. |
| 8,265,855 B2 | 9/2012 | Berkobin et al. |
| 8,265,868 B2 | 9/2012 | Cho et al. |
| 8,266,030 B2 | 9/2012 | Milne et al. |
| 8,271,187 B2 | 9/2012 | Taylor et al. |
| 8,275,351 B1 | 9/2012 | Cazanas et al. |
| 8,275,522 B1 | 9/2012 | Groeneweg et al. |
| 8,275,649 B2 | 9/2012 | Zheng et al. |
| 8,280,009 B2 | 10/2012 | Stepanian |
| 8,280,646 B2 | 10/2012 | Seidel |
| 8,281,188 B2 | 10/2012 | Miller |
| 8,290,425 B2 | 10/2012 | Albrett |
| 8,290,516 B2 | 10/2012 | Chandra et al. |
| 8,294,568 B2 | 10/2012 | Barrett |
| 8,295,816 B2 | 10/2012 | Madhavan et al. |
| 8,296,949 B2 | 10/2012 | Clevenger et al. |
| 8,297,198 B2 | 10/2012 | Read |
| 8,301,639 B1 | 10/2012 | Myllymaki et al. |
| 8,306,560 B2 | 11/2012 | Krause et al. |
| 8,310,363 B2 | 11/2012 | Breed |
| 8,311,140 B2 | 11/2012 | Feher |
| 8,311,509 B2 | 11/2012 | Feher |
| 8,311,722 B2 | 11/2012 | Zhang et al. |
| 8,311,858 B2 | 11/2012 | Everett et al. |
| 8,311,983 B2 | 11/2012 | Guzik |
| 8,312,479 B2 | 11/2012 | Boillot |
| 8,315,337 B2 | 11/2012 | Cho et al. |
| 8,319,605 B2 | 11/2012 | Hassan et al. |
| 8,319,666 B2 | 11/2012 | Weinmann et al. |
| 8,320,914 B2 | 11/2012 | Madhavan et al. |
| 8,321,125 B2 | 11/2012 | Tengler et al. |
| 8,321,524 B2 | 11/2012 | Hering et al. |
| 8,323,041 B2 | 12/2012 | Gore et al. |
| 8,325,642 B1 | 12/2012 | McHenry et al. |
| 8,326,258 B2 | 12/2012 | Chmielewski et al. |
| 8,326,470 B2 | 12/2012 | Mirle |

(56) References Cited

U.S. PATENT DOCUMENTS

| | | | |
|---|---|---|---|
| 8,326,522 B2 | 12/2012 | Harkenrider et al. |
| 8,326,667 B2 | 12/2012 | Johnson |
| 8,327,146 B2 | 12/2012 | Madhavan et al. |
| 8,334,841 B2 | 12/2012 | Boillot et al. |
| 8,335,547 B2 | 12/2012 | Otterson |
| 8,340,629 B2 | 12/2012 | Burt et al. |
| 8,340,902 B1 | 12/2012 | Chiang |
| 8,342,279 B1 | 1/2013 | Florus et al. |
| 8,345,857 B2 | 1/2013 | Gould et al. |
| 8,346,391 B1 | 1/2013 | Anhalt et al. |
| 8,347,243 B2 | 1/2013 | Bruneel |
| 8,351,861 B2 | 1/2013 | Min et al. |
| 8,351,925 B2 | 1/2013 | Feher |
| 8,352,575 B2 | 1/2013 | Samaha |
| 8,354,927 B2 | 1/2013 | Breed |
| 8,354,997 B2 | 1/2013 | Boillot |
| 8,358,222 B2 | 1/2013 | Gueziec |
| 8,366,541 B2 | 2/2013 | Luciano, Jr. et al. |
| 8,373,581 B2 | 2/2013 | Hassan et al. |
| 8,374,725 B1 | 2/2013 | Ols |
| 8,380,640 B2 | 2/2013 | Olsen, III et al. |
| 8,384,538 B2 | 2/2013 | Breed |
| 8,384,670 B1 | 2/2013 | Wright |
| 8,386,091 B2 | 2/2013 | Kristinsson et al. |
| 8,386,115 B2 | 2/2013 | McCutchen et al. |
| 8,390,474 B2 | 3/2013 | Yi et al. |
| 8,391,829 B2 | 3/2013 | Das |
| 8,391,849 B2 | 3/2013 | Zoeckler et al. |
| 8,392,065 B2 | 3/2013 | Tolstedt et al. |
| 8,392,322 B2 | 3/2013 | Milne et al. |
| 8,396,449 B2 | 3/2013 | Hatton |
| 8,396,665 B2 | 3/2013 | Siereveld et al. |
| 8,397,065 B2 | 3/2013 | Lin et al. |
| 8,397,848 B2 | 3/2013 | Read |
| 8,401,572 B2 | 3/2013 | Chandra et al. |
| 8,406,944 B2 | 3/2013 | Garon et al. |
| 8,406,988 B2 | 3/2013 | Schafer et al. |
| 8,407,152 B2 | 3/2013 | Olsen, III et al. |
| 8,408,720 B2 | 4/2013 | Nishigaki et al. |
| 8,410,945 B2 | 4/2013 | Breed |
| 8,411,590 B2 | 4/2013 | Wang |
| 8,412,421 B2 | 4/2013 | Greiner et al. |
| 8,412,584 B2 | 4/2013 | Boler et al. |
| 8,412,675 B2 | 4/2013 | Alvarado et al. |
| 8,414,366 B2 | 4/2013 | Browne et al. |
| 8,416,067 B2 | 4/2013 | Davidson et al. |
| 8,417,452 B2 | 4/2013 | Ross et al. |
| 8,417,618 B2 | 4/2013 | Milne et al. |
| 8,417,823 B2 | 4/2013 | Luna et al. |
| 8,420,984 B2 | 4/2013 | Kaiser et al. |
| 8,423,017 B2 | 4/2013 | Haralson et al. |
| 8,423,287 B2 | 4/2013 | Davidson et al. |
| 8,423,362 B2 | 4/2013 | Chengalvarayan et al. |
| 8,428,622 B1 | 4/2013 | Zhang |
| 8,428,789 B2 | 4/2013 | Dulzo et al. |
| 8,428,799 B2 | 4/2013 | Cansiani et al. |
| 8,432,269 B2 | 4/2013 | Christensen et al. |
| 8,433,471 B2 | 4/2013 | Christensen et al. |
| 8,438,028 B2 | 5/2013 | Chengalvarayan et al. |
| 8,438,030 B2 | 5/2013 | Talwar et al. |
| 8,438,633 B1 | 5/2013 | Backholm et al. |
| 8,442,528 B2 | 5/2013 | Chmielewski et al. |
| 8,442,550 B2 | 5/2013 | Blumberg et al. |
| 8,442,690 B2 | 5/2013 | Goldstein et al. |
| 8,442,904 B2 | 5/2013 | Milne et al. |
| 8,447,025 B2 | 5/2013 | Shaffer et al. |
| 8,447,607 B2 | 5/2013 | Weider et al. |
| 8,447,661 B2 | 5/2013 | Wiseman et al. |
| 8,451,739 B2 | 5/2013 | van Greunen et al. |
| 8,452,271 B2 | 5/2013 | Zoeckler et al. |
| 8,452,310 B1 | 5/2013 | Orlik et al. |
| 8,452,486 B2 | 5/2013 | Banet et al. |
| 8,456,294 B2 | 6/2013 | Emigh et al. |
| 8,457,686 B2 | 6/2013 | Przybylski |
| 8,463,449 B2 | 6/2013 | Sanders |
| 8,463,521 B2 | 6/2013 | Westendorf |
| 8,467,376 B2 | 6/2013 | Kubler et al. |
| 8,467,384 B2 | 6/2013 | McMenamy |
| 8,467,936 B2 | 6/2013 | Wijaya et al. |
| 8,468,126 B2 | 6/2013 | van Gent et al. |
| 8,473,127 B2 | 6/2013 | Daum et al. |
| 8,473,140 B2 | 6/2013 | Norris et al. |
| 8,477,019 B2 | 7/2013 | Laroia et al. |
| 8,482,395 B2 | 7/2013 | Rysenga et al. |
| 8,482,399 B2 | 7/2013 | Breed |
| 8,483,245 B2 | 7/2013 | Madhavan et al. |
| 8,483,949 B2 | 7/2013 | Taguchi et al. |
| 8,484,314 B2 | 7/2013 | Luna et al. |
| 8,487,871 B2 | 7/2013 | Langridge et al. |
| 8,488,598 B2 | 7/2013 | Silver et al. |
| 8,489,433 B2 | 7/2013 | Altieri et al. |
| 8,493,366 B2 | 7/2013 | Bathiche et al. |
| 8,494,510 B2 | 7/2013 | Backholm |
| 8,495,225 B2 | 7/2013 | Olrog |
| 8,497,838 B2 | 7/2013 | Langridge |
| 8,498,224 B2 | 7/2013 | Thubert et al. |
| 8,498,774 B2 | 7/2013 | Schurov |
| 8,499,030 B1 | 7/2013 | Reisman |
| 8,499,096 B2 | 7/2013 | Kwapniewski et al. |
| 8,502,498 B2 | 8/2013 | Fecher |
| 8,503,300 B2 | 8/2013 | Patel et al. |
| 8,503,932 B2 | 8/2013 | Demuynck et al. |
| 8,504,016 B2 | 8/2013 | Silver |
| 8,508,347 B2 | 8/2013 | Pihlaja |
| 8,509,222 B2 | 8/2013 | Tang |
| 8,509,226 B1 | 8/2013 | Murphy et al. |
| 8,509,260 B2 | 8/2013 | Koenck et al. |
| 8,509,431 B2 | 8/2013 | Schmidt et al. |
| 8,509,753 B2 | 8/2013 | Chandra et al. |
| 8,509,773 B2 | 8/2013 | Madhavan et al. |
| 8,509,986 B1 | 8/2013 | Chen |
| 8,510,470 B2 | 8/2013 | Yonge, III et al. |
| 8,514,825 B1 | 8/2013 | Addepalli et al. |
| 8,514,846 B2 | 8/2013 | Kung et al. |
| 8,514,849 B2 | 8/2013 | Radulovic |
| 8,515,409 B2 | 8/2013 | Ramo et al. |
| 8,515,616 B2 | 8/2013 | Hering et al. |
| 8,515,873 B2 | 8/2013 | Hawkins |
| 8,520,816 B2 | 8/2013 | Croak et al. |
| 8,521,548 B2 | 8/2013 | Gault et al. |
| 8,526,311 B2 | 9/2013 | Ballard et al. |
| 8,526,930 B2 | 9/2013 | Watkins et al. |
| 8,527,135 B2 | 9/2013 | Lowrey et al. |
| 8,528,680 B2 | 9/2013 | Florus et al. |
| 8,531,180 B2 | 9/2013 | Piemonte et al. |
| 8,531,312 B2 | 9/2013 | Gueziec |
| 8,531,316 B2 | 9/2013 | Velado et al. |
| 8,532,090 B2 | 9/2013 | Petit-Huguenin et al. |
| 8,532,275 B2 | 9/2013 | Mello et al. |
| 8,532,674 B2 | 9/2013 | Arun et al. |
| 8,533,803 B2 | 9/2013 | Cha et al. |
| 8,537,687 B2 | 9/2013 | Valdez et al. |
| 8,537,747 B2 | 9/2013 | Madhavan et al. |
| 8,537,770 B2 | 9/2013 | Silver |
| 8,537,991 B2 | 9/2013 | McClure |
| 8,538,621 B2 | 9/2013 | Ross et al. |
| 8,538,785 B2 | 9/2013 | Coleman et al. |
| 8,539,040 B2 | 9/2013 | Luna et al. |
| 8,539,769 B2 | 9/2013 | Hansen et al. |
| 8,542,196 B2 | 9/2013 | Pallakoff |
| 8,542,695 B1 | 9/2013 | Melick et al. |
| 8,542,715 B2 | 9/2013 | Feher |
| 8,543,143 B2 | 9/2013 | Chandra et al. |
| 8,543,287 B2 | 9/2013 | Stevens et al. |
| 8,543,328 B2 | 9/2013 | Stille |
| 8,543,330 B2 | 9/2013 | Taylor et al. |
| 8,547,962 B2 | 10/2013 | Ramachandran et al. |
| 8,547,967 B2 | 10/2013 | Grabelsky et al. |
| 8,548,508 B2 | 10/2013 | Yi et al. |
| 8,553,644 B2 | 10/2013 | Laroia et al. |
| 8,553,865 B2 | 10/2013 | Menard et al. |
| 8,554,688 B2 | 10/2013 | Harrell et al. |
| 8,554,896 B2 | 10/2013 | Sodergren et al. |
| 8,560,313 B2 | 10/2013 | Talwar et al. |

(56) References Cited

U.S. PATENT DOCUMENTS

| | | |
|---|---|---|
| 8,560,609 B2 | 10/2013 | Nathanson |
| 8,561,086 B2 | 10/2013 | Fleming |
| 8,564,455 B2 | 10/2013 | Gueziec |
| 8,565,948 B2 | 10/2013 | Pudar |
| 8,566,410 B2 | 10/2013 | Smith et al. |
| 8,570,372 B2 | 10/2013 | Russell |
| 8,570,875 B2 | 10/2013 | Venugopal et al. |
| 8,571,030 B1 | 10/2013 | Hui et al. |
| 8,571,519 B2 | 10/2013 | Ginzboorg |
| 8,572,176 B2 | 10/2013 | McKenna et al. |
| 8,577,003 B2 | 11/2013 | Rae |
| 8,577,390 B2 | 11/2013 | Sheha et al. |
| 8,577,528 B2 | 11/2013 | Uyeki |
| 8,577,568 B2 | 11/2013 | Sujan et al. |
| 8,577,730 B2 | 11/2013 | Gonzalez Loyo |
| 8,577,771 B2 | 11/2013 | Milne et al. |
| 8,578,282 B2 | 11/2013 | Boillot |
| 8,581,688 B2 | 11/2013 | Breed |
| 8,582,775 B2 | 11/2013 | Peirce et al. |
| 8,583,304 B2 | 11/2013 | Uyeki |
| 8,583,318 B2 | 11/2013 | Ross et al. |
| 8,583,333 B2 | 11/2013 | Rennie et al. |
| 8,583,520 B1 | 11/2013 | Forbes, Jr. |
| 8,588,213 B2 | 11/2013 | Pounds et al. |
| 8,589,018 B2 | 11/2013 | Sarnacke et al. |
| 8,594,467 B2 | 11/2013 | Lu et al. |
| 8,594,616 B2 | 11/2013 | Gusikhin et al. |
| 8,595,034 B2 | 11/2013 | Bauer et al. |
| 8,595,094 B1 | 11/2013 | Forbes, Jr. |
| 8,599,537 B2 | 12/2013 | Prax et al. |
| 8,599,822 B2 | 12/2013 | Castagnoli |
| 8,600,590 B2 | 12/2013 | Frazier et al. |
| 8,600,741 B2 | 12/2013 | Talwar et al. |
| 8,600,830 B2 | 12/2013 | Hoffberg |
| 8,600,932 B2 | 12/2013 | Poling et al. |
| 8,601,595 B2 | 12/2013 | Gelvin et al. |
| 8,601,813 B2 | 12/2013 | Shutty et al. |
| 8,604,919 B2 | 12/2013 | Otterson |
| 8,605,589 B2 | 12/2013 | Hart |
| 8,606,373 B2 | 12/2013 | Lozier et al. |
| 8,611,953 B2 | 12/2013 | Jordan et al. |
| 8,612,107 B2 | 12/2013 | Malikopoulos |
| 8,612,134 B2 | 12/2013 | Zheng et al. |
| 8,612,141 B2 | 12/2013 | Miyahara et al. |
| 8,612,273 B2 | 12/2013 | Johnson |
| 8,612,478 B1 | 12/2013 | Duong et al. |
| 8,612,856 B2 | 12/2013 | Hotelling et al. |
| 8,614,633 B1 * | 12/2013 | Lear ................ G08B 29/188 340/984 |
| 8,614,669 B2 | 12/2013 | Marc |
| 8,615,253 B2 | 12/2013 | MacGougan et al. |
| 8,615,254 B2 | 12/2013 | Jamtgaard et al. |
| 8,615,345 B2 | 12/2013 | MacNeille et al. |
| 8,615,355 B2 | 12/2013 | Inbarajan et al. |
| 8,615,648 B2 | 12/2013 | Chaudhari et al. |
| 8,615,773 B2 | 12/2013 | Bishop et al. |
| 8,619,037 B2 | 12/2013 | Fibaek |
| 8,619,681 B2 | 12/2013 | Olson |
| 8,620,360 B2 | 12/2013 | Madhavan et al. |
| 8,620,846 B2 | 12/2013 | Falchuk et al. |
| 8,621,075 B2 | 12/2013 | Luna |
| 8,626,208 B2 | 1/2014 | Oesterling et al. |
| 8,626,465 B2 | 1/2014 | Moore et al. |
| 8,626,661 B2 | 1/2014 | Gilder |
| 8,626,844 B2 | 1/2014 | Schulzrinne et al. |
| 8,630,443 B2 | 1/2014 | Tan et al. |
| 8,630,608 B2 | 1/2014 | Cazanas et al. |
| 8,630,619 B2 | 1/2014 | Yi et al. |
| 8,630,768 B2 | 1/2014 | McClellan et al. |
| 8,630,787 B2 | 1/2014 | Shutty et al. |
| 8,630,795 B2 | 1/2014 | Breed et al. |
| 8,632,182 B2 | 1/2014 | Chen et al. |
| 8,634,800 B2 | 1/2014 | Silver et al. |
| 8,635,091 B2 | 1/2014 | Amigo et al. |
| 8,635,272 B2 | 1/2014 | Reisman |
| 8,638,202 B2 | 1/2014 | Oesterling |
| 8,639,234 B2 | 1/2014 | Sumcad et al. |
| 8,639,494 B1 | 1/2014 | Roper |
| 8,639,508 B2 | 1/2014 | Zhao et al. |
| 8,643,715 B2 | 2/2014 | Cho |
| 8,644,303 B2 | 2/2014 | Pickett |
| 8,644,313 B2 | 2/2014 | Chiabaut et al. |
| 8,645,348 B2 | 2/2014 | Shiloh |
| 8,649,819 B2 | 2/2014 | Tonogai et al. |
| 8,649,969 B2 | 2/2014 | Davidson et al. |
| 8,652,041 B2 | 2/2014 | Moore-Ede |
| 8,653,953 B2 | 2/2014 | Biondo et al. |
| 8,655,487 B2 | 2/2014 | Hurley et al. |
| 8,655,593 B1 | 2/2014 | Davidson |
| 8,660,549 B2 | 2/2014 | Hrabak et al. |
| 8,660,735 B2 | 2/2014 | Tengler et al. |
| 8,660,780 B2 | 2/2014 | Kantarjiev et al. |
| 8,661,149 B2 | 2/2014 | Neuhaus et al. |
| 8,666,053 B2 | 3/2014 | Kung et al. |
| 8,666,395 B2 | 3/2014 | Silver |
| 8,666,437 B2 | 3/2014 | Stromberg et al. |
| 8,666,538 B2 | 3/2014 | Deas et al. |
| 8,666,756 B2 | 3/2014 | Salmon Rock et al. |
| 8,666,801 B2 | 3/2014 | Cho |
| 8,670,877 B2 | 3/2014 | MacNeille et al. |
| 8,674,842 B2 | 3/2014 | Zishaan |
| 8,675,514 B2 | 3/2014 | Myers et al. |
| 8,675,629 B2 | 3/2014 | Yi et al. |
| 8,675,671 B2 | 3/2014 | Nelson et al. |
| 8,675,851 B1 | 3/2014 | Karp et al. |
| 8,676,199 B2 | 3/2014 | Madhavan et al. |
| 8,676,402 B1 | 3/2014 | Foster |
| 8,676,468 B2 | 3/2014 | Taguchi |
| 8,676,491 B2 | 3/2014 | Taylor et al. |
| 8,677,507 B2 | 3/2014 | Ginter et al. |
| 8,682,364 B2 | 3/2014 | Tang et al. |
| 8,682,485 B2 | 3/2014 | Anhalt et al. |
| 8,686,922 B2 | 4/2014 | Breed |
| 8,687,650 B2 | 4/2014 | King |
| 8,687,790 B2 | 4/2014 | Ma et al. |
| 8,688,088 B2 | 4/2014 | Ramer et al. |
| 8,688,142 B2 | 4/2014 | Feher |
| 8,688,313 B2 | 4/2014 | Margol et al. |
| 8,688,320 B2 | 4/2014 | Faenger |
| 8,688,532 B2 | 4/2014 | Khunger et al. |
| 8,688,671 B2 | 4/2014 | Ramer et al. |
| 8,690,337 B2 | 4/2014 | Nishigaki et al. |
| 8,692,101 B2 | 4/2014 | Ryle et al. |
| 8,693,340 B2 | 4/2014 | Schwager et al. |
| 8,693,347 B2 | 4/2014 | Elliott et al. |
| 8,693,358 B2 | 4/2014 | Hodges |
| 8,693,500 B2 | 4/2014 | Ludwig et al. |
| 8,693,664 B2 | 4/2014 | Bookstaff et al. |
| 8,694,328 B1 | 4/2014 | Gormley |
| 8,700,299 B2 | 4/2014 | Morita et al. |
| 8,700,728 B2 | 4/2014 | Luna et al. |
| 8,705,360 B2 | 4/2014 | Cleveland et al. |
| 8,705,527 B1 | 4/2014 | Addepalli et al. |
| 8,706,330 B2 | 4/2014 | Caouette |
| 8,706,416 B2 | 4/2014 | Wang et al. |
| 8,706,583 B1 | 4/2014 | Forbes, Jr. |
| 8,706,584 B1 | 4/2014 | Forbes, Jr. |
| 8,706,640 B2 | 4/2014 | Hansen et al. |
| 8,711,735 B2 | 4/2014 | Kung et al. |
| 8,711,868 B2 | 4/2014 | Hodges et al. |
| 8,712,192 B2 | 4/2014 | Thota |
| 8,712,379 B2 | 4/2014 | Yi et al. |
| 8,712,395 B2 | 4/2014 | Ramer et al. |
| 8,712,909 B1 | 4/2014 | Raubenheimer et al. |
| 8,713,299 B2 | 4/2014 | Quinn et al. |
| 8,718,617 B2 | 5/2014 | Ramer et al. |
| 8,718,844 B2 | 5/2014 | Krause et al. |
| 8,719,125 B1 | 5/2014 | Forbes, Jr. |
| 8,719,183 B2 | 5/2014 | Olsen, III et al. |
| 8,719,198 B2 | 5/2014 | Zheng et al. |
| 8,719,339 B2 | 5/2014 | Reisman |
| 8,719,592 B2 | 5/2014 | Kennedy et al. |
| 8,723,698 B2 | 5/2014 | Davidson |
| 8,723,824 B2 | 5/2014 | Myers et al. |

(56) References Cited

U.S. PATENT DOCUMENTS

| | | |
|---|---|---|
| 8,725,126 B2 | 5/2014 | Ramer et al. |
| 8,725,326 B2 | 5/2014 | Kapp et al. |
| 8,725,396 B2 | 5/2014 | Gueziec et al. |
| 8,725,407 B2 | 5/2014 | Hurley et al. |
| 8,725,561 B1 | 5/2014 | Chatterjee et al. |
| 8,725,657 B2 | 5/2014 | Jarman et al. |
| 8,726,084 B2 | 5/2014 | Bell et al. |
| 8,726,222 B1 | 5/2014 | Lawson et al. |
| 8,726,968 B2 | 5/2014 | Sievers et al. |
| 8,731,155 B2 | 5/2014 | Chesnutt et al. |
| 8,731,581 B2 | 5/2014 | Blumberg et al. |
| 8,731,627 B2 | 5/2014 | Inabathuni et al. |
| 8,731,741 B2 | 5/2014 | Oesterling |
| 8,731,832 B1 | 5/2014 | Davidson |
| 8,732,023 B2 | 5/2014 | Mikurak |
| 8,732,405 B2 | 5/2014 | Ramamurthy et al. |
| 8,737,972 B2 | 5/2014 | Ramer et al. |
| 8,738,368 B2 | 5/2014 | Gratke et al. |
| 8,738,389 B2 | 5/2014 | Hjelm et al. |
| 8,738,708 B2 | 5/2014 | Chasin |
| 8,738,741 B2 | 5/2014 | Storrie |
| 8,743,870 B2 | 6/2014 | Ramachandran et al. |
| 8,744,421 B2 | 6/2014 | Peirce et al. |
| 8,744,745 B2 | 6/2014 | Pudar et al. |
| 8,745,167 B2 | 6/2014 | Mendez et al. |
| 8,749,350 B2 | 6/2014 | Geisler et al. |
| 8,750,123 B1 | 6/2014 | Alisawi |
| 8,750,826 B2 | 6/2014 | Bangor et al. |
| 8,750,832 B2 | 6/2014 | Wuergler et al. |
| 8,750,884 B1 | 6/2014 | Gorman et al. |
| 8,750,943 B2 | 6/2014 | Bradburn et al. |
| 8,751,066 B1 | 6/2014 | Towers et al. |
| 8,751,083 B2 | 6/2014 | Huntzicker |
| 8,751,098 B2 | 6/2014 | Faus et al. |
| 8,751,153 B2 | 6/2014 | Hurley et al. |
| 8,751,290 B2 | 6/2014 | Schullian et al. |
| 8,751,777 B2 | 6/2014 | Felke et al. |
| 8,751,793 B2 | 6/2014 | Ginter et al. |
| 8,754,766 B2 | 6/2014 | Oesterling et al. |
| 8,755,362 B2 | 6/2014 | Laroia et al. |
| 8,755,371 B2 | 6/2014 | Ramachandran et al. |
| 8,755,764 B2 | 6/2014 | Yi et al. |
| 8,755,774 B2 | 6/2014 | Cho et al. |
| 8,755,776 B2 | 6/2014 | Ramer et al. |
| 8,755,837 B2 | 6/2014 | Rhoads et al. |
| 8,756,062 B2 | 6/2014 | Talwar et al. |
| 8,756,995 B2 | 6/2014 | Tzidon et al. |
| 8,757,495 B2 | 6/2014 | Qu et al. |
| 8,760,499 B2 | 6/2014 | Russell |
| 8,761,008 B2 | 6/2014 | Meier et al. |
| 8,761,101 B1 | 6/2014 | Crosbie et al. |
| 8,761,390 B2 | 6/2014 | Peirce et al. |
| 8,761,722 B1 | 6/2014 | Bowles et al. |
| 8,761,736 B2 | 6/2014 | MacDonald et al. |
| 8,762,151 B2 | 6/2014 | Correia et al. |
| 8,762,188 B2 | 6/2014 | Abercrombie et al. |
| 8,762,285 B2 | 6/2014 | Davis et al. |
| 8,767,627 B2 | 7/2014 | Ezure et al. |
| 8,768,319 B2 | 7/2014 | Ramer et al. |
| 8,768,492 B2 | 7/2014 | Fisher |
| 8,768,569 B2 | 7/2014 | Kim et al. |
| 8,768,617 B2 | 7/2014 | Colley et al. |
| 8,768,799 B1 | 7/2014 | Forbes |
| 8,768,838 B1 | 7/2014 | Hoffman |
| 8,769,467 B2 | 7/2014 | Chyan et al. |
| 8,774,232 B2 | 7/2014 | Smith et al. |
| 8,774,389 B2 | 7/2014 | Kagan et al. |
| 8,774,777 B2 | 7/2014 | Ramer et al. |
| 8,774,844 B2 | 7/2014 | Fiatal |
| 8,775,283 B1 | 7/2014 | Forbes, Jr. |
| 8,775,631 B2 | 7/2014 | Luna |
| 8,775,674 B2 | 7/2014 | Poulson et al. |
| 8,775,964 B2 | 7/2014 | Hayashi et al. |
| 8,779,936 B2 | 7/2014 | Choi et al. |
| 8,779,944 B2 | 7/2014 | Weinmann et al. |
| 8,779,947 B2 | 7/2014 | Tengler et al. |
| 8,780,386 B2 | 7/2014 | Shaheen et al. |
| 8,780,772 B2 | 7/2014 | Liu et al. |
| 8,780,889 B2 | 7/2014 | Yeom |
| 8,780,893 B2 | 7/2014 | O Brien, Jr. et al. |
| 8,781,657 B2 | 7/2014 | Pebbles |
| 8,781,715 B2 | 7/2014 | Breed |
| 8,781,898 B1 | 7/2014 | Yagnik |
| 8,782,222 B2 | 7/2014 | Luna et al. |
| 8,786,437 B2 | 7/2014 | Breed |
| 8,786,464 B2 | 7/2014 | Gueziec |
| 8,787,323 B2 | 7/2014 | Laroia et al. |
| 8,787,913 B2 | 7/2014 | Madhavan et al. |
| 8,787,977 B2 | 7/2014 | Wuergler et al. |
| 8,787,987 B2 | 7/2014 | Gullapalli et al. |
| 8,788,114 B2 | 7/2014 | Young |
| 8,788,200 B2 | 7/2014 | Colley et al. |
| 8,788,565 B2 | 7/2014 | Bevan |
| 8,788,731 B2 | 7/2014 | Peirce et al. |
| 8,788,973 B2 | 7/2014 | Lavigne et al. |
| 8,791,600 B2 | 7/2014 | Soar |
| 8,792,227 B2 | 7/2014 | Prax et al. |
| 8,792,478 B2 | 7/2014 | Kell et al. |
| 8,793,031 B2 | 7/2014 | Anantha et al. |
| 8,793,034 B2 | 7/2014 | Ricci |
| 8,793,063 B2 | 7/2014 | Horvitz et al. |
| 8,793,064 B2 | 7/2014 | Green et al. |
| 8,793,066 B2 | 7/2014 | Panabaker et al. |
| 8,796,881 B2 | 8/2014 | Davis |
| 8,797,719 B2 | 8/2014 | Prax et al. |
| 8,797,958 B2 | 8/2014 | Waldner et al. |
| 8,798,048 B1 | 8/2014 | Hui et al. |
| 8,798,592 B2 | 8/2014 | Ramer et al. |
| 8,798,594 B2 | 8/2014 | Ramer et al. |
| 8,798,595 B2 | 8/2014 | Ramer et al. |
| 8,798,623 B2 | 8/2014 | Yi et al. |
| 8,798,847 B2 | 8/2014 | Isaac |
| 8,798,919 B2 | 8/2014 | Yano et al. |
| 8,799,035 B2 | 8/2014 | Coleman et al. |
| 8,799,756 B2 | 8/2014 | Grosz et al. |
| 8,799,829 B2 | 8/2014 | Grosz et al. |
| 8,803,089 B2 | 8/2014 | Walerow et al. |
| 8,804,702 B2 | 8/2014 | Meranchik |
| 8,805,110 B2 | 8/2014 | Rhoads et al. |
| 8,805,270 B2 | 8/2014 | Maharajh et al. |
| 8,805,339 B2 | 8/2014 | Ramer et al. |
| 8,805,425 B2 | 8/2014 | Fiatal |
| 8,805,639 B1 | 8/2014 | Musicant et al. |
| 8,805,734 B2 | 8/2014 | Diana et al. |
| 8,810,192 B2 | 8/2014 | Bridges et al. |
| 8,811,952 B2 | 8/2014 | Fiatal et al. |
| 8,812,526 B2 | 8/2014 | Ramer et al. |
| 8,812,620 B2 | 8/2014 | Reisman |
| 8,812,695 B2 | 8/2014 | Luna et al. |
| 8,812,702 B2 | 8/2014 | Mendez et al. |
| 8,816,528 B2 | 8/2014 | Prax et al. |
| 8,817,652 B1 | 8/2014 | Francis |
| 8,817,957 B1 | 8/2014 | Tirey et al. |
| 8,818,325 B2 | 8/2014 | Hatton |
| 8,818,659 B2 | 8/2014 | Sujan et al. |
| 8,818,879 B2 | 8/2014 | Robbins et al. |
| 8,819,659 B2 | 8/2014 | Ramer et al. |
| 8,822,924 B2 | 9/2014 | Valentino et al. |
| 8,823,537 B2 | 9/2014 | LeFebvre et al. |
| 8,823,740 B1 | 9/2014 | Amirparviz et al. |
| 8,823,976 B2 | 9/2014 | Rebert et al. |
| 8,824,784 B2 | 9/2014 | Tedesco et al. |
| 8,825,002 B2 | 9/2014 | Meyer et al. |
| 8,825,022 B2 | 9/2014 | Agrawal et al. |
| 8,825,058 B2 | 9/2014 | Feuer et al. |
| 8,825,358 B2 | 9/2014 | Schafer et al. |
| 8,825,907 B2 | 9/2014 | Nerst et al. |
| 8,826,533 B2 | 9/2014 | Seifert et al. |
| 8,831,205 B1 | 9/2014 | Wu et al. |
| 8,831,597 B1 | 9/2014 | Shmunis et al. |
| 8,831,652 B2 | 9/2014 | Chandra et al. |
| 8,831,814 B2 | 9/2014 | Chen |
| 8,831,826 B2 | 9/2014 | Ricci |
| 8,831,994 B1 | 9/2014 | Hoffman |

(56) References Cited

U.S. PATENT DOCUMENTS

| | | |
|---|---|---|
| 8,832,100 B2 | 9/2014 | Ramer et al. |
| 8,832,228 B2 | 9/2014 | Luna |
| 8,832,649 B2 | 9/2014 | Bishop et al. |
| 8,832,716 B2 | 9/2014 | Bishop et al. |
| 8,836,073 B1 | 9/2014 | Or-Bach et al. |
| 8,836,489 B2 | 9/2014 | Christensen et al. |
| 8,837,363 B2 | 9/2014 | Jones et al. |
| 8,838,169 B2 | 9/2014 | Vendrow et al. |
| 8,838,385 B2 | 9/2014 | Van Wiemeersch |
| 8,838,783 B2 | 9/2014 | Luna et al. |
| 8,839,347 B2 | 9/2014 | Boldyrev et al. |
| 8,839,412 B1 | 9/2014 | Backholm et al. |
| 8,842,747 B2 | 9/2014 | Willms |
| 8,843,103 B2 | 9/2014 | Daly et al. |
| 8,843,110 B2 | 9/2014 | Laghrari et al. |
| 8,843,127 B2 | 9/2014 | Boldyrev et al. |
| 8,843,153 B2 | 9/2014 | Luna et al. |
| 8,843,269 B2 | 9/2014 | Anderson et al. |
| 8,843,395 B2 | 9/2014 | Ramer et al. |
| 8,843,396 B2 | 9/2014 | Ramer et al. |
| 8,848,558 B1 | 9/2014 | Martin et al. |
| 8,848,608 B1 | 9/2014 | Addepalli et al. |
| 8,848,702 B2 | 9/2014 | Troan et al. |
| 8,848,721 B2 | 9/2014 | Turunen et al. |
| 8,849,313 B2 | 9/2014 | Feher |
| 8,849,507 B2 | 9/2014 | Popp et al. |
| 8,849,563 B2 | 9/2014 | Hurley et al. |
| 8,849,652 B2 | 9/2014 | Weider et al. |
| 8,849,715 B2 | 9/2014 | Forbes, Jr. |
| 8,849,806 B2 | 9/2014 | Walker et al. |
| 8,849,931 B2 | 9/2014 | Linner et al. |
| 8,855,469 B2 | 10/2014 | Maharajh et al. |
| 8,855,575 B2 | 10/2014 | Heines et al. |
| 8,855,839 B2 | 10/2014 | Frazier et al. |
| 8,856,252 B2 | 10/2014 | Leppanen et al. |
| 8,860,564 B2 | 10/2014 | Rubin et al. |
| 8,861,005 B2 | 10/2014 | Grosz |
| 8,861,349 B2 | 10/2014 | Delangis |
| 8,861,354 B2 | 10/2014 | Luna et al. |
| 8,861,491 B2 | 10/2014 | Silver et al. |
| 8,861,512 B2 | 10/2014 | Camilleri et al. |
| 8,861,703 B2 | 10/2014 | Labrador et al. |
| 8,862,120 B2 | 10/2014 | Silver |
| 8,862,299 B2 | 10/2014 | Ricci |
| 8,862,346 B2 | 10/2014 | Saltsman et al. |
| 8,862,736 B2 | 10/2014 | Tagg |
| 8,863,256 B1 | 10/2014 | Addepalli et al. |
| 8,863,734 B2 | 10/2014 | Shaffer |
| 8,867,544 B2 | 10/2014 | Hui et al. |
| 8,868,030 B2 | 10/2014 | Sumcad et al. |
| 8,868,106 B2 | 10/2014 | Chen et al. |
| 8,868,288 B2 | 10/2014 | Plante et al. |
| 8,868,661 B2 | 10/2014 | Asawa et al. |
| 8,868,753 B2 | 10/2014 | Luna |
| 8,869,038 B2 | 10/2014 | Eick |
| 8,869,235 B2 | 10/2014 | Qureshi et al. |
| 8,872,650 B2 | 10/2014 | King et al. |
| 8,874,282 B2 | 10/2014 | Fredriksson |
| 8,874,477 B2 | 10/2014 | Hoffberg |
| 8,874,761 B2 | 10/2014 | Backholm |
| 8,879,112 B2 | 11/2014 | Schultz |
| 8,879,242 B2 | 11/2014 | Prax et al. |
| 8,879,417 B2 | 11/2014 | Hodges |
| 8,879,519 B2 | 11/2014 | Laroia et al. |
| 8,879,520 B2 | 11/2014 | Laroia et al. |
| 8,880,248 B2 | 11/2014 | Frazier et al. |
| 8,880,582 B2 | 11/2014 | Zilavy |
| 8,881,027 B1 | 11/2014 | Brown et al. |
| 8,882,662 B2 | 11/2014 | Charles |
| 8,884,782 B2 | 11/2014 | Rubin et al. |
| 8,885,572 B2 | 11/2014 | Laroia et al. |
| 8,885,648 B2 | 11/2014 | McHenry et al. |
| 8,886,389 B2 | 11/2014 | Edwards et al. |
| 8,886,393 B2 | 11/2014 | Edwards et al. |
| 8,886,422 B2 | 11/2014 | Sujan et al. |
| 8,886,563 B2 | 11/2014 | Sakata et al. |
| 8,886,830 B2 | 11/2014 | Kwapniewski et al. |
| 8,886,925 B2 | 11/2014 | Qureshi et al. |
| 8,886,948 B2 | 11/2014 | Schmidt et al. |
| 8,890,717 B2 | 11/2014 | McClellan et al. |
| 8,890,746 B2 | 11/2014 | Alizadeh-Shabdiz et al. |
| 8,891,483 B2 | 11/2014 | Connelly et al. |
| 8,891,753 B2 | 11/2014 | Kirchhoff et al. |
| 8,892,139 B2 | 11/2014 | Marlow et al. |
| 8,892,271 B2 | 11/2014 | Breed |
| 8,892,297 B2 | 11/2014 | Inbarajan |
| 8,892,451 B2 | 11/2014 | Everett et al. |
| 8,893,141 B2 | 11/2014 | Bernabeu-Auban et al. |
| 8,896,430 B2 | 11/2014 | Davidson et al. |
| 8,896,438 B2 | 11/2014 | Emigh et al. |
| 8,896,524 B2 | 11/2014 | Birnbaum et al. |
| 8,896,875 B2 | 11/2014 | Shaheen et al. |
| 8,898,236 B2 | 11/2014 | Kanakadandi et al. |
| 8,901,043 B2 | 12/2014 | Eckhardt et al. |
| 8,902,081 B2 | 12/2014 | Groeneweg |
| 8,902,255 B2 | 12/2014 | Papaefstathiou et al. |
| 8,902,860 B2 | 12/2014 | Laroia et al. |
| 8,902,865 B2 | 12/2014 | Laroia et al. |
| 8,903,062 B2 | 12/2014 | Blackwell et al. |
| 8,903,354 B2 | 12/2014 | Hatton |
| 8,903,954 B2 | 12/2014 | Luna et al. |
| 8,907,775 B2 | 12/2014 | Tyler |
| 8,908,039 B2 | 12/2014 | De Wind et al. |
| 8,909,202 B2 | 12/2014 | Luna et al. |
| 8,912,753 B2 | 12/2014 | Pudar et al. |
| 8,913,171 B2 | 12/2014 | Roberts et al. |
| 8,913,732 B2 | 12/2014 | Bookstaff |
| 8,914,141 B2 | 12/2014 | Philpott et al. |
| 8,914,170 B2 | 12/2014 | Kraeling et al. |
| 8,914,184 B2 | 12/2014 | McQuade et al. |
| 8,914,447 B2 | 12/2014 | Griset et al. |
| 8,917,159 B2 | 12/2014 | McAllister et al. |
| 8,917,240 B2 | 12/2014 | Langridge et al. |
| 8,917,308 B2 | 12/2014 | Kaltsukis |
| 8,917,628 B2 | 12/2014 | Steiner et al. |
| 8,918,229 B2 | 12/2014 | Hunt et al. |
| 8,918,232 B2 | 12/2014 | Lavi et al. |
| 8,918,240 B2 | 12/2014 | Manickaraj et al. |
| 8,918,547 B2 | 12/2014 | Cawse et al. |
| 8,918,841 B2 | 12/2014 | Chawla et al. |
| 8,919,848 B2 | 12/2014 | Ricci |
| 8,922,360 B2 | 12/2014 | Tyler |
| 8,922,391 B2 | 12/2014 | Rubin et al. |
| 8,922,590 B1 | 12/2014 | Luckett, Jr. et al. |
| 8,923,186 B1 | 12/2014 | daCosta |
| 8,923,499 B2 | 12/2014 | Liljestrand et al. |
| 8,923,888 B2 | 12/2014 | Kolodziej |
| 8,924,241 B2 | 12/2014 | Grosso |
| 8,925,808 B2 | 1/2015 | Harrell |
| 8,929,358 B2 | 1/2015 | Silver et al. |
| 8,929,394 B2 | 1/2015 | Nag |
| 8,929,522 B2 | 1/2015 | Berk |
| 8,929,548 B2 | 1/2015 | Rodriguez et al. |
| 8,929,857 B2 | 1/2015 | Baker et al. |
| 8,929,877 B2 | 1/2015 | Rhoads et al. |
| 8,930,229 B2 | 1/2015 | Bowne et al. |
| 8,930,231 B2 | 1/2015 | Bowne et al. |
| 8,930,572 B2 | 1/2015 | Yonge, III et al. |
| 8,934,414 B2 | 1/2015 | Luna |
| 8,934,917 B1 | 1/2015 | Pal et al. |
| 8,935,019 B2 | 1/2015 | Swanson et al. |
| 8,935,094 B2 | 1/2015 | Rubin et al. |
| 8,935,172 B1 | 1/2015 | Noble, Jr. et al. |
| 8,935,319 B2 | 1/2015 | Calo et al. |
| 8,935,326 B2 | 1/2015 | Tagg |
| 8,935,368 B2 | 1/2015 | Calo et al. |
| 8,936,762 B2 | 1/2015 | Ehrlich et al. |
| 8,937,967 B2 | 1/2015 | Melick et al. |
| 8,938,230 B2 | 1/2015 | Yi et al. |
| 8,942,664 B2 | 1/2015 | Silver et al. |
| 8,947,239 B1 | 2/2015 | Park |
| 8,947,531 B2 | 2/2015 | Fischer et al. |
| 8,948,190 B2 | 2/2015 | McGuigan et al. |
| 8,948,366 B2 | 2/2015 | Kaushal et al. |

(56) References Cited

U.S. PATENT DOCUMENTS

| | | |
|---|---|---|
| 8,948,442 B2 | 2/2015 | Breed et al. |
| 8,948,566 B2 | 2/2015 | Lee et al. |
| 8,948,727 B2 | 2/2015 | Tang et al. |
| 8,949,321 B2 | 2/2015 | Gowen et al. |
| 8,949,823 B2 | 2/2015 | Ricci |
| 8,953,570 B2 | 2/2015 | Lin et al. |
| 8,954,059 B1 | 2/2015 | Shmunis et al. |
| 8,954,255 B1 | 2/2015 | Crawford |
| 8,954,274 B2 | 2/2015 | Nesbitt |
| 8,954,479 B2 | 2/2015 | Chao et al. |
| 8,954,480 B2 | 2/2015 | Chao et al. |
| 8,954,516 B2 | 2/2015 | Hartwich et al. |
| 8,956,231 B2 | 2/2015 | Amaitis et al. |
| 8,957,623 B2 | 2/2015 | Sisk et al. |
| 8,958,346 B2 | 2/2015 | Silver et al. |
| 8,958,779 B2 | 2/2015 | Ramer et al. |
| 8,958,988 B2 | 2/2015 | Gueziec |
| 8,959,084 B2 | 2/2015 | Atenasio |
| 8,965,412 B2 | 2/2015 | Alizadeh-Shabdiz et al. |
| 8,965,677 B2 | 2/2015 | Breed et al. |
| 8,965,779 B1 | 2/2015 | Noble, Jr. et al. |
| 8,965,901 B2 | 2/2015 | Merriman et al. |
| 8,966,121 B2 | 2/2015 | Josefsberg et al. |
| 8,971,216 B2 | 3/2015 | Beck et al. |
| 8,971,524 B2 | 3/2015 | Grant et al. |
| 8,971,846 B2 | 3/2015 | Kumar et al. |
| 8,971,873 B2 | 3/2015 | Yi et al. |
| 8,971,887 B2 | 3/2015 | Das |
| 8,971,957 B2 | 3/2015 | Vendrow et al. |
| 8,972,053 B2 | 3/2015 | Bruemmer et al. |
| 8,972,163 B2 | 3/2015 | Green et al. |
| 8,972,165 B2 | 3/2015 | Hurley et al. |
| 8,972,177 B2 | 3/2015 | Zheng et al. |
| 8,972,295 B2 | 3/2015 | Johnson et al. |
| 8,972,736 B2 | 3/2015 | Peirce et al. |
| 8,974,302 B2 | 3/2015 | Amaitis et al. |
| 8,976,141 B2 | 3/2015 | Myers et al. |
| 8,977,408 B1 | 3/2015 | Cazanas et al. |
| 8,977,423 B2 | 3/2015 | Merg et al. |
| 8,977,639 B2 | 3/2015 | Petrou et al. |
| 8,977,755 B2 | 3/2015 | Luna |
| 8,979,159 B2 | 3/2015 | Ricci |
| 8,979,363 B2 | 3/2015 | Groeneweg et al. |
| 8,983,046 B2 | 3/2015 | Croak et al. |
| 8,983,506 B2 | 3/2015 | Silver |
| 8,983,681 B2 | 3/2015 | Yi et al. |
| 8,983,718 B2 | 3/2015 | Ricci |
| 8,983,762 B2 | 3/2015 | Davidson |
| 8,984,094 B2 | 3/2015 | Green et al. |
| 8,984,581 B2 | 3/2015 | Luna et al. |
| 8,989,018 B2 | 3/2015 | Li et al. |
| 8,989,699 B2 | 3/2015 | Hatton et al. |
| 8,989,718 B2 | 3/2015 | Ramer et al. |
| 8,989,954 B1 | 3/2015 | Addepalli et al. |
| 8,989,972 B2 | 3/2015 | Anderson |
| 8,990,840 B2 | 3/2015 | Bishop et al. |
| 8,994,546 B2 | 3/2015 | Breed et al. |
| 8,994,591 B2 | 3/2015 | Dupray et al. |
| 8,995,284 B2 | 3/2015 | Van Greunen et al. |
| 8,995,316 B2 | 3/2015 | Theimer |
| 8,995,451 B2 | 3/2015 | Lawrence et al. |
| 8,995,637 B2 | 3/2015 | Marchevsky et al. |
| 8,995,643 B2 | 3/2015 | Ma et al. |
| 8,995,662 B2 | 3/2015 | Rubin et al. |
| 8,995,815 B2 | 3/2015 | Maharajh et al. |
| 8,995,968 B2 | 3/2015 | Ramer et al. |
| 8,995,973 B2 | 3/2015 | Ramer et al. |
| 8,995,979 B2 | 3/2015 | Doherty et al. |
| 8,995,982 B2 | 3/2015 | Ricci |
| 8,996,198 B2 | 3/2015 | MacNeille et al. |
| 8,996,210 B2 | 3/2015 | Kish et al. |
| 8,996,287 B2 | 3/2015 | Davidson et al. |
| 8,996,418 B2 | 3/2015 | Forbes, Jr. |
| 8,996,419 B2 | 3/2015 | Forbes, Jr. |
| 8,996,698 B1 | 3/2015 | Tagg |
| 8,996,712 B2 | 3/2015 | Green et al. |
| 9,000,557 B2 | 4/2015 | Or-Bach et al. |
| 9,001,666 B2 | 4/2015 | Boerjesson |
| 9,002,350 B1 | 4/2015 | Shmunis et al. |
| 9,002,567 B2 | 4/2015 | Barrett et al. |
| 9,002,645 B2 | 4/2015 | Davidson |
| 9,002,734 B2 | 4/2015 | Felkey et al. |
| 9,003,293 B2 | 4/2015 | Grosz et al. |
| 9,003,294 B1 | 4/2015 | Ames et al. |
| 9,003,443 B2 | 4/2015 | Green et al. |
| 9,003,455 B2 | 4/2015 | Hulse et al. |
| 9,007,302 B1 | 4/2015 | Bandt-Horn |
| 9,008,854 B2 | 4/2015 | Breed |
| 9,008,856 B2 | 4/2015 | Ricci et al. |
| 9,008,906 B2 | 4/2015 | Ricci |
| 9,008,958 B2 | 4/2015 | Rubin et al. |
| 9,009,177 B2 | 4/2015 | Zheng et al. |
| 9,009,250 B2 | 4/2015 | Luna |
| 9,011,153 B2 | 4/2015 | Bennett et al. |
| 9,014,678 B2 | 4/2015 | Macdonald et al. |
| 9,014,884 B2 | 4/2015 | Pritchard et al. |
| 9,014,888 B2 | 4/2015 | Sukkarie et al. |
| 9,014,906 B2 | 4/2015 | Mohn et al. |
| 9,014,910 B2 | 4/2015 | Grau et al. |
| 9,014,953 B2 | 4/2015 | Breed et al. |
| 9,014,966 B2 | 4/2015 | Taylor et al. |
| 9,015,071 B2 | 4/2015 | Breed |
| 9,015,497 B2 | 4/2015 | Peeters et al. |
| 9,020,038 B2 | 4/2015 | Littwitz et al. |
| 9,020,491 B2 | 4/2015 | Ricci |
| 9,020,697 B2 | 4/2015 | Ricci et al. |
| 9,020,743 B2 | 4/2015 | Filev et al. |
| 9,020,760 B2 | 4/2015 | Fryer et al. |
| 9,020,761 B2 | 4/2015 | Davidson |
| 9,021,021 B2 | 4/2015 | Backholm et al. |
| 9,021,052 B2 | 4/2015 | Grosz et al. |
| 9,025,607 B2 | 5/2015 | Zeger et al. |
| 9,025,754 B2 | 5/2015 | Halpern et al. |
| 9,026,235 B2 | 5/2015 | Fisher |
| 9,030,321 B2 | 5/2015 | Breed |
| 9,031,073 B2 | 5/2015 | Yousefi et al. |
| 9,031,089 B2 | 5/2015 | Rubin et al. |
| 9,031,531 B2 | 5/2015 | Miluzzo et al. |
| 9,031,758 B1 | 5/2015 | Goudy et al. |
| 9,031,781 B2 | 5/2015 | Li et al. |
| 9,031,845 B2 | 5/2015 | Kennewick et al. |
| 9,031,986 B2 | 5/2015 | Ramer et al. |
| 9,032,891 B2 | 5/2015 | Kinoshita et al. |
| 9,033,116 B2 | 5/2015 | Breed |
| 9,035,897 B2 | 5/2015 | Kinoshita |
| 9,036,499 B2 | 5/2015 | Kaplan et al. |
| 9,036,591 B2 | 5/2015 | Silver |
| 9,037,406 B2 | 5/2015 | Mason et al. |
| 9,037,451 B2 | 5/2015 | Johnson et al. |
| 9,037,852 B2 | 5/2015 | Pinkus et al. |
| 9,037,920 B2 | 5/2015 | Bell et al. |
| 9,043,016 B2 | 5/2015 | Filippov et al. |
| 9,043,073 B2 | 5/2015 | Ricci |
| 9,043,151 B2 | 5/2015 | Cai et al. |
| 9,043,282 B2 | 5/2015 | Tyhurst et al. |
| 9,043,433 B2 | 5/2015 | Backholm et al. |
| 9,047,717 B2 | 6/2015 | Weinmann et al. |
| 9,047,783 B2 | 6/2015 | Farrell et al. |
| 9,049,040 B2 | 6/2015 | Latvakoski |
| 9,049,042 B2 | 6/2015 | Tagg et al. |
| 9,049,143 B2 | 6/2015 | Ramanchandran et al. |
| 9,049,179 B2 | 6/2015 | Luna |
| 9,049,298 B2 | 6/2015 | Daye et al. |
| 9,049,985 B2 | 6/2015 | Feher |
| 9,053,516 B2 | 6/2015 | Stempora |
| 9,055,022 B2 | 6/2015 | Ricci |
| 9,055,102 B2 | 6/2015 | Fiatal et al. |
| 9,055,105 B2 | 6/2015 | Leppanen et al. |
| 9,055,928 B2 | 6/2015 | McCombie et al. |
| 9,058,141 B2 | 6/2015 | Grosz |
| 9,058,406 B2 | 6/2015 | Soroca et al. |
| 9,058,703 B2 | 6/2015 | Ricci |
| 9,059,929 B2 | 6/2015 | Sudhaakar et al. |
| 9,059,942 B2 | 6/2015 | Boldyrev et al. |

(56) References Cited

U.S. PATENT DOCUMENTS

| | | |
|---|---|---|
| 9,059,978 B2 | 6/2015 | Kotani et al. |
| 9,060,341 B2 | 6/2015 | Karr et al. |
| 9,061,599 B2 | 6/2015 | Sisk |
| 9,062,617 B2 | 6/2015 | Mauti, Jr. |
| 9,063,165 B2 | 6/2015 | Valentino et al. |
| 9,063,525 B2 | 6/2015 | Sanders et al. |
| 9,063,542 B2 | 6/2015 | Greco et al. |
| 9,063,829 B2 | 6/2015 | Yu et al. |
| 9,064,010 B2 | 6/2015 | Maharajh et al. |
| 9,064,011 B2 | 6/2015 | Maharajh et al. |
| 9,064,174 B2 | 6/2015 | Nister et al. |
| 9,064,422 B2 | 6/2015 | Mohn et al. |
| 9,065,765 B2 | 6/2015 | Alisawi |
| 9,067,136 B2 | 6/2015 | Langridge |
| 9,067,565 B2 | 6/2015 | McClellan et al. |
| 9,068,852 B2 | 6/2015 | Mason et al. |
| 9,068,856 B2 | 6/2015 | Dorum et al. |
| 9,069,599 B2 | 6/2015 | Martinez et al. |
| 9,069,794 B1 | 6/2015 | Bandukwala et al. |
| 9,070,100 B2 | 6/2015 | Davidson |
| 9,070,168 B2 | 6/2015 | Amigo et al. |
| 9,070,173 B2 | 6/2015 | Forbes, Jr. |
| 9,070,291 B2 | 6/2015 | Gueziec |
| 9,071,619 B2 | 6/2015 | Ludwig et al. |
| 9,071,892 B2 | 6/2015 | Gratke et al. |
| 9,073,405 B2 | 7/2015 | Choi et al. |
| 9,074,892 B2 | 7/2015 | Fink |
| 9,075,136 B1 | 7/2015 | Joao |
| 9,075,146 B1 | 7/2015 | Valentino et al. |
| 9,075,561 B2 | 7/2015 | Sarnoff |
| 9,075,826 B2 | 7/2015 | Shen et al. |
| 9,076,175 B2 | 7/2015 | Ramer et al. |
| 9,077,641 B2 | 7/2015 | Reich et al. |
| 9,078,200 B2 | 7/2015 | Wuergler et al. |
| 9,079,470 B2 | 7/2015 | Slawson |
| 9,079,497 B2 | 7/2015 | Ricci |
| 9,081,418 B1 | 7/2015 | Yao et al. |
| 9,081,485 B1 | 7/2015 | Brown et al. |
| 9,081,653 B2 | 7/2015 | Ricci et al. |
| 9,081,860 B2 | 7/2015 | Genera et al. |
| 9,081,944 B2 | 7/2015 | Camacho et al. |
| 9,082,100 B2 | 7/2015 | Hurley et al. |
| 9,082,103 B2 | 7/2015 | Breed |
| 9,082,238 B2 | 7/2015 | Ricci |
| 9,082,239 B2 | 7/2015 | Ricci |
| 9,082,243 B2 | 7/2015 | Gostoli et al. |
| 9,082,303 B2 | 7/2015 | Gueziec |
| 9,082,414 B2 | 7/2015 | Talwar et al. |
| 9,083,414 B2 | 7/2015 | Basnayake et al. |
| 9,083,581 B1 | 7/2015 | Addepalli et al. |
| 9,083,802 B2 | 7/2015 | Anisimov et al. |
| 9,084,091 B2 | 7/2015 | Shah et al. |
| 9,084,105 B2 | 7/2015 | Luna et al. |
| 9,084,118 B2 | 7/2015 | Oesterling |
| 9,085,334 B2 | 7/2015 | Hoffmann et al. |
| 9,086,285 B2 | 7/2015 | Gupta et al. |
| 9,087,099 B2 | 7/2015 | Camacho et al. |
| 9,087,215 B2 | 7/2015 | LaFever et al. |
| 9,087,216 B2 | 7/2015 | LaFever et al. |
| 9,087,319 B2 | 7/2015 | Nguyen |
| 9,088,454 B2 | 7/2015 | Yousefi et al. |
| 9,088,572 B2 | 7/2015 | Ricci |
| 9,088,903 B2 | 7/2015 | Kim et al. |
| 9,090,295 B2 | 7/2015 | Lagassey |
| 9,090,339 B2 | 7/2015 | Arms et al. |
| 9,091,551 B2 | 7/2015 | Hannah et al. |
| 9,091,558 B2 | 7/2015 | Su et al. |
| 9,091,581 B2 | 7/2015 | Henry et al. |
| 9,092,914 B2 | 7/2015 | Muetzel et al. |
| 9,092,984 B2 | 7/2015 | Bahl et al. |
| 9,094,436 B2 | 7/2015 | Westra et al. |
| 9,096,234 B2 | 8/2015 | Frye |
| 9,097,549 B1 | 8/2015 | Rao et al. |
| 9,098,080 B2 | 8/2015 | Norris et al. |
| 9,098,232 B2 | 8/2015 | Huang |
| 9,098,367 B2 | 8/2015 | Ricci |
| 9,098,433 B1 | 8/2015 | Lazier et al. |
| 9,098,590 B2 | 8/2015 | Perrow et al. |
| 9,098,952 B2 | 8/2015 | Jung et al. |
| 9,098,957 B1 | 8/2015 | Alam et al. |
| 9,098,958 B2 | 8/2015 | Joyce et al. |
| 9,099,000 B2 | 8/2015 | Schalk |
| 9,099,526 B2 | 8/2015 | Or-Bach et al. |
| 9,100,503 B2 | 8/2015 | Terpstra et al. |
| 9,100,873 B2 | 8/2015 | Luna et al. |
| 9,100,989 B2 | 8/2015 | Ray et al. |
| 9,103,671 B1 | 8/2015 | Breed et al. |
| 9,103,679 B2 | 8/2015 | Habib et al. |
| 9,103,920 B2 | 8/2015 | Valentino et al. |
| 9,104,239 B2 | 8/2015 | Kim et al. |
| 9,104,287 B2 | 8/2015 | Balchandran et al. |
| 9,104,538 B2 | 8/2015 | Garrett et al. |
| 9,105,051 B2 | 8/2015 | Ricci |
| 9,105,066 B2 | 8/2015 | Gay et al. |
| 9,105,189 B2 | 8/2015 | Rubin et al. |
| 9,105,304 B2 | 8/2015 | Marrow et al. |
| 9,106,286 B2 | 8/2015 | Agee et al. |
| 9,106,729 B2 | 8/2015 | Kantak et al. |
| 9,107,058 B2 | 8/2015 | Inha et al. |
| 9,107,089 B2 | 8/2015 | Kasslin et al. |
| 9,107,195 B2 | 8/2015 | Doherty et al. |
| 9,108,579 B2 | 8/2015 | Camacho et al. |
| 9,108,646 B2 | 8/2015 | Swanson et al. |
| 9,110,996 B2 | 8/2015 | Ramer et al. |
| 9,111,125 B2 | 8/2015 | Westerman et al. |
| 9,111,234 B2 | 8/2015 | Wallace et al. |
| 9,111,333 B2 | 8/2015 | Jiang et al. |
| 9,111,604 B2 | 8/2015 | Reisman |
| 9,112,700 B2 | 8/2015 | Link, II |
| 9,112,721 B2 | 8/2015 | Behrens et al. |
| 9,112,788 B2 | 8/2015 | Thubert et al. |
| 9,112,996 B2 | 8/2015 | Klaban |
| 9,113,182 B2 | 8/2015 | Lemmons |
| 9,113,288 B2 | 8/2015 | Sauerbrey et al. |
| 9,113,289 B2 | 8/2015 | Sudit et al. |
| 9,114,812 B2 | 8/2015 | Frazier et al. |
| 9,115,989 B2 | 8/2015 | Valentino et al. |
| 9,116,786 B2 | 8/2015 | Ricci |
| 9,116,818 B2 | 8/2015 | Bilange et al. |
| 9,117,190 B2 | 8/2015 | Davidson |
| 9,117,318 B2 | 8/2015 | Ricci |
| 9,118,383 B2 | 8/2015 | Arcidiacono et al. |
| 9,118,593 B2 | 8/2015 | Kunarathnam et al. |
| 9,119,128 B2 | 8/2015 | Ruparelia et al. |
| 9,121,719 B2 | 9/2015 | Stankoulov |
| 9,122,621 B2 | 9/2015 | Cawse et al. |
| 9,123,058 B2 | 9/2015 | Ricci |
| 9,123,098 B2 | 9/2015 | Takahashi et al. |
| 9,123,186 B2 | 9/2015 | Ricci |
| 9,124,650 B2 | 9/2015 | Maharajh et al. |
| 9,124,957 B1 | 9/2015 | Fogel et al. |
| 9,125,042 B2 | 9/2015 | Daly et al. |
| 9,126,514 B2 | 9/2015 | Soar |
| 9,127,955 B2 | 9/2015 | Tsimhoni et al. |
| 9,127,959 B2 | 9/2015 | Kantarjiev et al. |
| 9,128,798 B2 | 9/2015 | Hoffman et al. |
| 9,128,809 B2 | 9/2015 | Davidson et al. |
| 9,128,867 B2 | 9/2015 | Cawse et al. |
| 9,128,906 B2 | 9/2015 | Peters et al. |
| 9,129,133 B2 | 9/2015 | LaFever et al. |
| 9,129,449 B2 | 9/2015 | Davidson |
| 9,129,605 B2 | 9/2015 | Eller et al. |
| 9,130,647 B2 | 9/2015 | Yarnold et al. |
| 9,130,760 B2 | 9/2015 | Lehane et al. |
| 9,130,930 B2 | 9/2015 | Kennedy |
| 9,131,397 B2 | 9/2015 | Luna et al. |
| 9,132,806 B2 | 9/2015 | De Los Santos et al. |
| 9,134,353 B2 | 9/2015 | Jia et al. |
| 9,134,398 B2 | 9/2015 | Dupray et al. |
| 9,134,955 B2 | 9/2015 | Healey et al. |
| 9,134,986 B2 | 9/2015 | Ricci |
| 9,135,155 B2 | 9/2015 | Sharon et al. |
| 9,135,569 B2 | 9/2015 | Narasimha et al. |
| 9,135,731 B2 | 9/2015 | Lauenstein et al. |

(56) References Cited

U.S. PATENT DOCUMENTS

| | | |
|---|---|---|
| 9,135,756 B2 | 9/2015 | Doughty et al. |
| 9,135,759 B2 | 9/2015 | Baer et al. |
| 9,135,764 B2 | 9/2015 | Ricci |
| 9,136,153 B2 | 9/2015 | Or-Bach et al. |
| 9,137,262 B2 | 9/2015 | Qureshi et al. |
| 9,137,364 B2 | 9/2015 | Gullapalli et al. |
| 9,137,389 B2 | 9/2015 | Neal et al. |
| 9,140,560 B2 | 9/2015 | Ricci |
| 9,140,565 B2 | 9/2015 | Taguchi |
| 9,140,567 B2 | 9/2015 | Fryer et al. |
| 9,140,715 B2 | 9/2015 | Wilson et al. |
| 9,141,171 B2 | 9/2015 | Chew et al. |
| 9,141,220 B2 | 9/2015 | Engl et al. |
| 9,141,618 B2 | 9/2015 | Boldyrev et al. |
| 9,141,772 B2 | 9/2015 | Ristock et al. |
| 9,142,071 B2 | 9/2015 | Ricci |
| 9,142,072 B2 | 9/2015 | Ricci |
| 9,142,142 B2 | 9/2015 | Nath et al. |
| 9,143,203 B2 | 9/2015 | Park |
| 9,143,384 B2 | 9/2015 | Yousefi et al. |
| 9,143,529 B2 | 9/2015 | Qureshi et al. |
| 9,143,530 B2 | 9/2015 | Qureshi et al. |
| 9,143,912 B2 | 9/2015 | Leppanen |
| 9,145,059 B2 | 9/2015 | Gibbs et al. |
| 9,145,149 B2 | 9/2015 | Frazier et al. |
| 9,146,118 B2 | 9/2015 | Liu et al. |
| 9,146,120 B2 | 9/2015 | Wan |
| 9,147,219 B2 | 9/2015 | Binion et al. |
| 9,147,296 B2 | 9/2015 | Ricci |
| 9,147,297 B2 | 9/2015 | Ricci |
| 9,147,298 B2 | 9/2015 | Ricci |
| 9,147,353 B1 | 9/2015 | Slusar |
| 9,148,702 B1 | 9/2015 | Ko et al. |
| 9,148,743 B2 | 9/2015 | Timm et al. |
| RE45,757 E | 10/2015 | Quayle et al. |
| 9,149,236 B2 | 10/2015 | Chun et al. |
| 9,150,272 B1 | 10/2015 | Thompson |
| 9,151,692 B2 | 10/2015 | Breed |
| 9,152,202 B2 | 10/2015 | Seinfeld et al. |
| 9,152,488 B2 | 10/2015 | Presman et al. |
| 9,152,933 B2 | 10/2015 | Wellman |
| 9,153,084 B2 | 10/2015 | Ricci |
| 9,153,132 B2 | 10/2015 | Goudy et al. |
| 9,154,324 B2 | 10/2015 | Hartwich et al. |
| 9,154,976 B1 | 10/2015 | Martin et al. |
| 9,157,383 B2 | 10/2015 | Stevens et al. |
| 9,159,098 B2 | 10/2015 | Van Rensburg et al. |
| 9,160,612 B2 | 10/2015 | Lambeth et al. |
| 9,160,629 B1 | 10/2015 | Martin et al. |
| 9,160,755 B2 | 10/2015 | Chasin et al. |
| 9,160,851 B2 | 10/2015 | Kugler et al. |
| 9,160,869 B2 | 10/2015 | Schult |
| 9,161,258 B2 | 10/2015 | Wendling et al. |
| 9,161,700 B2 | 10/2015 | Banet et al. |
| 9,163,718 B2 | 10/2015 | Nelson et al. |
| 9,163,952 B2 | 10/2015 | Viola et al. |
| 9,165,466 B2 | 10/2015 | Yi et al. |
| 9,166,845 B2 | 10/2015 | Hui et al. |
| 9,166,888 B1 | 10/2015 | Brockbank et al. |
| 9,166,936 B1 | 10/2015 | Stovall et al. |
| 9,166,987 B2 | 10/2015 | Sun |
| 9,167,097 B2 | 10/2015 | Kung et al. |
| 9,167,619 B2 | 10/2015 | Tucker et al. |
| 9,170,583 B2 | 10/2015 | Lozier et al. |
| 9,170,648 B2 | 10/2015 | Roth |
| 9,170,913 B2 | 10/2015 | Hunt et al. |
| 9,171,079 B2 | 10/2015 | Banka et al. |
| 9,171,201 B2 | 10/2015 | Lake, II et al. |
| 9,171,471 B2 | 10/2015 | Davidson |
| 9,172,116 B2 | 10/2015 | Ross et al. |
| 9,172,680 B2 | 10/2015 | Marlow et al. |
| 9,173,100 B2 | 10/2015 | Ricci |
| 9,173,128 B2 | 10/2015 | Backholm et al. |
| 9,173,154 B2 | 10/2015 | Merino Gonzalez et al. |
| 9,173,566 B2 | 11/2015 | Feher |
| 9,173,593 B2 | 11/2015 | Banet et al. |
| 9,173,594 B2 | 11/2015 | Banet et al. |
| 9,175,967 B2 | 11/2015 | Abramson et al. |
| 9,176,924 B2 | 11/2015 | Ricci |
| 9,177,476 B2 | 11/2015 | Breed |
| 9,178,720 B2 | 11/2015 | Tang |
| 9,178,829 B2 | 11/2015 | Meier et al. |
| 9,179,253 B2 | 11/2015 | Cho |
| 9,179,311 B2 | 11/2015 | Peirce et al. |
| 9,179,487 B2 | 11/2015 | Silver |
| 9,179,488 B2 | 11/2015 | Lei et al. |
| 9,180,747 B2 | 11/2015 | Slawson |
| 9,182,764 B1 | 11/2015 | Kolhouse et al. |
| 9,182,996 B2 | 11/2015 | Kempka |
| 9,183,273 B2 | 11/2015 | Raghunathan et al. |
| 9,183,380 B2 | 11/2015 | Qureshi et al. |
| 9,183,560 B2 | 11/2015 | Abelow |
| 9,183,572 B2 | 11/2015 | Brubaker |
| 9,183,584 B2 | 11/2015 | Blumberg et al. |
| 9,183,685 B2 | 11/2015 | Ricci |
| 9,184,778 B2 | 11/2015 | Tan |
| 9,185,142 B2 | 11/2015 | Mussman et al. |
| 9,185,521 B2 | 11/2015 | Leppanen et al. |
| 9,185,560 B2 | 11/2015 | Schmidt et al. |
| 9,185,675 B2 | 11/2015 | Chen et al. |
| 9,187,085 B1 | 11/2015 | Nallapa et al. |
| 9,188,449 B2 | 11/2015 | Biswal et al. |
| 9,188,451 B2 | 11/2015 | Magnusson et al. |
| 9,189,879 B2 | 11/2015 | Filev et al. |
| 9,190,844 B2 | 11/2015 | Tran |
| 9,191,135 B2 | 11/2015 | Englert |
| 9,191,138 B2 | 11/2015 | Li et al. |
| 9,191,505 B2 | 11/2015 | Poder |
| 9,191,515 B2 | 11/2015 | Doulton |
| 9,191,634 B2 | 11/2015 | Schofield et al. |
| 9,191,866 B2 | 11/2015 | Stimpson et al. |
| 9,195,984 B1 | 11/2015 | Spector et al. |
| 9,195,993 B2 | 11/2015 | Ramer et al. |
| 9,196,005 B2 | 11/2015 | Williams et al. |
| 9,197,297 B2 | 11/2015 | Agee et al. |
| 9,197,599 B1 | 11/2015 | Barry et al. |
| 9,197,906 B1 | 11/2015 | Kathol et al. |
| 9,200,561 B2 | 12/2015 | McAlister |
| 9,200,902 B2 | 12/2015 | Madhavan et al. |
| 9,200,921 B2 | 12/2015 | Iwuchukwu |
| 9,201,575 B2 | 12/2015 | Day |
| 9,201,979 B2 | 12/2015 | Ramer et al. |
| 9,202,186 B2 | 12/2015 | Wellman et al. |
| 9,202,318 B2 | 12/2015 | Batcheller et al. |
| 9,202,465 B2 | 12/2015 | Talwar et al. |
| 9,203,553 B1 | 12/2015 | Li et al. |
| 9,203,652 B2 | 12/2015 | Petit-Huguenin et al. |
| 9,203,680 B2 | 12/2015 | Beidas et al. |
| 9,203,864 B2 | 12/2015 | Luna et al. |
| 9,204,251 B1 | 12/2015 | Mendelson |
| 9,204,257 B1 | 12/2015 | Mendelson |
| 9,204,351 B2 | 12/2015 | White et al. |
| 9,204,359 B2 | 12/2015 | Sapkota et al. |
| 9,208,123 B2 | 12/2015 | Luna |
| 9,208,626 B2 | 12/2015 | Davidson |
| 9,208,780 B2 | 12/2015 | Fujimoto et al. |
| 9,209,871 B2 | 12/2015 | Agee et al. |
| 9,209,977 B2 | 12/2015 | Catsburg et al. |
| 9,210,249 B2 | 12/2015 | Wuergler et al. |
| 9,210,256 B1 | 12/2015 | Humphrey et al. |
| 9,210,276 B2 | 12/2015 | Hunt et al. |
| 9,210,708 B1 | 12/2015 | Li et al. |
| 9,211,811 B2 | 12/2015 | Breed |
| 9,213,090 B2 | 12/2015 | Paoletti |
| 9,213,447 B2 | 12/2015 | Chen |
| 9,213,944 B1 | 12/2015 | Do et al. |
| 9,213,947 B1 | 12/2015 | Do et al. |
| 9,214,191 B2 | 12/2015 | Guzik |
| 9,215,212 B2 | 12/2015 | Reddy et al. |
| 9,215,317 B2 | 12/2015 | Shmunis et al. |
| 9,215,319 B2 | 12/2015 | Silver et al. |
| 9,215,322 B1 | 12/2015 | Wu et al. |
| 9,215,683 B1 | 12/2015 | Tonogai |
| 9,215,728 B2 | 12/2015 | Silver |

(56) References Cited

U.S. PATENT DOCUMENTS

| | | |
|---|---|---|
| 9,215,986 B2 | 12/2015 | Banet et al. |
| 9,216,068 B2 | 12/2015 | Tesar |
| 9,218,609 B2 | 12/2015 | Hertel et al. |
| 9,218,689 B1 | 12/2015 | Baldwin |
| 9,218,698 B2 | 12/2015 | Ricci |
| 9,218,718 B2 | 12/2015 | Barclay et al. |
| 9,219,572 B2 | 12/2015 | Li et al. |
| 9,219,677 B2 | 12/2015 | McCann et al. |
| 9,219,678 B2 | 12/2015 | Brouk et al. |
| 9,221,428 B2 | 12/2015 | Kote et al. |
| 9,221,452 B2 | 12/2015 | Tang et al. |
| 9,223,878 B2 | 12/2015 | Ramer et al. |
| 9,223,897 B1 | 12/2015 | Gross et al. |
| 9,224,249 B2 | 12/2015 | Lowrey et al. |
| 9,224,250 B2 | 12/2015 | Daoud et al. |
| 9,225,376 B2 | 12/2015 | Olson |
| 9,225,581 B2 | 12/2015 | Yousefi et al. |
| 9,225,760 B2 | 12/2015 | Ralston et al. |
| 9,225,782 B2 | 12/2015 | Addepalli et al. |
| 9,225,793 B2 | 12/2015 | Dutta et al. |
| 9,225,839 B2 | 12/2015 | Gisby et al. |
| 9,225,844 B2 | 12/2015 | Madhavan et al. |
| 9,226,012 B2 | 12/2015 | McKissick et al. |
| 9,226,115 B2 | 12/2015 | Raghunathan et al. |
| 9,226,117 B2 | 12/2015 | Vos et al. |
| 9,226,216 B2 | 12/2015 | Ruparelia et al. |
| 9,227,595 B2 | 1/2016 | Yang et al. |
| 9,228,843 B2 | 1/2016 | Rangarajan et al. |
| 9,229,734 B2 | 1/2016 | Hulse et al. |
| 9,229,800 B2 | 1/2016 | Jain et al. |
| 9,229,903 B2 | 1/2016 | Swanson et al. |
| 9,229,906 B2 | 1/2016 | McQuade et al. |
| 9,230,002 B2 | 1/2016 | Wong et al. |
| 9,230,232 B2 | 1/2016 | McCormick et al. |
| 9,230,379 B2 | 1/2016 | Ricci |
| 9,230,438 B2 | 1/2016 | Barrett |
| 9,231,823 B2 | 1/2016 | Van Greunen et al. |
| 9,231,904 B2 | 1/2016 | Johnson et al. |
| 9,232,007 B2 | 1/2016 | Rebert et al. |
| 9,232,451 B2 | 1/2016 | Murphy et al. |
| 9,233,315 B2 | 1/2016 | Fredriksson |
| 9,234,780 B2 | 1/2016 | Henry et al. |
| 9,235,941 B2 | 1/2016 | Ricci et al. |
| 9,237,543 B2 | 1/2016 | Karr et al. |
| 9,238,465 B1 | 1/2016 | Ghannam et al. |
| 9,239,989 B2 | 1/2016 | Bouqata et al. |
| 9,240,018 B2 | 1/2016 | Ricci |
| 9,240,019 B2 | 1/2016 | Ricci |
| 9,240,082 B2 | 1/2016 | Marathe et al. |
| 9,240,763 B2 | 1/2016 | Baumgarte |
| 9,241,314 B2 | 1/2016 | Ismail et al. |
| 9,242,653 B2 | 1/2016 | Schweikl et al. |
| 9,245,266 B2 | 1/2016 | Hardt |
| 9,245,434 B2 | 1/2016 | Baillargeon et al. |
| 9,246,207 B2 | 1/2016 | Smith et al. |
| 9,246,335 B2 | 1/2016 | Blevins et al. |
| 9,246,794 B2 | 1/2016 | Thubert et al. |
| 9,246,862 B2 | 1/2016 | Papakipos et al. |
| 9,247,378 B2 | 1/2016 | Bisson et al. |
| 9,247,434 B2 | 1/2016 | Tengler et al. |
| 9,247,478 B1 | 1/2016 | Gorman et al. |
| 9,248,790 B2 | 2/2016 | Bradley et al. |
| 9,250,079 B2 | 2/2016 | Zhou |
| 9,250,327 B2 | 2/2016 | Kelley et al. |
| 9,251,193 B2 | 2/2016 | Ariel et al. |
| 9,251,628 B2 | 2/2016 | Ubik et al. |
| 9,251,648 B2 | 2/2016 | Anderson et al. |
| 9,251,693 B2 | 2/2016 | Edwards |
| 9,253,127 B2 | 2/2016 | Gourevitch et al. |
| 9,253,200 B2 | 2/2016 | Schwarz et al. |
| 9,253,545 B2 | 2/2016 | Lemmons |
| 9,254,092 B2 | 2/2016 | Albert et al. |
| 9,254,099 B2 | 2/2016 | Connor |
| 9,254,798 B1 | 2/2016 | Mostafa et al. |
| 9,255,810 B2 | 2/2016 | Van Wiemeersch et al. |
| 9,256,679 B2 | 2/2016 | Chung |
| 9,256,992 B2 | 2/2016 | Davidson |
| 9,258,148 B2 | 2/2016 | Gatti et al. |
| 9,258,173 B2 | 2/2016 | Yousefi et al. |
| 9,258,193 B2 | 2/2016 | Kasslin et al. |
| 9,258,198 B2 | 2/2016 | Burke et al. |
| 9,258,208 B2 | 2/2016 | Thubert et al. |
| 9,258,260 B2 | 2/2016 | Nikolayev et al. |
| 9,258,419 B2 | 2/2016 | Bradburn |
| 9,258,695 B2 | 2/2016 | Kasslin et al. |
| 9,258,758 B2 | 2/2016 | Miranda et al. |
| 9,258,765 B1 | 2/2016 | daCosta |
| 9,259,986 B2 | 2/2016 | Slawson |
| 9,260,976 B2 | 2/2016 | Phillips et al. |
| 9,261,376 B2 | 2/2016 | Zheng et al. |
| 9,262,370 B2 | 2/2016 | Hofstaedter et al. |
| 9,262,439 B2 | 2/2016 | Delli Santi et al. |
| 9,262,787 B2 | 2/2016 | Binion et al. |
| 9,262,934 B2 | 2/2016 | Mohn et al. |
| 9,264,151 B1 | 2/2016 | Emigh et al. |
| 9,264,243 B2 | 2/2016 | Thubert et al. |
| 9,264,292 B2 | 2/2016 | El Osta |
| 9,264,344 B2 | 2/2016 | Li et al. |
| 9,264,758 B2 | 2/2016 | Gharaat et al. |
| 9,264,846 B2 | 2/2016 | Stromberg et al. |
| 9,264,877 B2 | 2/2016 | Feher |
| 9,264,892 B2 | 2/2016 | Robertson |
| 9,268,882 B2 | 2/2016 | Slaton et al. |
| 9,269,203 B2 | 2/2016 | Peirce |
| 9,269,267 B2 | 2/2016 | Goodwin |
| 9,270,541 B2 | 2/2016 | Burke et al. |
| 9,270,676 B2 | 2/2016 | Shiloh |
| 9,270,819 B2 | 2/2016 | Baldridge et al. |
| 9,270,824 B2 | 2/2016 | Klaban |
| 9,270,952 B2 | 2/2016 | Jamtgaard et al. |
| 9,271,023 B2 | 2/2016 | Ramer et al. |
| 9,271,133 B2 | 2/2016 | Rodriguez |
| 9,271,238 B2 | 2/2016 | Ismail et al. |
| 9,272,714 B2 | 3/2016 | Rao et al. |
| 9,272,853 B2 | 3/2016 | Van Mill et al. |
| 9,273,972 B2 | 3/2016 | Narasimha et al. |
| 9,273,976 B2 | 3/2016 | Davidson |
| 9,274,132 B2 | 3/2016 | Wilson et al. |
| 9,275,093 B2 | 3/2016 | Pandey et al. |
| 9,275,387 B1 | 3/2016 | Spector et al. |
| 9,275,417 B2 | 3/2016 | Binion et al. |
| 9,276,736 B2 | 3/2016 | Peirce |
| 9,276,737 B2 | 3/2016 | Peirce |
| 9,276,964 B2 | 3/2016 | Stille et al. |
| 9,277,092 B2 | 3/2016 | Webster et al. |
| 9,277,370 B2 | 3/2016 | Addepalli et al. |
| 9,277,378 B2 | 3/2016 | Jackson et al. |
| 9,277,400 B2 | 3/2016 | Malaney |
| 9,277,443 B2 | 3/2016 | Backholm et al. |
| 9,277,477 B2 | 3/2016 | Leppanen et al. |
| 9,277,481 B2 | 3/2016 | Laroia et al. |
| 9,277,486 B2 | 3/2016 | Elnajjar |
| 9,277,492 B2 | 3/2016 | Juang et al. |
| 9,277,525 B2 | 3/2016 | Dupray et al. |
| 9,278,655 B2 | 3/2016 | Jones et al. |
| 9,280,212 B1 | 3/2016 | Kret et al. |
| 9,280,294 B1 | 3/2016 | Hushon et al. |
| 9,280,403 B2 | 3/2016 | Ishibashi et al. |
| 9,280,435 B2 | 3/2016 | Hunt et al. |
| 9,280,559 B1 | 3/2016 | Jones |
| 9,280,605 B2 | 3/2016 | Tilden et al. |
| 9,280,902 B2 | 3/2016 | Silzer, Sr. et al. |
| 9,280,919 B2 | 3/2016 | Johnson et al. |
| 9,281,942 B2 | 3/2016 | Leboeuf et al. |
| 9,281,970 B2 | 3/2016 | Ran |
| 9,282,029 B2 | 3/2016 | Petite |
| 9,282,110 B2 | 3/2016 | Zhang et al. |
| 9,282,200 B2 | 3/2016 | Grosz et al. |
| 9,282,201 B2 | 3/2016 | Grosz et al. |
| 9,282,202 B2 | 3/2016 | Gowen et al. |
| 9,283,862 B2 | 3/2016 | Bridges et al. |
| 9,283,954 B2 | 3/2016 | Dalum |
| 9,284,015 B2 | 3/2016 | Thompson |
| 9,285,229 B2 | 3/2016 | Kunath et al. |

(56) References Cited

U.S. PATENT DOCUMENTS

| | | |
|---|---|---|
| 9,285,382 B2 | 3/2016 | Wilson et al. |
| 9,285,430 B2 | 3/2016 | Loftus et al. |
| 9,285,966 B2 | 3/2016 | Bechtel et al. |
| 9,286,029 B2 | 3/2016 | Raux et al. |
| 9,286,244 B2 | 3/2016 | Stauner et al. |
| 9,286,266 B1 | 3/2016 | Fleck et al. |
| 9,286,471 B2 | 3/2016 | Qureshi et al. |
| 9,286,736 B2 | 3/2016 | Punjabi et al. |
| 9,288,048 B2 | 3/2016 | Han et al. |
| 9,288,148 B1 | 3/2016 | Krishnaswamy et al. |
| 9,288,173 B2 | 3/2016 | Vitaldevara et al. |
| 9,288,608 B2 | 3/2016 | Richardson et al. |
| 9,290,074 B2 | 3/2016 | Slawson |
| 9,290,146 B2 | 3/2016 | Breed |
| 9,290,153 B2 | 3/2016 | Ricci et al. |
| 9,290,227 B2 | 3/2016 | Thompson |
| 9,290,229 B2 | 3/2016 | Thompson |
| 9,291,466 B2 | 3/2016 | Davidson |
| 9,292,014 B2 | 3/2016 | Caron et al. |
| 9,292,133 B2 | 3/2016 | Nishioka |
| 9,292,602 B2 | 3/2016 | Morris et al. |
| 9,292,909 B2 | 3/2016 | Hogasten et al. |
| 9,292,952 B2 | 3/2016 | Giuli et al. |
| 9,292,978 B2 | 3/2016 | Hunt |
| 9,292,979 B2 | 3/2016 | Olsen, III et al. |
| 9,292,996 B2 | 3/2016 | Davis et al. |
| 9,293,039 B2 | 3/2016 | Margulici et al. |
| 9,293,042 B1 | 3/2016 | Wasserman |
| 9,294,635 B2 | 3/2016 | Gowen et al. |
| 9,295,922 B2 | 3/2016 | Fisher |
| 9,296,273 B2 | 3/2016 | Slawson |
| 9,296,299 B2 | 3/2016 | Ricci |
| 9,296,338 B2 | 3/2016 | Kaplan et al. |
| 9,297,662 B2 | 3/2016 | Ricci |
| 9,298,803 B2 | 3/2016 | Wallace |
| 9,299,066 B2 | 3/2016 | Borghetti et al. |
| 9,299,250 B1 | 3/2016 | Sumcad et al. |
| 9,300,699 B2 | 3/2016 | Kung et al. |
| 9,300,719 B2 | 3/2016 | Luna et al. |
| 9,300,817 B2 | 3/2016 | Schultz |
| 9,301,242 B2 | 3/2016 | Yi et al. |
| 9,301,310 B2 | 3/2016 | Quigley et al. |
| RE45,975 E | 4/2016 | Cho et al. |
| 9,305,317 B2 | 4/2016 | Grokop et al. |
| 9,305,411 B2 | 4/2016 | Ricci |
| 9,305,867 B1 | 4/2016 | Or-Bach et al. |
| 9,306,891 B2 | 4/2016 | McNamee et al. |
| 9,307,351 B2 | 4/2016 | Park |
| 9,307,407 B1 | 4/2016 | Feher |
| 9,307,448 B2 | 4/2016 | Krishnaswamy et al. |
| 9,307,493 B2 | 4/2016 | Backholm et al. |
| 9,310,216 B2 | 4/2016 | MacNeille et al. |
| 9,311,586 B2 | 4/2016 | Robinette et al. |
| 9,311,670 B2 | 4/2016 | Hoffberg |
| 9,311,805 B2 | 4/2016 | Zishaan |
| 9,312,929 B2 | 4/2016 | Forenza et al. |
| 9,312,968 B2 | 4/2016 | Choi et al. |
| 9,313,106 B2 | 4/2016 | Oddo et al. |
| 9,313,316 B2 | 4/2016 | Shirzadi |
| 9,313,629 B2 | 4/2016 | Chen et al. |
| 9,313,661 B2 | 4/2016 | Eling et al. |
| 9,315,109 B2 | 4/2016 | Marathe et al. |
| 9,315,151 B2 | 4/2016 | Taylor et al. |
| 9,317,351 B2 | 4/2016 | Hilliges et al. |
| 9,317,566 B1 | 4/2016 | LHuillier et al. |
| 9,317,574 B1 | 4/2016 | Brisebois et al. |
| 9,317,855 B2 | 4/2016 | Altberg et al. |
| 9,317,972 B2 | 4/2016 | Forutanpour et al. |
| 9,317,983 B2 | 4/2016 | Ricci |
| 9,319,140 B2 | 4/2016 | Chen et al. |
| 9,319,212 B2 | 4/2016 | Feher |
| 9,319,361 B2 | 4/2016 | Chakra et al. |
| 9,319,362 B1 | 4/2016 | McAllister et al. |
| 9,319,523 B2 | 4/2016 | Kirchhoff et al. |
| 9,319,836 B2 | 4/2016 | Jodlauk et al. |
| 9,321,467 B2 | 4/2016 | Frazier et al. |
| 9,322,658 B2 | 4/2016 | Hannah et al. |
| 9,323,232 B2 | 4/2016 | Blom et al. |
| 9,323,246 B2 | 4/2016 | Long et al. |
| 9,323,342 B2 | 4/2016 | Aronsson et al. |
| 9,323,429 B2 | 4/2016 | Lu et al. |
| 9,323,601 B2 | 4/2016 | Feldbauer et al. |
| 9,323,781 B2 | 4/2016 | Dzubay et al. |
| 9,324,089 B2 | 4/2016 | Ramaswamy et al. |
| 9,324,096 B2 | 4/2016 | Higgins |
| 9,324,198 B2 | 4/2016 | Davidson et al. |
| 9,324,234 B2 | 4/2016 | Ricci et al. |
| 9,325,525 B2 | 4/2016 | Goel et al. |
| 9,325,560 B2 | 4/2016 | Du |
| 9,325,662 B2 | 4/2016 | Luna et al. |
| 9,325,805 B2 | 4/2016 | Shattil |
| 9,325,847 B2 | 4/2016 | Ma et al. |
| 9,325,849 B1 | 4/2016 | Brydon et al. |
| 9,326,091 B2 | 4/2016 | Donnellan et al. |
| 9,326,096 B1 | 4/2016 | Gatmir-Motahari et al. |
| 9,326,101 B2 | 4/2016 | Ling et al. |
| 9,326,133 B2 | 4/2016 | Feuer et al. |
| 9,326,134 B2 | 4/2016 | Ahuja et al. |
| 9,326,149 B2 | 4/2016 | Hassan et al. |
| 9,326,189 B2 | 4/2016 | Luna et al. |
| 9,326,266 B2 | 4/2016 | Ngai et al. |
| 9,328,674 B2 | 5/2016 | Geveci et al. |
| 9,329,049 B2 | 5/2016 | Edwards et al. |
| 9,329,675 B2 | 5/2016 | Ojelund et al. |
| 9,329,815 B2 | 5/2016 | Beninato et al. |
| 9,330,465 B2 | 5/2016 | Schumacher |
| 9,330,567 B2 | 5/2016 | Ricci |
| 9,332,137 B2 | 5/2016 | Gowen et al. |
| 9,332,261 B2 | 5/2016 | Yousefi et al. |
| 9,332,363 B2 | 5/2016 | Jain et al. |
| 9,332,396 B2 | 5/2016 | Spears |
| 9,332,397 B2 | 5/2016 | Madhavan et al. |
| 9,332,551 B2 | 5/2016 | Wells |
| 9,333,424 B2 | 5/2016 | Huang et al. |
| 9,335,180 B2 | 5/2016 | Sinton |
| 9,335,760 B2 | 5/2016 | Philpott et al. |
| 9,336,235 B2 | 5/2016 | Hao |
| 9,336,333 B2 | 5/2016 | Blue et al. |
| 9,336,403 B2 | 5/2016 | Keohane et al. |
| 9,338,026 B2 | 5/2016 | Bandini et al. |
| 9,338,086 B2 | 5/2016 | Thubert et al. |
| 9,338,112 B2 | 5/2016 | John et al. |
| 9,338,125 B2 | 5/2016 | Stremel et al. |
| 9,338,170 B2 | 5/2016 | Ricci |
| 9,338,190 B2 | 5/2016 | Eng et al. |
| 9,338,289 B1 | 5/2016 | Goyal et al. |
| 9,338,479 B2 | 5/2016 | Hulse et al. |
| 9,338,515 B2 | 5/2016 | Hu et al. |
| 9,338,527 B2 | 5/2016 | Kaushal et al. |
| 9,338,727 B2 | 5/2016 | Castagnoli |
| 9,338,731 B2 | 5/2016 | Cepuran et al. |
| 9,339,209 B2 | 5/2016 | Banet et al. |
| 9,339,714 B2 | 5/2016 | Syed et al. |
| 9,340,251 B2 | 5/2016 | Thompson |
| 9,341,483 B2 | 5/2016 | Chao et al. |
| 9,341,490 B1 | 5/2016 | Carter et al. |
| 9,342,228 B2 | 5/2016 | Mohammed et al. |
| 9,342,499 B2 | 5/2016 | Madnani et al. |
| 9,342,888 B2 | 5/2016 | Menashe et al. |
| 9,342,927 B2 | 5/2016 | Adhikari et al. |
| 9,342,965 B2 | 5/2016 | Elgebaly et al. |
| 9,342,975 B2 | 5/2016 | Titus et al. |
| 9,342,976 B2 | 5/2016 | Pfeffer |
| 9,343,057 B1 | 5/2016 | Shahmurad et al. |
| 9,344,211 B2 | 5/2016 | Li et al. |
| 9,344,219 B2 | 5/2016 | Ran |
| 9,344,233 B2 | 5/2016 | Agee et al. |
| 9,344,512 B2 | 5/2016 | Hershberg et al. |
| 9,344,515 B2 | 5/2016 | Hu et al. |
| 9,344,576 B2 | 5/2016 | Friedman et al. |
| 9,344,856 B2 | 5/2016 | Zhang et al. |
| 9,344,883 B2 | 5/2016 | Perry et al. |
| 9,345,059 B2 | 5/2016 | Visuri et al. |
| 9,346,514 B2 | 5/2016 | Thompson |

(56) References Cited

U.S. PATENT DOCUMENTS

| | | |
|---|---|---|
| 9,347,779 B1 | 5/2016 | Lynch |
| 9,348,577 B2 | 5/2016 | Hoffman et al. |
| 9,349,016 B1 | 5/2016 | Brisebois et al. |
| 9,349,215 B1 | 5/2016 | Baldwin |
| 9,349,234 B2 | 5/2016 | Ricci |
| 9,349,280 B2 | 5/2016 | Baldwin et al. |
| 9,349,410 B2 | 5/2016 | Greco et al. |
| 9,349,487 B2 | 5/2016 | Jeong |
| 9,350,005 B2 | 5/2016 | Nishimoto |
| 9,350,547 B2 | 5/2016 | Horne et al. |
| 9,350,617 B2 | 5/2016 | Hartwich |
| 9,350,635 B2 | 5/2016 | Vasseur et al. |
| 9,350,645 B2 | 5/2016 | Hui et al. |
| 9,350,649 B2 | 5/2016 | Delangis |
| 9,350,683 B2 | 5/2016 | Hui et al. |
| 9,350,690 B2 | 5/2016 | Meijer et al. |
| 9,350,808 B2 | 5/2016 | Beck et al. |
| 9,350,809 B2 | 5/2016 | Leppanen et al. |
| 9,350,861 B1 | 5/2016 | Leary et al. |
| 9,350,909 B2 | 5/2016 | Sheaffer et al. |
| 9,351,060 B2 | 5/2016 | Wilker et al. |
| 9,351,106 B2 | 5/2016 | Markham et al. |
| 9,351,113 B1 | 5/2016 | Sun |
| 9,351,124 B1 | 5/2016 | Shelton |
| 9,351,174 B2 | 5/2016 | Huang |
| 9,351,193 B2 | 5/2016 | Raleigh et al. |
| 9,351,242 B2 | 5/2016 | Cervinka et al. |
| 9,351,246 B2 | 5/2016 | Nieminen et al. |
| 9,351,299 B2 | 5/2016 | Kazmi et al. |
| 9,351,301 B2 | 5/2016 | Lee et al. |
| 9,351,353 B2 | 5/2016 | Recker et al. |
| 9,351,640 B2 | 5/2016 | Tran |
| 9,352,650 B2 | 5/2016 | Filev et al. |
| 9,353,965 B1 | 5/2016 | Goyal et al. |
| 9,354,069 B2 | 5/2016 | Sheha et al. |
| 9,354,339 B2 | 5/2016 | Bongiovanni |
| 9,354,709 B1 | 5/2016 | Heller et al. |
| 9,355,064 B2 | 5/2016 | Chowdhary et al. |
| 9,355,157 B2 | 5/2016 | Mohammed et al. |
| 9,355,410 B2 | 5/2016 | Salkintzis |
| 9,355,416 B2 | 5/2016 | Graziano |
| 9,355,423 B1 | 5/2016 | Slusar |
| 9,355,504 B2 | 5/2016 | Peeters et al. |
| 9,355,506 B2 | 5/2016 | Raynal et al. |
| 9,355,530 B1 | 5/2016 | Block et al. |
| 9,356,234 B2 | 5/2016 | Ko |
| 9,356,666 B1 | 5/2016 | Agee et al. |
| 9,356,727 B2 | 5/2016 | Immendorf et al. |
| 9,356,731 B2 | 5/2016 | Baheti et al. |
| 9,356,819 B2 | 5/2016 | Bleecher Snyder et al. |
| 9,356,858 B2 | 5/2016 | Vasseur et al. |
| 9,356,875 B2 | 5/2016 | Dasgupta et al. |
| 9,356,898 B2 | 5/2016 | Stern |
| 9,356,899 B2 | 5/2016 | Payne et al. |
| 9,356,905 B2 | 5/2016 | Malik et al. |
| 9,356,953 B2 | 5/2016 | Efrati |
| 9,356,983 B2 | 5/2016 | Basso et al. |
| 9,357,047 B2 | 5/2016 | Lawson et al. |
| 9,357,048 B1 | 5/2016 | Ledet |
| 9,357,345 B2 | 5/2016 | Roskind et al. |
| 9,357,384 B2 | 5/2016 | Ibrahim et al. |
| 9,357,475 B2 | 5/2016 | Lei et al. |
| 9,357,573 B2 | 5/2016 | Hwang et al. |
| 9,357,933 B2 | 6/2016 | Baldwin et al. |
| 9,358,551 B2 | 6/2016 | Thwar et al. |
| 9,359,018 B2 | 6/2016 | Lagassey |
| 9,359,036 B2 | 6/2016 | Thompson |
| 9,360,323 B2 | 6/2016 | Grokop |
| 9,360,990 B1 | 6/2016 | Emigh et al. |
| 9,361,358 B2 | 6/2016 | Riggs et al. |
| 9,361,387 B2 | 6/2016 | Dumais et al. |
| 9,361,465 B2 | 6/2016 | Lortz et al. |
| 9,361,478 B2 | 6/2016 | Hu et al. |
| 9,361,481 B2 | 6/2016 | LaFever et al. |
| 9,361,522 B2 | 6/2016 | Bentley et al. |
| 9,361,603 B2 | 6/2016 | Mendez et al. |
| 9,361,605 B2 | 6/2016 | Yablokov et al. |
| 9,361,650 B2 | 6/2016 | Binion et al. |
| 9,361,778 B1 | 6/2016 | German |
| 9,363,016 B2 | 6/2016 | Chen et al. |
| 9,363,166 B2 | 6/2016 | Vasseur et al. |
| 9,363,250 B2 | 6/2016 | Matthews, III et al. |
| 9,363,383 B1 | 6/2016 | Tirey et al. |
| 9,363,626 B2 | 6/2016 | Chow et al. |
| 9,363,636 B2 | 6/2016 | Ganesh et al. |
| 9,363,638 B1 | 6/2016 | Jones |
| 9,363,643 B1 | 6/2016 | Kessenger et al. |
| 9,363,646 B2 | 6/2016 | Mauti, Jr. |
| 9,363,651 B1 | 6/2016 | daCosta |
| 9,363,679 B2 | 6/2016 | Giannakis et al. |
| 9,363,861 B2 | 6/2016 | Chalmers et al. |
| 9,364,158 B2 | 6/2016 | Banet et al. |
| 9,365,212 B2 | 6/2016 | Buford |
| 9,366,542 B2 | 6/2016 | Singh |
| 9,366,704 B2 | 6/2016 | Haghighat-Kashani et al. |
| 9,367,512 B2 | 6/2016 | Jaudon et al. |
| 9,367,521 B2 | 6/2016 | OSullivan et al. |
| 9,367,632 B2 | 6/2016 | Revels |
| 9,367,800 B1 | 6/2016 | Do et al. |
| 9,367,803 B2 | 6/2016 | Yadav et al. |
| 9,367,860 B2 | 6/2016 | McKirdy |
| 9,367,968 B2 | 6/2016 | Giraud et al. |
| 9,368,022 B2 | 6/2016 | Titus et al. |
| 9,368,029 B2 | 6/2016 | Gueziec |
| 9,368,180 B2 | 6/2016 | Oh et al. |
| 9,368,356 B2 | 6/2016 | Kim |
| 9,369,182 B2 | 6/2016 | Kurs et al. |
| 9,369,215 B2 | 6/2016 | Rudland et al. |
| 9,369,328 B2 | 6/2016 | Dhananjay et al. |
| 9,369,341 B2 | 6/2016 | Reich et al. |
| 9,369,351 B2 | 6/2016 | Di Pietro et al. |
| 9,369,382 B2 | 6/2016 | Azulai |
| 9,369,415 B2 | 6/2016 | Chasin |
| 9,369,419 B2 | 6/2016 | Rana et al. |
| 9,369,572 B2 | 6/2016 | Agrawal et al. |
| 9,369,758 B2 | 6/2016 | Gharaat et al. |
| 9,369,884 B2 | 6/2016 | Jones et al. |
| 9,369,888 B2 | 6/2016 | Forenza et al. |
| 9,369,901 B2 | 6/2016 | Park et al. |
| 9,369,919 B2 | 6/2016 | Chakrabarti et al. |
| 9,369,959 B2 | 6/2016 | Ruutu et al. |
| 9,369,995 B2 | 6/2016 | Chakrabarti et al. |
| 9,370,125 B2 | 6/2016 | Abuelsaad et al. |
| 9,371,099 B2 | 6/2016 | Lagassey |
| 9,372,074 B2 | 6/2016 | Yamagiwa |
| 9,372,092 B2 | 6/2016 | Skillman et al. |
| 9,372,123 B2 | 6/2016 | Li et al. |
| 9,372,213 B2 | 6/2016 | Auguste et al. |
| 9,372,477 B2 | 6/2016 | Gettings et al. |
| 9,372,934 B2 | 6/2016 | Hancock |
| 9,372,999 B2 | 6/2016 | Handler |
| 9,373,102 B2 | 6/2016 | Merchant et al. |
| 9,373,116 B1 | 6/2016 | Kerr |
| 9,373,201 B2 | 6/2016 | Jefferies et al. |
| 9,373,207 B2 | 6/2016 | Ricci et al. |
| 9,373,251 B2 | 6/2016 | Feher |
| 9,373,258 B2 | 6/2016 | Groeneweg |
| 9,373,345 B1 | 6/2016 | Cudak et al. |
| 9,373,394 B2 | 6/2016 | Lee |
| 9,373,625 B2 | 6/2016 | Kim et al. |
| 9,374,151 B2 | 6/2016 | Xiong et al. |
| 9,374,177 B2 | 6/2016 | Shi |
| 9,374,242 B2 | 6/2016 | Jung et al. |
| 9,374,280 B2 | 6/2016 | Misra et al. |
| 9,374,281 B2 | 6/2016 | Dasgupta et al. |
| 9,374,330 B2 | 6/2016 | Emigh et al. |
| 9,374,355 B2 | 6/2016 | Schwarz et al. |
| 9,374,661 B2 | 6/2016 | Malinovskiy et al. |
| 9,374,670 B2 | 6/2016 | Hymel et al. |
| 9,374,677 B2 | 6/2016 | Tarlazzi et al. |
| 9,374,706 B2 | 6/2016 | Huang et al. |
| 9,374,709 B2 | 6/2016 | Peirce et al. |
| 9,374,772 B2 | 6/2016 | Daoud |
| 9,374,799 B2 | 6/2016 | Batada et al. |

(56) References Cited

U.S. PATENT DOCUMENTS

| | | |
|---|---|---|
| 9,374,870 B2 | 6/2016 | Cumpston et al. |
| 9,375,145 B2 | 6/2016 | Chin et al. |
| 9,375,847 B2 | 6/2016 | Angle et al. |
| 9,376,123 B2 | 6/2016 | Kumar et al. |
| 9,377,314 B2 | 6/2016 | Tseng et al. |
| 9,377,319 B2 | 6/2016 | San Filippo et al. |
| 9,377,955 B2 | 6/2016 | Lee et al. |
| 9,378,223 B2 | 6/2016 | Choudhury et al. |
| 9,378,359 B2 | 6/2016 | Qureshi et al. |
| 9,378,485 B2 | 6/2016 | Preiss et al. |
| 9,378,507 B2 | 6/2016 | Bezancon et al. |
| 9,378,601 B2 | 6/2016 | Ricci |
| 9,378,602 B2 | 6/2016 | Ricci et al. |
| 9,378,819 B2 | 6/2016 | Park |
| 9,379,666 B2 | 6/2016 | Kitayoshi et al. |
| 9,380,008 B2 | 6/2016 | Ramarao et al. |
| 9,380,106 B2 | 6/2016 | Payne et al. |
| 9,380,119 B2 | 6/2016 | Kasslin et al. |
| 9,380,120 B2 | 6/2016 | Holden et al. |
| 9,380,160 B2 | 6/2016 | Jain |
| 9,380,423 B2 | 6/2016 | Zubas et al. |
| 9,380,491 B2 | 6/2016 | Li et al. |
| 9,380,531 B1 | 6/2016 | Subramanian et al. |
| 9,380,586 B2 | 6/2016 | Wang |
| 9,380,738 B2 | 7/2016 | Nelson, Jr. |
| 9,380,741 B2 | 7/2016 | Drew et al. |
| 9,380,949 B2 | 7/2016 | Schuessler |
| 9,380,952 B2 | 7/2016 | Banet et al. |
| 9,383,206 B2 | 7/2016 | Kimchi et al. |
| 9,383,214 B2 | 7/2016 | Shrinath et al. |
| 9,383,895 B1 | 7/2016 | Vinayak et al. |
| 9,384,075 B2 | 7/2016 | Kim |
| 9,384,111 B2 | 7/2016 | Hunt et al. |
| 9,384,500 B2 | 7/2016 | Ramer et al. |
| 9,384,511 B1 | 7/2016 | Purpus |
| 9,384,609 B2 | 7/2016 | Ricci |
| 9,384,828 B2 | 7/2016 | Oh |
| 9,385,311 B2 | 7/2016 | Kim et al. |
| 9,385,312 B2 | 7/2016 | Lee |
| 9,385,783 B2 | 7/2016 | Stuntebeck et al. |
| 9,385,911 B2 | 7/2016 | Vermani et al. |
| 9,385,933 B2 | 7/2016 | Vasseur et al. |
| 9,386,046 B2 | 7/2016 | Oliver et al. |
| 9,386,150 B2 | 7/2016 | Ramer et al. |
| 9,386,164 B2 | 7/2016 | Jain |
| 9,386,405 B2 | 7/2016 | Velusamy et al. |
| 9,386,465 B2 | 7/2016 | Forenza et al. |
| 9,386,522 B2 | 7/2016 | San Vicente et al. |
| 9,386,553 B2 | 7/2016 | Berger et al. |
| 9,386,578 B2 | 7/2016 | Holtzman et al. |
| 9,386,590 B2 | 7/2016 | Wigren |
| 9,387,861 B1 | 7/2016 | Lurie et al. |
| 9,387,940 B2 | 7/2016 | Godzdanker et al. |
| 9,389,094 B2 | 7/2016 | Brenner et al. |
| 9,389,095 B2 | 7/2016 | Li et al. |
| 9,389,260 B2 | 7/2016 | Potyrailo et al. |
| 9,389,611 B2 | 7/2016 | Erickson et al. |
| 9,389,893 B2 | 7/2016 | Raghu |
| 9,390,103 B2 | 7/2016 | Peng |
| 9,390,229 B1 | 7/2016 | Kahn et al. |
| 9,390,240 B1 | 7/2016 | Brisebois et al. |
| 9,390,397 B2 | 7/2016 | OSullivan et al. |
| 9,390,402 B1 | 7/2016 | Kane, Jr. et al. |
| 9,390,418 B2 | 7/2016 | Gavan et al. |
| 9,390,436 B2 | 7/2016 | Ramer et al. |
| 9,390,451 B1 | 7/2016 | Slusar |
| 9,390,501 B2 | 7/2016 | Marty et al. |
| 9,390,608 B2 | 7/2016 | Lundy |
| 9,390,620 B2 | 7/2016 | Gueziec et al. |
| 9,390,628 B2 | 7/2016 | Mohn et al. |
| 9,391,273 B1 | 7/2016 | Yoo |
| 9,391,745 B2 | 7/2016 | Agee et al. |
| 9,391,784 B2 | 7/2016 | Hui et al. |
| 9,391,789 B2 | 7/2016 | Krishnaswamy |
| 9,391,878 B2 | 7/2016 | Bade et al. |
| 9,391,968 B2 | 7/2016 | Novack |
| 9,391,986 B2 | 7/2016 | Schultz et al. |
| 9,392,099 B2 | 7/2016 | Lim et al. |
| 9,392,123 B1 | 7/2016 | Yin et al. |
| 9,392,452 B2 | 7/2016 | Chesnutt et al. |
| 9,392,459 B2 | 7/2016 | Starsinic et al. |
| 9,392,508 B2 | 7/2016 | Senarath et al. |
| 9,392,669 B2 | 7/2016 | Recker et al. |
| 9,392,941 B2 | 7/2016 | Powch et al. |
| 9,393,491 B2 | 7/2016 | Barney et al. |
| 9,393,500 B2 | 7/2016 | Barney et al. |
| 9,393,879 B2 | 7/2016 | Tyagi et al. |
| 9,393,920 B2 | 7/2016 | Hosey et al. |
| 9,395,196 B2 | 7/2016 | Johnson et al. |
| 9,395,880 B2 | 7/2016 | Shapiro |
| 9,396,051 B2 | 7/2016 | Bora et al. |
| 9,396,344 B1 | 7/2016 | Jones |
| 9,396,385 B2 | 7/2016 | Bentley et al. |
| 9,396,541 B2 | 7/2016 | Lai |
| 9,396,655 B2 | 7/2016 | Haag et al. |
| 9,396,867 B2 | 7/2016 | Kurs |
| 9,397,522 B2 | 7/2016 | Chemishkian et al. |
| 9,397,724 B1 | 7/2016 | Feher |
| 9,397,795 B2 | 7/2016 | Choi |
| 9,397,936 B2 | 7/2016 | Cooper et al. |
| 9,398,035 B2 | 7/2016 | Vasseur et al. |
| 9,398,066 B1 | 7/2016 | Roth et al. |
| 9,398,116 B2 | 7/2016 | Snider et al. |
| 9,398,171 B1 | 7/2016 | Yin et al. |
| 9,398,213 B1 | 7/2016 | Cronin et al. |
| 9,398,420 B2 | 7/2016 | Horvitz et al. |
| 9,398,437 B2 | 7/2016 | Kasslin et al. |
| 9,398,467 B2 | 7/2016 | Schultz et al. |
| 9,398,576 B2 | 7/2016 | Calcev et al. |
| 9,399,430 B2 | 7/2016 | Kirsch et al. |
| 9,400,591 B2 | 7/2016 | Sheha et al. |
| 9,400,659 B2 | 7/2016 | Mumford et al. |
| 9,400,890 B2 | 7/2016 | Bostley, III et al. |
| 9,401,056 B2 | 7/2016 | Lee |
| 9,401,057 B2 | 7/2016 | Garrett et al. |
| 9,401,087 B2 | 7/2016 | Tengler et al. |
| 9,401,088 B2 | 7/2016 | Gueziec |
| 9,401,100 B2 | 7/2016 | Forsblom et al. |
| 9,401,178 B2 | 7/2016 | Bentley et al. |
| 9,401,191 B2 | 7/2016 | Kim |
| 9,401,204 B2 | 7/2016 | Kim |
| 9,401,205 B2 | 7/2016 | Cho |
| 9,401,610 B2 | 7/2016 | Uyeki |
| 9,401,783 B1 | 7/2016 | Agee et al. |
| 9,401,812 B1 | 7/2016 | Jachner |
| 9,401,822 B2 | 7/2016 | McCoy et al. |
| 9,401,845 B2 | 7/2016 | Cazanas et al. |
| 9,401,850 B2 | 7/2016 | Misra et al. |
| 9,401,863 B2 | 7/2016 | Hui et al. |
| 9,401,923 B2 | 7/2016 | Valasek et al. |
| 9,401,970 B2 | 7/2016 | Liu |
| 9,401,977 B1 | 7/2016 | Gaw |
| 9,401,987 B2 | 7/2016 | Jain |
| 9,402,158 B2 | 7/2016 | Cuff et al. |
| 9,402,159 B1 | 7/2016 | Self et al. |
| 9,402,216 B2 | 7/2016 | Forte et al. |
| 9,402,242 B2 | 7/2016 | Skaaksrud et al. |
| 9,402,245 B2 | 7/2016 | Chen et al. |
| 9,403,482 B2 | 8/2016 | Shahraray et al. |
| 9,403,521 B2 | 8/2016 | Williams et al. |
| 9,403,539 B2 | 8/2016 | Pykkonen et al. |
| 9,404,759 B2 | 8/2016 | Kalai et al. |
| 9,405,597 B1 | 8/2016 | Luff et al. |
| 9,405,772 B2 | 8/2016 | Petrou et al. |
| 9,405,892 B2 | 8/2016 | Baldwin et al. |
| 9,406,086 B2 | 8/2016 | Jackson et al. |
| 9,406,168 B1 | 8/2016 | Baldwin |
| 9,406,176 B2 | 8/2016 | Hansen et al. |
| 9,406,231 B2 | 8/2016 | Goudy et al. |
| 9,406,336 B2 | 8/2016 | Bose et al. |
| 9,406,380 B2 | 8/2016 | Yi et al. |
| 9,407,367 B2 | 8/2016 | Guo et al. |
| 9,407,542 B2 | 8/2016 | Vasseur |
| 9,407,603 B2 | 8/2016 | Gluck |

(56) References Cited

U.S. PATENT DOCUMENTS

| | | |
|---|---|---|
| 9,407,624 B1 | 8/2016 | Myers et al. |
| 9,407,646 B2 | 8/2016 | Cruz Mota et al. |
| 9,407,706 B2 | 8/2016 | Grokop et al. |
| 9,407,709 B2 | 8/2016 | Zamer |
| 9,407,878 B2 | 8/2016 | Buehler |
| 9,407,942 B2 | 8/2016 | Brenneman |
| 9,408,028 B2 | 8/2016 | Laws et al. |
| 9,408,032 B1 | 8/2016 | Kerr et al. |
| 9,408,036 B2 | 8/2016 | Hart et al. |
| 9,408,043 B2 | 8/2016 | Mannikka |
| 9,408,048 B1 | 8/2016 | Paulrajan et al. |
| 9,408,176 B2 | 8/2016 | Baek et al. |
| 9,408,477 B1 | 8/2016 | Robinson et al. |
| 9,409,074 B2 | 8/2016 | Han et al. |
| 9,410,813 B2 | 8/2016 | Barrett et al. |
| 9,410,823 B2 | 8/2016 | Widmer et al. |
| 9,410,833 B1 | 8/2016 | Leaders et al. |
| 9,411,451 B2 | 8/2016 | Myers et al. |
| 9,411,734 B2 | 8/2016 | Dong |
| 9,411,740 B2 | 8/2016 | Lee |
| 9,411,893 B2 | 8/2016 | Johnson et al. |
| 9,411,916 B2 | 8/2016 | Cruz Mota et al. |
| 9,411,955 B2 | 8/2016 | Jakobsson |
| 9,411,967 B2 | 8/2016 | Parecki et al. |
| 9,412,208 B2 | 8/2016 | Greenberg et al. |
| 9,412,248 B1 | 8/2016 | Cohn et al. |
| 9,412,270 B2 | 8/2016 | Neel et al. |
| 9,412,273 B2 | 8/2016 | Ricci |
| 9,412,282 B2 | 8/2016 | Hunt et al. |
| 9,412,361 B1 | 8/2016 | Geramifard et al. |
| 9,412,387 B2 | 8/2016 | Davis et al. |
| 9,412,430 B2 | 8/2016 | Kim |
| 9,412,444 B2 | 8/2016 | Yi et al. |
| 9,412,621 B2 | 8/2016 | Kim |
| 9,412,997 B2 | 8/2016 | Abe et al. |
| 9,413,468 B2 | 8/2016 | Schemmann et al. |
| 9,413,615 B1 | 8/2016 | Singh et al. |
| 9,413,643 B2 | 8/2016 | Hui et al. |
| 9,413,715 B2 | 8/2016 | Chor |
| 9,413,779 B2 | 8/2016 | Vasseur et al. |
| 9,413,884 B2 | 8/2016 | Silver |
| 9,413,906 B2 | 8/2016 | Shlimovich |
| 9,414,198 B2 | 8/2016 | Forstall et al. |
| 9,414,210 B2 | 8/2016 | Arnold et al. |
| 9,414,239 B2 | 8/2016 | Brunk |
| 9,414,293 B2 | 8/2016 | Hui et al. |
| 9,414,780 B2 | 8/2016 | Rhoads |
| 9,415,125 B2 | 8/2016 | Chen et al. |
| 9,416,987 B2 | 8/2016 | Ragland et al. |
| 9,417,069 B2 | 8/2016 | Gupta et al. |
| 9,417,078 B1 | 8/2016 | Seibert |
| 9,417,084 B2 | 8/2016 | Geurts et al. |
| 9,417,331 B2 | 8/2016 | Valentino et al. |
| 9,417,691 B2 | 8/2016 | Belimpasakis et al. |
| 9,417,754 B2 | 8/2016 | Smith |
| 9,417,834 B2 | 8/2016 | Ricci |
| 9,418,008 B2 | 8/2016 | Jung et al. |
| 9,418,040 B2 | 8/2016 | Cordray et al. |
| 9,418,115 B2 | 8/2016 | Ganick et al. |
| 9,418,339 B1 | 8/2016 | Leonard et al. |
| 9,418,340 B2 | 8/2016 | Masseur et al. |
| 9,418,393 B2 | 8/2016 | Forbes, Jr. |
| 9,418,489 B2 | 8/2016 | Macdonald et al. |
| 9,418,491 B2 | 8/2016 | Phillips |
| 9,418,537 B2 | 8/2016 | Cahill |
| 9,418,705 B2 | 8/2016 | Kaps et al. |
| 9,418,838 B2 | 8/2016 | Kim et al. |
| 9,419,458 B2 | 8/2016 | Kumagai |
| 9,419,802 B2 | 8/2016 | Lortz et al. |
| 9,419,810 B2 | 8/2016 | Jones et al. |
| 9,420,043 B2 | 8/2016 | Houston et al. |
| 9,420,107 B2 | 8/2016 | Daye et al. |
| 9,420,116 B1 | 8/2016 | Hamilton et al. |
| 9,420,121 B2 | 8/2016 | Grosz et al. |
| 9,420,227 B1 | 8/2016 | Shires et al. |
| 9,420,402 B2 | 8/2016 | Theimer |
| 9,420,405 B2 | 8/2016 | Ahmed et al. |
| 9,420,410 B2 | 8/2016 | Macdonald et al. |
| 9,420,423 B1 | 8/2016 | Mendelson |
| 9,420,431 B2 | 8/2016 | Swanson |
| 9,420,432 B2 | 8/2016 | Matthews, III et al. |
| 9,420,453 B2 | 8/2016 | Casey |
| 9,420,514 B2 | 8/2016 | Hui et al. |
| 9,420,592 B2 | 8/2016 | Choi et al. |
| 9,423,505 B2 | 8/2016 | Riley et al. |
| 9,423,914 B2 | 8/2016 | Nishioka |
| 9,424,007 B2 | 8/2016 | DeAnna et al. |
| 9,424,291 B2 | 8/2016 | Shinn et al. |
| 9,424,608 B2 | 8/2016 | Greenberg et al. |
| 9,424,618 B2 | 8/2016 | Rodriguez |
| 9,424,672 B2 | 8/2016 | Zavodny et al. |
| 9,424,729 B2 | 8/2016 | Warren et al. |
| 9,424,861 B2 | 8/2016 | Jerram et al. |
| 9,425,618 B2 | 8/2016 | Nagashima |
| 9,425,905 B2 | 8/2016 | Lee et al. |
| 9,425,954 B1 | 8/2016 | Chalker |
| 9,425,963 B2 | 8/2016 | Nairn et al. |
| 9,426,020 B2 | 8/2016 | Vasseur et al. |
| 9,426,035 B2 | 8/2016 | Shetty et al. |
| 9,426,040 B2 | 8/2016 | Vasseur et al. |
| 9,426,075 B2 | 8/2016 | Senarath et al. |
| 9,426,110 B2 | 8/2016 | Aalbers |
| 9,426,225 B2 | 8/2016 | Penilla et al. |
| 9,426,229 B2 | 8/2016 | Dearman et al. |
| 9,426,232 B1 | 8/2016 | Wilden et al. |
| 9,426,239 B2 | 8/2016 | McCandless et al. |
| 9,426,289 B2 | 8/2016 | Shaffer et al. |
| 9,426,616 B1 | 8/2016 | Rasband et al. |
| 9,426,627 B1 | 8/2016 | Logan et al. |
| 9,426,716 B2 | 8/2016 | Thubert et al. |
| 9,426,720 B2 | 8/2016 | Cohn et al. |
| 9,426,772 B2 | 8/2016 | Shuster |
| 9,427,581 B2 | 8/2016 | Simon et al. |
| 9,428,186 B2 | 8/2016 | Breed |
| 9,428,191 B2 | 8/2016 | Yoshizumi |
| 9,428,192 B2 | 8/2016 | Schofield et al. |
| 9,428,270 B1 | 8/2016 | Tofte et al. |
| 9,429,431 B2 | 8/2016 | Fleizach et al. |
| 9,429,445 B2 | 8/2016 | Tang |
| 9,429,657 B2 | 8/2016 | Sidhu et al. |
| 9,429,659 B1 | 8/2016 | Adelson |
| 9,429,661 B2 | 8/2016 | Valentino et al. |
| 9,429,926 B2 | 8/2016 | Love |
| 9,429,944 B2 | 8/2016 | Filippov et al. |
| 9,430,029 B2 | 8/2016 | Alpert et al. |
| 9,430,043 B1 | 8/2016 | Amento et al. |
| 9,430,106 B1 | 8/2016 | Olsen et al. |
| 9,430,207 B1 | 8/2016 | Bandhole et al. |
| 9,430,420 B2 | 8/2016 | Agarwal et al. |
| 9,430,463 B2 | 8/2016 | Futrell et al. |
| 9,430,491 B2 | 8/2016 | Vibhor et al. |
| 9,430,732 B2 | 8/2016 | Mats et al. |
| 9,430,860 B2 | 8/2016 | Walker et al. |
| 9,430,936 B2 | 8/2016 | Petite |
| 9,431,006 B2 | 8/2016 | Bellegarda |
| 9,431,028 B2 | 8/2016 | Jerram et al. |
| 9,431,125 B2 | 8/2016 | Alrod et al. |
| 9,432,152 B2 | 8/2016 | Feher |
| 9,432,248 B2 | 8/2016 | Vasseur et al. |
| 9,432,271 B2 | 8/2016 | Bullard et al. |
| 9,432,312 B2 | 8/2016 | Dasgupta et al. |
| 9,432,450 B2 | 8/2016 | Skaaksrud et al. |
| 9,432,502 B2 | 8/2016 | Papakipos et al. |
| 9,432,713 B2 | 8/2016 | Bhatia et al. |
| 9,432,720 B2 | 8/2016 | Kruglick |
| 9,432,806 B2 | 8/2016 | Zises |
| 9,432,808 B1 | 8/2016 | Reyes et al. |
| 9,432,828 B1 | 8/2016 | Tu et al. |
| 9,432,833 B2 | 8/2016 | Kim et al. |
| 9,432,855 B1 | 8/2016 | Martin et al. |
| 9,432,908 B2 | 8/2016 | Wohlert et al. |
| 9,432,912 B2 | 8/2016 | Ding et al. |
| 9,432,925 B2 | 8/2016 | Kasslin et al. |
| 9,433,020 B2 | 8/2016 | Ali-Vehmas |

(56) References Cited

U.S. PATENT DOCUMENTS

| | | |
|---|---|---|
| 9,433,062 B2 | 8/2016 | Reed |
| 9,434,359 B2 | 9/2016 | Kumar et al. |
| 9,434,371 B2 | 9/2016 | Muta et al. |
| 9,434,372 B2 | 9/2016 | Iwasa |
| 9,434,902 B2 | 9/2016 | Niitsuma et al. |
| 9,435,104 B2 | 9/2016 | Juricak et al. |
| 9,435,233 B2 | 9/2016 | Tour et al. |
| 9,435,238 B2 | 9/2016 | Aso et al. |
| 9,435,274 B2 | 9/2016 | Wong et al. |
| 9,435,288 B2 | 9/2016 | Cohn et al. |
| 9,435,298 B2 | 9/2016 | Hayman et al. |
| 9,435,310 B2 | 9/2016 | Moonjelly et al. |
| 9,435,402 B2 | 9/2016 | Hwang et al. |
| 9,435,406 B2 | 9/2016 | Cho et al. |
| 9,435,414 B2 | 9/2016 | Lee et al. |
| 9,435,652 B2 | 9/2016 | Ralston et al. |
| 9,435,657 B2 | 9/2016 | Feng |
| 9,436,181 B2 | 9/2016 | Peeters et al. |
| 9,436,183 B2 | 9/2016 | Thakur et al. |
| 9,436,220 B2 | 9/2016 | Rosenberg et al. |
| 9,436,231 B2 | 9/2016 | Bevilacqua et al. |
| 9,436,449 B1 | 9/2016 | Chandnani et al. |
| 9,436,568 B2 | 9/2016 | Lee et al. |
| 9,436,702 B2 | 9/2016 | Pryakhin et al. |
| 9,436,917 B2 | 9/2016 | Mermoud et al. |
| 9,436,931 B2 | 9/2016 | Welles et al. |
| 9,436,948 B2 | 9/2016 | Bridges et al. |
| 9,436,956 B2 | 9/2016 | Jaramillo |
| 9,437,033 B2 | 9/2016 | Sun et al. |
| 9,437,099 B2 | 9/2016 | Henderson et al. |
| 9,437,103 B2 | 9/2016 | Ophardt |
| 9,437,110 B2 | 9/2016 | Otake |
| 9,437,113 B2 | 9/2016 | Bush et al. |
| 9,437,271 B2 | 9/2016 | Lee |
| 9,437,289 B2 | 9/2016 | Oh et al. |
| 9,437,766 B2 | 9/2016 | Escher et al. |
| 9,437,890 B2 | 9/2016 | Milacic et al. |
| 9,437,903 B2 | 9/2016 | DeKeuster |
| 9,438,581 B2 | 9/2016 | Nairn |
| 9,438,677 B2 | 9/2016 | Leung et al. |
| 9,438,684 B2 | 9/2016 | Yuan |
| 9,438,731 B2 | 9/2016 | Klaban |
| 9,438,949 B2 | 9/2016 | Davis et al. |
| 9,439,035 B2 | 9/2016 | Fraccaroli |
| 9,439,038 B2 | 9/2016 | Chowdhury et al. |
| 9,439,043 B2 | 9/2016 | Christie et al. |
| 9,439,126 B2 | 9/2016 | Petite |
| 9,439,129 B2 | 9/2016 | McNamee et al. |
| 9,439,232 B2 | 9/2016 | Thanayankizil et al. |
| 9,439,240 B1 | 9/2016 | Shipley et al. |
| 9,439,530 B2 | 9/2016 | Logan et al. |
| 9,439,563 B2 | 9/2016 | Teller |
| 9,439,567 B2 | 9/2016 | Carter et al. |
| 9,439,574 B2 | 9/2016 | McCombie et al. |
| 9,439,584 B1 | 9/2016 | de Vries et al. |
| 9,439,596 B2 | 9/2016 | Leininger et al. |
| 9,439,995 B2 | 9/2016 | Conroy et al. |
| 9,440,146 B1 | 9/2016 | Rouse et al. |
| 9,440,192 B2 | 9/2016 | Hoke et al. |
| 9,440,352 B2 | 9/2016 | Meier et al. |
| 9,440,526 B2 | 9/2016 | Okuwaki et al. |
| 9,440,545 B2 | 9/2016 | Wang |
| 9,440,552 B2 | 9/2016 | Li |
| 9,440,555 B2 | 9/2016 | Garfinkel et al. |
| 9,440,635 B2 | 9/2016 | Sujan et al. |
| 9,440,638 B2 | 9/2016 | Booth et al. |
| 9,440,641 B2 | 9/2016 | Kitabatake et al. |
| 9,440,654 B2 | 9/2016 | Atluri et al. |
| 9,440,657 B1 | 9/2016 | Fields et al. |
| 9,440,660 B2 | 9/2016 | Sherony et al. |
| 9,440,688 B2 | 9/2016 | Smith et al. |
| 9,440,689 B1 | 9/2016 | Smith et al. |
| 9,441,511 B2 | 9/2016 | Han |
| 9,441,532 B2 | 9/2016 | Pegg et al. |
| 9,441,533 B2 | 9/2016 | Boyer et al. |
| 9,441,549 B2 | 9/2016 | Onozato et al. |
| 9,441,560 B1 | 9/2016 | Preston et al. |
| 9,441,563 B2 | 9/2016 | Kobayashi et al. |
| 9,441,570 B2 | 9/2016 | Cohn et al. |
| 9,441,571 B2 | 9/2016 | Petersen et al. |
| 9,441,580 B2 | 9/2016 | Amaya et al. |
| 9,441,581 B2 | 9/2016 | Hill et al. |
| 9,441,588 B2 | 9/2016 | McAlister |
| 9,441,695 B2 | 9/2016 | Sugimura et al. |
| 9,441,708 B2 | 9/2016 | Kimes et al. |
| 9,441,720 B2 | 9/2016 | Furcoiu |
| 9,441,725 B2 | 9/2016 | Dobbins et al. |
| 9,441,726 B1 | 9/2016 | Palazzolo |
| 9,441,847 B2 | 9/2016 | Grohman |
| 9,441,971 B2 | 9/2016 | Casson et al. |
| 9,441,979 B2 | 9/2016 | Barnard et al. |
| 9,441,982 B2 | 9/2016 | Wong et al. |
| 9,441,983 B2 | 9/2016 | Wong et al. |
| 9,441,987 B2 | 9/2016 | Cornwall |
| 9,441,999 B2 | 9/2016 | Saavedra |
| 9,442,100 B2 | 9/2016 | Connor |
| 9,442,290 B2 | 9/2016 | Parkinson et al. |
| 9,442,496 B1 | 9/2016 | Beckman et al. |
| 9,442,526 B2 | 9/2016 | Rosenberg et al. |
| 9,442,548 B1 | 9/2016 | Johansson et al. |
| 9,442,564 B1 | 9/2016 | Dillon |
| 9,442,626 B2 | 9/2016 | Schupak et al. |
| 9,442,647 B2 | 9/2016 | Sinaguinan |
| 9,442,888 B2 | 9/2016 | Stanfield et al. |
| 9,442,905 B1 | 9/2016 | Kawaguchi |
| 9,442,906 B2 | 9/2016 | Greenberg et al. |
| 9,442,963 B2 | 9/2016 | Ritto et al. |
| 9,443,019 B2 | 9/2016 | Gailis et al. |
| 9,443,024 B2 | 9/2016 | Krishnamurthy |
| 9,443,036 B2 | 9/2016 | Sood et al. |
| 9,443,046 B2 | 9/2016 | Meng |
| 9,443,090 B2 | 9/2016 | Harris et al. |
| 9,443,097 B2 | 9/2016 | OHare et al. |
| 9,443,152 B2 | 9/2016 | Atsmon et al. |
| 9,443,192 B1 | 9/2016 | Cosic |
| 9,443,199 B2 | 9/2016 | Pinckney et al. |
| 9,443,202 B2 | 9/2016 | Leppanen et al. |
| 9,443,204 B2 | 9/2016 | Vasseur et al. |
| 9,443,243 B2 | 9/2016 | Hampel et al. |
| 9,443,248 B2 | 9/2016 | Shafi et al. |
| 9,443,253 B2 | 9/2016 | Carlson et al. |
| 9,443,255 B2 | 9/2016 | Steenstra et al. |
| 9,443,270 B1 | 9/2016 | Friedman et al. |
| 9,443,272 B2 | 9/2016 | Wan et al. |
| 9,443,298 B2 | 9/2016 | Ross et al. |
| 9,443,309 B2 | 9/2016 | Menashe et al. |
| 9,443,326 B2 | 9/2016 | Krumm et al. |
| 9,443,358 B2 | 9/2016 | Breed |
| 9,443,370 B2 | 9/2016 | Carson et al. |
| 9,443,383 B2 | 9/2016 | Fine et al. |
| 9,443,406 B2 | 9/2016 | Bradshaw et al. |
| 9,443,407 B2 | 9/2016 | Davidson |
| 9,443,409 B1 | 9/2016 | Hyde et al. |
| 9,443,413 B2 | 9/2016 | Faaborg et al. |
| 9,443,417 B2 | 9/2016 | Wang et al. |
| 9,443,425 B2 | 9/2016 | Smereka et al. |
| 9,443,429 B2 | 9/2016 | Mathieu et al. |
| 9,443,430 B2 | 9/2016 | Beaurepaire |
| 9,443,433 B1 | 9/2016 | Conway et al. |
| 9,443,508 B2 | 9/2016 | Tan |
| 9,443,521 B1 | 9/2016 | Olguin Olguin et al. |
| 9,443,581 B2 | 9/2016 | Kim |
| 9,443,908 B2 | 9/2016 | Lee et al. |
| 9,443,909 B2 | 9/2016 | Lee |
| 9,443,911 B2 | 9/2016 | Ha |
| 9,444,252 B2 | 9/2016 | Bourgeau |
| 9,444,422 B2 | 9/2016 | Bharj et al. |
| 9,444,520 B2 | 9/2016 | Hall et al. |
| 9,444,547 B2 | 9/2016 | Ganick et al. |
| 9,444,565 B1 | 9/2016 | Leopardi et al. |
| 9,444,692 B2 | 9/2016 | Lehane et al. |
| 9,444,711 B1 | 9/2016 | Siganporia et al. |
| 9,444,719 B2 | 9/2016 | Wolcott et al. |
| 9,444,727 B2 | 9/2016 | Vasseur et al. |

(56) References Cited

U.S. PATENT DOCUMENTS

| | | |
|---|---|---|
| 9,444,752 B2 | 9/2016 | Backholm |
| 9,444,798 B1 | 9/2016 | Wang |
| 9,444,805 B1 | 9/2016 | Saylor et al. |
| 9,444,811 B2 | 9/2016 | Nara et al. |
| 9,444,826 B2 | 9/2016 | Bandini et al. |
| 9,444,856 B2 | 9/2016 | Phillips et al. |
| 9,444,859 B2 | 9/2016 | Malik et al. |
| 9,444,866 B2 | 9/2016 | Liao et al. |
| 9,444,881 B2 | 9/2016 | Huang |
| 9,444,892 B1 | 9/2016 | Amireddy et al. |
| 9,444,902 B2 | 9/2016 | Lin et al. |
| 9,444,916 B2 | 9/2016 | Backholm |
| 9,444,924 B2 | 9/2016 | Rodriguez et al. |
| 9,445,081 B1 | 9/2016 | Kouperman et al. |
| 9,445,138 B2 | 9/2016 | Walker et al. |
| 9,445,209 B2 | 9/2016 | Dadu et al. |
| 9,445,214 B2 | 9/2016 | Norris et al. |
| 9,445,220 B2 | 9/2016 | Granbery |
| 9,445,227 B2 | 9/2016 | Aldana |
| 9,445,231 B2 | 9/2016 | Florins et al. |
| 9,445,232 B2 | 9/2016 | Russell et al. |
| 9,445,234 B2 | 9/2016 | Shaw |
| 9,445,238 B2 | 9/2016 | Johnson et al. |
| 9,445,239 B2 | 9/2016 | Reddy |
| 9,445,241 B2 | 9/2016 | Chen et al. |
| 9,445,248 B2 | 9/2016 | Rattner |
| 9,445,251 B2 | 9/2016 | Beyer, Jr. et al. |
| 9,445,270 B1 | 9/2016 | Bicket et al. |
| 9,445,288 B2 | 9/2016 | Peitzer et al. |
| 9,445,339 B2 | 9/2016 | Axmon et al. |
| 9,445,341 B2 | 9/2016 | Spinelli et al. |
| 9,445,353 B2 | 9/2016 | Ullah et al. |
| 9,445,360 B2 | 9/2016 | Marimuthu |
| 9,445,368 B2 | 9/2016 | Nirantar et al. |
| 9,445,445 B2 | 9/2016 | Miller et al. |
| 9,445,447 B2 | 9/2016 | Pal et al. |
| 9,445,451 B2 | 9/2016 | Taylor |
| 9,445,524 B2 | 9/2016 | Lofy et al. |
| 9,450,760 B2 | 9/2016 | Lindemann |
| 9,456,302 B2 | 9/2016 | Skomra et al. |
| 9,460,228 B2 | 10/2016 | Greenberg et al. |
| 9,462,040 B2 | 10/2016 | Addepalli et al. |
| 9,467,533 B2 | 10/2016 | Huber et al. |
| 9,467,925 B1 | 10/2016 | Baroudi et al. |
| 9,485,210 B2 | 11/2016 | Appalabattula et al. |
| 9,485,673 B2 | 11/2016 | Turunen et al. |
| 9,495,401 B2 | 11/2016 | Migliori |
| 9,549,364 B2 | 1/2017 | Boldyrev et al. |
| 9,563,771 B2 | 2/2017 | Lang et al. |
| 9,590,790 B2 | 3/2017 | Hui et al. |
| 9,591,087 B2 | 3/2017 | Sinha et al. |
| 9,591,451 B1 | 3/2017 | Knight et al. |
| 9,613,011 B2 | 4/2017 | Lund et al. |
| 9,614,964 B2 | 4/2017 | Stepanian |
| 9,618,222 B1 | 4/2017 | Hussain et al. |
| 9,632,664 B2 | 4/2017 | Foss et al. |
| 9,634,928 B2 | 4/2017 | Choudhury et al. |
| 9,639,623 B2 | 5/2017 | Lund |
| 9,645,709 B2 | 5/2017 | Foss et al. |
| 9,665,662 B1 | 5/2017 | Gautam et al. |
| 9,667,501 B2 | 5/2017 | Dasgupta et al. |
| 9,668,103 B1 | 5/2017 | Edwards et al. |
| 9,672,497 B1 * | 6/2017 | Lewis ............... G06Q 10/20 |
| 9,679,072 B2 | 6/2017 | Boudville |
| 9,679,336 B2 | 6/2017 | Papakipos et al. |
| 9,690,559 B2 | 6/2017 | Haserodt et al. |
| 9,692,756 B2 | 6/2017 | Poisner et al. |
| 9,692,878 B1 | 6/2017 | Rosenthal et al. |
| 9,693,375 B2 | 6/2017 | Bacon et al. |
| 9,703,670 B2 | 7/2017 | Ajith Kumar et al. |
| 9,705,751 B1 | 7/2017 | Yi et al. |
| 9,712,486 B2 | 7/2017 | Johnson et al. |
| 9,715,496 B1 | 7/2017 | Sapoznik et al. |
| 9,730,017 B2 | 8/2017 | Belimpasakis et al. |
| 9,733,975 B2 | 8/2017 | Cook et al. |
| 9,734,473 B2 | 8/2017 | Scott et al. |
| 9,747,440 B2 | 8/2017 | Gupta et al. |
| 9,747,663 B2 | 8/2017 | Barnes |
| 9,749,410 B2 | 8/2017 | Thubert et al. |
| 9,756,050 B1 | 9/2017 | Brandwine |
| 9,756,549 B2 | 9/2017 | Perdomo |
| 9,950,722 B2 * | 4/2018 | Kumar ............... B61L 27/0027 |
| 2001/0023576 A1 | 9/2001 | Rollins |
| 2001/0026549 A1 | 10/2001 | Hameleers et al. |
| 2001/0037316 A1 | 11/2001 | Shiloh |
| 2001/0038674 A1 | 11/2001 | Trans |
| 2002/0006807 A1 | 1/2002 | Mantyjarvi et al. |
| 2002/0018724 A1 | 2/2002 | Millet et al. |
| 2002/0032510 A1 | 3/2002 | Turnbull et al. |
| 2002/0039381 A1 | 4/2002 | Dooley et al. |
| 2002/0049535 A1 | 4/2002 | Rigo et al. |
| 2002/0052677 A1 | 5/2002 | Lasson et al. |
| 2002/0054578 A1 | 5/2002 | Zhang et al. |
| 2002/0059075 A1 | 5/2002 | Schick et al. |
| 2002/0063001 A1 | 5/2002 | Lennevi |
| 2002/0063002 A1 | 5/2002 | Lasson |
| 2002/0064707 A1 | 5/2002 | Wessman |
| 2002/0065165 A1 | 5/2002 | Lasson et al. |
| 2002/0065589 A1 | 5/2002 | Ostberg et al. |
| 2002/0065698 A1 | 5/2002 | Schick et al. |
| 2002/0073243 A1 | 6/2002 | Staiger |
| 2002/0087478 A1 | 7/2002 | Hudd et al. |
| 2002/0095859 A1 | 7/2002 | Hicks et al. |
| 2002/0105228 A1 | 8/2002 | Zecca et al. |
| 2002/0105968 A1 | 8/2002 | Pruzan et al. |
| 2002/0107873 A1 | 8/2002 | Winkler et al. |
| 2002/0110146 A1 | 8/2002 | Thayer et al. |
| 2002/0120490 A1 | 8/2002 | Gajewski et al. |
| 2002/0122055 A1 | 9/2002 | Parupudi et al. |
| 2002/0122196 A1 | 9/2002 | Cordery et al. |
| 2002/0124007 A1 | 9/2002 | Zhao |
| 2002/0127978 A1 | 9/2002 | Khatri |
| 2002/0141438 A1 | 10/2002 | Smith et al. |
| 2002/0144038 A1 | 10/2002 | Smith |
| 2002/0146015 A1 | 10/2002 | Bryan et al. |
| 2002/0178130 A1 | 11/2002 | Moy et al. |
| 2002/0181633 A1 | 12/2002 | Trans |
| 2002/0184062 A1 | 12/2002 | Diaz |
| 2002/0186144 A1 | 12/2002 | Meunier |
| 2002/0188892 A1 | 12/2002 | Lajolo |
| 2002/0198632 A1 | 12/2002 | Breed et al. |
| 2002/0199156 A1 | 12/2002 | Chess et al. |
| 2003/0001779 A1 | 1/2003 | Mintz et al. |
| 2003/0002047 A1 | 1/2003 | Sayers et al. |
| 2003/0004778 A1 | 1/2003 | Gareau et al. |
| 2003/0014521 A1 | 1/2003 | Elson et al. |
| 2003/0016770 A1 | 1/2003 | Trans et al. |
| 2003/0018794 A1 | 1/2003 | Zhang et al. |
| 2003/0043073 A1 | 3/2003 | Gray et al. |
| 2003/0053105 A1 | 3/2003 | Morooka et al. |
| 2003/0055666 A1 | 3/2003 | Roddy et al. |
| 2003/0063004 A1 | 4/2003 | Anthony et al. |
| 2003/0065432 A1 | 4/2003 | Shuman et al. |
| 2003/0073406 A1 | 4/2003 | Benjamin et al. |
| 2003/0086515 A1 | 5/2003 | Trans et al. |
| 2003/0086539 A1 | 5/2003 | McCalmont et al. |
| 2003/0088644 A1 | 5/2003 | Ganguly et al. |
| 2003/0093187 A1 | 5/2003 | Walker |
| 2003/0098804 A1 | 5/2003 | Ekstrand et al. |
| 2003/0105567 A1 | 6/2003 | Koenig et al. |
| 2003/0109245 A1 | 6/2003 | McCalmont et al. |
| 2003/0112456 A1 | 6/2003 | Tomita et al. |
| 2003/0125849 A1 | 7/2003 | Braun et al. |
| 2003/0133423 A1 | 7/2003 | LaDue |
| 2003/0137426 A1 | 7/2003 | Anthony et al. |
| 2003/0141990 A1 | 7/2003 | Coon |
| 2003/0143554 A1 | 7/2003 | Berres et al. |
| 2003/0150215 A1 | 8/2003 | Rollins |
| 2003/0154418 A1 | 8/2003 | Vandensande |
| 2003/0156733 A1 | 8/2003 | Zeller et al. |
| 2003/0158771 A1 | 8/2003 | Shen et al. |
| 2003/0167178 A1 | 9/2003 | Jarman et al. |
| 2003/0182183 A1 | 9/2003 | Pribe |
| 2003/0183467 A1 | 10/2003 | Kozarekar |

(56) References Cited

U.S. PATENT DOCUMENTS

| | | |
|---|---|---|
| 2003/0191568 A1 | 10/2003 | Breed |
| 2003/0204747 A1 | 10/2003 | Gaebel et al. |
| 2003/0209893 A1 | 11/2003 | Breed et al. |
| 2003/0221118 A1 | 11/2003 | Walker |
| 2003/0227382 A1 | 12/2003 | Breed |
| 2003/0228005 A1 | 12/2003 | Melick et al. |
| 2003/0229528 A1 | 12/2003 | Nitao et al. |
| 2003/0230443 A1 | 12/2003 | Cramer et al. |
| 2003/0231163 A1 | 12/2003 | Hanon et al. |
| 2003/0231208 A1 | 12/2003 | Hanon et al. |
| 2003/0233302 A1 | 12/2003 | Weber et al. |
| 2003/0236072 A1 | 12/2003 | Thomson |
| 2004/0010349 A1 | 1/2004 | Perez et al. |
| 2004/0015073 A1 | 1/2004 | Schell et al. |
| 2004/0022175 A1 | 2/2004 | Bolinth et al. |
| 2004/0022232 A1 | 2/2004 | Reinders |
| 2004/0028222 A1 | 2/2004 | Sewell et al. |
| 2004/0031256 A1 | 2/2004 | Rollins |
| 2004/0034455 A1 | 2/2004 | Simonds et al. |
| 2004/0051783 A1 | 3/2004 | Chellappa et al. |
| 2004/0054821 A1 | 3/2004 | Warren et al. |
| 2004/0054953 A1 | 3/2004 | Mitchell et al. |
| 2004/0055282 A1 | 3/2004 | Gray, Jr. et al. |
| 2004/0057432 A1 | 3/2004 | Allen |
| 2004/0059477 A1 | 3/2004 | Kish et al. |
| 2004/0064064 A1 | 4/2004 | Zhou et al. |
| 2004/0078141 A1 | 4/2004 | Kittell et al. |
| 2004/0081079 A1 | 4/2004 | Forest et al. |
| 2004/0081193 A1 | 4/2004 | Forest et al. |
| 2004/0088448 A1 | 5/2004 | Joshi et al. |
| 2004/0090962 A1 | 5/2004 | Forest et al. |
| 2004/0096059 A1 | 5/2004 | Seo |
| 2004/0111195 A1 | 6/2004 | Vries et al. |
| 2004/0112654 A1 | 6/2004 | Kozarekar et al. |
| 2004/0124255 A1 | 7/2004 | Heerdt |
| 2004/0126782 A1 | 7/2004 | Holden et al. |
| 2004/0129478 A1 | 7/2004 | Breed et al. |
| 2004/0130442 A1 | 7/2004 | Breed et al. |
| 2004/0132629 A1 | 7/2004 | Vinci et al. |
| 2004/0133907 A1 | 7/2004 | Rodriguez et al. |
| 2004/0142722 A1 | 7/2004 | Everett |
| 2004/0148169 A1 | 7/2004 | Baker |
| 2004/0148284 A1 | 7/2004 | Baker |
| 2004/0153362 A1 | 8/2004 | Bauer et al. |
| 2004/0153537 A1 | 8/2004 | Rezvani et al. |
| 2004/0153859 A1 | 8/2004 | Kopetz |
| 2004/0162482 A1 | 8/2004 | Assmann et al. |
| 2004/0184584 A1 | 9/2004 | McCalmont et al. |
| 2004/0184928 A1 | 9/2004 | Millet et al. |
| 2004/0184929 A1 | 9/2004 | Millet et al. |
| 2004/0184930 A1 | 9/2004 | Millet et al. |
| 2004/0184931 A1 | 9/2004 | Millet et al. |
| 2004/0186714 A1 | 9/2004 | Baker |
| 2004/0186819 A1 | 9/2004 | Baker |
| 2004/0193304 A1 | 9/2004 | Hartmann et al. |
| 2004/0198386 A1 | 10/2004 | Dupray |
| 2004/0203730 A1 | 10/2004 | Fraser et al. |
| 2004/0209653 A1 | 10/2004 | Chandhok |
| 2004/0210437 A1 | 10/2004 | Baker |
| 2004/0218548 A1 | 11/2004 | Kennedy et al. |
| 2004/0218582 A1 | 11/2004 | Kennedy et al. |
| 2004/0219909 A1 | 11/2004 | Kennedy et al. |
| 2004/0228325 A1 | 11/2004 | Hepworth et al. |
| 2004/0236706 A1 | 11/2004 | Fitch et al. |
| 2004/0249637 A1 | 12/2004 | Baker |
| 2004/0250539 A1 | 12/2004 | Cueman et al. |
| 2004/0254904 A1 | 12/2004 | Nelken et al. |
| 2004/0258163 A1 | 12/2004 | Yu et al. |
| 2004/0260585 A1 | 12/2004 | Spangenberg et al. |
| 2004/0266457 A1 | 12/2004 | Dupray |
| 2005/0002417 A1 | 1/2005 | Kelly et al. |
| 2005/0002578 A1 | 1/2005 | Mitchell et al. |
| 2005/0002579 A1 | 1/2005 | Mitchell et al. |
| 2005/0005167 A1 | 1/2005 | Kelly et al. |
| 2005/0012721 A1 | 1/2005 | Fong et al. |
| 2005/0017488 A1 | 1/2005 | Breed et al. |
| 2005/0017966 A1 | 1/2005 | Engl et al. |
| 2005/0022210 A1 | 1/2005 | Zintel et al. |
| 2005/0046584 A1 | 3/2005 | Breed |
| 2005/0055193 A1 | 3/2005 | Bondarenko |
| 2005/0059046 A1 | 3/2005 | LaBrenz et al. |
| 2005/0060069 A1 | 3/2005 | Breed et al. |
| 2005/0060070 A1 | 3/2005 | Kapolka et al. |
| 2005/0065678 A1 | 3/2005 | Smith et al. |
| 2005/0065711 A1 | 3/2005 | Dahlgren et al. |
| 2005/0065779 A1 | 3/2005 | Odinak |
| 2005/0068918 A1 | 3/2005 | Mantravadi et al. |
| 2005/0069083 A1 | 3/2005 | Klingenbeck-Regn |
| 2005/0071778 A1 | 3/2005 | Tokkonen |
| 2005/0071882 A1 | 3/2005 | Rodriguez et al. |
| 2005/0075119 A1 | 4/2005 | Sheha et al. |
| 2005/0080519 A1 | 4/2005 | Oesterling et al. |
| 2005/0080520 A1 | 4/2005 | Kline et al. |
| 2005/0083965 A1 | 4/2005 | Sodergren |
| 2005/0085928 A1 | 4/2005 | Shani |
| 2005/0126182 A1 | 6/2005 | Teets et al. |
| 2005/0131607 A1 | 6/2005 | Breed |
| 2005/0134115 A1 | 6/2005 | Betts, Jr. et al. |
| 2005/0134440 A1 | 6/2005 | Breed |
| 2005/0134503 A1 | 6/2005 | Colley et al. |
| 2005/0136902 A1 | 6/2005 | Mazzara |
| 2005/0137735 A1 | 6/2005 | Loy et al. |
| 2005/0137763 A1 | 6/2005 | Watkins et al. |
| 2005/0137786 A1 | 6/2005 | Breed et al. |
| 2005/0140696 A1 | 6/2005 | Buxton |
| 2005/0141565 A1 | 6/2005 | Forest et al. |
| 2005/0141752 A1 | 6/2005 | Bjorgan et al. |
| 2005/0143097 A1 | 6/2005 | Wilson et al. |
| 2005/0143916 A1 | 6/2005 | Kim et al. |
| 2005/0144648 A1 | 6/2005 | Gotwals et al. |
| 2005/0147057 A1 | 7/2005 | LaDue |
| 2005/0150230 A1 | 7/2005 | Rollins |
| 2005/0151517 A1 | 7/2005 | Cook et al. |
| 2005/0152318 A1 | 7/2005 | Elbatt et al. |
| 2005/0162514 A1 | 7/2005 | Dennis et al. |
| 2005/0165886 A1 | 7/2005 | Tuer et al. |
| 2005/0168573 A1 | 8/2005 | Dennis et al. |
| 2005/0171660 A1 | 8/2005 | Woolford et al. |
| 2005/0175079 A1 | 8/2005 | Gamper et al. |
| 2005/0186933 A1 | 8/2005 | Trans |
| 2005/0187677 A1 | 8/2005 | Walker |
| 2005/0188349 A1 | 8/2005 | Bent et al. |
| 2005/0188350 A1 | 8/2005 | Bent et al. |
| 2005/0192186 A1 | 9/2005 | Iyer et al. |
| 2005/0192727 A1 | 9/2005 | Shostak et al. |
| 2005/0198958 A1 | 9/2005 | Haase |
| 2005/0203683 A1 | 9/2005 | Olsen et al. |
| 2005/0209746 A1 | 9/2005 | Kish et al. |
| 2005/0215239 A1 | 9/2005 | Kopra et al. |
| 2005/0216151 A1 | 9/2005 | Gawlik et al. |
| 2005/0216331 A1 | 9/2005 | Ahrens et al. |
| 2005/0227674 A1 | 10/2005 | Kopra et al. |
| 2005/0237296 A1 | 10/2005 | Lee |
| 2005/0246190 A1 | 11/2005 | Sandor et al. |
| 2005/0251604 A1 | 11/2005 | Gerig |
| 2005/0253397 A1 | 11/2005 | Kumar et al. |
| 2005/0254460 A1 | 11/2005 | Fraser et al. |
| 2005/0261062 A1 | 11/2005 | Lewin et al. |
| 2005/0263254 A1 | 12/2005 | Sievers et al. |
| 2005/0264404 A1 | 12/2005 | Franczyk et al. |
| 2005/0273218 A1 | 12/2005 | Breed et al. |
| 2005/0278055 A1 | 12/2005 | Ferguson et al. |
| 2005/0278076 A1 | 12/2005 | Barbir et al. |
| 2005/0278098 A1 | 12/2005 | Breed |
| 2005/0280555 A1 | 12/2005 | Warner |
| 2005/0285445 A1 | 12/2005 | Wruck et al. |
| 2005/0286436 A1 | 12/2005 | Flask |
| 2005/0286466 A1 | 12/2005 | Tagg et al. |
| 2005/0286486 A1 | 12/2005 | Miller |
| 2005/0286781 A1 | 12/2005 | Mitchell et al. |
| 2006/0017582 A1 | 1/2006 | Lockhart et al. |
| 2006/0025897 A1 | 2/2006 | Shostak et al. |
| 2006/0026017 A1 | 2/2006 | Walker |
| 2006/0041370 A1 | 2/2006 | Gault et al. |

(56) References Cited

U.S. PATENT DOCUMENTS

| | | |
|---|---|---|
| 2006/0041845 A1 | 2/2006 | Ferguson et al. |
| 2006/0044146 A1 | 3/2006 | Ferguson et al. |
| 2006/0047379 A1 | 3/2006 | Schullian et al. |
| 2006/0047419 A1 | 3/2006 | Diendorf et al. |
| 2006/0050018 A1 | 3/2006 | Hutzel et al. |
| 2006/0052922 A1 | 3/2006 | Koenig et al. |
| 2006/0055564 A1 | 3/2006 | Olsen et al. |
| 2006/0061795 A1 | 3/2006 | Walmsley |
| 2006/0062363 A1 | 3/2006 | Albrett |
| 2006/0064232 A1 | 3/2006 | Ampunan et al. |
| 2006/0066480 A1 | 3/2006 | Kostanic et al. |
| 2006/0066481 A1 | 3/2006 | Goldberg |
| 2006/0066482 A1 | 3/2006 | Goldberg |
| 2006/0066483 A1 | 3/2006 | Goldberg |
| 2006/0069529 A1 | 3/2006 | Kostanic et al. |
| 2006/0069530 A1 | 3/2006 | Goldberg |
| 2006/0069531 A1 | 3/2006 | Goldberg |
| 2006/0074557 A1 | 4/2006 | Mulligan et al. |
| 2006/0079752 A1 | 4/2006 | Anderl et al. |
| 2006/0080013 A1 | 4/2006 | Koenig et al. |
| 2006/0080442 A1 | 4/2006 | Ferguson et al. |
| 2006/0081086 A1 | 4/2006 | Crist |
| 2006/0083403 A1 | 4/2006 | Zhang et al. |
| 2006/0089236 A1 | 4/2006 | Tamai |
| 2006/0092033 A1 | 5/2006 | Hoff et al. |
| 2006/0092043 A1 | 5/2006 | Lagassey |
| 2006/0095199 A1 | 5/2006 | Lagassey |
| 2006/0095756 A1 | 5/2006 | Erforth et al. |
| 2006/0097855 A1 | 5/2006 | Turnbull et al. |
| 2006/0099944 A1 | 5/2006 | Ross |
| 2006/0102075 A1 | 5/2006 | Saylor et al. |
| 2006/0107090 A1 | 5/2006 | Emma et al. |
| 2006/0118088 A1 | 6/2006 | Jung et al. |
| 2006/0122746 A1 | 6/2006 | Gawlik et al. |
| 2006/0123053 A1 | 6/2006 | Scannell |
| 2006/0129975 A1 | 6/2006 | Wille et al. |
| 2006/0132297 A1 | 6/2006 | Carver et al. |
| 2006/0138225 A1 | 6/2006 | Richley et al. |
| 2006/0143454 A1 | 6/2006 | Walmsley |
| 2006/0144997 A1 | 7/2006 | Schmidt et al. |
| 2006/0148414 A1 | 7/2006 | Tee et al. |
| 2006/0161269 A1 | 7/2006 | Staiger |
| 2006/0161320 A1 | 7/2006 | Cahoon |
| 2006/0164230 A1 | 7/2006 | DeWind et al. |
| 2006/0167595 A1 | 7/2006 | Breed et al. |
| 2006/0167784 A1 | 7/2006 | Hoffberg |
| 2006/0171410 A1 | 8/2006 | Jung et al. |
| 2006/0173268 A1 | 8/2006 | Mullick et al. |
| 2006/0180371 A1 | 8/2006 | Breed et al. |
| 2006/0182034 A1 | 8/2006 | Klinker et al. |
| 2006/0184295 A1 | 8/2006 | Hawkins et al. |
| 2006/0184445 A1 | 8/2006 | Sandor et al. |
| 2006/0184657 A1 | 8/2006 | Rezvani et al. |
| 2006/0185434 A1 | 8/2006 | Bernhagen |
| 2006/0191995 A1 | 8/2006 | Stewart et al. |
| 2006/0194566 A1 | 8/2006 | Oesterling |
| 2006/0199167 A1 | 9/2006 | Yang et al. |
| 2006/0200008 A1 | 9/2006 | Moore-Ede |
| 2006/0200259 A1 | 9/2006 | Hoffberg et al. |
| 2006/0206246 A1 | 9/2006 | Walker |
| 2006/0208169 A1 | 9/2006 | Breed et al. |
| 2006/0211446 A1 | 9/2006 | Wittmann et al. |
| 2006/0212193 A1 | 9/2006 | Breed |
| 2006/0212194 A1 | 9/2006 | Breed |
| 2006/0212300 A1 | 9/2006 | Resser et al. |
| 2006/0217864 A1 | 9/2006 | Johnson et al. |
| 2006/0220842 A1 | 10/2006 | Breed |
| 2006/0224151 A1 | 10/2006 | Waaler |
| 2006/0229090 A1 | 10/2006 | LaDue |
| 2006/0235579 A1 | 10/2006 | Oesterling et al. |
| 2006/0243043 A1 | 11/2006 | Breed |
| 2006/0244581 A1 | 11/2006 | Breed et al. |
| 2006/0244720 A1 | 11/2006 | Tracy |
| 2006/0250967 A1 | 11/2006 | Miller et al. |
| 2006/0253539 A1 | 11/2006 | Casperson et al. |
| 2006/0253763 A1 | 11/2006 | Oliva et al. |
| 2006/0259259 A1 | 11/2006 | Rozenboim et al. |
| 2006/0259274 A1 | 11/2006 | Greco et al. |
| 2006/0259866 A1 | 11/2006 | Prasad et al. |
| 2006/0265117 A1 | 11/2006 | Cahoon |
| 2006/0268007 A1 | 11/2006 | Gopalakrishnan |
| 2006/0271246 A1 | 11/2006 | Bell et al. |
| 2006/0276201 A1 | 12/2006 | Dupray |
| 2006/0284839 A1 | 12/2006 | Breed et al. |
| 2006/0287783 A1 | 12/2006 | Walker |
| 2006/0287915 A1 | 12/2006 | Boulet et al. |
| 2006/0293850 A1 | 12/2006 | Ahn et al. |
| 2006/0293954 A1 | 12/2006 | Anderson et al. |
| 2006/0293955 A1 | 12/2006 | Wilson et al. |
| 2007/0001869 A1 | 1/2007 | Hunzinger |
| 2007/0001876 A1 | 1/2007 | Patenaude et al. |
| 2007/0002077 A1 | 1/2007 | Gopalakrishnan |
| 2007/0005202 A1 | 1/2007 | Breed |
| 2007/0005609 A1 | 1/2007 | Breed |
| 2007/0006101 A1 | 1/2007 | Michaels |
| 2007/0008186 A1 | 1/2007 | Michaels et al. |
| 2007/0015119 A1 | 1/2007 | Atenasio |
| 2007/0021915 A1 | 1/2007 | Breed et al. |
| 2007/0022032 A1 | 1/2007 | Anderson et al. |
| 2007/0030116 A1 | 2/2007 | Feher |
| 2007/0032220 A1 | 2/2007 | Feher |
| 2007/0032246 A1 | 2/2007 | Feher |
| 2007/0032250 A1 | 2/2007 | Feher |
| 2007/0032266 A1 | 2/2007 | Feher |
| 2007/0032832 A1 | 2/2007 | Feher |
| 2007/0038137 A1 | 2/2007 | Arand et al. |
| 2007/0057781 A1 | 3/2007 | Breed |
| 2007/0069947 A1 | 3/2007 | Banet et al. |
| 2007/0075919 A1 | 4/2007 | Breed |
| 2007/0076312 A1 | 4/2007 | Jordan |
| 2007/0079012 A1 | 4/2007 | Walker |
| 2007/0079383 A1 | 4/2007 | Gopalakrishnan |
| 2007/0083329 A1 | 4/2007 | Im |
| 2007/0083491 A1 | 4/2007 | Walmsley et al. |
| 2007/0085697 A1 | 4/2007 | Breed |
| 2007/0086482 A1 | 4/2007 | Pruzan et al. |
| 2007/0086624 A1 | 4/2007 | Breed et al. |
| 2007/0087733 A1 | 4/2007 | Gerlach et al. |
| 2007/0087756 A1 | 4/2007 | Hoffberg |
| 2007/0091983 A1 | 4/2007 | Siriwongpairat et al. |
| 2007/0092103 A1 | 4/2007 | Mihcak et al. |
| 2007/0093947 A1 | 4/2007 | Gould |
| 2007/0094366 A1 | 4/2007 | Ayoub |
| 2007/0096565 A1 | 5/2007 | Breed et al. |
| 2007/0098496 A1 | 5/2007 | Hall et al. |
| 2007/0103835 A1 | 5/2007 | Sorenson |
| 2007/0106559 A1 | 5/2007 | Harrell |
| 2007/0107034 A1 | 5/2007 | Gotwals |
| 2007/0108267 A1 | 5/2007 | Jonsson et al. |
| 2007/0109111 A1 | 5/2007 | Breed et al. |
| 2007/0112729 A1 | 5/2007 | Wiseman et al. |
| 2007/0118364 A1 | 5/2007 | Wise et al. |
| 2007/0118372 A1 | 5/2007 | Wise et al. |
| 2007/0118373 A1 | 5/2007 | Wise et al. |
| 2007/0118374 A1 | 5/2007 | Wise et al. |
| 2007/0118378 A1 | 5/2007 | Skuratovsky |
| 2007/0118430 A1 | 5/2007 | Wiseman et al. |
| 2007/0119859 A1 | 5/2007 | Harrell |
| 2007/0120996 A1 | 5/2007 | Boillot |
| 2007/0121712 A1 | 5/2007 | Okamoto |
| 2007/0124451 A1 | 5/2007 | Joshi et al. |
| 2007/0126561 A1 | 6/2007 | Breed |
| 2007/0126631 A1 | 6/2007 | Goldberg |
| 2007/0126632 A1 | 6/2007 | Goldberg |
| 2007/0126696 A1 | 6/2007 | Boillot |
| 2007/0127688 A1 | 6/2007 | Doulton |
| 2007/0130547 A1 | 6/2007 | Boillot |
| 2007/0130952 A1 | 6/2007 | Copen |
| 2007/0139216 A1 | 6/2007 | Breed |
| 2007/0149184 A1 | 6/2007 | Viegers et al. |
| 2007/0152107 A1 | 7/2007 | LeFebvre et al. |
| 2007/0152804 A1 | 7/2007 | Breed et al. |
| 2007/0155360 A1 | 7/2007 | An |
| 2007/0156312 A1 | 7/2007 | Breed et al. |

(56) References Cited

U.S. PATENT DOCUMENTS

| | | |
|---|---|---|
| 2007/0156320 A1 | 7/2007 | Breed et al. |
| 2007/0168486 A1 | 7/2007 | McCoy et al. |
| 2007/0168578 A1 | 7/2007 | Balchandran et al. |
| 2007/0169723 A1 | 7/2007 | Rutledge |
| 2007/0171029 A1 | 7/2007 | Inbarajan |
| 2007/0173986 A1 | 7/2007 | Inbarajan |
| 2007/0173992 A1 | 7/2007 | McCutchen et al. |
| 2007/0174633 A1 | 7/2007 | Draper et al. |
| 2007/0179706 A1 | 8/2007 | McCutchen et al. |
| 2007/0179798 A1 | 8/2007 | Inbarajan |
| 2007/0179799 A1 | 8/2007 | Laghrari |
| 2007/0179800 A1 | 8/2007 | Oesterling |
| 2007/0185768 A1 | 8/2007 | Vengroff et al. |
| 2007/0191995 A1 | 8/2007 | Laghrari |
| 2007/0192221 A1 | 8/2007 | Sandor et al. |
| 2007/0200758 A1 | 8/2007 | Goldberg |
| 2007/0200847 A1 | 8/2007 | Rossler et al. |
| 2007/0202890 A1 | 8/2007 | Feher |
| 2007/0205881 A1 | 9/2007 | Breed |
| 2007/0209608 A1 | 9/2007 | Rutledge |
| 2007/0211022 A1 | 9/2007 | Boillot |
| 2007/0211023 A1 | 9/2007 | Boillot |
| 2007/0211031 A1 | 9/2007 | Marc |
| 2007/0214462 A1 | 9/2007 | Boillot |
| 2007/0220437 A1 | 9/2007 | Boillot |
| 2007/0227344 A1 | 10/2007 | Ryle et al. |
| 2007/0238427 A1 | 10/2007 | Kraft et al. |
| 2007/0238520 A1 | 10/2007 | Kacmarcik |
| 2007/0244838 A1 | 10/2007 | Moy et al. |
| 2007/0247282 A1 | 10/2007 | Olsen et al. |
| 2007/0252734 A1 | 11/2007 | Greiner et al. |
| 2007/0258642 A1 | 11/2007 | Thota |
| 2007/0261072 A1 | 11/2007 | Boulet et al. |
| 2007/0261103 A1 | 11/2007 | Viavant et al. |
| 2007/0262574 A1 | 11/2007 | Breed et al. |
| 2007/0263506 A1 | 11/2007 | Gulas et al. |
| 2007/0265018 A1 | 11/2007 | Feher |
| 2007/0265733 A1 | 11/2007 | Harrell |
| 2007/0271014 A1 | 11/2007 | Breed |
| 2007/0272216 A1 | 11/2007 | Hollenbeck |
| 2007/0282506 A1 | 12/2007 | Breed et al. |
| 2007/0287473 A1 | 12/2007 | Dupray |
| 2007/0294199 A1 | 12/2007 | Nelken et al. |
| 2007/0294636 A1 | 12/2007 | Sullivan |
| 2007/0298765 A1 | 12/2007 | Dickinson et al. |
| 2007/0299587 A1 | 12/2007 | Breed et al. |
| 2008/0015131 A1 | 1/2008 | Vinci et al. |
| 2008/0015771 A1 | 1/2008 | Breed |
| 2008/0015976 A1 | 1/2008 | Sandor et al. |
| 2008/0019187 A1 | 1/2008 | Kux et al. |
| 2008/0021605 A1 | 1/2008 | Huber et al. |
| 2008/0021964 A1 | 1/2008 | Inbarajan |
| 2008/0025204 A1 | 1/2008 | Radha et al. |
| 2008/0025330 A1 | 1/2008 | Wang |
| 2008/0027604 A1 | 1/2008 | Oesterling |
| 2008/0027605 A1 | 1/2008 | Oesterling |
| 2008/0027606 A1 | 1/2008 | Helm |
| 2008/0028474 A1 | 1/2008 | Horne et al. |
| 2008/0030345 A1 | 2/2008 | Austin et al. |
| 2008/0032622 A1 | 2/2008 | Kopra et al. |
| 2008/0036580 A1 | 2/2008 | Breed |
| 2008/0039983 A1 | 2/2008 | Oesterling et al. |
| 2008/0039995 A1 | 2/2008 | Reeser |
| 2008/0040004 A1 | 2/2008 | Breed |
| 2008/0040005 A1 | 2/2008 | Breed |
| 2008/0040023 A1 | 2/2008 | Breed et al. |
| 2008/0040029 A1 | 2/2008 | Breed |
| 2008/0040223 A1 | 2/2008 | Bridges et al. |
| 2008/0040258 A1 | 2/2008 | Weber et al. |
| 2008/0040287 A1 | 2/2008 | Harrell et al. |
| 2008/0042410 A1 | 2/2008 | Breed et al. |
| 2008/0042815 A1 | 2/2008 | Breed et al. |
| 2008/0043868 A1 | 2/2008 | Feher |
| 2008/0046149 A1 | 2/2008 | Breed |
| 2008/0046150 A1 | 2/2008 | Breed |
| 2008/0047329 A1 | 2/2008 | Breed |
| 2008/0049906 A1 | 2/2008 | Doulton |
| 2008/0049907 A1 | 2/2008 | Doulton |
| 2008/0049908 A1 | 2/2008 | Doulton |
| 2008/0051955 A1 | 2/2008 | Ross et al. |
| 2008/0051957 A1 | 2/2008 | Breed et al. |
| 2008/0052070 A1 | 2/2008 | Doulton |
| 2008/0052071 A1 | 2/2008 | Doulton |
| 2008/0052413 A1 | 2/2008 | Wang et al. |
| 2008/0053240 A1 | 3/2008 | Henry et al. |
| 2008/0057886 A1 | 3/2008 | Feher |
| 2008/0061959 A1 | 3/2008 | Breed |
| 2008/0062856 A1 | 3/2008 | Feher |
| 2008/0063155 A1 | 3/2008 | Doulton |
| 2008/0064413 A1 | 3/2008 | Breed |
| 2008/0065290 A1 | 3/2008 | Breed et al. |
| 2008/0071534 A1 | 3/2008 | Johnson |
| 2008/0071882 A1 | 3/2008 | Hering et al. |
| 2008/0072261 A1 | 3/2008 | Ralston et al. |
| 2008/0085040 A1 | 4/2008 | Basu et al. |
| 2008/0086240 A1 | 4/2008 | Breed |
| 2008/0088441 A1 | 4/2008 | Breed |
| 2008/0088462 A1 | 4/2008 | Breed |
| 2008/0089338 A1 | 4/2008 | Campbell et al. |
| 2008/0089402 A1 | 4/2008 | Massey et al. |
| 2008/0094212 A1 | 4/2008 | Breed |
| 2008/0095300 A1 | 4/2008 | Zingelewicz et al. |
| 2008/0097845 A1 | 4/2008 | Altberg et al. |
| 2008/0098175 A1 | 4/2008 | Mitchell et al. |
| 2008/0098275 A1 | 4/2008 | Mitchell et al. |
| 2008/0100140 A1 | 5/2008 | Sorenson et al. |
| 2008/0100572 A1 | 5/2008 | Boillot |
| 2008/0100706 A1 | 5/2008 | Breed |
| 2008/0101460 A1 | 5/2008 | Rodriguez |
| 2008/0103655 A1 | 5/2008 | Turnbull et al. |
| 2008/0106436 A1 | 5/2008 | Breed |
| 2008/0108372 A1 | 5/2008 | Breed |
| 2008/0109221 A1 | 5/2008 | Doulton |
| 2008/0109470 A1 | 5/2008 | McGee |
| 2008/0111666 A1 | 5/2008 | Plante et al. |
| 2008/0114502 A1 | 5/2008 | Breed et al. |
| 2008/0119966 A1 | 5/2008 | Breed et al. |
| 2008/0125958 A1 | 5/2008 | Boss et al. |
| 2008/0126149 A1 | 5/2008 | Kloess et al. |
| 2008/0129475 A1 | 6/2008 | Breed et al. |
| 2008/0133126 A1 | 6/2008 | Dupray |
| 2008/0133136 A1 | 6/2008 | Breed et al. |
| 2008/0133219 A1 | 6/2008 | Doulton |
| 2008/0133231 A1 | 6/2008 | Doulton |
| 2008/0133232 A1 | 6/2008 | Doulton |
| 2008/0137589 A1 | 6/2008 | Barrett |
| 2008/0140278 A1 | 6/2008 | Breed |
| 2008/0140318 A1 | 6/2008 | Breed |
| 2008/0143595 A1 | 6/2008 | Colley et al. |
| 2008/0144519 A1 | 6/2008 | Cooppan |
| 2008/0144944 A1 | 6/2008 | Breed |
| 2008/0147245 A1 | 6/2008 | Koepf et al. |
| 2008/0147253 A1 | 6/2008 | Breed |
| 2008/0147265 A1 | 6/2008 | Breed |
| 2008/0147266 A1 | 6/2008 | Plante et al. |
| 2008/0147267 A1 | 6/2008 | Plante et al. |
| 2008/0147271 A1 | 6/2008 | Breed |
| 2008/0147410 A1 | 6/2008 | Odinak |
| 2008/0147571 A1 | 6/2008 | Greiner et al. |
| 2008/0147686 A1 | 6/2008 | Colley et al. |
| 2008/0150786 A1 | 6/2008 | Breed |
| 2008/0152128 A1 | 6/2008 | Sewell et al. |
| 2008/0154452 A1 | 6/2008 | Kapp et al. |
| 2008/0154459 A1 | 6/2008 | Grichnik et al. |
| 2008/0154495 A1 | 6/2008 | Breed |
| 2008/0154629 A1 | 6/2008 | Breed et al. |
| 2008/0155478 A1 | 6/2008 | Stross |
| 2008/0156406 A1 | 7/2008 | Breed |
| 2008/0156569 A1 | 7/2008 | Clevenger et al. |
| 2008/0157940 A1 | 7/2008 | Breed et al. |
| 2008/0158096 A1 | 7/2008 | Breed |
| 2008/0159416 A1 | 7/2008 | Melick et al. |
| 2008/0159560 A1 | 7/2008 | Song et al. |
| 2008/0161986 A1 | 7/2008 | Breed |

(56) References Cited

U.S. PATENT DOCUMENTS

| | | |
|---|---|---|
| 2008/0161987 A1 | 7/2008 | Breed |
| 2008/0161988 A1 | 7/2008 | Oesterling et al. |
| 2008/0161989 A1 | 7/2008 | Breed |
| 2008/0162036 A1 | 7/2008 | Breed |
| 2008/0162132 A1 | 7/2008 | Doulton |
| 2008/0162860 A1 | 7/2008 | Sabbatini et al. |
| 2008/0165018 A1 | 7/2008 | Breed |
| 2008/0167123 A1 | 7/2008 | Luciano et al. |
| 2008/0167819 A1 | 7/2008 | Breed |
| 2008/0167821 A1 | 7/2008 | Breed |
| 2008/0174423 A1 | 7/2008 | Breed |
| 2008/0177436 A1 | 7/2008 | Fortson |
| 2008/0178292 A1 | 7/2008 | Stauner et al. |
| 2008/0180654 A1 | 7/2008 | Bathiche et al. |
| 2008/0181151 A1 | 7/2008 | Feher |
| 2008/0186164 A1 | 8/2008 | Emigh et al. |
| 2008/0188240 A1 | 8/2008 | Feher |
| 2008/0194273 A1 | 8/2008 | Kansal et al. |
| 2008/0195942 A1 | 8/2008 | Marsyla et al. |
| 2008/0200209 A1 | 8/2008 | Cahoon |
| 2008/0205535 A1 | 8/2008 | Feher |
| 2008/0212272 A1 | 9/2008 | Hollander |
| 2008/0215202 A1 | 9/2008 | Breed |
| 2008/0215231 A1 | 9/2008 | Breed |
| 2008/0215891 A1 | 9/2008 | Horne et al. |
| 2008/0216567 A1 | 9/2008 | Breed |
| 2008/0218427 A1 | 9/2008 | Dobosz et al. |
| 2008/0222496 A1 | 9/2008 | Tuyls et al. |
| 2008/0228346 A1 | 9/2008 | Lucas et al. |
| 2008/0228908 A1 | 9/2008 | Link et al. |
| 2008/0229194 A1 | 9/2008 | Boler et al. |
| 2008/0235515 A1 | 9/2008 | Yedidia et al. |
| 2008/0236275 A1 | 10/2008 | Breed et al. |
| 2008/0240070 A1 | 10/2008 | Feher |
| 2008/0243611 A1 | 10/2008 | Delli Santi et al. |
| 2008/0243783 A1 | 10/2008 | Santi et al. |
| 2008/0243821 A1 | 10/2008 | Delli Santi et al. |
| 2008/0244216 A1 | 10/2008 | Zilavy |
| 2008/0250869 A1 | 10/2008 | Breed et al. |
| 2008/0252485 A1 | 10/2008 | Lagassey |
| 2008/0252495 A1 | 10/2008 | Mitchell et al. |
| 2008/0253275 A1 | 10/2008 | Feher |
| 2008/0253353 A1 | 10/2008 | Feher |
| 2008/0255784 A1 | 10/2008 | Gamper et al. |
| 2008/0257066 A1 | 10/2008 | Henry et al. |
| 2008/0257067 A1 | 10/2008 | Henry et al. |
| 2008/0262646 A1 | 10/2008 | Breed |
| 2008/0266323 A1 | 10/2008 | Biocca et al. |
| 2008/0266389 A1 | 10/2008 | DeWind et al. |
| 2008/0269958 A1 | 10/2008 | Filev et al. |
| 2008/0270074 A1 | 10/2008 | Horkavi et al. |
| 2008/0270076 A1 | 10/2008 | Breed |
| 2008/0272906 A1 | 11/2008 | Breed |
| 2008/0272923 A1 | 11/2008 | Breed |
| 2008/0276107 A1 | 11/2008 | Bogavac |
| 2008/0276271 A1 | 11/2008 | Anderson et al. |
| 2008/0278314 A1 | 11/2008 | Miller et al. |
| 2008/0281585 A1 | 11/2008 | Feher |
| 2008/0282817 A1 | 11/2008 | Breed |
| 2008/0284575 A1 | 11/2008 | Breed |
| 2008/0288129 A1 | 11/2008 | Hancock, Sr. |
| 2008/0288215 A1 | 11/2008 | Duberry |
| 2008/0288878 A1 | 11/2008 | Hayashi et al. |
| 2008/0301452 A1 | 12/2008 | Horne et al. |
| 2008/0301767 A1 | 12/2008 | Picard et al. |
| 2008/0303693 A1 | 12/2008 | Link |
| 2008/0308249 A1 | 12/2008 | Hetke |
| 2008/0318622 A1 | 12/2008 | Jen |
| 2009/0012675 A1 | 1/2009 | Laghrari et al. |
| 2009/0015400 A1 | 1/2009 | Breed |
| 2009/0016216 A1 | 1/2009 | Ballard et al. |
| 2009/0019341 A1 | 1/2009 | Emma et al. |
| 2009/0021486 A1 | 1/2009 | Chaudhri et al. |
| 2009/0023446 A1 | 1/2009 | Das |
| 2009/0024636 A1 | 1/2009 | Shiloh |
| 2009/0027056 A1 | 1/2009 | Huang et al. |
| 2009/0027223 A1 | 1/2009 | Hill |
| 2009/0027229 A1 | 1/2009 | Fortson et al. |
| 2009/0029670 A1 | 1/2009 | Cho et al. |
| 2009/0029671 A1 | 1/2009 | Cho et al. |
| 2009/0030605 A1 | 1/2009 | Breed |
| 2009/0030652 A1 | 1/2009 | Greco et al. |
| 2009/0033540 A1 | 2/2009 | Breed et al. |
| 2009/0034630 A1 | 2/2009 | Cho et al. |
| 2009/0034631 A1 | 2/2009 | Cho et al. |
| 2009/0034656 A1 | 2/2009 | Cho et al. |
| 2009/0036090 A1 | 2/2009 | Cho et al. |
| 2009/0037047 A1 | 2/2009 | Hawkins et al. |
| 2009/0037097 A1 | 2/2009 | Cho et al. |
| 2009/0040029 A1 | 2/2009 | Bridges et al. |
| 2009/0042592 A1 | 2/2009 | Cho et al. |
| 2009/0043407 A1 | 2/2009 | Mathiesen et al. |
| 2009/0043415 A1 | 2/2009 | Sun et al. |
| 2009/0043441 A1 | 2/2009 | Breed |
| 2009/0043506 A1 | 2/2009 | Breed |
| 2009/0043653 A1 | 2/2009 | Sandor et al. |
| 2009/0044073 A1 | 2/2009 | Cho et al. |
| 2009/0045910 A1 | 2/2009 | Zoller et al. |
| 2009/0046538 A1 | 2/2009 | Breed et al. |
| 2009/0048750 A1 | 2/2009 | Breed |
| 2009/0051566 A1 | 2/2009 | Olsen et al. |
| 2009/0055190 A1 | 2/2009 | Filev et al. |
| 2009/0055824 A1 | 2/2009 | Rychtyckyj et al. |
| 2009/0055843 A1 | 2/2009 | Engber et al. |
| 2009/0058593 A1 | 3/2009 | Breed |
| 2009/0061852 A1 | 3/2009 | Feher |
| 2009/0063045 A1 | 3/2009 | Figueroa et al. |
| 2009/0063154 A1 | 3/2009 | Gusikhin et al. |
| 2009/0063226 A1 | 3/2009 | Greiner et al. |
| 2009/0064155 A1 | 3/2009 | Giuli et al. |
| 2009/0066667 A1 | 3/2009 | Feher |
| 2009/0067336 A1 | 3/2009 | Cho et al. |
| 2009/0071421 A1 | 3/2009 | Maehara et al. |
| 2009/0076803 A1 | 3/2009 | Feher |
| 2009/0085769 A1 | 4/2009 | Thubert et al. |
| 2009/0088187 A1 | 4/2009 | Krause et al. |
| 2009/0088990 A1 | 4/2009 | Schweitzer et al. |
| 2009/0092114 A1 | 4/2009 | Feher |
| 2009/0092284 A1 | 4/2009 | Breed et al. |
| 2009/0093236 A1 | 4/2009 | Balan et al. |
| 2009/0094527 A1 | 4/2009 | Parupudi et al. |
| 2009/0094555 A1 | 4/2009 | Viitala |
| 2009/0098852 A1 | 4/2009 | Feher |
| 2009/0099708 A1 | 4/2009 | Greiner et al. |
| 2009/0099886 A1 | 4/2009 | Greiner et al. |
| 2009/0102401 A1 | 4/2009 | Ashdown |
| 2009/0102638 A1 | 4/2009 | Olsen et al. |
| 2009/0105041 A1 | 4/2009 | McKenzie et al. |
| 2009/0106036 A1 | 4/2009 | Tamura et al. |
| 2009/0109037 A1 | 4/2009 | Farmer |
| 2009/0109795 A1 | 4/2009 | Marti |
| 2009/0110235 A1 | 4/2009 | Marti |
| 2009/0119538 A1 | 5/2009 | Scales et al. |
| 2009/0119657 A1 | 5/2009 | Link |
| 2009/0122797 A1 | 5/2009 | Thubert et al. |
| 2009/0122812 A1 | 5/2009 | Steiner et al. |
| 2009/0125180 A1 | 5/2009 | Berkobin et al. |
| 2009/0132153 A1 | 5/2009 | Shutty et al. |
| 2009/0138715 A1 | 5/2009 | Xiao et al. |
| 2009/0139781 A1 | 6/2009 | Straubel |
| 2009/0140887 A1 | 6/2009 | Breed et al. |
| 2009/0141991 A1 | 6/2009 | Mitchell et al. |
| 2009/0143923 A1 | 6/2009 | Breed |
| 2009/0143953 A1 | 6/2009 | Amminemi et al. |
| 2009/0144127 A1 | 6/2009 | Smith |
| 2009/0150023 A1 | 6/2009 | Grau et al. |
| 2009/0153468 A1 | 6/2009 | Ong et al. |
| 2009/0154992 A1 | 6/2009 | Greiner et al. |
| 2009/0163194 A1 | 6/2009 | Mazzara, Jr. |
| 2009/0164053 A1 | 6/2009 | Oesterling |
| 2009/0164216 A1 | 6/2009 | Chengalvarayan et al. |
| 2009/0164551 A1 | 6/2009 | Oesterling et al. |
| 2009/0167524 A1 | 7/2009 | Chesnutt et al. |
| 2009/0168849 A1 | 7/2009 | Rouxel |

(56) References Cited

U.S. PATENT DOCUMENTS

| | | |
|---|---|---|
| 2009/0170434 A1 | 7/2009 | Tengler et al. |
| 2009/0170537 A1 | 7/2009 | Mauti, Jr. |
| 2009/0170539 A1 | 7/2009 | Kortge et al. |
| 2009/0171684 A1 | 7/2009 | Samolinski et al. |
| 2009/0172102 A1 | 7/2009 | Chesnutt et al. |
| 2009/0177351 A1 | 7/2009 | Watkins et al. |
| 2009/0178022 A1 | 7/2009 | Horne et al. |
| 2009/0187297 A1 | 7/2009 | Kish et al. |
| 2009/0190755 A1 | 7/2009 | Sewell et al. |
| 2009/0192662 A1 | 7/2009 | Faus et al. |
| 2009/0193781 A1 | 8/2009 | Haase |
| 2009/0194996 A1 | 8/2009 | Haase |
| 2009/0198856 A1 | 8/2009 | Habben |
| 2009/0200988 A1 | 8/2009 | Bridges et al. |
| 2009/0216138 A1 | 8/2009 | Arand et al. |
| 2009/0216910 A1* | 8/2009 | Duchesneau ........... H04L 41/04 709/250 |
| 2009/0219992 A1 | 9/2009 | Nang |
| 2009/0222438 A1 | 9/2009 | Strandell et al. |
| 2009/0228157 A1 | 9/2009 | Breed |
| 2009/0232408 A1 | 9/2009 | Meany |
| 2009/0235044 A1 | 9/2009 | Kisel et al. |
| 2009/0240308 A1 | 9/2009 | Feher |
| 2009/0240391 A1 | 9/2009 | Duddle et al. |
| 2009/0240427 A1 | 9/2009 | Siereveld et al. |
| 2009/0243828 A1 | 10/2009 | Hering et al. |
| 2009/0245533 A1 | 10/2009 | Gerlach |
| 2009/0247132 A1 | 10/2009 | Sumcad et al. |
| 2009/0247153 A1 | 10/2009 | Haralson et al. |
| 2009/0247187 A1 | 10/2009 | Feher |
| 2009/0248222 A1 | 10/2009 | McGarry et al. |
| 2009/0248235 A1 | 10/2009 | Hering et al. |
| 2009/0248236 A1 | 10/2009 | Schwinke |
| 2009/0248302 A1 | 10/2009 | Harkenrider et al. |
| 2009/0249074 A1 | 10/2009 | Madhavan et al. |
| 2009/0252134 A1 | 10/2009 | Schlicht et al. |
| 2009/0258333 A1 | 10/2009 | Yu |
| 2009/0261971 A1 | 10/2009 | Viegers et al. |
| 2009/0262929 A1 | 10/2009 | Walmsley |
| 2009/0267758 A1 | 10/2009 | Hyde et al. |
| 2009/0270113 A1 | 10/2009 | Feher |
| 2009/0271054 A1* | 10/2009 | Dokken ............... G01C 21/005 701/21 |
| 2009/0271151 A1 | 10/2009 | ONeal et al. |
| 2009/0281864 A1 | 11/2009 | Abercrombie et al. |
| 2009/0283080 A1 | 11/2009 | Matas et al. |
| 2009/0284391 A1 | 11/2009 | Berkobin et al. |
| 2009/0287407 A1 | 11/2009 | Sheha et al. |
| 2009/0292858 A1 | 11/2009 | Lambeth et al. |
| 2009/0299600 A1 | 12/2009 | Guo et al. |
| 2009/0299857 A1 | 12/2009 | Brubaker |
| 2009/0301791 A1 | 12/2009 | McPhail et al. |
| 2009/0303016 A1 | 12/2009 | Deuber et al. |
| 2009/0303187 A1 | 12/2009 | Pallakoff |
| 2009/0306834 A1 | 12/2009 | Hjelm et al. |
| 2009/0306866 A1 | 12/2009 | Malikopoulos |
| 2009/0307031 A1 | 12/2009 | Winkler et al. |
| 2009/0310591 A1 | 12/2009 | Feher |
| 2009/0312595 A1 | 12/2009 | Leuthardt et al. |
| 2009/0312668 A1 | 12/2009 | Leuthardt et al. |
| 2009/0313178 A1 | 12/2009 | Weber et al. |
| 2009/0314129 A1 | 12/2009 | Crist |
| 2009/0319868 A1 | 12/2009 | Sharon et al. |
| 2009/0322560 A1 | 12/2009 | Tengler et al. |
| 2009/0323967 A1 | 12/2009 | Peirce et al. |
| 2009/0324047 A1 | 12/2009 | Jarisch |
| 2009/0325596 A1 | 12/2009 | Oesterling et al. |
| 2009/0325612 A1 | 12/2009 | Oesterling et al. |
| 2010/0004762 A1 | 1/2010 | Leuthardt et al. |
| 2010/0004853 A1 | 1/2010 | Siereveld et al. |
| 2010/0010958 A1 | 1/2010 | Perrow et al. |
| 2010/0014768 A1 | 1/2010 | Bhattacharjya et al. |
| 2010/0015583 A1 | 1/2010 | Leuthardt et al. |
| 2010/0017001 A1 | 1/2010 | Leuthardt et al. |
| 2010/0017236 A1 | 1/2010 | Duddle et al. |
| 2010/0022820 A1 | 1/2010 | Leuthardt et al. |
| 2010/0029284 A1 | 2/2010 | Feher |
| 2010/0030582 A1 | 2/2010 | Rippel et al. |
| 2010/0030586 A1 | 2/2010 | Taylor et al. |
| 2010/0033342 A1 | 2/2010 | Patenaude et al. |
| 2010/0033372 A1 | 2/2010 | Pryor et al. |
| 2010/0038158 A1 | 2/2010 | Whitney et al. |
| 2010/0041958 A1 | 2/2010 | Leuthardt et al. |
| 2010/0042453 A1 | 2/2010 | Scaramellino et al. |
| 2010/0042498 A1 | 2/2010 | Schalk |
| 2010/0042578 A1 | 2/2010 | Leuthardt et al. |
| 2010/0049516 A1 | 2/2010 | Talwar et al. |
| 2010/0052945 A1 | 3/2010 | Breed |
| 2010/0054279 A1 | 3/2010 | Feldbauer et al. |
| 2010/0060942 A1 | 3/2010 | Monga et al. |
| 2010/0060943 A1 | 3/2010 | Monga et al. |
| 2010/0063368 A1 | 3/2010 | Leuthardt et al. |
| 2010/0063614 A1 | 3/2010 | Rosenboim et al. |
| 2010/0067595 A1 | 3/2010 | Feher |
| 2010/0069724 A1 | 3/2010 | Leuthardt et al. |
| 2010/0070748 A1 | 3/2010 | Duan et al. |
| 2010/0073158 A1 | 3/2010 | Uesaka et al. |
| 2010/0074141 A1 | 3/2010 | Nguyen |
| 2010/0076249 A1 | 3/2010 | Leuthardt et al. |
| 2010/0076634 A1 | 3/2010 | Brigham |
| 2010/0076764 A1 | 3/2010 | Chengalvarayan |
| 2010/0076853 A1 | 3/2010 | Schwarz |
| 2010/0080377 A1 | 4/2010 | Gould et al. |
| 2010/0081860 A1 | 4/2010 | Leuthardt et al. |
| 2010/0081861 A1 | 4/2010 | Leuthardt et al. |
| 2010/0082361 A1 | 4/2010 | Dennen et al. |
| 2010/0082559 A1 | 4/2010 | Sumcad et al. |
| 2010/0082751 A1 | 4/2010 | Meijer et al. |
| 2010/0088163 A1 | 4/2010 | Davidson et al. |
| 2010/0094490 A1 | 4/2010 | Alston et al. |
| 2010/0094688 A1 | 4/2010 | Olsen et al. |
| 2010/0094769 A1 | 4/2010 | Davidson et al. |
| 2010/0094981 A1 | 4/2010 | Cordray et al. |
| 2010/0099346 A1 | 4/2010 | Browne et al. |
| 2010/0100036 A1 | 4/2010 | Leuthardt et al. |
| 2010/0100315 A1 | 4/2010 | Davidson et al. |
| 2010/0100507 A1 | 4/2010 | Davidson et al. |
| 2010/0100899 A1 | 4/2010 | Bradbury et al. |
| 2010/0101226 A1 | 4/2010 | Shutty et al. |
| 2010/0105315 A1 | 4/2010 | Albrett |
| 2010/0106356 A1 | 4/2010 | Trepagnier et al. |
| 2010/0114339 A1 | 5/2010 | Kaiser et al. |
| 2010/0114944 A1 | 5/2010 | Adler et al. |
| 2010/0115126 A1 | 5/2010 | Kanakadandi et al. |
| 2010/0122127 A1 | 5/2010 | Oliva et al. |
| 2010/0124920 A1 | 5/2010 | Feher |
| 2010/0124949 A1 | 5/2010 | Demuynck et al. |
| 2010/0125383 A1 | 5/2010 | Caouette |
| 2010/0125561 A1 | 5/2010 | Leuthardt et al. |
| 2010/0130811 A1 | 5/2010 | Leuthardt et al. |
| 2010/0131642 A1 | 5/2010 | Chalikouras et al. |
| 2010/0132692 A1 | 6/2010 | Shaffer |
| 2010/0140976 A1 | 6/2010 | Browne et al. |
| 2010/0141435 A1 | 6/2010 | Breed |
| 2010/0141657 A1 | 6/2010 | Gamper et al. |
| 2010/0142421 A1 | 6/2010 | Schlicht et al. |
| 2010/0142445 A1 | 6/2010 | Schlicht et al. |
| 2010/0142446 A1 | 6/2010 | Schlicht et al. |
| 2010/0142447 A1 | 6/2010 | Schlicht et al. |
| 2010/0142448 A1 | 6/2010 | Schlicht et al. |
| 2010/0142701 A1 | 6/2010 | Volkoff et al. |
| 2010/0150120 A1 | 6/2010 | Schlicht et al. |
| 2010/0151989 A1 | 6/2010 | Read |
| 2010/0152960 A1 | 6/2010 | Huber et al. |
| 2010/0153207 A1 | 6/2010 | Roberts et al. |
| 2010/0159869 A1 | 6/2010 | Bradburn et al. |
| 2010/0161167 A1 | 6/2010 | Leyerle |
| 2010/0164790 A1 | 7/2010 | Wisnewski et al. |
| 2010/0165287 A1 | 7/2010 | Pienimaa et al. |
| 2010/0167702 A1 | 7/2010 | Madhavan et al. |
| 2010/0167721 A1 | 7/2010 | Madhavan et al. |
| 2010/0167722 A1 | 7/2010 | Madhavan et al. |
| 2010/0167727 A1 | 7/2010 | Madhavan et al. |
| 2010/0167737 A1 | 7/2010 | Madhavan et al. |

(56) References Cited

U.S. PATENT DOCUMENTS

| | | |
|---|---|---|
| 2010/0167745 A1 | 7/2010 | Madhavan et al. |
| 2010/0169009 A1 | 7/2010 | Breed et al. |
| 2010/0171642 A1 | 7/2010 | Hassan et al. |
| 2010/0174428 A1 | 7/2010 | LeFebvre et al. |
| 2010/0176949 A1 | 7/2010 | Emigh et al. |
| 2010/0179849 A1 | 7/2010 | Muckell et al. |
| 2010/0182438 A1 | 7/2010 | Mohammed |
| 2010/0185615 A1 | 7/2010 | Monga |
| 2010/0190493 A1 | 7/2010 | Zoeckler et al. |
| 2010/0191403 A1 | 7/2010 | Krause |
| 2010/0191801 A1 | 7/2010 | Sodergren |
| 2010/0192042 A1 | 7/2010 | Sharon et al. |
| 2010/0195634 A1 | 8/2010 | Thompson |
| 2010/0198435 A1 | 8/2010 | Cansiani et al. |
| 2010/0201891 A1 | 8/2010 | Laroia et al. |
| 2010/0202616 A1 | 8/2010 | Peirce et al. |
| 2010/0202652 A1 | 8/2010 | Mihcak et al. |
| 2010/0205450 A1 | 8/2010 | Samacke et al. |
| 2010/0207754 A1 | 8/2010 | Shostak et al. |
| 2010/0208852 A1 | 8/2010 | Feher |
| 2010/0211346 A1 | 8/2010 | Henry et al. |
| 2010/0211724 A1 | 8/2010 | Weingarten |
| 2010/0214056 A1 | 8/2010 | King et al. |
| 2010/0214090 A1 | 8/2010 | Sartini et al. |
| 2010/0214411 A1 | 8/2010 | Weinmann et al. |
| 2010/0217535 A1 | 8/2010 | Seidel |
| 2010/0220514 A1 | 9/2010 | Vigoda et al. |
| 2010/0220708 A1 | 9/2010 | Mantravadi et al. |
| 2010/0225450 A1 | 9/2010 | Fischer et al. |
| 2010/0225493 A1 | 9/2010 | Zishaan |
| 2010/0226527 A1 | 9/2010 | Zhang et al. |
| 2010/0228434 A1 | 9/2010 | Leyerle |
| 2010/0229002 A1 | 9/2010 | Horne et al. |
| 2010/0231527 A1 | 9/2010 | Fibaek |
| 2010/0234071 A1 | 9/2010 | Shabtay et al. |
| 2010/0235285 A1 | 9/2010 | Hoffberg |
| 2010/0246287 A1 | 9/2010 | Vigoda et al. |
| 2010/0246289 A1 | 9/2010 | Vigoda et al. |
| 2010/0253618 A1 | 10/2010 | Nishigaki et al. |
| 2010/0256835 A1 | 10/2010 | Mudalige |
| 2010/0256836 A1 | 10/2010 | Mudalige |
| 2010/0256852 A1 | 10/2010 | Mudalige |
| 2010/0256859 A1 | 10/2010 | Leyerle et al. |
| 2010/0256903 A1 | 10/2010 | Johnson |
| 2010/0260102 A1 | 10/2010 | Liu et al. |
| 2010/0261465 A1 | 10/2010 | Rhoads et al. |
| 2010/0262321 A1 | 10/2010 | Daum et al. |
| 2010/0262408 A1 | 10/2010 | Taguchi et al. |
| 2010/0268423 A1 | 10/2010 | Breed |
| 2010/0268619 A1 | 10/2010 | Farmer |
| 2010/0268958 A1 | 10/2010 | Home et al. |
| 2010/0274397 A1 | 10/2010 | Lozier et al. |
| 2010/0274816 A1 | 10/2010 | Guzik |
| 2010/0277308 A1 | 11/2010 | Potkonjak |
| 2010/0278413 A1 | 11/2010 | Jarisch |
| 2010/0279768 A1 | 11/2010 | Huang et al. |
| 2010/0280751 A1 | 11/2010 | Breed |
| 2010/0281011 A1 | 11/2010 | Santi et al. |
| 2010/0281321 A1 | 11/2010 | Sun et al. |
| 2010/0282851 A1 | 11/2010 | Bulan et al. |
| 2010/0282856 A1 | 11/2010 | Bulan et al. |
| 2010/0283626 A1 | 11/2010 | Breed |
| 2010/0285774 A1 | 11/2010 | Ginzboorg |
| 2010/0286830 A1 | 11/2010 | Wijaya et al. |
| 2010/0289627 A1 | 11/2010 | McAllister et al. |
| 2010/0299020 A1 | 11/2010 | Koepf et al. |
| 2010/0299200 A1 | 11/2010 | Delli Santi et al. |
| 2010/0302145 A1 | 12/2010 | Langridge et al. |
| 2010/0302945 A1 | 12/2010 | Leppanen et al. |
| 2010/0302947 A1 | 12/2010 | Leppanen et al. |
| 2010/0304759 A1 | 12/2010 | Leppanen et al. |
| 2010/0305779 A1 | 12/2010 | Hassan et al. |
| 2010/0306320 A1 | 12/2010 | Leppanen et al. |
| 2010/0309042 A1 | 12/2010 | Colley et al. |
| 2010/0312547 A1 | 12/2010 | Van Os et al. |
| 2010/0313740 A1 | 12/2010 | Ryle et al. |
| 2010/0316033 A1 | 12/2010 | Atwal |
| 2010/0316163 A1 | 12/2010 | Forenza et al. |
| 2010/0317420 A1 | 12/2010 | Hoffberg |
| 2010/0323626 A1 | 12/2010 | Potkonjak |
| 2010/0324955 A1 | 12/2010 | Rinehart et al. |
| 2010/0332113 A1 | 12/2010 | Tengler et al. |
| 2010/0332363 A1 | 12/2010 | Duddle et al. |
| 2010/0332715 A1 | 12/2010 | Hadden et al. |
| 2011/0001638 A1 | 1/2011 | Pudar |
| 2011/0002371 A1 | 1/2011 | Forenza et al. |
| 2011/0002410 A1 | 1/2011 | Forenza et al. |
| 2011/0002411 A1 | 1/2011 | Forenza et al. |
| 2011/0003606 A1 | 1/2011 | Forenza et al. |
| 2011/0003607 A1 | 1/2011 | Forenza et al. |
| 2011/0003608 A1 | 1/2011 | Forenza et al. |
| 2011/0004487 A1 | 1/2011 | Schoenberg |
| 2011/0004513 A1 | 1/2011 | Hoffberg |
| 2011/0010079 A1 | 1/2011 | Shutty et al. |
| 2011/0010349 A1 | 1/2011 | Ellingson et al. |
| 2011/0012720 A1 | 1/2011 | Hirschfeld |
| 2011/0015797 A1 | 1/2011 | Gilstrap |
| 2011/0016063 A1 | 1/2011 | Pollack et al. |
| 2011/0016199 A1 | 1/2011 | De Carlo et al. |
| 2011/0016514 A1 | 1/2011 | De Carlo et al. |
| 2011/0018498 A1 | 1/2011 | Soar |
| 2011/0018998 A1 | 1/2011 | Guzik |
| 2011/0019652 A1 | 1/2011 | Atwal |
| 2011/0022423 A1 | 1/2011 | Shank |
| 2011/0026850 A1 | 2/2011 | Weinberger et al. |
| 2011/0029455 A1 | 2/2011 | Weber et al. |
| 2011/0029644 A1 | 2/2011 | Gelvin et al. |
| 2011/0034176 A1 | 2/2011 | Lord et al. |
| 2011/0035461 A1 | 2/2011 | Sodergren et al. |
| 2011/0038307 A1 | 2/2011 | Madhavan et al. |
| 2011/0039527 A1 | 2/2011 | Yi et al. |
| 2011/0039528 A1 | 2/2011 | Yi et al. |
| 2011/0039533 A1 | 2/2011 | Yi et al. |
| 2011/0039537 A1 | 2/2011 | Madhavan et al. |
| 2011/0039538 A1 | 2/2011 | Madhavan et al. |
| 2011/0039556 A1 | 2/2011 | Yi et al. |
| 2011/0039559 A1 | 2/2011 | Yi et al. |
| 2011/0039586 A1 | 2/2011 | Madhavan et al. |
| 2011/0039587 A1 | 2/2011 | Madhavan et al. |
| 2011/0040552 A1 | 2/2011 | Van Guilder et al. |
| 2011/0044193 A1 | 2/2011 | Forenza et al. |
| 2011/0046870 A1 | 2/2011 | Ross et al. |
| 2011/0050575 A1 | 3/2011 | Krahenbuhl et al. |
| 2011/0051948 A1 | 3/2011 | Boldt et al. |
| 2011/0052001 A1 | 3/2011 | Tan et al. |
| 2011/0054767 A1 | 3/2011 | Schafer et al. |
| 2011/0055092 A1 | 3/2011 | Fargano et al. |
| 2011/0055172 A1 | 3/2011 | Tan et al. |
| 2011/0058109 A1 | 3/2011 | Nishigaki et al. |
| 2011/0060480 A1 | 3/2011 | Mottla et al. |
| 2011/0065416 A1 | 3/2011 | Burt et al. |
| 2011/0066902 A1 | 3/2011 | Sharon et al. |
| 2011/0071952 A1 | 3/2011 | Gaffney et al. |
| 2011/0075611 A1 | 3/2011 | Choi |
| 2011/0075709 A1 | 3/2011 | Feher |
| 2011/0076653 A1 | 3/2011 | Culligan et al. |
| 2011/0081922 A1 | 4/2011 | Chandra et al. |
| 2011/0082621 A1 | 4/2011 | Berkobin et al. |
| 2011/0083128 A1 | 4/2011 | Hoch et al. |
| 2011/0083647 A1 | 4/2011 | Hansen et al. |
| 2011/0088674 A1 | 4/2011 | Shutty et al. |
| 2011/0092251 A1 | 4/2011 | Gopalakrishnan |
| 2011/0095904 A1 | 4/2011 | Choi et al. |
| 2011/0095914 A1 | 4/2011 | Velado et al. |
| 2011/0095940 A1 | 4/2011 | Breed |
| 2011/0098016 A1 | 4/2011 | Hatton |
| 2011/0098029 A1 | 4/2011 | Rhoads et al. |
| 2011/0098056 A1 | 4/2011 | Rhoads et al. |
| 2011/0103393 A1 | 5/2011 | Meier et al. |
| 2011/0105098 A1 | 5/2011 | Tengler et al. |
| 2011/0106374 A1 | 5/2011 | Margol et al. |
| 2011/0112690 A1 | 5/2011 | Caron et al. |
| 2011/0112761 A1 | 5/2011 | Hurley et al. |
| 2011/0113107 A1 | 5/2011 | Hartwich et al. |

(56) References Cited

U.S. PATENT DOCUMENTS

| | | |
|---|---|---|
| 2011/0118934 A1 | 5/2011 | Lowrey et al. |
| 2011/0119523 A1 | 5/2011 | Bisdikian et al. |
| 2011/0122797 A1 | 5/2011 | Sheha et al. |
| 2011/0125500 A1 | 5/2011 | Talwar et al. |
| 2011/0125855 A1 | 5/2011 | Hartwich et al. |
| 2011/0128118 A1 | 6/2011 | Gilleland et al. |
| 2011/0128163 A1 | 6/2011 | Gilleland et al. |
| 2011/0130892 A1 | 6/2011 | Dulzo et al. |
| 2011/0130893 A1 | 6/2011 | Gilleland et al. |
| 2011/0131074 A1 | 6/2011 | Gilleland et al. |
| 2011/0131235 A1 | 6/2011 | Petrou et al. |
| 2011/0131241 A1 | 6/2011 | Petrou et al. |
| 2011/0131269 A1 | 6/2011 | Gilleland et al. |
| 2011/0137489 A1 | 6/2011 | Gilleland et al. |
| 2011/0137691 A1 | 6/2011 | Johnson |
| 2011/0137825 A1 | 6/2011 | Weber et al. |
| 2011/0137895 A1 | 6/2011 | Petrou et al. |
| 2011/0140871 A1 | 6/2011 | Christensen et al. |
| 2011/0141925 A1 | 6/2011 | Velenko et al. |
| 2011/0143811 A1 | 6/2011 | Rodriguez |
| 2011/0144839 A1 | 6/2011 | Pudar |
| 2011/0144911 A1 | 6/2011 | Madhavan et al. |
| 2011/0144963 A1 | 6/2011 | Johnson |
| 2011/0144987 A1 | 6/2011 | Zhao et al. |
| 2011/0145042 A1 | 6/2011 | Green et al. |
| 2011/0145089 A1 | 6/2011 | Khunger et al. |
| 2011/0145507 A1 | 6/2011 | Ramamurthy et al. |
| 2011/0149341 A1 | 6/2011 | Ko |
| 2011/0151898 A1 | 6/2011 | Chandra et al. |
| 2011/0153148 A1 | 6/2011 | Edwards et al. |
| 2011/0153175 A1 | 6/2011 | Zhang et al. |
| 2011/0153178 A1 | 6/2011 | Westendorf |
| 2011/0153367 A1 | 6/2011 | Amigo et al. |
| 2011/0154411 A1 | 6/2011 | Feher |
| 2011/0158492 A1 | 6/2011 | Jarisch |
| 2011/0161138 A1 | 6/2011 | Keaveny et al. |
| 2011/0161380 A1 | 6/2011 | Keaveny et al. |
| 2011/0166733 A1 | 7/2011 | Yu et al. |
| 2011/0166739 A1 | 7/2011 | Oesterling |
| 2011/0172910 A1 | 7/2011 | Hurley et al. |
| 2011/0172911 A1 | 7/2011 | Hurley et al. |
| 2011/0176428 A1 | 7/2011 | Ballard et al. |
| 2011/0176606 A1 | 7/2011 | Fuchie |
| 2011/0179106 A1 | 7/2011 | Hulse et al. |
| 2011/0191465 A1 | 8/2011 | Hofstaedter et al. |
| 2011/0196552 A1 | 8/2011 | Garon et al. |
| 2011/0196644 A1 | 8/2011 | Davidson et al. |
| 2011/0196805 A1 | 8/2011 | Gault et al. |
| 2011/0199389 A1 | 8/2011 | Lu et al. |
| 2011/0201302 A1 | 8/2011 | Hatton |
| 2011/0202270 A1 | 8/2011 | Sharma et al. |
| 2011/0205246 A1 | 8/2011 | Boler et al. |
| 2011/0206112 A1 | 8/2011 | Feher |
| 2011/0207463 A1 | 8/2011 | Zoeckler et al. |
| 2011/0208551 A1 | 8/2011 | Johnson |
| 2011/0208567 A9 | 8/2011 | Roddy et al. |
| 2011/0208667 A1 | 8/2011 | Mackenzie et al. |
| 2011/0209544 A1 | 9/2011 | Tzidon et al. |
| 2011/0210816 A1 | 9/2011 | Wang |
| 2011/0212305 A1 | 9/2011 | Chen et al. |
| 2011/0212713 A1 | 9/2011 | Zoeckler et al. |
| 2011/0212717 A1 | 9/2011 | Rhoads et al. |
| 2011/0217957 A1 | 9/2011 | Macdonald et al. |
| 2011/0223937 A1 | 9/2011 | Leppanen et al. |
| 2011/0225259 A1 | 9/2011 | Quinn et al. |
| 2011/0225416 A1 | 9/2011 | Quinn et al. |
| 2011/0238751 A1 | 9/2011 | Belimpasakis et al. |
| 2011/0246246 A1 | 10/2011 | Johnson |
| 2011/0249714 A1 | 10/2011 | Madhavan et al. |
| 2011/0250933 A1 | 10/2011 | Wuergler et al. |
| 2011/0257882 A1 | 10/2011 | McBurney et al. |
| 2011/0258310 A1 | 10/2011 | Sodergren |
| 2011/0265127 A1 | 10/2011 | Feher |
| 2011/0267222 A1 | 11/2011 | Craig |
| 2011/0270486 A1 | 11/2011 | Stevens et al. |
| 2011/0270488 A1 | 11/2011 | King et al. |
| 2011/0270723 A1 | 11/2011 | ONeil |
| 2011/0270724 A1 | 11/2011 | ONeil et al. |
| 2011/0270783 A1 | 11/2011 | ONeil |
| 2011/0273568 A1 | 11/2011 | Lagassey |
| 2011/0276565 A1 | 11/2011 | Zheng et al. |
| 2011/0277000 A1 | 11/2011 | Feher |
| 2011/0281562 A1 | 11/2011 | Videtich |
| 2011/0282526 A1 | 11/2011 | Mirle |
| 2011/0282527 A1 | 11/2011 | Inbarajan et al. |
| 2011/0282631 A1 | 11/2011 | Poling et al. |
| 2011/0282663 A1 | 11/2011 | Talwar et al. |
| 2011/0282668 A1 | 11/2011 | Stefan et al. |
| 2011/0282700 A1 | 11/2011 | Cockcroft |
| 2011/0285633 A1 | 11/2011 | Bathiche et al. |
| 2011/0288700 A1 | 11/2011 | Pebbles |
| 2011/0288721 A1 | 11/2011 | Christensen |
| 2011/0288737 A1 | 11/2011 | Carr |
| 2011/0288867 A1 | 11/2011 | Chengalvarayan et al. |
| 2011/0289520 A1 | 11/2011 | Grigoriev et al. |
| 2011/0291823 A1 | 12/2011 | Christensen et al. |
| 2011/0293042 A1 | 12/2011 | Rosenhouse et al. |
| 2011/0294466 A1 | 12/2011 | Tang et al. |
| 2011/0295577 A1 | 12/2011 | Ramachandran |
| 2011/0297070 A1 | 12/2011 | Riggs et al. |
| 2011/0297333 A1 | 12/2011 | Sievers et al. |
| 2011/0301839 A1 | 12/2011 | Pudar et al. |
| 2011/0302214 A1 | 12/2011 | Frye et al. |
| 2011/0306329 A1 | 12/2011 | Das |
| 2011/0307283 A1 | 12/2011 | Johnson |
| 2011/0314210 A1 | 12/2011 | Zorn et al. |
| 2011/0316679 A1 | 12/2011 | Pihlaja |
| 2012/0008509 A1 | 1/2012 | Myers et al. |
| 2012/0016551 A1 | 1/2012 | Krause et al. |
| 2012/0022764 A1 | 1/2012 | Tang et al. |
| 2012/0023522 A1 | 1/2012 | Anderson et al. |
| 2012/0027028 A1 | 2/2012 | Feldbauer et al. |
| 2012/0028597 A1 | 2/2012 | Chmielewski et al. |
| 2012/0028599 A1 | 2/2012 | Hatton et al. |
| 2012/0028607 A1 | 2/2012 | Tengler et al. |
| 2012/0028617 A1 | 2/2012 | Madhavan et al. |
| 2012/0028635 A1 | 2/2012 | Borg et al. |
| 2012/0028656 A1 | 2/2012 | Yi et al. |
| 2012/0028680 A1 | 2/2012 | Breed |
| 2012/0028681 A1 | 2/2012 | Madhavan et al. |
| 2012/0029763 A1 | 2/2012 | Hering |
| 2012/0029801 A1 | 2/2012 | Yano et al. |
| 2012/0029945 A1 | 2/2012 | Altieri et al. |
| 2012/0030470 A1 | 2/2012 | Jdanov et al. |
| 2012/0030541 A1 | 2/2012 | Okamura |
| 2012/0030706 A1 | 2/2012 | Hulse et al. |
| 2012/0036038 A1 | 2/2012 | Farmer |
| 2012/0036400 A1 | 2/2012 | Miller |
| 2012/0046036 A1 | 2/2012 | Madhavan et al. |
| 2012/0046044 A1 | 2/2012 | Jamtgaard et al. |
| 2012/0046110 A1 | 2/2012 | Amaitis et al. |
| 2012/0049793 A1 | 3/2012 | Ross et al. |
| 2012/0050067 A1 | 3/2012 | Otterson |
| 2012/0053759 A1 | 3/2012 | Lowrey et al. |
| 2012/0053784 A1 | 3/2012 | Schmidt et al. |
| 2012/0054036 A1 | 3/2012 | Nam et al. |
| 2012/0058775 A1 | 3/2012 | Dupray et al. |
| 2012/0058826 A1 | 3/2012 | Amaitis et al. |
| 2012/0063436 A1 | 3/2012 | Thubert et al. |
| 2012/0065831 A1 | 3/2012 | Ross et al. |
| 2012/0069131 A1 | 3/2012 | Abelow |
| 2012/0072266 A1 | 3/2012 | Schullian et al. |
| 2012/0072317 A1 | 3/2012 | ONeil |
| 2012/0072322 A1 | 3/2012 | ONeil |
| 2012/0072341 A1 | 3/2012 | ONeil |
| 2012/0072533 A1 | 3/2012 | ONeil |
| 2012/0072922 A1 | 3/2012 | ONeil |
| 2012/0078063 A1 | 3/2012 | Moore-Ede |
| 2012/0078440 A1 | 3/2012 | Oravis et al. |
| 2012/0078754 A1 | 3/2012 | Wiseman et al. |
| 2012/0079149 A1 | 3/2012 | Gelvin et al. |
| 2012/0083303 A1 | 4/2012 | Min et al. |
| 2012/0083969 A1 | 4/2012 | Greiner et al. |
| 2012/0084103 A1 | 4/2012 | Altieri et al. |

(56) References Cited

U.S. PATENT DOCUMENTS

| | | |
|---|---|---|
| 2012/0087430 A1 | 4/2012 | Forenza et al. |
| 2012/0089299 A1 | 4/2012 | Breed |
| 2012/0089329 A1 | 4/2012 | Kim et al. |
| 2012/0093078 A1 | 4/2012 | Perlman et al. |
| 2012/0094657 A1 | 4/2012 | Gullapalli et al. |
| 2012/0095920 A1 | 4/2012 | McQuade et al. |
| 2012/0100873 A1 | 4/2012 | Parupudi et al. |
| 2012/0101671 A1 | 4/2012 | Caouette |
| 2012/0101900 A1 | 4/2012 | Milatz et al. |
| 2012/0101911 A1 | 4/2012 | Shiloh |
| 2012/0105637 A1 | 5/2012 | Yousefi et al. |
| 2012/0106350 A1 | 5/2012 | Yousefi et al. |
| 2012/0106428 A1 | 5/2012 | Schlicht et al. |
| 2012/0106446 A1 | 5/2012 | Yousefi et al. |
| 2012/0106447 A1 | 5/2012 | Yousefi et al. |
| 2012/0106448 A1 | 5/2012 | Yousefi et al. |
| 2012/0106469 A1 | 5/2012 | Yousefi et al. |
| 2012/0106526 A1 | 5/2012 | Yousefi et al. |
| 2012/0106537 A1 | 5/2012 | Yousefi et al. |
| 2012/0106544 A1 | 5/2012 | Yousefi et al. |
| 2012/0106549 A1 | 5/2012 | Yousefi et al. |
| 2012/0106550 A1 | 5/2012 | Yousefi et al. |
| 2012/0106551 A1 | 5/2012 | Yousefi et al. |
| 2012/0106565 A1 | 5/2012 | Yousefi et al. |
| 2012/0106653 A1 | 5/2012 | Yousefi et al. |
| 2012/0109406 A1 | 5/2012 | Yousefi et al. |
| 2012/0109407 A1 | 5/2012 | Yousefi et al. |
| 2012/0109446 A1 | 5/2012 | Yousefi et al. |
| 2012/0109447 A1 | 5/2012 | Yousefi et al. |
| 2012/0109649 A1 | 5/2012 | Talwar et al. |
| 2012/0109831 A1 | 5/2012 | Fitch et al. |
| 2012/0110356 A1 | 5/2012 | Yousefi et al. |
| 2012/0116556 A1 | 5/2012 | Luciano, Jr. et al. |
| 2012/0116766 A1 | 5/2012 | Wasserblat et al. |
| 2012/0120296 A1 | 5/2012 | Roberts et al. |
| 2012/0121033 A1 | 5/2012 | Allpress |
| 2012/0123629 A1 | 5/2012 | Edwards et al. |
| 2012/0123631 A1 | 5/2012 | Schurov |
| 2012/0123670 A1 | 5/2012 | Uyeki |
| 2012/0127206 A1 | 5/2012 | Thompson et al. |
| 2012/0127922 A1 | 5/2012 | Feher |
| 2012/0127976 A1 | 5/2012 | Lin et al. |
| 2012/0128034 A1 | 5/2012 | Feher |
| 2012/0134287 A1 | 5/2012 | Turunen et al. |
| 2012/0135723 A1 | 5/2012 | Ramo et al. |
| 2012/0137333 A1 | 5/2012 | Feher |
| 2012/0140080 A1 | 6/2012 | Taylor et al. |
| 2012/0140757 A1 | 6/2012 | Feher |
| 2012/0142367 A1 | 6/2012 | Przybylski |
| 2012/0142397 A1 | 6/2012 | Jordan et al. |
| 2012/0143397 A1 | 6/2012 | Mackay et al. |
| 2012/0144272 A1 | 6/2012 | Franceschini et al. |
| 2012/0146766 A1 | 6/2012 | Geisler et al. |
| 2012/0146810 A1 | 6/2012 | Olsen et al. |
| 2012/0147863 A1 | 6/2012 | Doherty et al. |
| 2012/0149356 A1 | 6/2012 | Arun et al. |
| 2012/0150541 A1 | 6/2012 | Talwar et al. |
| 2012/0151402 A1 | 6/2012 | Durham et al. |
| 2012/0155547 A1 | 6/2012 | Littwitz et al. |
| 2012/0157083 A1 | 6/2012 | Otterson |
| 2012/0158436 A1 | 6/2012 | Bauer et al. |
| 2012/0165101 A1 | 6/2012 | Krishnarnoorthy et al. |
| 2012/0167585 A1 | 7/2012 | Wormser |
| 2012/0172088 A1 | 7/2012 | Kirch et al. |
| 2012/0173234 A1 | 7/2012 | Fujimoto et al. |
| 2012/0173900 A1 | 7/2012 | Diab et al. |
| 2012/0173905 A1 | 7/2012 | Diab et al. |
| 2012/0178478 A1 | 7/2012 | Emigh et al. |
| 2012/0179325 A1 | 7/2012 | Faenger |
| 2012/0179365 A1 | 7/2012 | Miyahara et al. |
| 2012/0181973 A1 | 7/2012 | Lyden |
| 2012/0181982 A1 | 7/2012 | Fecher |
| 2012/0187916 A1 | 7/2012 | Duer et al. |
| 2012/0190386 A1 | 7/2012 | Anderson |
| 2012/0191293 A1 | 7/2012 | Slaton et al. |
| 2012/0191495 A1 | 7/2012 | McIntosh et al. |
| 2012/0192241 A1 | 7/2012 | Cho et al. |
| 2012/0197449 A1 | 8/2012 | Sanders |
| 2012/0197486 A1 | 8/2012 | Elliott |
| 2012/0197637 A1 | 8/2012 | Gratke et al. |
| 2012/0197643 A1 | 8/2012 | Talwar et al. |
| 2012/0197988 A1 | 8/2012 | Leppanen et al. |
| 2012/0198220 A1 | 8/2012 | Felke et al. |
| 2012/0202530 A1 | 8/2012 | Sheha et al. |
| 2012/0203434 A1 | 8/2012 | Sujan et al. |
| 2012/0203557 A1 | 8/2012 | Odinak |
| 2012/0206345 A1 | 8/2012 | Langridge |
| 2012/0209117 A1 | 8/2012 | Mozes et al. |
| 2012/0209505 A1 | 8/2012 | Breed et al. |
| 2012/0209609 A1 | 8/2012 | Zhao et al. |
| 2012/0209634 A1 | 8/2012 | Ling et al. |
| 2012/0209756 A1 | 8/2012 | El-Sakkout et al. |
| 2012/0214323 A1 | 8/2012 | Gore et al. |
| 2012/0215446 A1 | 8/2012 | Schunder et al. |
| 2012/0216626 A1 | 8/2012 | Henry et al. |
| 2012/0217091 A1 | 8/2012 | Baillargeon et al. |
| 2012/0219039 A1 | 8/2012 | Feher |
| 2012/0220258 A1 | 8/2012 | Hatton |
| 2012/0221188 A1 | 8/2012 | Kelly |
| 2012/0221217 A1 | 8/2012 | Sujan et al. |
| 2012/0221548 A1 | 8/2012 | Delli Santi et al. |
| 2012/0223829 A1 | 9/2012 | Tyler |
| 2012/0223830 A1 | 9/2012 | Tyler |
| 2012/0224617 A1 | 9/2012 | Feher |
| 2012/0224827 A1 | 9/2012 | Tano |
| 2012/0226421 A1 | 9/2012 | Kote et al. |
| 2012/0226889 A1 | 9/2012 | Merriman et al. |
| 2012/0226963 A1 | 9/2012 | Bivens et al. |
| 2012/0227041 A1 | 9/2012 | Lambeth et al. |
| 2012/0229377 A1 | 9/2012 | Kim et al. |
| 2012/0229381 A1 | 9/2012 | Langridge |
| 2012/0230370 A1 | 9/2012 | Shaffer et al. |
| 2012/0231821 A1 | 9/2012 | Swanson |
| 2012/0232679 A1 | 9/2012 | Abercrombie et al. |
| 2012/0235624 A1 | 9/2012 | Sisk et al. |
| 2012/0235807 A1 | 9/2012 | Rysenga et al. |
| 2012/0236152 A1 | 9/2012 | De Wind et al. |
| 2012/0239251 A1 | 9/2012 | Wijaya et al. |
| 2012/0239462 A1 | 9/2012 | Pursell et al. |
| 2012/0243408 A1 | 9/2012 | Leppanen et al. |
| 2012/0243438 A1 | 9/2012 | Steiner et al. |
| 2012/0244847 A1 | 9/2012 | Chandra et al. |
| 2012/0244850 A1 | 9/2012 | Doherty et al. |
| 2012/0245934 A1 | 9/2012 | Talwar et al. |
| 2012/0246177 A1 | 9/2012 | Perrow et al. |
| 2012/0246733 A1 | 9/2012 | Schafer et al. |
| 2012/0246735 A1 | 9/2012 | Peeters et al. |
| 2012/0250607 A1 | 10/2012 | Feher |
| 2012/0252364 A1 | 10/2012 | Inabathuni et al. |
| 2012/0252400 A1 | 10/2012 | Hatton |
| 2012/0252475 A1 | 10/2012 | Farrell et al. |
| 2012/0253548 A1 | 10/2012 | Davidson |
| 2012/0253550 A1 | 10/2012 | Davidson et al. |
| 2012/0253587 A1 | 10/2012 | Davidson |
| 2012/0253632 A1 | 10/2012 | Davidson |
| 2012/0253822 A1 | 10/2012 | Schalk |
| 2012/0253861 A1 | 10/2012 | Davidson et al. |
| 2012/0253862 A1 | 10/2012 | Davidson |
| 2012/0253867 A1 | 10/2012 | Davidson |
| 2012/0253888 A1 | 10/2012 | Davidson |
| 2012/0253889 A1 | 10/2012 | Davidson et al. |
| 2012/0253892 A1 | 10/2012 | Davidson |
| 2012/0254876 A1 | 10/2012 | Bishop et al. |
| 2012/0257624 A1 | 10/2012 | Thubert et al. |
| 2012/0257697 A1 | 10/2012 | Zhou et al. |
| 2012/0258776 A1 | 10/2012 | Lord et al. |
| 2012/0259527 A1 | 10/2012 | Taguchi |
| 2012/0259732 A1 | 10/2012 | Sasankan et al. |
| 2012/0259951 A1 | 10/2012 | Schalk et al. |
| 2012/0262283 A1 | 10/2012 | Biondo et al. |
| 2012/0264376 A1 | 10/2012 | Breed |
| 2012/0268359 A1 | 10/2012 | Chen et al. |
| 2012/0271503 A1 | 10/2012 | Owens et al. |
| 2012/0274555 A1 | 11/2012 | Fibaek |

(56) References Cited

U.S. PATENT DOCUMENTS

| | | |
|---|---|---|
| 2012/0274745 A1 | 11/2012 | Russell |
| 2012/0281181 A1 | 11/2012 | Chen et al. |
| 2012/0281741 A1 | 11/2012 | Feher |
| 2012/0282933 A1 | 11/2012 | Hofstaedter et al. |
| 2012/0283954 A1 | 11/2012 | Bray et al. |
| 2012/0284376 A1 | 11/2012 | Hofstaedter et al. |
| 2012/0284399 A1 | 11/2012 | Hofstaedter et al. |
| 2012/0284404 A1 | 11/2012 | Hofstaedter et al. |
| 2012/0286725 A1 | 11/2012 | Gullapalli et al. |
| 2012/0289166 A1 | 11/2012 | Chmielewski et al. |
| 2012/0289187 A1 | 11/2012 | Hofstaedter et al. |
| 2012/0289258 A1 | 11/2012 | Hofstaedter et al. |
| 2012/0290449 A1 | 11/2012 | Mullen et al. |
| 2012/0290692 A1 | 11/2012 | Reich et al. |
| 2012/0290900 A1 | 11/2012 | Paniconi |
| 2012/0296517 A1 | 11/2012 | Poling et al. |
| 2012/0296567 A1 | 11/2012 | Breed |
| 2012/0296579 A1 | 11/2012 | Poling et al. |
| 2012/0300758 A1 | 11/2012 | Turunen et al. |
| 2012/0302254 A1 | 11/2012 | Charbit et al. |
| 2012/0302265 A1 | 11/2012 | Lei et al. |
| 2012/0303548 A1 | 11/2012 | Johnson et al. |
| 2012/0304126 A1 | 11/2012 | Lavigne et al. |
| 2012/0309417 A1 | 12/2012 | Blom et al. |
| 2012/0310975 A1 | 12/2012 | Oliver et al. |
| 2012/0311657 A1 | 12/2012 | Boldyrev et al. |
| 2012/0313910 A1 | 12/2012 | Haraguchi |
| 2012/0314570 A1 | 12/2012 | Forenza et al. |
| 2012/0314660 A1 | 12/2012 | Leppanen et al. |
| 2012/0315994 A1 | 12/2012 | Huang et al. |
| 2012/0318590 A1 | 12/2012 | Read |
| 2012/0320033 A1 | 12/2012 | Papaefstathiou et al. |
| 2012/0320825 A1 | 12/2012 | Yi et al. |
| 2012/0323474 A1 | 12/2012 | Breed et al. |
| 2012/0323499 A1 | 12/2012 | Yelin et al. |
| 2012/0323577 A1 | 12/2012 | Correia et al. |
| 2012/0324366 A1 | 12/2012 | Latvakoski |
| 2012/0324578 A1 | 12/2012 | Seinfeld et al. |
| 2012/0324727 A1 | 12/2012 | Seifert et al. |
| 2012/0327918 A1 | 12/2012 | Yi et al. |
| 2012/0329384 A1 | 12/2012 | Boldyrev et al. |
| 2012/0329482 A1 | 12/2012 | Chandra et al. |
| 2013/0002443 A1 | 1/2013 | Breed |
| 2013/0005251 A1 | 1/2013 | Soar |
| 2013/0006674 A1 | 1/2013 | Bowne et al. |
| 2013/0006675 A1 | 1/2013 | Bowne et al. |
| 2013/0006769 A1 | 1/2013 | Schalk et al. |
| 2013/0012179 A1 | 1/2013 | Watkins et al. |
| 2013/0013347 A1 | 1/2013 | Ling et al. |
| 2013/0013348 A1 | 1/2013 | Ling et al. |
| 2013/0016209 A1 | 1/2013 | Taylor et al. |
| 2013/0018836 A1 | 1/2013 | Hofstaedter et al. |
| 2013/0024060 A1 | 1/2013 | Sukkarie et al. |
| 2013/0027404 A1 | 1/2013 | Sarnoff |
| 2013/0027552 A1 | 1/2013 | Guzik |
| 2013/0030552 A1 | 1/2013 | Beckley et al. |
| 2013/0030873 A1 | 1/2013 | Davidson |
| 2013/0030876 A1 | 1/2013 | Rinehart et al. |
| 2013/0032634 A1 | 2/2013 | McKirdy |
| 2013/0033381 A1 | 2/2013 | Breed |
| 2013/0034130 A1 | 2/2013 | Forenza et al. |
| 2013/0035901 A1 | 2/2013 | Breed |
| 2013/0039433 A1 | 2/2013 | Ralston et al. |
| 2013/0040076 A1 | 2/2013 | Jones et al. |
| 2013/0040636 A1 | 2/2013 | Borg et al. |
| 2013/0044137 A1 | 2/2013 | Forsblom et al. |
| 2013/0046418 A1 | 2/2013 | Anderson |
| 2013/0046419 A1 | 2/2013 | Anderson et al. |
| 2013/0046432 A1 | 2/2013 | Edwards et al. |
| 2013/0046439 A1 | 2/2013 | Anderson et al. |
| 2013/0046446 A1 | 2/2013 | Anderson |
| 2013/0046510 A1 | 2/2013 | Bowne et al. |
| 2013/0046559 A1 | 2/2013 | Coleman et al. |
| 2013/0054016 A1 | 2/2013 | Canter et al. |
| 2013/0054024 A1 | 2/2013 | Bruemmer et al. |
| 2013/0054050 A1 | 2/2013 | Filev et al. |
| 2013/0054078 A1 | 2/2013 | Anderson |
| 2013/0054363 A1 | 2/2013 | Sasankan et al. |
| 2013/0055347 A1 | 2/2013 | Chawla et al. |
| 2013/0060583 A1 | 3/2013 | Collins et al. |
| 2013/0062966 A1 | 3/2013 | Verghese et al. |
| 2013/0063094 A1 | 3/2013 | Gibbs et al. |
| 2013/0064313 A1 | 3/2013 | Gatti et al. |
| 2013/0066891 A1 | 3/2013 | Oldyrev et al. |
| 2013/0069803 A1 | 3/2013 | McCormick et al. |
| 2013/0076649 A1 | 3/2013 | Myers et al. |
| 2013/0079959 A1 | 3/2013 | Swanson et al. |
| 2013/0080172 A1 | 3/2013 | Talwar et al. |
| 2013/0080173 A1 | 3/2013 | Talwar et al. |
| 2013/0085638 A1 | 4/2013 | Weinmann et al. |
| 2013/0090782 A1 | 4/2013 | Yi et al. |
| 2013/0092800 A1 | 4/2013 | LeFebvre et al. |
| 2013/0094298 A1 | 4/2013 | Vigoda et al. |
| 2013/0096799 A1 | 4/2013 | Horne |
| 2013/0096815 A1 | 4/2013 | Mason et al. |
| 2013/0097084 A1 | 4/2013 | Jarman et al. |
| 2013/0097197 A1 | 4/2013 | Rincover et al. |
| 2013/0097414 A1 | 4/2013 | Bishop et al. |
| 2013/0097459 A1 | 4/2013 | Bell et al. |
| 2013/0103195 A1 | 4/2013 | Anhalt et al. |
| 2013/0103238 A1 | 4/2013 | Yu et al. |
| 2013/0103765 A1 | 4/2013 | Papakipos et al. |
| 2013/0109416 A1 | 5/2013 | Tang et al. |
| 2013/0110329 A1 | 5/2013 | Kinoshita et al. |
| 2013/0110344 A1* | 5/2013 | Merg .................. G07C 5/0825 701/31.4 |
| 2013/0111345 A1 | 5/2013 | Newman et al. |
| 2013/0111415 A1 | 5/2013 | Newman et al. |
| 2013/0111513 A1 | 5/2013 | Gaude |
| 2013/0118000 A1 | 5/2013 | Florus et al. |
| 2013/0130639 A1 | 5/2013 | Oesterling et al. |
| 2013/0130665 A1 | 5/2013 | Peirce et al. |
| 2013/0130675 A1 | 5/2013 | Yi et al. |
| 2013/0131975 A1 | 5/2013 | Hurley et al. |
| 2013/0132286 A1 | 5/2013 | Schaefer et al. |
| 2013/0132854 A1 | 5/2013 | Raleigh et al. |
| 2013/0134730 A1 | 5/2013 | Ricci |
| 2013/0136412 A1 | 5/2013 | Lee et al. |
| 2013/0138714 A1 | 5/2013 | Ricci |
| 2013/0141247 A1 | 6/2013 | Ricci |
| 2013/0143495 A1 | 6/2013 | Ricci |
| 2013/0143529 A1 | 6/2013 | Leppanen |
| 2013/0143535 A1 | 6/2013 | Leppanen et al. |
| 2013/0143546 A1 | 6/2013 | Ricci |
| 2013/0143601 A1 | 6/2013 | Ricci |
| 2013/0144462 A1 | 6/2013 | Ricci |
| 2013/0144463 A1 | 6/2013 | Ricci et al. |
| 2013/0144474 A1 | 6/2013 | Ricci |
| 2013/0145065 A1 | 6/2013 | Ricci |
| 2013/0145279 A1 | 6/2013 | Ricci |
| 2013/0145297 A1 | 6/2013 | Ricci et al. |
| 2013/0145360 A1 | 6/2013 | Ricci |
| 2013/0145401 A1 | 6/2013 | Ricci |
| 2013/0145482 A1 | 6/2013 | Ricci et al. |
| 2013/0148748 A1 | 6/2013 | Suda |
| 2013/0148753 A1 | 6/2013 | Willms |
| 2013/0149985 A1 | 6/2013 | Yi et al. |
| 2013/0149998 A1 | 6/2013 | Yi et al. |
| 2013/0151031 A1 | 6/2013 | Ricci |
| 2013/0151034 A1 | 6/2013 | Davidson et al. |
| 2013/0151046 A1 | 6/2013 | Choi et al. |
| 2013/0151065 A1 | 6/2013 | Ricci |
| 2013/0151088 A1 | 6/2013 | Ricci |
| 2013/0151288 A1 | 6/2013 | Bowne et al. |
| 2013/0151563 A1 | 6/2013 | Addepalli et al. |
| 2013/0152003 A1 | 6/2013 | Ricci et al. |
| 2013/0154298 A1 | 6/2013 | Ricci |
| 2013/0154817 A1 | 6/2013 | Olsen et al. |
| 2013/0154982 A1 | 6/2013 | Hotelling et al. |
| 2013/0157870 A1 | 6/2013 | Pushkarev et al. |
| 2013/0158778 A1 | 6/2013 | Tengler et al. |
| 2013/0158821 A1 | 6/2013 | Ricci |
| 2013/0159805 A1 | 6/2013 | Sun et al. |
| 2013/0163511 A1 | 6/2013 | Waldner et al. |

(56) References Cited

U.S. PATENT DOCUMENTS

| | | |
|---|---|---|
| 2013/0164712 A1 | 6/2013 | Hunt et al. |
| 2013/0164713 A1 | 6/2013 | Hunt et al. |
| 2013/0164714 A1 | 6/2013 | Hunt et al. |
| 2013/0164715 A1 | 6/2013 | Hunt et al. |
| 2013/0166097 A1 | 6/2013 | Ricci |
| 2013/0166170 A1 | 6/2013 | Hunt et al. |
| 2013/0166726 A1 | 6/2013 | Boldyrev et al. |
| 2013/0167159 A1 | 6/2013 | Ricci et al. |
| 2013/0169226 A1 | 7/2013 | Read |
| 2013/0173284 A1 | 7/2013 | Hyde et al. |
| 2013/0173285 A1 | 7/2013 | Hyde et al. |
| 2013/0173293 A1 | 7/2013 | Hyde et al. |
| 2013/0173294 A1 | 7/2013 | Hyde et al. |
| 2013/0173295 A1 | 7/2013 | Hyde et al. |
| 2013/0173296 A1 | 7/2013 | Hyde et al. |
| 2013/0173297 A1 | 7/2013 | Hyde et al. |
| 2013/0173298 A1 | 7/2013 | Hyde et al. |
| 2013/0173299 A1 | 7/2013 | Hyde et al. |
| 2013/0173300 A1 | 7/2013 | Hyde et al. |
| 2013/0173301 A1 | 7/2013 | Hyde et al. |
| 2013/0173302 A1 | 7/2013 | Hyde et al. |
| 2013/0173303 A1 | 7/2013 | Hyde et al. |
| 2013/0173304 A1 | 7/2013 | Hyde et al. |
| 2013/0173305 A1 | 7/2013 | Hyde et al. |
| 2013/0173393 A1 | 7/2013 | Calman et al. |
| 2013/0176334 A1 | 7/2013 | Boldyrev et al. |
| 2013/0179007 A1 | 7/2013 | Dalum |
| 2013/0179188 A1 | 7/2013 | Hyde et al. |
| 2013/0179198 A1 | 7/2013 | Bowne et al. |
| 2013/0179576 A1 | 7/2013 | Boldyrev et al. |
| 2013/0181931 A1 | 7/2013 | Kinoshita |
| 2013/0182863 A1 | 7/2013 | Huang |
| 2013/0184886 A1 | 7/2013 | Pollack et al. |
| 2013/0184964 A1 | 7/2013 | Hunt et al. |
| 2013/0184965 A1 | 7/2013 | Hunt et al. |
| 2013/0188463 A1 | 7/2013 | Ng et al. |
| 2013/0191018 A1 | 7/2013 | Siereveld et al. |
| 2013/0191644 A1 | 7/2013 | Horne et al. |
| 2013/0194126 A1 | 8/2013 | Paoletti |
| 2013/0195264 A1 | 8/2013 | Kirchhoff et al. |
| 2013/0197730 A1 | 8/2013 | Huntzicker |
| 2013/0197776 A1 | 8/2013 | Davidson et al. |
| 2013/0197875 A1 | 8/2013 | Shirley et al. |
| 2013/0198245 A1 | 8/2013 | Kagan et al. |
| 2013/0198737 A1 | 8/2013 | Ricci |
| 2013/0198802 A1 | 8/2013 | Ricci |
| 2013/0200991 A1 | 8/2013 | Ricci et al. |
| 2013/0201316 A1 | 8/2013 | Binder et al. |
| 2013/0203400 A1 | 8/2013 | Ricci |
| 2013/0204466 A1 | 8/2013 | Ricci |
| 2013/0204484 A1 | 8/2013 | Ricci |
| 2013/0204493 A1 | 8/2013 | Ricci et al. |
| 2013/0204524 A1 | 8/2013 | Fryer et al. |
| 2013/0204943 A1 | 8/2013 | Ricci |
| 2013/0205026 A1 | 8/2013 | Ricci |
| 2013/0205174 A1 | 8/2013 | Zorn et al. |
| 2013/0205412 A1 | 8/2013 | Ricci |
| 2013/0207817 A1 | 8/2013 | Gueziec |
| 2013/0208729 A1 | 8/2013 | Evans et al. |
| 2013/0211828 A1 | 8/2013 | Gratke et al. |
| 2013/0211832 A1 | 8/2013 | Talwar et al. |
| 2013/0211976 A1 | 8/2013 | Breed |
| 2013/0213344 A1 | 8/2013 | Stender |
| 2013/0215235 A1 | 8/2013 | Russell |
| 2013/0217409 A1 | 8/2013 | Bridges et al. |
| 2013/0218379 A1 | 8/2013 | Filev et al. |
| 2013/0218412 A1 | 8/2013 | Ricci |
| 2013/0218446 A1 | 8/2013 | Bradley et al. |
| 2013/0219039 A1 | 8/2013 | Ricci |
| 2013/0219872 A1 | 8/2013 | Gibble et al. |
| 2013/0225201 A1 | 8/2013 | Chen et al. |
| 2013/0226369 A1 | 8/2013 | Yorio et al. |
| 2013/0226543 A1 | 8/2013 | Ramachandran |
| 2013/0227648 A1 | 8/2013 | Ricci |
| 2013/0229141 A1 | 9/2013 | Johnson |
| 2013/0231052 A1 | 9/2013 | Eling et al. |
| 2013/0231800 A1 | 9/2013 | Ricci |
| 2013/0232289 A1 | 9/2013 | Zhong et al. |
| 2013/0235203 A1 | 9/2013 | Billington et al. |
| 2013/0238424 A1 | 9/2013 | Ramer et al. |
| 2013/0238443 A1 | 9/2013 | Ramer et al. |
| 2013/0238700 A1 | 9/2013 | Papakipos et al. |
| 2013/0239845 A1 | 9/2013 | Frazier et al. |
| 2013/0240678 A1 | 9/2013 | Frazier et al. |
| 2013/0241026 A1 | 9/2013 | Or-Bach et al. |
| 2013/0244210 A1 | 9/2013 | Nath et al. |
| 2013/0245837 A1 | 9/2013 | Grohman |
| 2013/0245852 A1 | 9/2013 | Sanders |
| 2013/0245863 A1 | 9/2013 | Frazier et al. |
| 2013/0245864 A1 | 9/2013 | Frazier et al. |
| 2013/0245880 A1 | 9/2013 | McQuade |
| 2013/0245945 A1 | 9/2013 | Morita et al. |
| 2013/0246183 A1 | 9/2013 | Ramer et al. |
| 2013/0250933 A1 | 9/2013 | Yousefi et al. |
| 2013/0250969 A1 | 9/2013 | Hui et al. |
| 2013/0253325 A1 | 9/2013 | Call et al. |
| 2013/0253782 A1 | 9/2013 | Saltsman et al. |
| 2013/0254035 A1 | 9/2013 | Ramer et al. |
| 2013/0255560 A1 | 10/2013 | Kinoshita et al. |
| 2013/0257718 A1 | 10/2013 | Ojelund et al. |
| 2013/0257904 A1 | 10/2013 | Roth |
| 2013/0260722 A1 | 10/2013 | Pi |
| 2013/0261846 A1 | 10/2013 | McQuade et al. |
| 2013/0261874 A1 | 10/2013 | McQuade et al. |
| 2013/0261907 A1 | 10/2013 | McQuade et al. |
| 2013/0261939 A1 | 10/2013 | McQuade et al. |
| 2013/0261942 A1 | 10/2013 | McQuade et al. |
| 2013/0261953 A1 | 10/2013 | Kiyama et al. |
| 2013/0261966 A1 | 10/2013 | Wang et al. |
| 2013/0262111 A1 | 10/2013 | Eller et al. |
| 2013/0262349 A1 | 10/2013 | Bouqata et al. |
| 2013/0267046 A1 | 10/2013 | Or-Bach et al. |
| 2013/0267253 A1 | 10/2013 | Case et al. |
| 2013/0268950 A1 | 10/2013 | Bishop et al. |
| 2013/0271273 A1 | 10/2013 | Oesterling |
| 2013/0271275 A1 | 10/2013 | Schalk |
| 2013/0273901 A1 | 10/2013 | Calo et al. |
| 2013/0273968 A1 | 10/2013 | Rhoads et al. |
| 2013/0273980 A1 | 10/2013 | Ventulett et al. |
| 2013/0275209 A1 | 10/2013 | Ramer et al. |
| 2013/0275226 A1 | 10/2013 | Ramer et al. |
| 2013/0275227 A1 | 10/2013 | Ramer et al. |
| 2013/0275368 A1 | 10/2013 | Camacho et al. |
| 2013/0275569 A1 | 10/2013 | Calo et al. |
| 2013/0275761 A1 | 10/2013 | Catsburg et al. |
| 2013/0278440 A1 | 10/2013 | Rubin et al. |
| 2013/0278441 A1 | 10/2013 | Rubin et al. |
| 2013/0278442 A1 | 10/2013 | Rubin et al. |
| 2013/0278443 A1 | 10/2013 | Rubin et al. |
| 2013/0279500 A1 | 10/2013 | Yousefi et al. |
| 2013/0279695 A1 | 10/2013 | Rubin et al. |
| 2013/0281023 A1 | 10/2013 | Madanarajagopal et al. |
| 2013/0281045 A1 | 10/2013 | Daly et al. |
| 2013/0281133 A1 | 10/2013 | Davidson |
| 2013/0281140 A1 | 10/2013 | Rubin et al. |
| 2013/0281141 A1 | 10/2013 | Rubin et al. |
| 2013/0281324 A1 | 10/2013 | Gouliaev et al. |
| 2013/0282238 A1 | 10/2013 | Ricci et al. |
| 2013/0282267 A1 | 10/2013 | Rubin et al. |
| 2013/0282271 A1 | 10/2013 | Rubin et al. |
| 2013/0282277 A1 | 10/2013 | Rubin et al. |
| 2013/0282357 A1 | 10/2013 | Rubin et al. |
| 2013/0282482 A1 | 10/2013 | Ramer et al. |
| 2013/0282491 A1 | 10/2013 | Ramer et al. |
| 2013/0282925 A1 | 10/2013 | Cawse et al. |
| 2013/0282946 A1 | 10/2013 | Ricci |
| 2013/0283345 A1 | 10/2013 | Kahana |
| 2013/0285855 A1 | 10/2013 | Dupray et al. |
| 2013/0285903 A1 | 10/2013 | Langridge et al. |
| 2013/0287193 A1 | 10/2013 | Kelly et al. |
| 2013/0287201 A1 | 10/2013 | Kaushal et al. |
| 2013/0288659 A1 | 10/2013 | Hrabak et al. |
| 2013/0289820 A1 | 10/2013 | Chen |
| 2013/0289821 A1 | 10/2013 | Nakagawa |

(56) References Cited

U.S. PATENT DOCUMENTS

| | | |
|---|---|---|
| 2013/0289874 A1 | 10/2013 | Taguchi |
| 2013/0290106 A1 | 10/2013 | Bradley et al. |
| 2013/0290199 A1 | 10/2013 | Camacho et al. |
| 2013/0293367 A1 | 11/2013 | Schalk |
| 2013/0293394 A1 | 11/2013 | Rubin et al. |
| 2013/0293471 A1 | 11/2013 | Langridge |
| 2013/0295888 A1 | 11/2013 | Das |
| 2013/0295889 A1 | 11/2013 | Das |
| 2013/0297078 A1 | 11/2013 | Kolavennu |
| 2013/0297162 A1 | 11/2013 | Dai et al. |
| 2013/0297175 A1 | 11/2013 | Davidson |
| 2013/0297199 A1 | 11/2013 | Kapp et al. |
| 2013/0297207 A1 | 11/2013 | Mason et al. |
| 2013/0297250 A1 | 11/2013 | Tzidon et al. |
| 2013/0297404 A1 | 11/2013 | Ramer et al. |
| 2013/0301584 A1 | 11/2013 | Addepalli et al. |
| 2013/0303138 A1 | 11/2013 | Chandra et al. |
| 2013/0303197 A1 | 11/2013 | Chandra et al. |
| 2013/0304347 A1 | 11/2013 | Davidson |
| 2013/0304348 A1 | 11/2013 | Davidson et al. |
| 2013/0304349 A1 | 11/2013 | Davidson |
| 2013/0304475 A1 | 11/2013 | Gratke et al. |
| 2013/0304519 A1 | 11/2013 | Altieri et al. |
| 2013/0304581 A1 | 11/2013 | Soroca et al. |
| 2013/0304616 A1 | 11/2013 | Raleigh et al. |
| 2013/0305087 A1 | 11/2013 | Catthoor et al. |
| 2013/0308470 A1* | 11/2013 | Bevan ............... H04W 36/32 370/252 |
| 2013/0308495 A1 | 11/2013 | Tucker et al. |
| 2013/0309977 A1 | 11/2013 | Heines et al. |
| 2013/0310010 A1 | 11/2013 | Yi et al. |
| 2013/0310951 A1 | 11/2013 | Fisher |
| 2013/0311002 A1 | 11/2013 | Isaac |
| 2013/0311297 A1 | 11/2013 | Ramer et al. |
| 2013/0316703 A1 | 11/2013 | Girard et al. |
| 2013/0316743 A1 | 11/2013 | Emigh et al. |
| 2013/0317694 A1 | 11/2013 | Merg et al. |
| 2013/0317732 A1 | 11/2013 | Borg et al. |
| 2013/0318022 A1 | 11/2013 | Yadav et al. |
| 2013/0318380 A1 | 11/2013 | Behrens et al. |
| 2013/0318529 A1 | 11/2013 | Bishop et al. |
| 2013/0320212 A1 | 12/2013 | Valentino et al. |
| 2013/0324242 A1 | 12/2013 | Vincent et al. |
| 2013/0325249 A1 | 12/2013 | Hering et al. |
| 2013/0325323 A1 | 12/2013 | Breed |
| 2013/0325357 A1 | 12/2013 | Walerow et al. |
| 2013/0325442 A1 | 12/2013 | Dahlmeier et al. |
| 2013/0325610 A1 | 12/2013 | Ramer et al. |
| 2013/0329139 A1 | 12/2013 | Feher |
| 2013/0329634 A1 | 12/2013 | Correia et al. |
| 2013/0332024 A1 | 12/2013 | Garrett et al. |
| 2013/0332070 A1 | 12/2013 | Fleizach et al. |
| 2013/0335449 A1 | 12/2013 | Johnson et al. |
| 2013/0336235 A1 | 12/2013 | Meyer et al. |
| 2013/0336316 A1 | 12/2013 | Sudhaakar et al. |
| 2013/0337762 A1 | 12/2013 | Buch et al. |
| 2013/0337782 A1 | 12/2013 | Macdonald et al. |
| 2013/0337801 A1 | 12/2013 | Yi et al. |
| 2013/0337830 A1 | 12/2013 | Haro et al. |
| 2013/0338971 A1 | 12/2013 | Chao et al. |
| 2013/0338972 A1 | 12/2013 | Chao et al. |
| 2013/0339098 A1 | 12/2013 | Looman et al. |
| 2013/0339266 A1 | 12/2013 | Looman et al. |
| 2013/0339387 A1 | 12/2013 | Duong et al. |
| 2013/0339981 A1 | 12/2013 | Ishibashi et al. |
| 2013/0340444 A1 | 12/2013 | Bryant et al. |
| 2013/0342020 A1 | 12/2013 | Blevins et al. |
| 2013/0342368 A1 | 12/2013 | Nathanson |
| 2013/0342460 A1 | 12/2013 | Vincent et al. |
| 2013/0344859 A1 | 12/2013 | Abramson et al. |
| 2014/0005484 A1 | 1/2014 | Charles |
| 2014/0005485 A1 | 1/2014 | Tesar et al. |
| 2014/0005486 A1 | 1/2014 | Charles |
| 2014/0005487 A1 | 1/2014 | Tesar |
| 2014/0005488 A1 | 1/2014 | Charles et al. |
| 2014/0005489 A1 | 1/2014 | Charles |
| 2014/0005555 A1 | 1/2014 | Tesar |
| 2014/0006129 A1 | 1/2014 | Heath |
| 2014/0006347 A1 | 1/2014 | Qureshi et al. |
| 2014/0006555 A1 | 1/2014 | Shields |
| 2014/0006772 A1 | 1/2014 | Qureshi et al. |
| 2014/0007006 A1 | 1/2014 | Pallakoff |
| 2014/0007048 A1 | 1/2014 | Qureshi et al. |
| 2014/0007182 A1 | 1/2014 | Qureshi et al. |
| 2014/0007183 A1 | 1/2014 | Qureshi et al. |
| 2014/0007192 A1 | 1/2014 | Qureshi et al. |
| 2014/0007193 A1 | 1/2014 | Qureshi et al. |
| 2014/0007214 A1 | 1/2014 | Qureshi et al. |
| 2014/0007222 A1 | 1/2014 | Qureshi et al. |
| 2014/0012431 A1 | 1/2014 | Breed |
| 2014/0012664 A1 | 1/2014 | Ramer et al. |
| 2014/0012665 A1 | 1/2014 | Ramer et al. |
| 2014/0015690 A1 | 1/2014 | Feher |
| 2014/0015977 A1 | 1/2014 | Taylor et al. |
| 2014/0016499 A1 | 1/2014 | Forenza et al. |
| 2014/0018034 A1 | 1/2014 | Lindberg |
| 2014/0018097 A1 | 1/2014 | Goldstein |
| 2014/0019135 A1 | 1/2014 | Talwar et al. |
| 2014/0019170 A1 | 1/2014 | Coleman et al. |
| 2014/0019522 A1 | 1/2014 | Weng et al. |
| 2014/0022954 A1 | 1/2014 | Akers et al. |
| 2014/0023026 A1 | 1/2014 | Meyer et al. |
| 2014/0025312 A1 | 1/2014 | Chin et al. |
| 2014/0025494 A1 | 1/2014 | Ramer et al. |
| 2014/0025502 A1 | 1/2014 | Ramer et al. |
| 2014/0025503 A1 | 1/2014 | Meyer et al. |
| 2014/0026020 A1 | 1/2014 | Feldbauer et al. |
| 2014/0028023 A1 | 1/2014 | Klumper |
| 2014/0028783 A1 | 1/2014 | Kaltsukis |
| 2014/0031005 A1 | 1/2014 | Sumcad et al. |
| 2014/0031010 A1 | 1/2014 | Wuergler et al. |
| 2014/0031033 A1 | 1/2014 | Juang et al. |
| 2014/0031082 A1 | 1/2014 | Zishaan |
| 2014/0031989 A1 | 1/2014 | Bergman et al. |
| 2014/0031991 A1 | 1/2014 | Bergman et al. |
| 2014/0031992 A1 | 1/2014 | Bergman et al. |
| 2014/0032062 A1 | 1/2014 | Baer et al. |
| 2014/0032130 A1 | 1/2014 | Berkobin et al. |
| 2014/0032800 A1 | 1/2014 | Peirce et al. |
| 2014/0036922 A1 | 2/2014 | Yousefi et al. |
| 2014/0038836 A1 | 2/2014 | Higgins et al. |
| 2014/0039812 A1 | 2/2014 | Henry et al. |
| 2014/0040134 A1 | 2/2014 | Ciurea |
| 2014/0040343 A1 | 2/2014 | Nickolov et al. |
| 2014/0043204 A1 | 2/2014 | Basnayake et al. |
| 2014/0045482 A1 | 2/2014 | Bisson et al. |
| 2014/0046585 A1 | 2/2014 | Morris et al. |
| 2014/0046701 A1 | 2/2014 | Steinberg et al. |
| 2014/0046761 A1 | 2/2014 | Ramer et al. |
| 2014/0047011 A1 | 2/2014 | Lahav et al. |
| 2014/0047322 A1 | 2/2014 | Kim et al. |
| 2014/0047448 A1 | 2/2014 | Bishop et al. |
| 2014/0050148 A1 | 2/2014 | Choi |
| 2014/0050701 A1 | 2/2014 | Zhong et al. |
| 2014/0052316 A1 | 2/2014 | Frazier et al. |
| 2014/0052353 A1 | 2/2014 | Sujan et al. |
| 2014/0052384 A1 | 2/2014 | Poling et al. |
| 2014/0052496 A1 | 2/2014 | Diana et al. |
| 2014/0053090 A1 | 2/2014 | Lu et al. |
| 2014/0053804 A1 | 2/2014 | Rayl et al. |
| 2014/0055358 A1 | 2/2014 | Birnbaum et al. |
| 2014/0058266 A1 | 2/2014 | Call et al. |
| 2014/0058570 A1 | 2/2014 | Kumar et al. |
| 2014/0058600 A1 | 2/2014 | Hoffmann et al. |
| 2014/0058666 A1 | 2/2014 | Sheha et al. |
| 2014/0059468 A1 | 2/2014 | Allgair |
| 2014/0064288 A1 | 3/2014 | Melick et al. |
| 2014/0067152 A1 | 3/2014 | Swanson et al. |
| 2014/0067225 A1 | 3/2014 | Lee et al. |
| 2014/0067313 A1 | 3/2014 | Breed |
| 2014/0067758 A1 | 3/2014 | Boldyrev et al. |
| 2014/0069899 A1 | 3/2014 | Mehn et al. |
| 2014/0070943 A1 | 3/2014 | Breed |
| 2014/0071167 A1 | 3/2014 | Lauenstein et al. |

(56) References Cited

U.S. PATENT DOCUMENTS

| | | |
|---|---|---|
| 2014/0071995 A1 | 3/2014 | Hartwich |
| 2014/0072111 A1 | 3/2014 | Klaban |
| 2014/0074468 A1 | 3/2014 | Sorin et al. |
| 2014/0075198 A1 | 3/2014 | Peirce et al. |
| 2014/0078991 A1 | 3/2014 | Trotter et al. |
| 2014/0079160 A1 | 3/2014 | Beidas et al. |
| 2014/0079297 A1 | 3/2014 | Tadayon et al. |
| 2014/0080428 A1 | 3/2014 | Rhoads et al. |
| 2014/0080457 A1 | 3/2014 | Agrawal et al. |
| 2014/0081483 A1 | 3/2014 | Neinmann et al. |
| 2014/0081493 A1 | 3/2014 | Shemyakin et al. |
| 2014/0081517 A1 | 3/2014 | Barrett et al. |
| 2014/0081793 A1 | 3/2014 | Hoffberg |
| 2014/0081813 A1 | 3/2014 | Breed |
| 2014/0088871 A1 | 3/2014 | Gueziec |
| 2014/0089089 A1 | 3/2014 | Ramer et al. |
| 2014/0089241 A1 | 3/2014 | Hoffberg et al. |
| 2014/0089286 A1 | 3/2014 | Delli Santi et al. |
| 2014/0091950 A1 | 4/2014 | Gueziec |
| 2014/0092424 A1 | 4/2014 | Grosz |
| 2014/0092438 A1 | 4/2014 | Schultz |
| 2014/0094976 A1 | 4/2014 | Lozier et al. |
| 2014/0095170 A1 | 4/2014 | Roper et al. |
| 2014/0095234 A1 | 4/2014 | Johnson |
| 2014/0095263 A1 | 4/2014 | McAlister et al. |
| 2014/0095264 A1 | 4/2014 | Grosz |
| 2014/0095335 A1 | 4/2014 | Grosz |
| 2014/0095342 A1 | 4/2014 | Gowen et al. |
| 2014/0095551 A1 | 4/2014 | Grosz et al. |
| 2014/0095586 A1 | 4/2014 | Grosz et al. |
| 2014/0095587 A1 | 4/2014 | Schult |
| 2014/0095588 A1 | 4/2014 | Gowen et al. |
| 2014/0095632 A1 | 4/2014 | Grosz et al. |
| 2014/0095645 A1 | 4/2014 | Grosz et al. |
| 2014/0095939 A1 | 4/2014 | Bell et al. |
| 2014/0095971 A1 | 4/2014 | Gowen et al. |
| 2014/0096009 A1 | 4/2014 | Grosz et al. |
| 2014/0096010 A1 | 4/2014 | Grosz |
| 2014/0096011 A1 | 4/2014 | Grosz |
| 2014/0096012 A1 | 4/2014 | Grosz et al. |
| 2014/0096013 A1 | 4/2014 | Grosz |
| 2014/0096015 A1 | 4/2014 | Grosz et al. |
| 2014/0096016 A1 | 4/2014 | Grosz |
| 2014/0096017 A1 | 4/2014 | Grosz |
| 2014/0096018 A1 | 4/2014 | Iannucci |
| 2014/0096019 A1 | 4/2014 | Gowen et al. |
| 2014/0096020 A1 | 4/2014 | Grosz et al. |
| 2014/0096021 A1 | 4/2014 | Gowen et al. |
| 2014/0096022 A1 | 4/2014 | Shlimovich |
| 2014/0096026 A1 | 4/2014 | Grosz |
| 2014/0096029 A1 | 4/2014 | Schultz |
| 2014/0096037 A1 | 4/2014 | Grosz |
| 2014/0096038 A1 | 4/2014 | Schultz |
| 2014/0096039 A1 | 4/2014 | Schultz |
| 2014/0096040 A1 | 4/2014 | Grosz |
| 2014/0096041 A1 | 4/2014 | Gowen et al. |
| 2014/0098671 A1 | 4/2014 | Raleigh et al. |
| 2014/0098685 A1 | 4/2014 | Shattil |
| 2014/0101611 A1 | 4/2014 | Lang et al. |
| 2014/0107923 A1 | 4/2014 | Gueziec |
| 2014/0108786 A1 | 4/2014 | Kreft |
| 2014/0109080 A1 | 4/2014 | Ricci |
| 2014/0111380 A1 | 4/2014 | Gibbs et al. |
| 2014/0112527 A1 | 4/2014 | Nister et al. |
| 2014/0113548 A1 | 4/2014 | Camulli |
| 2014/0114532 A1 | 4/2014 | Choi et al. |
| 2014/0114554 A1 | 4/2014 | Lagassey |
| 2014/0114555 A1 | 4/2014 | Lagassey |
| 2014/0114562 A1 | 4/2014 | Zhou |
| 2014/0114696 A1 | 4/2014 | Amigo et al. |
| 2014/0114718 A1 | 4/2014 | Randall et al. |
| 2014/0114829 A1 | 4/2014 | Forbes, Jr. |
| 2014/0114844 A1 | 4/2014 | Forbes, Jr. |
| 2014/0114849 A1 | 4/2014 | Forbes, Jr. |
| 2014/0114850 A1 | 4/2014 | Forbes, Jr. |
| 2014/0119535 A1 | 5/2014 | Anisimov et al. |
| 2014/0119575 A1 | 5/2014 | Conrad et al. |
| 2014/0120867 A1 | 5/2014 | Hodges |
| 2014/0121873 A1 | 5/2014 | Choi et al. |
| 2014/0121959 A1 | 5/2014 | Hurley et al. |
| 2014/0122243 A1 | 5/2014 | Ramer et al. |
| 2014/0125584 A1 | 5/2014 | Xun et al. |
| 2014/0125598 A1 | 5/2014 | Cheng et al. |
| 2014/0128072 A1 | 5/2014 | Yi et al. |
| 2014/0129038 A1 | 5/2014 | Finnell et al. |
| 2014/0129160 A1 | 5/2014 | Tran |
| 2014/0129332 A1 | 5/2014 | Ramer et al. |
| 2014/0130756 A1 | 5/2014 | McAlister |
| 2014/0132210 A1 | 5/2014 | Partovi |
| 2014/0133392 A1 | 5/2014 | Das et al. |
| 2014/0133639 A1 | 5/2014 | Berk |
| 2014/0133767 A1 | 5/2014 | Lund et al. |
| 2014/0135048 A1 | 5/2014 | Kasslin et al. |
| 2014/0136019 A1 | 5/2014 | Fredriksson |
| 2014/0136927 A1 | 5/2014 | Li et al. |
| 2014/0136992 A1 | 5/2014 | Magcale et al. |
| 2014/0140233 A1 | 5/2014 | Houston et al. |
| 2014/0141744 A1 | 5/2014 | Miluzzo et al. |
| 2014/0141812 A1 | 5/2014 | Cho |
| 2014/0143171 A1 | 5/2014 | Hurley et al. |
| 2014/0143839 A1 | 5/2014 | Ricci |
| 2014/0143889 A1 | 5/2014 | Ginter et al. |
| 2014/0151456 A1 | 6/2014 | McCumin et al. |
| 2014/0156087 A1 | 6/2014 | Amundson |
| 2014/0157086 A1 | 6/2014 | Sharon et al. |
| 2014/0160359 A1 | 6/2014 | Feher |
| 2014/0162219 A1 | 6/2014 | Stankoulov |
| 2014/0163768 A1 | 6/2014 | Purdy et al. |
| 2014/0163963 A2 | 6/2014 | Dahlmeier et al. |
| 2014/0164113 A1 | 6/2014 | Ramer et al. |
| 2014/0164124 A1 | 6/2014 | Rhoads |
| 2014/0164125 A1 | 6/2014 | Taylor |
| 2014/0167697 A1 | 6/2014 | Stempin |
| 2014/0168262 A1 | 6/2014 | Forutanpour et al. |
| 2014/0169503 A1 | 6/2014 | Cohen |
| 2014/0172946 A1 | 6/2014 | Hershberg et al. |
| 2014/0180439 A1 | 6/2014 | Fisher |
| 2014/0180498 A1 | 6/2014 | Jeong |
| 2014/0180557 A1 | 6/2014 | Hunt et al. |
| 2014/0180723 A1 | 6/2014 | Cote et al. |
| 2014/0180727 A1 | 6/2014 | Freiberger et al. |
| 2014/0180825 A1 | 6/2014 | Ramer et al. |
| 2014/0180884 A1 | 6/2014 | Forbes, Jr. |
| 2014/0180885 A1 | 6/2014 | Forbes, Jr. |
| 2014/0180886 A1 | 6/2014 | Forbes, Jr. |
| 2014/0181100 A1 | 6/2014 | Ramer et al. |
| 2014/0184430 A1 | 7/2014 | Jiang et al. |
| 2014/0185499 A1 | 7/2014 | Ray et al. |
| 2014/0188379 A1 | 7/2014 | Gostoli et al. |
| 2014/0188533 A1 | 7/2014 | Davidson |
| 2014/0188753 A1 | 7/2014 | Davidson |
| 2014/0189430 A1 | 7/2014 | Hilliges et al. |
| 2014/0190248 A1 | 7/2014 | Moran et al. |
| 2014/0191574 A1 | 7/2014 | Palatini |
| 2014/0191842 A1 | 7/2014 | McQuade et al. |
| 2014/0191886 A1 | 7/2014 | Barrett |
| 2014/0192181 A1 | 7/2014 | Taylor et al. |
| 2014/0193047 A1 | 7/2014 | Grosz et al. |
| 2014/0194149 A1 | 7/2014 | Lavi et al. |
| 2014/0195044 A1 | 7/2014 | McQuade et al. |
| 2014/0195045 A1 | 7/2014 | McQuade et al. |
| 2014/0195046 A1 | 7/2014 | Fadler et al. |
| 2014/0195047 A1 | 7/2014 | King et al. |
| 2014/0195071 A1 | 7/2014 | Hunt |
| 2014/0195102 A1 | 7/2014 | Nathanson |
| 2014/0195153 A1 | 7/2014 | Barrett et al. |
| 2014/0195197 A1 | 7/2014 | Boerhout |
| 2014/0195272 A1 | 7/2014 | Sadiq et al. |
| 2014/0195663 A1 | 7/2014 | Hirschenberger et al. |
| 2014/0195808 A1 | 7/2014 | Lortz et al. |
| 2014/0195921 A1 | 7/2014 | Grosz et al. |
| 2014/0199965 A1 | 7/2014 | Cepuran et al. |
| 2014/0199989 A1 | 7/2014 | Cepuran et al. |
| 2014/0200718 A1 | 7/2014 | Tessier |

(56) References Cited

U.S. PATENT DOCUMENTS

| | | |
|---|---|---|
| 2014/0200740 A1 | 7/2014 | Lavi et al. |
| 2014/0200742 A1 | 7/2014 | Mauti, Jr. |
| 2014/0200756 A1 | 7/2014 | Sisk |
| 2014/0201064 A1 | 7/2014 | Jackson et al. |
| 2014/0201126 A1 | 7/2014 | Zadeh et al. |
| 2014/0201671 A1 | 7/2014 | Zhai et al. |
| 2014/0202800 A1 | 7/2014 | Breed |
| 2014/0206392 A1 | 7/2014 | Mauti, Jr. |
| 2014/0207338 A1 | 7/2014 | Healey et al. |
| 2014/0207619 A1 | 7/2014 | Ishebabi |
| 2014/0211803 A1 | 7/2014 | Yousefi et al. |
| 2014/0211842 A1 | 7/2014 | Zhao et al. |
| 2014/0213238 A1 | 7/2014 | Giraud et al. |
| 2014/0214212 A1 | 7/2014 | Leen et al. |
| 2014/0214311 A1 | 7/2014 | Stevens et al. |
| 2014/0214526 A1 | 7/2014 | Ramer et al. |
| 2014/0214527 A1 | 7/2014 | Ramer et al. |
| 2014/0214762 A1 | 7/2014 | Haas et al. |
| 2014/0214763 A1 | 7/2014 | Haas et al. |
| 2014/0215491 A1 | 7/2014 | Addepalli et al. |
| 2014/0215513 A1 | 7/2014 | Ramer et al. |
| 2014/0218187 A1 | 8/2014 | Chun et al. |
| 2014/0220945 A1 | 8/2014 | Bookstaff |
| 2014/0222241 A1 | 8/2014 | Ols |
| 2014/0222610 A1 | 8/2014 | Mikurak |
| 2014/0222729 A1 | 8/2014 | Dasgupta et al. |
| 2014/0222976 A1 | 8/2014 | Ballard et al. |
| 2014/0223112 A1 | 8/2014 | Serjeanston et al. |
| 2014/0223208 A1 | 8/2014 | Eltawil et al. |
| 2014/0226589 A1 | 8/2014 | Yousefi et al. |
| 2014/0226879 A1 | 8/2014 | Westerman et al. |
| 2014/0226887 A1 | 8/2014 | Takahashi et al. |
| 2014/0228043 A1 | 8/2014 | Wigren |
| 2014/0228223 A1 | 8/2014 | Gnirke et al. |
| 2014/0235209 A1 | 8/2014 | Wuergler et al. |
| 2014/0236434 A1 | 8/2014 | Sujan et al. |
| 2014/0236718 A1 | 8/2014 | Ramer et al. |
| 2014/0240088 A1 | 8/2014 | Robinette et al. |
| 2014/0240170 A1 | 8/2014 | Rudow et al. |
| 2014/0240289 A1 | 8/2014 | Myers et al. |
| 2014/0240349 A1 | 8/2014 | Tuukkanen |
| 2014/0244125 A1 | 8/2014 | Dorum et al. |
| 2014/0244148 A1 | 8/2014 | Horvitz et al. |
| 2014/0244156 A1 | 8/2014 | Magnusson et al. |
| 2014/0247892 A1 | 9/2014 | Williams et al. |
| 2014/0248852 A1 | 9/2014 | Raleigh et al. |
| 2014/0249696 A1 | 9/2014 | Margol et al. |
| 2014/0249697 A1 | 9/2014 | Fredriksson |
| 2014/0249712 A1 | 9/2014 | Margol et al. |
| 2014/0249714 A1 | 9/2014 | Gormley |
| 2014/0249927 A1 | 9/2014 | De Angelo |
| 2014/0250228 A1 | 9/2014 | Shiloh |
| 2014/0253172 A1 | 9/2014 | Roop |
| 2014/0253375 A1 | 9/2014 | Rudow et al. |
| 2014/0253883 A1 | 9/2014 | Akamatsu |
| 2014/0256304 A1 | 9/2014 | Frye et al. |
| 2014/0257867 A1 | 9/2014 | Gay et al. |
| 2014/0258469 A1 | 9/2014 | Maharajh et al. |
| 2014/0260190 A1 | 9/2014 | DeGeorge |
| 2014/0263628 A1 | 9/2014 | McQuade et al. |
| 2014/0263629 A1 | 9/2014 | McQuade et al. |
| 2014/0263861 A1 | 9/2014 | Pritchard et al. |
| 2014/0263989 A1 | 9/2014 | Valentino et al. |
| 2014/0264047 A1 | 9/2014 | Valentino et al. |
| 2014/0266594 A1 | 9/2014 | Reiser |
| 2014/0266635 A1 | 9/2014 | Roth et al. |
| 2014/0266793 A1 | 9/2014 | Velado et al. |
| 2014/0267074 A1 | 9/2014 | Balci et al. |
| 2014/0267741 A1 | 9/2014 | King et al. |
| 2014/0268229 A1 | 9/2014 | Kempka |
| 2014/0268601 A1 | 9/2014 | Valentino et al. |
| 2014/0269441 A1 | 9/2014 | Hyde et al. |
| 2014/0269442 A1 | 9/2014 | Hyde et al. |
| 2014/0269443 A1 | 9/2014 | Hyde et al. |
| 2014/0269466 A1 | 9/2014 | Owens et al. |
| 2014/0269514 A1 | 9/2014 | Leppanen et al. |
| 2014/0270158 A1 | 9/2014 | Peirce |
| 2014/0270172 A1 | 9/2014 | Peirce |
| 2014/0271114 A1 | 9/2014 | Phillips et al. |
| 2014/0273924 A1 | 9/2014 | Hyde et al. |
| 2014/0273937 A1 | 9/2014 | Hyde et al. |
| 2014/0273939 A1 | 9/2014 | Hyde et al. |
| 2014/0273940 A1 | 9/2014 | Hyde et al. |
| 2014/0273947 A1 | 9/2014 | Hyde et al. |
| 2014/0273955 A1 | 9/2014 | Oesterling |
| 2014/0273998 A1 | 9/2014 | Ramer et al. |
| 2014/0274016 A1 | 9/2014 | Timm et al. |
| 2014/0277613 A1 | 9/2014 | Love et al. |
| 2014/0277757 A1 | 9/2014 | Wang et al. |
| 2014/0277831 A1 | 9/2014 | Hunt |
| 2014/0277862 A1 | 9/2014 | Pritchard et al. |
| 2014/0277878 A1 | 9/2014 | Manickaraj et al. |
| 2014/0277887 A1 | 9/2014 | Slattery et al. |
| 2014/0277917 A1 | 9/2014 | Banet et al. |
| 2014/0277971 A1 | 9/2014 | Oshiro et al. |
| 2014/0278038 A1 | 9/2014 | Stankoulov |
| 2014/0278071 A1 | 9/2014 | San Filippo et al. |
| 2014/0278075 A1 | 9/2014 | Fink |
| 2014/0278081 A1 | 9/2014 | Iwuchukwu |
| 2014/0278086 A1 | 9/2014 | San Filippo et al. |
| 2014/0278096 A1 | 9/2014 | Davidson |
| 2014/0278101 A1 | 9/2014 | Davidson |
| 2014/0278555 A1 | 9/2014 | Johnson et al. |
| 2014/0278573 A1 | 9/2014 | Cook |
| 2014/0278599 A1 | 9/2014 | Reh et al. |
| 2014/0278607 A1 | 9/2014 | Johnson et al. |
| 2014/0278608 A1 | 9/2014 | Johnson et al. |
| 2014/0278623 A1 | 9/2014 | Martinez et al. |
| 2014/0278847 A1 | 9/2014 | Gallo |
| 2014/0279019 A1 | 9/2014 | Cheney et al. |
| 2014/0279326 A1 | 9/2014 | Forbes, Jr. |
| 2014/0279535 A1 | 9/2014 | Fadler |
| 2014/0280961 A1 | 9/2014 | Martinez et al. |
| 2014/0281953 A1 | 9/2014 | Hayashi et al. |
| 2014/0282470 A1 | 9/2014 | Buga et al. |
| 2014/0285519 A1 | 9/2014 | Uusitalo et al. |
| 2014/0285660 A1 | 9/2014 | Jamtgaard et al. |
| 2014/0286731 A1 | 9/2014 | Van Mill et al. |
| 2014/0287723 A1 | 9/2014 | LaFever et al. |
| 2014/0288713 A1 | 9/2014 | Caron et al. |
| 2014/0288812 A1 | 9/2014 | Green et al. |
| 2014/0288831 A1 | 9/2014 | Sinton |
| 2014/0288884 A1 | 9/2014 | Schullian et al. |
| 2014/0288915 A1 | 9/2014 | Madnani et al. |
| 2014/0289020 A1 | 9/2014 | Schullian et al. |
| 2014/0289249 A1 | 9/2014 | Davis et al. |
| 2014/0293928 A1 | 10/2014 | Boldyrev et al. |
| 2014/0294013 A1 | 10/2014 | Uzelac et al. |
| 2014/0298237 A1 | 10/2014 | Galu, Jr. |
| 2014/0298906 A1 | 10/2014 | Tzidon et al. |
| 2014/0299783 A1 | 10/2014 | Valentino et al. |
| 2014/0300583 A1 | 10/2014 | Izukawa et al. |
| 2014/0300584 A1 | 10/2014 | Nishioka |
| 2014/0300922 A1 | 10/2014 | Shaheen et al. |
| 2014/0301376 A1 | 10/2014 | Cho et al. |
| 2014/0301666 A1 | 10/2014 | Thota |
| 2014/0302774 A1 | 10/2014 | Burke et al. |
| 2014/0302895 A1 | 10/2014 | Wuergler et al. |
| 2014/0303944 A1 | 10/2014 | Jiang et al. |
| 2014/0306799 A1 | 10/2014 | Ricci |
| 2014/0306814 A1 | 10/2014 | Ricci |
| 2014/0306817 A1 | 10/2014 | Ricci |
| 2014/0306826 A1 | 10/2014 | Ricci |
| 2014/0306833 A1 | 10/2014 | Ricci |
| 2014/0306834 A1 | 10/2014 | Ricci |
| 2014/0306835 A1 | 10/2014 | Ricci |
| 2014/0307265 A1 | 10/2014 | Yamagiwa |
| 2014/0307655 A1 | 10/2014 | Ricci |
| 2014/0307724 A1 | 10/2014 | Ricci |
| 2014/0307770 A1 | 10/2014 | Jiang et al. |
| 2014/0308902 A1 | 10/2014 | Ricci |
| 2014/0309789 A1 | 10/2014 | Ricci |
| 2014/0309790 A1 | 10/2014 | Ricci |
| 2014/0309804 A1 | 10/2014 | Ricci |

(56) References Cited

U.S. PATENT DOCUMENTS

| | | |
|---|---|---|
| 2014/0309805 A1 | 10/2014 | Ricci |
| 2014/0309806 A1 | 10/2014 | Ricci |
| 2014/0309813 A1 | 10/2014 | Ricci |
| 2014/0309814 A1 | 10/2014 | Ricci et al. |
| 2014/0309815 A1 | 10/2014 | Ricci et al. |
| 2014/0309838 A1 | 10/2014 | Ricci |
| 2014/0309839 A1 | 10/2014 | Ricci et al. |
| 2014/0309847 A1 | 10/2014 | Ricci |
| 2014/0309849 A1 | 10/2014 | Ricci |
| 2014/0309852 A1 | 10/2014 | Ricci |
| 2014/0309853 A1 | 10/2014 | Ricci |
| 2014/0309862 A1 | 10/2014 | Ricci |
| 2014/0309863 A1 | 10/2014 | Ricci |
| 2014/0309864 A1 | 10/2014 | Ricci |
| 2014/0309865 A1 | 10/2014 | Ricci |
| 2014/0309866 A1 | 10/2014 | Ricci |
| 2014/0309867 A1 | 10/2014 | Ricci |
| 2014/0309868 A1 | 10/2014 | Ricci |
| 2014/0309869 A1 | 10/2014 | Ricci |
| 2014/0309870 A1 | 10/2014 | Ricci et al. |
| 2014/0309871 A1 | 10/2014 | Ricci |
| 2014/0309872 A1 | 10/2014 | Ricci |
| 2014/0309873 A1 | 10/2014 | Ricci |
| 2014/0309874 A1 | 10/2014 | Ricci |
| 2014/0309875 A1 | 10/2014 | Ricci |
| 2014/0309876 A1 | 10/2014 | Ricci |
| 2014/0309877 A1 | 10/2014 | Ricci |
| 2014/0309878 A1 | 10/2014 | Ricci |
| 2014/0309879 A1 | 10/2014 | Ricci |
| 2014/0309880 A1 | 10/2014 | Ricci |
| 2014/0309885 A1 | 10/2014 | Ricci |
| 2014/0309886 A1 | 10/2014 | Ricci |
| 2014/0309891 A1 | 10/2014 | Ricci |
| 2014/0309892 A1 | 10/2014 | Ricci |
| 2014/0309893 A1 | 10/2014 | Ricci |
| 2014/0309913 A1 | 10/2014 | Ricci et al. |
| 2014/0309919 A1 | 10/2014 | Ricci |
| 2014/0309920 A1 | 10/2014 | Ricci |
| 2014/0309921 A1 | 10/2014 | Ricci et al. |
| 2014/0309922 A1 | 10/2014 | Ricci |
| 2014/0309923 A1 | 10/2014 | Ricci |
| 2014/0309927 A1 | 10/2014 | Ricci |
| 2014/0309929 A1 | 10/2014 | Ricci |
| 2014/0309930 A1 | 10/2014 | Ricci |
| 2014/0309934 A1 | 10/2014 | Ricci |
| 2014/0309935 A1 | 10/2014 | Ricci |
| 2014/0309982 A1 | 10/2014 | Ricci |
| 2014/0310031 A1 | 10/2014 | Ricci |
| 2014/0310075 A1 | 10/2014 | Ricci |
| 2014/0310103 A1 | 10/2014 | Ricci |
| 2014/0310186 A1 | 10/2014 | Ricci |
| 2014/0310243 A1 | 10/2014 | McGee et al. |
| 2014/0310277 A1 | 10/2014 | Ricci |
| 2014/0310349 A1 | 10/2014 | Rainisto |
| 2014/0310359 A1 | 10/2014 | Kim et al. |
| 2014/0310379 A1 | 10/2014 | Ricci et al. |
| 2014/0310594 A1 | 10/2014 | Ricci et al. |
| 2014/0310610 A1 | 10/2014 | Ricci |
| 2014/0310702 A1 | 10/2014 | Ricci et al. |
| 2014/0310739 A1 | 10/2014 | Ricci et al. |
| 2014/0310788 A1 | 10/2014 | Ricci |
| 2014/0312242 A1 | 10/2014 | Valentino et al. |
| 2014/0312839 A1 | 10/2014 | Uyeki |
| 2014/0313208 A1 | 10/2014 | Filev et al. |
| 2014/0315527 A1 | 10/2014 | Ramer et al. |
| 2014/0316764 A1 | 10/2014 | Ayan et al. |
| 2014/0316903 A1 | 10/2014 | Maharajh et al. |
| 2014/0317112 A1 | 10/2014 | Maharajh et al. |
| 2014/0318293 A1 | 10/2014 | Nelson et al. |
| 2014/0320315 A1 | 10/2014 | Gueziec |
| 2014/0320421 A1 | 10/2014 | Wei et al. |
| 2014/0321363 A1 | 10/2014 | Hui et al. |
| 2014/0321453 A1 | 10/2014 | Ramachandran et al. |
| 2014/0324510 A1 | 10/2014 | Vardhan et al. |
| 2014/0324572 A1 | 10/2014 | Ramer et al. |
| 2014/0325030 A1 | 10/2014 | Maharajh et al. |
| 2014/0325113 A1 | 10/2014 | Frye et al. |
| 2014/0327778 A1 | 11/2014 | McQuade et al. |
| 2014/0327981 A1 | 11/2014 | Marrow et al. |
| 2014/0333664 A1 | 11/2014 | Williams et al. |
| 2014/0335487 A1 | 11/2014 | Hinman et al. |
| 2014/0335818 A1 | 11/2014 | Jain |
| 2014/0335822 A1 | 11/2014 | Jain |
| 2014/0336834 A1 | 11/2014 | Sanders |
| 2014/0336868 A1 | 11/2014 | Breed |
| 2014/0336918 A1 | 11/2014 | Wan |
| 2014/0337253 A1 | 11/2014 | Berezin et al. |
| 2014/0337338 A1 | 11/2014 | Shinn et al. |
| 2014/0337765 A1 | 11/2014 | Jain |
| 2014/0340242 A1 | 11/2014 | Belzner et al. |
| 2014/0340348 A1 | 11/2014 | Park |
| 2014/0341475 A1 | 11/2014 | Shen et al. |
| 2014/0341852 A1 | 11/2014 | Srivastava et al. |
| 2014/0342659 A1 | 11/2014 | Maharajh et al. |
| 2014/0342711 A1 | 11/2014 | Vendrow et al. |
| 2014/0343819 A1 | 11/2014 | Johansson et al. |
| 2014/0343831 A1 | 11/2014 | Hosey et al. |
| 2014/0344065 A1 | 11/2014 | Ramer et al. |
| 2014/0344124 A1 | 11/2014 | Forbes, Jr. |
| 2014/0344393 A1 | 11/2014 | Rebert et al. |
| 2014/0344460 A1 | 11/2014 | Storrie |
| 2014/0344718 A1 | 11/2014 | Rapaport et al. |
| 2014/0347482 A1 | 11/2014 | Weinmann et al. |
| 2014/0347491 A1 | 11/2014 | Connor |
| 2014/0347978 A1 | 11/2014 | Kim et al. |
| 2014/0349256 A1 | 11/2014 | Connor |
| 2014/0349257 A1 | 11/2014 | Connor |
| 2014/0349684 A1 | 11/2014 | Leppanen et al. |
| 2014/0350776 A1 | 11/2014 | Chen |
| 2014/0353300 A1 | 12/2014 | Swiatek et al. |
| 2014/0354686 A1 | 12/2014 | Mullins |
| 2014/0357295 A1 | 12/2014 | Skomra et al. |
| 2014/0358291 A1 | 12/2014 | Wells |
| 2014/0358294 A1 | 12/2014 | Nichols et al. |
| 2014/0358361 A1 | 12/2014 | Breed |
| 2014/0358362 A1 | 12/2014 | Breed |
| 2014/0358749 A1 | 12/2014 | Williams et al. |
| 2014/0358896 A1 | 12/2014 | Camacho et al. |
| 2014/0359477 A1 | 12/2014 | Chen |
| 2014/0359552 A1 | 12/2014 | Misra et al. |
| 2014/0362195 A1 | 12/2014 | Ng-Thow-Hing et al. |
| 2014/0362807 A1 | 12/2014 | Bhatnagar et al. |
| 2014/0362847 A1 | 12/2014 | Turunen et al. |
| 2014/0362954 A1 | 12/2014 | Choi et al. |
| 2014/0362992 A1 | 12/2014 | Rung et al. |
| 2014/0364096 A1 | 12/2014 | Agrawal et al. |
| 2014/0365228 A1 | 12/2014 | Ng-Thow-Hing et al. |
| 2014/0365517 A1 | 12/2014 | Calo et al. |
| 2014/0365518 A1 | 12/2014 | Calo et al. |
| 2014/0366644 A1 | 12/2014 | Henry et al. |
| 2014/0369237 A1 | 12/2014 | Sullivan et al. |
| 2014/0370839 A1 | 12/2014 | Hatton |
| 2014/0371891 A1 | 12/2014 | Moorer |
| 2014/0372454 A1 | 12/2014 | Walker et al. |
| 2014/0372532 A1 | 12/2014 | Nerst et al. |
| 2014/0372880 A1 | 12/2014 | Zhai et al. |
| 2014/0373639 A1 | 12/2014 | Henry et al. |
| 2014/0375428 A1 | 12/2014 | Park |
| 2014/0375447 A1 | 12/2014 | Raghunathan et al. |
| 2014/0376827 A1 | 12/2014 | Jiang et al. |
| 2014/0378055 A1 | 12/2014 | Pal et al. |
| 2014/0378170 A1 | 12/2014 | Rudow et al. |
| 2014/0378171 A1 | 12/2014 | Rudow et al. |
| 2014/0379169 A1 | 12/2014 | Camacho et al. |
| 2014/0379182 A1 | 12/2014 | Frazier et al. |
| 2014/0380106 A1 | 12/2014 | Presman et al. |
| 2014/0380132 A1 | 12/2014 | Ran |
| 2014/0380240 A1 | 12/2014 | Rankin et al. |
| 2014/0380296 A1 | 12/2014 | Pal et al. |
| 2014/0380408 A1 | 12/2014 | Ginter et al. |
| 2014/0380442 A1 | 12/2014 | Addepalli et al. |
| 2014/0380505 A1 | 12/2014 | Camacho et al. |
| 2015/0002281 A1 | 1/2015 | Berkobin et al. |
| 2015/0003238 A1 | 1/2015 | Kalmikov |

(56) References Cited

U.S. PATENT DOCUMENTS

| | | |
|---|---|---|
| 2015/0003267 A1 | 1/2015 | Francis |
| 2015/0003396 A1 | 1/2015 | Hui et al. |
| 2015/0003400 A1 | 1/2015 | Camilleri et al. |
| 2015/0005911 A1 | 1/2015 | Lake et al. |
| 2015/0005984 A1 | 1/2015 | De Los Santos et al. |
| 2015/0006035 A1 | 1/2015 | Ricci |
| 2015/0006375 A1 | 1/2015 | Forbes, Jr. |
| 2015/0007155 A1 | 1/2015 | Hoffman et al. |
| 2015/0009863 A1 | 1/2015 | Troan et al. |
| 2015/0010153 A1 | 1/2015 | Robertson |
| 2015/0011194 A1 | 1/2015 | Rodriguez |
| 2015/0012152 A1 | 1/2015 | Ricci |
| 2015/0012647 A1 | 1/2015 | Grelewicz |
| 2015/0015363 A1 | 1/2015 | Tyler |
| 2015/0016248 A1 | 1/2015 | Meier et al. |
| 2015/0016777 A1 | 1/2015 | Abovitz et al. |
| 2015/0017997 A1 | 1/2015 | Pal et al. |
| 2015/0018622 A1 | 1/2015 | Tesar et al. |
| 2015/0019068 A1 | 1/2015 | Peirce |
| 2015/0019266 A1 | 1/2015 | Stempora |
| 2015/0019329 A1 | 1/2015 | Ramer et al. |
| 2015/0019550 A1 | 1/2015 | Maharajh et al. |
| 2015/0020152 A1 | 1/2015 | Litichever et al. |
| 2015/0023196 A1 | 1/2015 | Schlenk |
| 2015/0023256 A1 | 1/2015 | Liu et al. |
| 2015/0023949 A1 | 1/2015 | Narain et al. |
| 2015/0025727 A1 | 1/2015 | Engman et al. |
| 2015/0025748 A1 | 1/2015 | Hagnander et al. |
| 2015/0025917 A1 | 1/2015 | Stempora |
| 2015/0026047 A1 | 1/2015 | Johnson, Jr. |
| 2015/0026312 A1 | 1/2015 | Othmer et al. |
| 2015/0026376 A1 | 1/2015 | Scanlan et al. |
| 2015/0027681 A1 | 1/2015 | Ragland et al. |
| 2015/0029094 A1 | 1/2015 | Aronsson et al. |
| 2015/0029405 A1 | 1/2015 | Yamagiwa |
| 2015/0029541 A1 | 1/2015 | Yun |
| 2015/0029838 A1 | 1/2015 | Silver |
| 2015/0029941 A1 | 1/2015 | Dickinson et al. |
| 2015/0029987 A1 | 1/2015 | Addepalli et al. |
| 2015/0031331 A1 | 1/2015 | Silver et al. |
| 2015/0032264 A1 | 1/2015 | Emmons et al. |
| 2015/0032291 A1 | 1/2015 | Lowrey et al. |
| 2015/0032303 A1 | 1/2015 | Swanson et al. |
| 2015/0032424 A1 | 1/2015 | Gupta et al. |
| 2015/0032671 A9 | 1/2015 | Kamath et al. |
| 2015/0032860 A1 | 1/2015 | Delangis |
| 2015/0035665 A1 | 2/2015 | Plante et al. |
| 2015/0036485 A1 | 2/2015 | Poulson et al. |
| 2015/0036679 A1 | 2/2015 | Deng et al. |
| 2015/0038123 A1 | 2/2015 | Tuukkanen et al. |
| 2015/0038125 A1 | 2/2015 | Baldridge et al. |
| 2015/0039214 A1 | 2/2015 | McClellan et al. |
| 2015/0039389 A1 | 2/2015 | Besehanic et al. |
| 2015/0039398 A1 | 2/2015 | Forbes, Jr. |
| 2015/0039666 A1 | 2/2015 | McShane et al. |
| 2015/0039827 A1 | 2/2015 | Kazi |
| 2015/0039936 A1 | 2/2015 | Kazi et al. |
| 2015/0040134 A1 | 2/2015 | Leggette et al. |
| 2015/0040175 A1 | 2/2015 | Ramaswamy et al. |
| 2015/0043012 A1 | 2/2015 | Rudow et al. |
| 2015/0043420 A1 | 2/2015 | Xiong et al. |
| 2015/0043445 A1 | 2/2015 | Xiong et al. |
| 2015/0043594 A1 | 2/2015 | Kim et al. |
| 2015/0044964 A1 | 2/2015 | Khan et al. |
| 2015/0046023 A1 | 2/2015 | Olsen et al. |
| 2015/0046062 A1 | 2/2015 | Davidson et al. |
| 2015/0046147 A1 | 2/2015 | Waibel et al. |
| 2015/0046263 A1 | 2/2015 | Seo |
| 2015/0046306 A1 | 2/2015 | Forbes, Jr. |
| 2015/0046554 A1 | 2/2015 | Papakipos et al. |
| 2015/0048641 A1 | 2/2015 | Ricci |
| 2015/0050527 A1 | 2/2015 | Jiang et al. |
| 2015/0050907 A1 | 2/2015 | Rudow et al. |
| 2015/0051787 A1 | 2/2015 | Doughty et al. |
| 2015/0052987 A1 | 2/2015 | Jung et al. |
| 2015/0053304 A1 | 2/2015 | Huwyler et al. |
| 2015/0053779 A1 | 2/2015 | Adamek et al. |
| 2015/0053780 A1 | 2/2015 | Nelson et al. |
| 2015/0053781 A1 | 2/2015 | Nelson et al. |
| 2015/0054647 A1 | 2/2015 | Edwards |
| 2015/0056945 A1 | 2/2015 | Daly et al. |
| 2015/0056951 A1 | 2/2015 | Talwar et al. |
| 2015/0056984 A1 | 2/2015 | Feuer et al. |
| 2015/0057028 A1 | 2/2015 | Rudow et al. |
| 2015/0057838 A1 | 2/2015 | Scholl et al. |
| 2015/0057926 A1 | 2/2015 | Gupta et al. |
| 2015/0058191 A1 | 2/2015 | Khan et al. |
| 2015/0058233 A1 | 2/2015 | Budlong |
| 2015/0061603 A1 | 3/2015 | Loftus et al. |
| 2015/0061895 A1 | 3/2015 | Ricci |
| 2015/0062168 A1 | 3/2015 | Ng-Thow-Hing et al. |
| 2015/0063213 A1 | 3/2015 | Laroia et al. |
| 2015/0063329 A1 | 3/2015 | Frye et al. |
| 2015/0065168 A1 | 3/2015 | Roskind et al. |
| 2015/0066287 A1 | 3/2015 | Daoud et al. |
| 2015/0066861 A1 | 3/2015 | Ritto et al. |
| 2015/0067536 A1 | 3/2015 | Leorin et al. |
| 2015/0071115 A1 | 3/2015 | Neff et al. |
| 2015/0072668 A1 | 3/2015 | Macdonald et al. |
| 2015/0073639 A1 | 3/2015 | Minarcin et al. |
| 2015/0073647 A1 | 3/2015 | Ubik et al. |
| 2015/0073649 A1 | 3/2015 | Kelly et al. |
| 2015/0074013 A1 | 3/2015 | Schoonmaker et al. |
| 2015/0074732 A1 | 3/2015 | Green et al. |
| 2015/0075167 A1 | 3/2015 | Caouette |
| 2015/0077054 A1 | 3/2015 | Uyeki |
| 2015/0077056 A1 | 3/2015 | Bridges et al. |
| 2015/0078247 A1 | 3/2015 | Maharajh et al. |
| 2015/0078393 A1 | 3/2015 | Melick et al. |
| 2015/0078538 A1 | 3/2015 | Jain |
| 2015/0078539 A1 | 3/2015 | Jain |
| 2015/0078543 A1 | 3/2015 | Gisby et al. |
| 2015/0078741 A1 | 3/2015 | OConnor et al. |
| 2015/0081158 A1 | 3/2015 | Stilkerich |
| 2015/0081247 A1 | 3/2015 | Valentino et al. |
| 2015/0081462 A1 | 3/2015 | Ozvat et al. |
| 2015/0083869 A1 | 3/2015 | LeFebvre et al. |
| 2015/0085095 A1 | 3/2015 | Tesar |
| 2015/0087224 A1 | 3/2015 | Maharajh et al. |
| 2015/0088618 A1 | 3/2015 | Basir et al. |
| 2015/0088779 A1 | 3/2015 | Falcone et al. |
| 2015/0089083 A1 | 3/2015 | Cawse et al. |
| 2015/0089084 A1 | 3/2015 | Cawse et al. |
| 2015/0089236 A1 | 3/2015 | Han et al. |
| 2015/0093981 A1 | 4/2015 | Fusco et al. |
| 2015/0094035 A1 | 4/2015 | Jung et al. |
| 2015/0094876 A1 | 4/2015 | Baldwin |
| 2015/0094968 A1 | 4/2015 | Jia et al. |
| 2015/0095156 A1 | 4/2015 | Sauerbrey et al. |
| 2015/0095219 A1 | 4/2015 | Hurley |
| 2015/0095238 A1 | 4/2015 | Khan et al. |
| 2015/0095336 A1 | 4/2015 | Green et al. |
| 2015/0095841 A1 | 4/2015 | Fiedler et al. |
| 2015/0097798 A1 | 4/2015 | Ricci |
| 2015/0097860 A1 | 4/2015 | Alaniz et al. |
| 2015/0097861 A1 | 4/2015 | Alaniz et al. |
| 2015/0097863 A1 | 4/2015 | Alaniz et al. |
| 2015/0097864 A1 | 4/2015 | Alaniz et al. |
| 2015/0100179 A1 | 4/2015 | Alaniz et al. |
| 2015/0100195 A1 | 4/2015 | Kelly et al. |
| 2015/0100197 A1 | 4/2015 | Peirce et al. |
| 2015/0100238 A1 | 4/2015 | Cai et al. |
| 2015/0100621 A1 | 4/2015 | Pan |
| 2015/0100633 A1 | 4/2015 | Barrett et al. |
| 2015/0102568 A1 | 4/2015 | Slawson |
| 2015/0102569 A1 | 4/2015 | Slawson |
| 2015/0102570 A1 | 4/2015 | Slawson |
| 2015/0102571 A1 | 4/2015 | Slawson |
| 2015/0102572 A1 | 4/2015 | Slawson |
| 2015/0102593 A1 | 4/2015 | Slawson |
| 2015/0102914 A1 | 4/2015 | Park |
| 2015/0103662 A1 | 4/2015 | Valero et al. |
| 2015/0103994 A1 | 4/2015 | Kaushal et al. |
| 2015/0106204 A1 | 4/2015 | Pudar |

(56) References Cited

U.S. PATENT DOCUMENTS

| | | |
|---|---|---|
| 2015/0106526 A1 | 4/2015 | Arndt |
| 2015/0106668 A1 | 4/2015 | Ran |
| 2015/0109120 A1 | 4/2015 | Tyler |
| 2015/0109145 A1 | 4/2015 | Marathe et al. |
| 2015/0110078 A1 | 4/2015 | White et al. |
| 2015/0110080 A1 | 4/2015 | White et al. |
| 2015/0110081 A1 | 4/2015 | White et al. |
| 2015/0110180 A1 | 4/2015 | An et al. |
| 2015/0110258 A1 | 4/2015 | Liljestrand et al. |
| 2015/0111288 A1 | 4/2015 | Wilson et al. |
| 2015/0111570 A1 | 4/2015 | Towers-Clark |
| 2015/0111591 A1 | 4/2015 | Hoffberg |
| 2015/0112504 A1 | 4/2015 | Binion et al. |
| 2015/0112543 A1 | 4/2015 | Binion et al. |
| 2015/0112545 A1 | 4/2015 | Binion et al. |
| 2015/0112730 A1 | 4/2015 | Binion et al. |
| 2015/0112731 A1 | 4/2015 | Binion et al. |
| 2015/0112800 A1 | 4/2015 | Binion et al. |
| 2015/0112871 A1 | 4/2015 | Kumnick |
| 2015/0112884 A1 | 4/2015 | Ostrovsky et al. |
| 2015/0113006 A1 | 4/2015 | Almaer et al. |
| 2015/0113172 A1 | 4/2015 | Johnson et al. |
| 2015/0113638 A1 | 4/2015 | Valasek et al. |
| 2015/0116078 A1 | 4/2015 | Mishra et al. |
| 2015/0116079 A1 | 4/2015 | Mishra et al. |
| 2015/0116100 A1 | 4/2015 | Yang et al. |
| 2015/0116275 A1 | 4/2015 | Kanehira |
| 2015/0116276 A1 | 4/2015 | Izukawa et al. |
| 2015/0117387 A1 | 4/2015 | Shmunis et al. |
| 2015/0120082 A1 | 4/2015 | Cuddihy et al. |
| 2015/0120331 A1 | 4/2015 | Russo et al. |
| 2015/0120402 A1 | 4/2015 | Ahmed et al. |
| 2015/0120476 A1 | 4/2015 | Harrell |
| 2015/0121071 A1 | 4/2015 | Schwarz et al. |
| 2015/0121287 A1 | 4/2015 | Fermon |
| 2015/0121457 A1 | 4/2015 | Schwarz et al. |
| 2015/0121460 A1 | 4/2015 | Ristock et al. |
| 2015/0123619 A1 | 5/2015 | Marathe et al. |
| 2015/0126203 A1 | 5/2015 | Silver et al. |
| 2015/0126873 A1 | 5/2015 | Connor |
| 2015/0127321 A1 | 5/2015 | Waibel et al. |
| 2015/0127376 A1 | 5/2015 | Ortenzi et al. |
| 2015/0127390 A1 | 5/2015 | Bowne et al. |
| 2015/0127431 A1 | 5/2015 | Thomas et al. |
| 2015/0127527 A1 | 5/2015 | Eide |
| 2015/0128013 A1 | 5/2015 | Okamura |
| 2015/0128123 A1 | 5/2015 | Eling |
| 2015/0128205 A1 | 5/2015 | Mahaffey et al. |
| 2015/0128284 A1 | 5/2015 | LaFever et al. |
| 2015/0128285 A1 | 5/2015 | LeFever et al. |
| 2015/0128287 A1 | 5/2015 | LaFever et al. |
| 2015/0128597 A1 | 5/2015 | Schlak |
| 2015/0129581 A1 | 5/2015 | Cole |
| 2015/0130767 A1 | 5/2015 | Myers et al. |
| 2015/0130811 A1 | 5/2015 | Ellis et al. |
| 2015/0131489 A1 | 5/2015 | Silver et al. |
| 2015/0131794 A1 | 5/2015 | Ellis et al. |
| 2015/0133108 A1 | 5/2015 | Ahmed et al. |
| 2015/0133113 A1 | 5/2015 | Vendrow et al. |
| 2015/0134430 A1 | 5/2015 | Ellis et al. |
| 2015/0134513 A1 | 5/2015 | Olson et al. |
| 2015/0135028 A1 | 5/2015 | Zorn et al. |
| 2015/0135067 A1 | 5/2015 | Ellis et al. |
| 2015/0135101 A1 | 5/2015 | Ellis et al. |
| 2015/0135328 A1 | 5/2015 | Ellis et al. |
| 2015/0137993 A1 | 5/2015 | Terry |
| 2015/0138097 A1 | 5/2015 | Yamada |
| 2015/0138977 A1 | 5/2015 | Dacosta |
| 2015/0139042 A1 | 5/2015 | Connelly et al. |
| 2015/0141035 A1 | 5/2015 | Chen et al. |
| 2015/0141043 A1 | 5/2015 | Abramson et al. |
| 2015/0141759 A1 | 5/2015 | Charles et al. |
| 2015/0142255 A1 | 5/2015 | Gormley |
| 2015/0142257 A1 | 5/2015 | Merg et al. |
| 2015/0142262 A1 | 5/2015 | Lee |
| 2015/0142264 A1 | 5/2015 | Gormley |
| 2015/0142418 A1 | 5/2015 | Byron et al. |
| 2015/0142428 A1 | 5/2015 | Zhao et al. |
| 2015/0142526 A1 | 5/2015 | Forbes, Jr. |
| 2015/0145955 A1 | 5/2015 | Russell |
| 2015/0146000 A1 | 5/2015 | De Wind et al. |
| 2015/0146886 A1 | 5/2015 | Baumgarte |
| 2015/0148963 A1 | 5/2015 | Klein et al. |
| 2015/0148964 A1 | 5/2015 | Schultz et al. |
| 2015/0148965 A1 | 5/2015 | Lemire et al. |
| 2015/0149084 A1 | 5/2015 | Lai |
| 2015/0149219 A1 | 5/2015 | Bowne et al. |
| 2015/0149256 A1 | 5/2015 | Forbes, Jr. |
| 2015/0149336 A1 | 5/2015 | Haggerty et al. |
| 2015/0150046 A1 | 5/2015 | Maharajh et al. |
| 2015/0150124 A1 | 5/2015 | Zhang et al. |
| 2015/0150493 A1 | 6/2015 | Shacham-Diamand et al. |
| 2015/0153910 A1 | 6/2015 | Wheeler et al. |
| 2015/0154709 A1 | 6/2015 | Cook |
| 2015/0154712 A1 | 6/2015 | Cook |
| 2015/0156525 A1 | 6/2015 | Lemmons |
| 2015/0156556 A1 | 6/2015 | Lemmons |
| 2015/0157947 A1 | 6/2015 | Amaitis et al. |
| 2015/0159895 A1 | 6/2015 | Quam et al. |
| 2015/0159899 A1 | 6/2015 | Bergman et al. |
| 2015/0159900 A1 | 6/2015 | Quam et al. |
| 2015/0159901 A1 | 6/2015 | Quam et al. |
| 2015/0159902 A1 | 6/2015 | Quam et al. |
| 2015/0159903 A1 | 6/2015 | Marak et al. |
| 2015/0159904 A1 | 6/2015 | Barton |
| 2015/0160019 A1 | 6/2015 | Biswal et al. |
| 2015/0160633 A1 | 6/2015 | Adamik et al. |
| 2015/0161122 A1 | 6/2015 | Merriman et al. |
| 2015/0161149 A1 | 6/2015 | Genera et al. |
| 2015/0161415 A1 | 6/2015 | Kreft |
| 2015/0161587 A1 | 6/2015 | Khan et al. |
| 2015/0161828 A1 | 6/2015 | Davidson |
| 2015/0161890 A1 | 6/2015 | Huntzicker |
| 2015/0163121 A1 | 6/2015 | Mahaffey et al. |
| 2015/0163631 A1 | 6/2015 | Quam et al. |
| 2015/0163819 A1 | 6/2015 | Yousefi et al. |
| 2015/0163832 A1 | 6/2015 | Hosey et al. |
| 2015/0163945 A1 | 6/2015 | Barton et al. |
| 2015/0164437 A1 | 6/2015 | McCombie et al. |
| 2015/0165905 A1 | 6/2015 | Filev et al. |
| 2015/0166073 A1 | 6/2015 | DAmato et al. |
| 2015/0168174 A1 | 6/2015 | Abramson et al. |
| 2015/0168175 A1 | 6/2015 | Abramson et al. |
| 2015/0168365 A1 | 6/2015 | Connor |
| 2015/0168821 A1 | 6/2015 | Negretti et al. |
| 2015/0169406 A1 | 6/2015 | Li et al. |
| 2015/0169867 A1 | 6/2015 | Scaife |
| 2015/0170072 A1 | 6/2015 | Grant et al. |
| 2015/0170289 A1 | 6/2015 | Bowne et al. |
| 2015/0170290 A1 | 6/2015 | Bowne et al. |
| 2015/0170427 A1 | 6/2015 | Hansen et al. |
| 2015/0170440 A1 | 6/2015 | Davidson et al. |
| 2015/0170653 A1 | 6/2015 | Berndt et al. |
| 2015/0171368 A1 | 6/2015 | Vronsky et al. |
| 2015/0172236 A1 | 6/2015 | Meijer et al. |
| 2015/0172306 A1 | 6/2015 | Kim et al. |
| 2015/0172919 A1 | 6/2015 | Basnayake et al. |
| 2015/0175067 A1 | 6/2015 | Keaveny et al. |
| 2015/0175161 A1 | 6/2015 | Breed |
| 2015/0175397 A1 | 6/2015 | Lynn et al. |
| 2015/0177007 A1 | 6/2015 | Su et al. |
| 2015/0177010 A1 | 6/2015 | Abramson et al. |
| 2015/0177521 A1 | 6/2015 | Abdollahi et al. |
| 2015/0178578 A1 | 6/2015 | Hampiholi |
| 2015/0178661 A1 | 6/2015 | Keaveny et al. |
| 2015/0178700 A1 | 6/2015 | Forbes, Jr. |
| 2015/0178723 A1 | 6/2015 | Khan et al. |
| 2015/0178990 A1 | 6/2015 | Ng-Thow-Hing et al. |
| 2015/0179004 A1 | 6/2015 | Davidson et al. |
| 2015/0180701 A1 | 6/2015 | Van Greunen et al. |
| 2015/0180763 A1 | 6/2015 | Boerjesson |
| 2015/0181029 A1 | 6/2015 | Shmunis et al. |
| 2015/0181032 A1 | 6/2015 | Silver et al. |
| 2015/0181417 A1 | 6/2015 | Snider et al. |

(56) References Cited

U.S. PATENT DOCUMENTS

| | | |
|---|---|---|
| 2015/0185031 A1 | 7/2015 | Davidson |
| 2015/0185218 A1 | 7/2015 | Vernick et al. |
| 2015/0185825 A1 | 7/2015 | Mullins |
| 2015/0186094 A1 | 7/2015 | Ricci |
| 2015/0187019 A1 | 7/2015 | Fernandes et al. |
| 2015/0187137 A1 | 7/2015 | Mullins |
| 2015/0187138 A1 | 7/2015 | Mullins |
| 2015/0187357 A1 | 7/2015 | Xia et al. |
| 2015/0188949 A1 | 7/2015 | Mahaffey et al. |
| 2015/0188961 A1 | 7/2015 | Ricci |
| 2015/0189559 A1 | 7/2015 | White et al. |
| 2015/0189671 A1 | 7/2015 | Silver |
| 2015/0191150 A1 | 7/2015 | Van Wiemeersch et al. |
| 2015/0192421 A1 | 7/2015 | Barrett et al. |
| 2015/0192423 A1 | 7/2015 | Van Wiemeersch et al. |
| 2015/0192495 A1 | 7/2015 | Boerhout |
| 2015/0192500 A1 | 7/2015 | Boerhout |
| 2015/0192682 A1 | 7/2015 | Valentino et al. |
| 2015/0193007 A1 | 7/2015 | Ricci |
| 2015/0193729 A1 | 7/2015 | Van Wiemeersch et al. |
| 2015/0193857 A1 | 7/2015 | Reed et al. |
| 2015/0193858 A1 | 7/2015 | Reed et al. |
| 2015/0193861 A1 | 7/2015 | Reed et al. |
| 2015/0193924 A1 | 7/2015 | Schumacher |
| 2015/0193987 A1 | 7/2015 | Peeters et al. |
| 2015/0193994 A1 | 7/2015 | McQuade |
| 2015/0193996 A1 | 7/2015 | Van Wiemeersch et al. |
| 2015/0195146 A1 | 7/2015 | Di Pietro et al. |
| 2015/0195186 A1 | 7/2015 | Li et al. |
| 2015/0195290 A1 | 7/2015 | Bandini et al. |
| 2015/0195408 A1 | 7/2015 | Daye et al. |
| 2015/0197247 A1 | 7/2015 | Ichinokawa |
| 2015/0197248 A1 | 7/2015 | Breed et al. |
| 2015/0198450 A1 | 7/2015 | Davidson |
| 2015/0198451 A1 | 7/2015 | Davidson |
| 2015/0198459 A1 | 7/2015 | MacNeille et al. |
| 2015/0198946 A1 | 7/2015 | Philpott et al. |
| 2015/0199855 A1 | 7/2015 | Alam et al. |
| 2015/0199965 A1 | 7/2015 | Leak et al. |
| 2015/0200782 A1 | 7/2015 | Horne et al. |
| 2015/0200811 A1 | 7/2015 | Kasslin et al. |
| 2015/0200957 A1 | 7/2015 | Zhang et al. |
| 2015/0201297 A1 | 7/2015 | Sauerbrey et al. |
| 2015/0201361 A1 | 7/2015 | Merino Gonzalez et al. |
| 2015/0202962 A1 | 7/2015 | Habashima et al. |
| 2015/0202976 A1 | 7/2015 | Bridges et al. |
| 2015/0205367 A1 | 7/2015 | Bandt-Horn |
| 2015/0205482 A1 | 7/2015 | Johnson et al. |
| 2015/0206356 A1 | 7/2015 | Davidson |
| 2015/0207809 A1 | 7/2015 | MacAulay |
| 2015/0207885 A1 | 7/2015 | Tagg |
| 2015/0208140 A1 | 7/2015 | Choi et al. |
| 2015/0208457 A1 | 7/2015 | Thanayankizil et al. |
| 2015/0210168 A1 | 7/2015 | Pykkonen et al. |
| 2015/0210217 A1 | 7/2015 | Taylor et al. |
| 2015/0213065 A1 | 7/2015 | Sisk et al. |
| 2015/0213432 A1 | 7/2015 | Johnson, Jr. |
| 2015/0213433 A1 | 7/2015 | Khan |
| 2015/0215459 A1 | 7/2015 | Kirchhoff et al. |
| 2015/0215954 A1 | 7/2015 | Pal et al. |
| 2015/0215986 A1 | 7/2015 | Lei et al. |
| 2015/0217291 A1 | 8/2015 | Wilson et al. |
| 2015/0218872 A1 | 8/2015 | Breed |
| 2015/0220150 A1 | 8/2015 | Plagemann et al. |
| 2015/0220597 A1 | 8/2015 | Simhadri et al. |
| 2015/0220995 A1 | 8/2015 | Guyot et al. |
| 2015/0222553 A1 | 8/2015 | Macdonald et al. |
| 2015/0222759 A1 | 8/2015 | Baker et al. |
| 2015/0223043 A1 | 8/2015 | Miluzzo et al. |
| 2015/0223151 A1 | 8/2015 | Lei et al. |
| 2015/0223273 A1 | 8/2015 | Macdonald et al. |
| 2015/0224845 A1 | 8/2015 | Anderson et al. |
| 2015/0225188 A1 | 8/2015 | Belluk et al. |
| 2015/0226135 A1* | 8/2015 | Geveci ............... F02D 41/1463 701/22 |
| 2015/0227227 A1 | 8/2015 | Myers et al. |
| 2015/0227890 A1 | 8/2015 | Bednarek et al. |
| 2015/0228077 A1 | 8/2015 | Menashe et al. |
| 2015/0229604 A1 | 8/2015 | Pal et al. |
| 2015/0230048 A1 | 8/2015 | Parameshwaran |
| 2015/0231491 A1 | 8/2015 | Hwang et al. |
| 2015/0231524 A1 | 8/2015 | Fisher |
| 2015/0231982 A1 | 8/2015 | Li et al. |
| 2015/0231985 A1 | 8/2015 | Li |
| 2015/0231986 A1 | 8/2015 | Li |
| 2015/0232065 A1 | 8/2015 | Ricci et al. |
| 2015/0232083 A1 | 8/2015 | Yu et al. |
| 2015/0234477 A1 | 8/2015 | Abovitz et al. |
| 2015/0234767 A1 | 8/2015 | Tatge et al. |
| 2015/0235088 A1 | 8/2015 | Abovitz et al. |
| 2015/0235370 A1 | 8/2015 | Abovitz et al. |
| 2015/0235441 A1 | 8/2015 | Abovitz et al. |
| 2015/0235447 A1 | 8/2015 | Abovitz et al. |
| 2015/0236927 A1 | 8/2015 | Langer et al. |
| 2015/0237128 A1 | 8/2015 | Castro et al. |
| 2015/0237537 A1 | 8/2015 | Stimpson et al. |
| 2015/0237552 A1 | 8/2015 | White et al. |
| 2015/0237661 A1 | 8/2015 | Farrell et al. |
| 2015/0238073 A1 | 8/2015 | Charles et al. |
| 2015/0238857 A1 | 8/2015 | Amaitis et al. |
| 2015/0239398 A1 | 8/2015 | Kaplan et al. |
| 2015/0239478 A1 | 8/2015 | Dorum et al. |
| 2015/0241225 A1 | 8/2015 | Liu et al. |
| 2015/0241230 A1 | 8/2015 | Davidson |
| 2015/0241231 A1 | 8/2015 | Abramson et al. |
| 2015/0241295 A1 | 8/2015 | Fuscone et al. |
| 2015/0241705 A1 | 8/2015 | Abovitz et al. |
| 2015/0241959 A1 | 8/2015 | Abovitz et al. |
| 2015/0242113 A1 | 8/2015 | Nguyen Thien et al. |
| 2015/0242258 A1 | 8/2015 | Brouk et al. |
| 2015/0242575 A1 | 8/2015 | Abovitz et al. |
| 2015/0242816 A1 | 8/2015 | Srimushnam |
| 2015/0242943 A1 | 8/2015 | Abovitz et al. |
| 2015/0243100 A1 | 8/2015 | Abovitz et al. |
| 2015/0243105 A1 | 8/2015 | Abovitz et al. |
| 2015/0243106 A1 | 8/2015 | Abovitz et al. |
| 2015/0244656 A1 | 8/2015 | Choi et al. |
| 2015/0244805 A1 | 8/2015 | Hampiholi et al. |
| 2015/0244806 A1 | 8/2015 | Renac et al. |
| 2015/0244826 A1 | 8/2015 | Stenneth |
| 2015/0244877 A1 | 8/2015 | Grant et al. |
| 2015/0245215 A1 | 8/2015 | Murphy et al. |
| 2015/0772708 | 8/2015 | Addepalli et al. |
| 2015/0247723 A1 | 9/2015 | Abovitz et al. |
| 2015/0247975 A1 | 9/2015 | Abovitz et al. |
| 2015/0247976 A1 | 9/2015 | Abovitz et al. |
| 2015/0248169 A1 | 9/2015 | Abovitz et al. |
| 2015/0248170 A1 | 9/2015 | Abovitz et al. |
| 2015/0248286 A1 | 9/2015 | Kotani et al. |
| 2015/0248287 A1 | 9/2015 | Kotani et al. |
| 2015/0248737 A1 | 9/2015 | Forbes, Jr. |
| 2015/0248787 A1 | 9/2015 | Abovitz et al. |
| 2015/0248788 A1 | 9/2015 | Abovitz et al. |
| 2015/0248789 A1 | 9/2015 | Abovitz et al. |
| 2015/0248791 A1 | 9/2015 | Abovitz et al. |
| 2015/0248792 A1 | 9/2015 | Abovitz et al. |
| 2015/0248793 A1 | 9/2015 | Abovitz et al. |
| 2015/0248795 A1 | 9/2015 | Davidson |
| 2015/0248881 A1 | 9/2015 | Holdren et al. |
| 2015/0249685 A1 | 9/2015 | Crane et al. |
| 2015/0249744 A1 | 9/2015 | Michaelis et al. |
| 2015/0250385 A1 | 9/2015 | Ahmed et al. |
| 2015/0250396 A1 | 9/2015 | Ahmed et al. |
| 2015/0251074 A1 | 9/2015 | Ahmed et al. |
| 2015/0252757 A1 | 9/2015 | McAlister |
| 2015/0254357 A1 | 9/2015 | Thota et al. |
| 2015/0254570 A1 | 9/2015 | Florence et al. |
| 2015/0254592 A1 | 9/2015 | Davidson |
| 2015/0254719 A1 | 9/2015 | Barfield, Jr. et al. |
| 2015/0254781 A1 | 9/2015 | Binion et al. |
| 2015/0255063 A1 | 9/2015 | Talwar et al. |
| 2015/0256377 A1 | 9/2015 | Dhananjay et al. |
| 2015/0256444 A1 | 9/2015 | Kaplan et al. |
| 2015/0256467 A1 | 9/2015 | Badiee et al. |

(56) References Cited

U.S. PATENT DOCUMENTS

| | | |
|---|---|---|
| 2015/0256617 A1 | 9/2015 | Klose et al. |
| 2015/0257080 A1 | 9/2015 | Rostagno et al. |
| 2015/0259020 A1 | 9/2015 | Hoffmann et al. |
| 2015/0260527 A1 | 9/2015 | Fink |
| 2015/0260529 A1 | 9/2015 | Petersen |
| 2015/0261554 A1 | 9/2015 | Kotani et al. |
| 2015/0261691 A1 | 9/2015 | Greco et al. |
| 2015/0261812 A1 | 9/2015 | Pappula |
| 2015/0261813 A1 | 9/2015 | Pappula |
| 2015/0261828 A1 | 9/2015 | Pappula |
| 2015/0261856 A1 | 9/2015 | Pappula |
| 2015/0261866 A1 | 9/2015 | Cerrone |
| 2015/0262238 A1 | 9/2015 | Aitchison et al. |
| 2015/0262433 A1 | 9/2015 | Davidson |
| 2015/0262483 A1 | 9/2015 | Sugawara |
| 2015/0262484 A1 | 9/2015 | Victor et al. |
| 2015/0263856 A1 | 9/2015 | Leboeuf et al. |
| 2015/0264089 A1 | 9/2015 | Ramanchandran et al. |
| 2015/0264130 A1 | 9/2015 | Pappula |
| 2015/0264138 A1 | 9/2015 | Watts, Jr. et al. |
| 2015/0264427 A1 | 9/2015 | Hulse et al. |
| 2015/0264480 A1 | 9/2015 | Talwar et al. |
| 2015/0264549 A1 | 9/2015 | Feher |
| 2015/0264554 A1 | 9/2015 | Addepalli et al. |
| 2015/0264626 A1 | 9/2015 | Perdomo |
| 2015/0264627 A1 | 9/2015 | Perdomo |
| 2015/0268054 A1 | 9/2015 | Stankoulov |
| 2015/0268055 A1 | 9/2015 | Gueziec |
| 2015/0268056 A1 | 9/2015 | Gueziec |
| 2015/0268355 A1 | 9/2015 | Valentino et al. |
| 2015/0268662 A1 | 9/2015 | Butter et al. |
| 2015/0268724 A1 | 9/2015 | Levesque et al. |
| 2015/0268936 A1 | 9/2015 | Huber et al. |
| 2015/0268949 A1 | 9/2015 | Huber et al. |
| 2015/0269130 A1 | 9/2015 | Huber et al. |
| 2015/0269250 A1 | 9/2015 | Basovnik et al. |
| 2015/0269383 A1 | 9/2015 | Lang et al. |
| 2015/0269489 A1 | 9/2015 | Buhler et al. |
| 2015/0269524 A1 | 9/2015 | Greene et al. |
| 2015/0269617 A1 | 9/2015 | Mikurak |
| 2015/0269790 A1 | 9/2015 | Batcheller et al. |
| 2015/0269791 A1 | 9/2015 | Amigo et al. |
| 2015/0270968 A1 | 9/2015 | Nairn et al. |
| 2015/0271019 A1 | 9/2015 | Reich et al. |
| 2015/0271132 A1 | 9/2015 | Erb |
| 2015/0271201 A1 | 9/2015 | Ruvio et al. |
| 2015/0272694 A1 | 10/2015 | Charles |
| 2015/0274017 A1 | 10/2015 | Frye |
| 2015/0276254 A1 | 10/2015 | Nemcek et al. |
| 2015/0276417 A1 | 10/2015 | Yoshizumi |
| 2015/0278814 A1 | 10/2015 | Jaffe |
| 2015/0278950 A1 | 10/2015 | El-Sakkout et al. |
| 2015/0281155 A1 | 10/2015 | Cue et al. |
| 2015/0281156 A1 | 10/2015 | Beausoleil et al. |
| 2015/0281906 A1 | 10/2015 | Tseng et al. |
| 2015/0282041 A1 | 10/2015 | Batchu et al. |
| 2015/0282061 A1 | 10/2015 | Matthews et al. |
| 2015/0282717 A1 | 10/2015 | McCombie et al. |
| 2015/0284103 A1 | 10/2015 | Swann |
| 2015/0285642 A1 | 10/2015 | Tseng et al. |
| 2015/0286663 A1 | 10/2015 | Mangan et al. |
| 2015/0286975 A1 | 10/2015 | Berlehner et al. |
| 2015/0288622 A1 | 10/2015 | Fargano et al. |
| 2015/0288634 A1 | 10/2015 | Emigh et al. |
| 2015/0289116 A1 | 10/2015 | Lei et al. |
| 2015/0291055 A1 | 10/2015 | He |
| 2015/0291164 A1 | 10/2015 | Yoshizumi |
| 2015/0293644 A1 | 10/2015 | Watanabe et al. |
| 2015/0293668 A1 | 10/2015 | Kurabayashi |
| 2015/0293755 A1 | 10/2015 | Robins et al. |
| 2015/0295808 A1 | 10/2015 | OMalley et al. |
| 2015/0295869 A1 | 10/2015 | Li et al. |
| 2015/0295910 A1 | 10/2015 | Nairn |
| 2015/0296037 A1 | 10/2015 | Guan et al. |
| 2015/0296224 A1 | 10/2015 | Davis |
| 2015/0296319 A1 | 10/2015 | Shenoy et al. |
| 2015/0296436 A1 | 10/2015 | Terpstra et al. |
| 2015/0296441 A1 | 10/2015 | Elnajjar |
| 2015/0297082 A1 | 10/2015 | Hoggle |
| 2015/0297311 A1 | 10/2015 | Tesar |
| 2015/0298153 A1 | 10/2015 | Baker et al. |
| 2015/0298555 A1 | 10/2015 | Bennett et al. |
| 2015/0301527 A1 | 10/2015 | Erickson et al. |
| 2015/0301528 A1 | 10/2015 | Fredriksson |
| 2015/0301592 A1 | 10/2015 | Miller |
| 2015/0301599 A1 | 10/2015 | Miller |
| 2015/0301732 A1 | 10/2015 | Henderson et al. |
| 2015/0301787 A1 | 10/2015 | Greco et al. |
| 2015/0301797 A1 | 10/2015 | Miller |
| 2015/0301819 A1 | 10/2015 | Sumcad et al. |
| 2015/0302250 A1 | 10/2015 | Miller |
| 2015/0302625 A1 | 10/2015 | Greco et al. |
| 2015/0302642 A1 | 10/2015 | Miller |
| 2015/0302643 A1 | 10/2015 | Miller |
| 2015/0302644 A1 | 10/2015 | Miller et al. |
| 2015/0302652 A1 | 10/2015 | Miller et al. |
| 2015/0302655 A1 | 10/2015 | Miller et al. |
| 2015/0302656 A1 | 10/2015 | Miller et al. |
| 2015/0302657 A1 | 10/2015 | Miller |
| 2015/0302658 A1 | 10/2015 | OConnor et al. |
| 2015/0302659 A1 | 10/2015 | OConnor et al. |
| 2015/0302660 A1 | 10/2015 | OConnor et al. |
| 2015/0302661 A1 | 10/2015 | Miller |
| 2015/0302662 A1 | 10/2015 | Miller |
| 2015/0302663 A1 | 10/2015 | Miller |
| 2015/0302664 A1 | 10/2015 | Miller |
| 2015/0302665 A1 | 10/2015 | Miller |
| 2015/0302667 A1 | 10/2015 | Punjabi et al. |
| 2015/0302732 A1 | 10/2015 | Wright et al. |
| 2015/0302735 A1 | 10/2015 | Geerlings et al. |
| 2015/0302739 A1 | 10/2015 | Berziel et al. |
| 2015/0302851 A1 | 10/2015 | Talwar et al. |
| 2015/0304207 A1 | 10/2015 | Axnas et al. |
| 2015/0304504 A1 | 10/2015 | McGuigan et al. |
| 2015/0304797 A1 | 10/2015 | Rhoads et al. |
| 2015/0304935 A1 | 10/2015 | Silver |
| 2015/0307082 A1 | 10/2015 | Nallapa et al. |
| 2015/0307106 A1 | 10/2015 | Rao et al. |
| 2015/0309263 A2 | 10/2015 | Abovitz et al. |
| 2015/0309264 A1 | 10/2015 | Abovitz et al. |
| 2015/0309535 A1 | 10/2015 | Connor |
| 2015/0309874 A1 | 10/2015 | Liang et al. |
| 2015/0309981 A1 | 10/2015 | Brav et al. |
| 2015/0310020 A1 | 10/2015 | Brav et al. |
| 2015/0310389 A1 | 10/2015 | Crimm et al. |
| 2015/0310652 A1 | 10/2015 | Dobson |
| 2015/0311903 A1 | 10/2015 | Frampton |
| 2015/0312380 A1 | 10/2015 | Sauerbrey et al. |
| 2015/0312404 A1 | 10/2015 | Abramson et al. |
| 2015/0312415 A1 | 10/2015 | Anisimov et al. |
| 2015/0312801 A1 | 10/2015 | Khan et al. |
| 2015/0314789 A1 | 11/2015 | Roos et al. |
| 2015/0316406 A1 | 11/2015 | Gale et al. |
| 2015/0316980 A1 | 11/2015 | Miller |
| 2015/0316982 A1 | 11/2015 | Miller |
| 2015/0317515 A1 | 11/2015 | Lake et al. |
| 2015/0317745 A1 | 11/2015 | Collins et al. |
| 2015/0317839 A1 | 11/2015 | Miller |
| 2015/0318705 A1 | 11/2015 | Lucas et al. |
| 2015/0319044 A1 | 11/2015 | Brockbank et al. |
| 2015/0319116 A1 | 11/2015 | Chavali et al. |
| 2015/0319170 A1 | 11/2015 | Grossemy |
| 2015/0319473 A1 | 11/2015 | Farkash et al. |
| 2015/0319511 A1 | 11/2015 | Droste et al. |
| 2015/0319551 A1 | 11/2015 | Grost et al. |
| 2015/0319681 A1 | 11/2015 | Nathanson et al. |
| 2015/0324058 A1 | 11/2015 | Sarnoff |
| 2015/0324270 A1 | 11/2015 | Li et al. |
| 2015/0324469 A1 | 11/2015 | Keyngnaert et al. |
| 2015/0324568 A1 | 11/2015 | Publicover et al. |
| 2015/0324736 A1 | 11/2015 | Sheets et al. |
| 2015/0324791 A1 | 11/2015 | Khan |
| 2015/0325093 A1 | 11/2015 | Hannah et al. |
| 2015/0325123 A1 | 11/2015 | Gueziec |

(56) References Cited

U.S. PATENT DOCUMENTS

| | | |
|---|---|---|
| 2015/0326447 A1 | 11/2015 | Yoon et al. |
| 2015/0326488 A1 | 11/2015 | Yousefi et al. |
| 2015/0326545 A1 | 11/2015 | Khan |
| 2015/0326919 A1 | 11/2015 | Kitano et al. |
| 2015/0330803 A1 | 11/2015 | Okuda et al. |
| 2015/0330804 A1 | 11/2015 | Okuda et al. |
| 2015/0331398 A1 | 11/2015 | Love |
| 2015/0331422 A1 | 11/2015 | Hartung et al. |
| 2015/0331686 A1 | 11/2015 | Petersen et al. |
| 2015/0332174 A1 | 11/2015 | Folkman et al. |
| 2015/0332242 A1 | 11/2015 | Perry et al. |
| 2015/0332419 A9 | 11/2015 | Budlong |
| 2015/0332441 A1 | 11/2015 | Hogasten et al. |
| 2015/0333378 A1 | 11/2015 | Chang et al. |
| 2015/0334176 A1 | 11/2015 | Brouk et al. |
| 2015/0334248 A1 | 11/2015 | Yin et al. |
| 2015/0334249 A1 | 11/2015 | Yin et al. |
| 2015/0334434 A1 | 11/2015 | Green et al. |
| 2015/0334543 A1 | 11/2015 | Yin et al. |
| 2015/0335978 A1 | 11/2015 | Syed et al. |
| 2015/0337400 A1 | 11/2015 | Wilson et al. |
| 2015/0338226 A1 | 11/2015 | Mason et al. |
| 2015/0338525 A1 | 11/2015 | Valentino et al. |
| 2015/0339570 A1 | 11/2015 | Scheffler |
| 2015/0339593 A1 | 11/2015 | Hakeem |
| 2015/0339857 A1 | 11/2015 | OConnor et al. |
| 2015/0341005 A1 | 11/2015 | Talwar et al. |
| 2015/0341241 A1 | 11/2015 | Robertson |
| 2015/0341268 A1 | 11/2015 | Cardona et al. |
| 2015/0341296 A1 | 11/2015 | Wieneke et al. |
| 2015/0341757 A1 | 11/2015 | Mannikka |
| 2015/0341862 A1 | 11/2015 | Lei et al. |
| 2015/0344055 A1 | 12/2015 | Hannah et al. |
| 2015/0347005 A1 | 12/2015 | Hou et al. |
| 2015/0347429 A1 | 12/2015 | Rajamanickam et al. |
| 2015/0347848 A1 | 12/2015 | Gurovich et al. |
| 2015/0348339 A1 | 12/2015 | Ohno et al. |
| 2015/0348543 A1 | 12/2015 | Zhao et al. |
| 2015/0350075 A1 | 12/2015 | Li et al. |
| 2015/0350177 A1 | 12/2015 | Sharp et al. |
| 2015/0350711 A1 | 12/2015 | Guzik |
| 2015/0350758 A1 | 12/2015 | Zhao et al. |
| 2015/0350967 A1 | 12/2015 | Gustafsson et al. |
| 2015/0350995 A1 | 12/2015 | Dudai et al. |
| 2015/0355855 A1 | 12/2015 | Cronin |
| 2015/0355988 A1 | 12/2015 | Lee et al. |
| 2015/0356104 A9 | 12/2015 | Kagan et al. |
| 2015/0356497 A1 | 12/2015 | Reeder et al. |
| 2015/0356781 A1 | 12/2015 | Miller |
| 2015/0356782 A1 | 12/2015 | Miller et al. |
| 2015/0356783 A1 | 12/2015 | Miller et al. |
| 2015/0356784 A1 | 12/2015 | Miller et al. |
| 2015/0356794 A1 | 12/2015 | Prakah-Asante et al. |
| 2015/0358074 A1 | 12/2015 | Yarnold et al. |
| 2015/0358234 A1 | 12/2015 | Krieger |
| 2015/0358352 A1 | 12/2015 | Chasin et al. |
| 2015/0358461 A1 | 12/2015 | Klaban |
| 2015/0358525 A1 | 12/2015 | Lord |
| 2015/0358762 A1 | 12/2015 | Park |
| 2015/0358852 A1 | 12/2015 | Richley et al. |
| 2015/0360671 A1 | 12/2015 | Williams et al. |
| 2015/0362995 A1 | 12/2015 | Norieda |
| 2015/0363563 A1 | 12/2015 | Hallwachs |
| 2015/0365255 A1 | 12/2015 | Gunther |
| 2015/0365328 A1 | 12/2015 | Luke et al. |
| 2015/0365519 A1 | 12/2015 | Ishfaq et al. |
| 2015/0365664 A1 | 12/2015 | Yousefi et al. |
| 2015/0365846 A1 | 12/2015 | Mattsson et al. |
| 2015/0365981 A1 | 12/2015 | Thanayankizil et al. |
| 2015/0366504 A1 | 12/2015 | Connor |
| 2015/0367736 A1 | 12/2015 | Salomonsen |
| 2015/0368566 A1 | 12/2015 | Young et al. |
| 2015/0369138 A1 | 12/2015 | Phillips et al. |
| 2015/0369505 A1 | 12/2015 | Malve et al. |
| 2015/0369660 A1 | 12/2015 | Yu |
| 2015/0370248 A1 | 12/2015 | Hilliges et al. |
| 2015/0370935 A1 | 12/2015 | Starr |
| 2015/0371153 A1 | 12/2015 | Lohmeier et al. |
| 2015/0371226 A1 | 12/2015 | Hurley et al. |
| 2015/0371336 A1 | 12/2015 | Brandman et al. |
| 2015/0371459 A1 | 12/2015 | Doughty et al. |
| 2015/0371465 A1 | 12/2015 | Garrett et al. |
| 2015/0372954 A1 | 12/2015 | Dubman et al. |
| 2015/0373022 A1 | 12/2015 | Dubman et al. |
| 2015/0373482 A1 | 12/2015 | Barnard et al. |
| 2015/0373502 A1 | 12/2015 | Wormald et al. |
| 2015/0373554 A1 | 12/2015 | Freda et al. |
| 2015/0373583 A1 | 12/2015 | Yousefi et al. |
| 2015/0378433 A1 | 12/2015 | Savastinuk et al. |
| 2015/0378574 A1 | 12/2015 | Gallo et al. |
| 2015/0379303 A1 | 12/2015 | LaFever et al. |
| 2015/0379408 A1 | 12/2015 | Kapoor et al. |
| 2015/0379765 A1 | 12/2015 | Gallo et al. |
| 2015/0379770 A1 | 12/2015 | Haley, Jr. et al. |
| 2015/0379788 A1 | 12/2015 | Raynal et al. |
| 2015/0379995 A1 | 12/2015 | Sims et al. |
| 2015/0381297 A1 | 12/2015 | Cepuran et al. |
| 2015/0381441 A1 | 12/2015 | Schalke et al. |
| 2015/0381543 A1 | 12/2015 | Hong et al. |
| 2015/0381547 A1 | 12/2015 | Mandanapu et al. |
| 2015/0381666 A1 | 12/2015 | Rustogi |
| 2015/0382084 A1 | 12/2015 | Gallo et al. |
| 2015/0382149 A1 | 12/2015 | Annett |
| 2015/0382263 A1 | 12/2015 | Jain et al. |
| 2015/0382278 A1 | 12/2015 | Fallon et al. |
| 2015/0382286 A1 | 12/2015 | Daoud |
| 2015/0382319 A1 | 12/2015 | George |
| 2016/0001765 A1 | 1/2016 | Shukla et al. |
| 2016/0003635 A1 | 1/2016 | Jung et al. |
| 2016/0003636 A1 | 1/2016 | Ng-Thow-Hing et al. |
| 2016/0003637 A1 | 1/2016 | Andersen |
| 2016/0004502 A1 | 1/2016 | Winkelman et al. |
| 2016/0004686 A1 | 1/2016 | Kruglick |
| 2016/0004788 A1 | 1/2016 | Elgort et al. |
| 2016/0007203 A1 | 1/2016 | Hassan et al. |
| 2016/0009304 A1 | 1/2016 | Kumar et al. |
| 2016/0011861 A1 | 1/2016 | Barthel et al. |
| 2016/0012215 A1 | 1/2016 | Ristock et al. |
| 2016/0012401 A1 | 1/2016 | Coloney et al. |
| 2016/0012465 A1 | 1/2016 | Sharp |
| 2016/0012650 A1 | 1/2016 | Coloney et al. |
| 2016/0012758 A1 | 1/2016 | Moloney et al. |
| 2016/0012813 A1 | 1/2016 | Every et al. |
| 2016/0013979 A1 | 1/2016 | Coloney et al. |
| 2016/0013998 A1 | 1/2016 | Coloney et al. |
| 2016/0014057 A1 | 1/2016 | Gudla et al. |
| 2016/0014070 A1 | 1/2016 | Adkins |
| 2016/0014151 A1 | 1/2016 | Prakash |
| 2016/0014450 A1 | 1/2016 | Hulse et al. |
| 2016/0015273 A1 | 1/2016 | Millikan |
| 2016/0016096 A1 | 1/2016 | Fisher et al. |
| 2016/0016523 A1 | 1/2016 | Yousefi et al. |
| 2016/0016626 A1 | 1/2016 | Thompson |
| 2016/0016627 A1 | 1/2016 | Thompson |
| 2016/0016628 A1 | 1/2016 | Thompson |
| 2016/0016630 A1 | 1/2016 | Thompson |
| 2016/0016631 A1 | 1/2016 | Thompson |
| 2016/0016633 A1 | 1/2016 | Thompson |
| 2016/0016634 A1 | 1/2016 | Thompson |
| 2016/0016635 A1 | 1/2016 | Thompson |
| 2016/0016636 A1 | 1/2016 | Thompson |
| 2016/0016651 A1 | 1/2016 | Anderson et al. |
| 2016/0019238 A1 | 1/2016 | Mazniker et al. |
| 2016/0019532 A1 | 1/2016 | Isaacson et al. |
| 2016/0019556 A1 | 1/2016 | Mazniker et al. |
| 2016/0019592 A1 | 1/2016 | Muttineni et al. |
| 2016/0019651 A1 | 1/2016 | Grimm et al. |
| 2016/0019980 A1 | 1/2016 | Jeong |
| 2016/0020864 A1 | 1/2016 | Thubert et al. |
| 2016/0020943 A1 | 1/2016 | Diab et al. |
| 2016/0020967 A1 | 1/2016 | Thubert et al. |
| 2016/0020979 A1 | 1/2016 | Thubert et al. |
| 2016/0020987 A1 | 1/2016 | Wetterwald et al. |
| 2016/0020988 A1 | 1/2016 | Hui et al. |

(56) References Cited

U.S. PATENT DOCUMENTS

| | | |
|---|---|---|
| 2016/0020997 A1 | 1/2016 | Hui et al. |
| 2016/0021006 A1 | 1/2016 | Vasseur et al. |
| 2016/0021009 A1 | 1/2016 | Hui et al. |
| 2016/0021010 A1 | 1/2016 | Vasseur et al. |
| 2016/0021011 A1 | 1/2016 | Vasseur et al. |
| 2016/0021013 A1 | 1/2016 | Vasseur et al. |
| 2016/0021014 A1 | 1/2016 | Wetterwald et al. |
| 2016/0021017 A1 | 1/2016 | Thubert et al. |
| 2016/0021018 A1 | 1/2016 | Hui et al. |
| 2016/0021038 A1 | 1/2016 | Woo et al. |
| 2016/0021039 A1 | 1/2016 | Woo et al. |
| 2016/0021049 A1 | 1/2016 | Virtanen et al. |
| 2016/0021116 A1 | 1/2016 | Maguire et al. |
| 2016/0021126 A1 | 1/2016 | Vasseur et al. |
| 2016/0021152 A1 | 1/2016 | Maguire et al. |
| 2016/0021484 A1 | 1/2016 | Park et al. |
| 2016/0021596 A1 | 1/2016 | Hui et al. |
| 2016/0021647 A1 | 1/2016 | Hui et al. |
| 2016/0022520 A1 | 1/2016 | Streeter et al. |
| 2016/0023621 A1 | 1/2016 | Books et al. |
| 2016/0025497 A1 | 1/2016 | Baalu et al. |
| 2016/0025514 A1 | 1/2016 | Pitchford et al. |
| 2016/0025979 A1 | 1/2016 | Border et al. |
| 2016/0026239 A1 | 1/2016 | Border et al. |
| 2016/0026253 A1 | 1/2016 | Bradski et al. |
| 2016/0026476 A1 | 1/2016 | Kempka |
| 2016/0026542 A1 | 1/2016 | Vasseur et al. |
| 2016/0026659 A1 | 1/2016 | Harley et al. |
| 2016/0026729 A1 | 1/2016 | Gil et al. |
| 2016/0026991 A1 | 1/2016 | Murdoch et al. |
| 2016/0027029 A1 | 1/2016 | Poole |
| 2016/0027045 A1 | 1/2016 | Kurian et al. |
| 2016/0027054 A1 | 1/2016 | Leppanen et al. |
| 2016/0027273 A1 | 1/2016 | Golden |
| 2016/0028011 A1 | 1/2016 | Choi et al. |
| 2016/0028243 A1 | 1/2016 | Schatz et al. |
| 2016/0028605 A1 | 1/2016 | Gil et al. |
| 2016/0028609 A1 | 1/2016 | Hui et al. |
| 2016/0028615 A1 | 1/2016 | Lee et al. |
| 2016/0028658 A1 | 1/2016 | Lambeth et al. |
| 2016/0028668 A1 | 1/2016 | Brouk et al. |
| 2016/0028722 A1 | 1/2016 | Kocher et al. |
| 2016/0028729 A1 | 1/2016 | Brouk et al. |
| 2016/0028750 A1 | 1/2016 | Di Pietro et al. |
| 2016/0028751 A1 | 1/2016 | Cruz Mota et al. |
| 2016/0028752 A1 | 1/2016 | Di Pietro et al. |
| 2016/0028753 A1 | 1/2016 | Di Pietro et al. |
| 2016/0028754 A1 | 1/2016 | Cruz Mota et al. |
| 2016/0028755 A1 | 1/2016 | Vasseur et al. |
| 2016/0028762 A1 | 1/2016 | Di Pietro et al. |
| 2016/0028763 A1 | 1/2016 | Cruz Mota et al. |
| 2016/0028764 A1 | 1/2016 | Vasseur et al. |
| 2016/0028778 A1 | 1/2016 | Terpstra et al. |
| 2016/0028827 A1 | 1/2016 | Ahmed et al. |
| 2016/0028899 A1 | 1/2016 | Xiao et al. |
| 2016/0029155 A1 | 1/2016 | Kerr et al. |
| 2016/0029167 A1 | 1/2016 | Zubas et al. |
| 2016/0029182 A1 | 1/2016 | Leppanen |
| 2016/0029194 A1 | 1/2016 | Jang et al. |
| 2016/0029346 A1 | 1/2016 | Suresh et al. |
| 2016/0029368 A1 | 1/2016 | Borenstein et al. |
| 2016/0029422 A1 | 1/2016 | Thorn et al. |
| 2016/0030825 A1 | 2/2016 | Mazzanobile et al. |
| 2016/0033264 A1 | 2/2016 | Rogers et al. |
| 2016/0033985 A1 | 2/2016 | Gulli et al. |
| 2016/0034133 A1 | 2/2016 | Wilson et al. |
| 2016/0034148 A1 | 2/2016 | Wilson et al. |
| 2016/0034152 A1 | 2/2016 | Wilson et al. |
| 2016/0034158 A1 | 2/2016 | Livesay et al. |
| 2016/0034166 A1 | 2/2016 | Wilson et al. |
| 2016/0034167 A1 | 2/2016 | Wilson et al. |
| 2016/0034329 A1 | 2/2016 | Larson et al. |
| 2016/0034764 A1 | 2/2016 | Connor |
| 2016/0034867 A1 | 2/2016 | Isaacson et al. |
| 2016/0034876 A1 | 2/2016 | Speiser et al. |
| 2016/0034879 A1 | 2/2016 | Dar |
| 2016/0034896 A1 | 2/2016 | OBrien et al. |
| 2016/0034941 A1 | 2/2016 | Isaacson et al. |
| 2016/0034954 A1 | 2/2016 | Tollinger et al. |
| 2016/0034994 A1 | 2/2016 | Soldate |
| 2016/0035005 A1 | 2/2016 | Kumar et al. |
| 2016/0035052 A1 | 2/2016 | Tran |
| 2016/0035096 A1 | 2/2016 | Rudow et al. |
| 2016/0035144 A1 | 2/2016 | Adimoolam et al. |
| 2016/0035148 A1 | 2/2016 | Huang et al. |
| 2016/0035150 A1 | 2/2016 | Barfield, Jr. et al. |
| 2016/0035972 A1 | 2/2016 | Lee et al. |
| 2016/0036519 A1 | 2/2016 | Loomis et al. |
| 2016/0036747 A1 | 2/2016 | Aalbers |
| 2016/0036764 A1 | 2/2016 | Dong et al. |
| 2016/0036842 A1 | 2/2016 | Lee et al. |
| 2016/0036868 A1 | 2/2016 | Brewer et al. |
| 2016/0036909 A1 | 2/2016 | Joshi |
| 2016/0036949 A1 | 2/2016 | Holden et al. |
| 2016/0036989 A1 | 2/2016 | Brewer et al. |
| 2016/0036990 A1 | 2/2016 | Brewer et al. |
| 2016/0036991 A1 | 2/2016 | Brewer et al. |
| 2016/0037294 A1 | 2/2016 | Zhang et al. |
| 2016/0037304 A1 | 2/2016 | Dunkin et al. |
| 2016/0037307 A1 | 2/2016 | Roth |
| 2016/0037389 A1 | 2/2016 | Tagg et al. |
| 2016/0037445 A1 | 2/2016 | Barathalwar |
| 2016/0037477 A1 | 2/2016 | Cheng et al. |
| 2016/0037478 A1 | 2/2016 | Skaaksrud et al. |
| 2016/0039356 A1 | 2/2016 | Talwar et al. |
| 2016/0039426 A1 | 2/2016 | Ricci |
| 2016/0039430 A1 | 2/2016 | Ricci |
| 2016/0039653 A1 | 2/2016 | Jangbarwala et al. |
| 2016/0040996 A1 | 2/2016 | Skillman et al. |
| 2016/0040998 A1 | 2/2016 | Ricci |
| 2016/0041024 A1 | 2/2016 | Reimer et al. |
| 2016/0041559 A1 | 2/2016 | Wellman et al. |
| 2016/0041820 A1 | 2/2016 | Ricci et al. |
| 2016/0042079 A1 | 2/2016 | Johnson et al. |
| 2016/0042153 A1 | 2/2016 | Mo |
| 2016/0042172 A1 | 2/2016 | Chiplunkar et al. |
| 2016/0042382 A1 | 2/2016 | Isaacson et al. |
| 2016/0042972 A1 | 2/2016 | Kang |
| 2016/0043300 A1 | 2/2016 | Kim et al. |
| 2016/0043313 A1 | 2/2016 | Lee |
| 2016/0043370 A1 | 2/2016 | Hatta et al. |
| 2016/0043429 A1 | 2/2016 | Hatta et al. |
| 2016/0043554 A1 | 2/2016 | Kubota et al. |
| 2016/0043571 A1 | 2/2016 | Kesler et al. |
| 2016/0043945 A1 | 2/2016 | Cooper et al. |
| 2016/0043973 A1 | 2/2016 | Drouin et al. |
| 2016/0044035 A1 | 2/2016 | Huang |
| 2016/0044054 A1 | 2/2016 | Stiansen et al. |
| 2016/0044108 A1 | 2/2016 | Vermeulen et al. |
| 2016/0044120 A1 | 2/2016 | Williams et al. |
| 2016/0044121 A1 | 2/2016 | Williams et al. |
| 2016/0044129 A1 | 2/2016 | Bergmann et al. |
| 2016/0044355 A1 | 2/2016 | Gideon et al. |
| 2016/0044454 A1 | 2/2016 | Ainsworth et al. |
| 2016/0044461 A1 | 2/2016 | Cuff et al. |
| 2016/0044510 A1 | 2/2016 | Lafuente |
| 2016/0044661 A1 | 2/2016 | Suresh |
| 2016/0044697 A1 | 2/2016 | Xhafa et al. |
| 2016/0045841 A1* | 2/2016 | Kaplan ............... C10G 1/02 429/49 |
| 2016/0047662 A1 | 2/2016 | Ricci |
| 2016/0047879 A1 | 2/2016 | Yoon et al. |
| 2016/0048266 A1 | 2/2016 | Smith et al. |
| 2016/0048580 A1 | 2/2016 | Raman |
| 2016/0048688 A1 | 2/2016 | Flynn et al. |
| 2016/0048842 A1 | 2/2016 | Trivedi et al. |
| 2016/0049203 A1 | 2/2016 | Alrod et al. |
| 2016/0049408 A1 | 2/2016 | Jung et al. |
| 2016/0049582 A1 | 2/2016 | Kim et al. |
| 2016/0049813 A1 | 2/2016 | Takizawa et al. |
| 2016/0049823 A1 | 2/2016 | Stein et al. |
| 2016/0049824 A1 | 2/2016 | Stein et al. |
| 2016/0050061 A1 | 2/2016 | Feher |
| 2016/0050137 A1 | 2/2016 | Jurasek et al. |

(56) References Cited

U.S. PATENT DOCUMENTS

| | | |
|---|---|---|
| 2016/0050159 A1 | 2/2016 | Cook et al. |
| 2016/0050183 A1 | 2/2016 | Biswas et al. |
| 2016/0050265 A1 | 2/2016 | Botticelli |
| 2016/0050315 A1 | 2/2016 | Malhotra et al. |
| 2016/0050379 A1 | 2/2016 | Jiang et al. |
| 2016/0050514 A1 | 2/2016 | Skocypec et al. |
| 2016/0050520 A1 | 2/2016 | Stanger et al. |
| 2016/0050535 A1 | 2/2016 | Mansfield et al. |
| 2016/0050541 A1 | 2/2016 | Youssef et al. |
| 2016/0050548 A1 | 2/2016 | Silver |
| 2016/0050553 A1 | 2/2016 | Kang |
| 2016/0050674 A1 | 2/2016 | Kenney et al. |
| 2016/0050705 A1 | 2/2016 | Carlton et al. |
| 2016/0051791 A1 | 2/2016 | Ewers et al. |
| 2016/0052473 A1 | 2/2016 | Debenham et al. |
| 2016/0052512 A1 | 2/2016 | Buford |
| 2016/0052762 A1 | 2/2016 | Swift |
| 2016/0054021 A1 | 2/2016 | Lee et al. |
| 2016/0054140 A1 | 2/2016 | Breed |
| 2016/0054736 A1 | 2/2016 | Kolhouse et al. |
| 2016/0055116 A1 | 2/2016 | Duer et al. |
| 2016/0055225 A1 | 2/2016 | Xu et al. |
| 2016/0055232 A1 | 2/2016 | Yang et al. |
| 2016/0055499 A1 | 2/2016 | Hawkins et al. |
| 2016/0055551 A1 | 2/2016 | Hafeez |
| 2016/0055740 A1 | 2/2016 | Fuchs et al. |
| 2016/0055747 A1 | 2/2016 | Ricci |
| 2016/0056209 A1 | 2/2016 | Suh |
| 2016/0056211 A1 | 2/2016 | Cho |
| 2016/0056246 A1 | 2/2016 | Ha |
| 2016/0056847 A1 | 2/2016 | Wang et al. |
| 2016/0056938 A1 | 2/2016 | Kenney et al. |
| 2016/0057084 A1 | 2/2016 | Tan |
| 2016/0057143 A1 | 2/2016 | Carlson et al. |
| 2016/0057571 A1 | 2/2016 | Florins et al. |
| 2016/0058315 A1 | 3/2016 | Wiser et al. |
| 2016/0058335 A1 | 3/2016 | Ashby |
| 2016/0058390 A1 | 3/2016 | Dyell et al. |
| 2016/0059412 A1 | 3/2016 | Oleynik |
| 2016/0059662 A1 | 3/2016 | Slawson |
| 2016/0059865 A1 | 3/2016 | Ricci |
| 2016/0061472 A1 | 3/2016 | Lee et al. |
| 2016/0061618 A1 | 3/2016 | Benenson et al. |
| 2016/0062583 A1 | 3/2016 | Ricci |
| 2016/0063062 A1 | 3/2016 | Yahav |
| 2016/0063102 A1 | 3/2016 | Yahav |
| 2016/0063191 A1 | 3/2016 | Vesto et al. |
| 2016/0063497 A1 | 3/2016 | Grant |
| 2016/0063868 A1 | 3/2016 | White et al. |
| 2016/0064659 A1 | 3/2016 | Cho |
| 2016/0064947 A1 | 3/2016 | Heresztyn et al. |
| 2016/0064999 A1 | 3/2016 | Takano |
| 2016/0065517 A1 | 3/2016 | Beausoleil et al. |
| 2016/0065520 A1 | 3/2016 | Puranik et al. |
| 2016/0065572 A1 | 3/2016 | Kim et al. |
| 2016/0065719 A1 | 3/2016 | Jeong et al. |
| 2016/0065928 A1 | 3/2016 | Feinson |
| 2016/0066123 A1 | 3/2016 | Ko et al. |
| 2016/0066125 A1 | 3/2016 | Cho et al. |
| 2016/0066127 A1 | 3/2016 | Choi et al. |
| 2016/0066162 A1 | 3/2016 | Schulz et al. |
| 2016/0066221 A1 | 3/2016 | Sapkota et al. |
| 2016/0066246 A1 | 3/2016 | Green et al. |
| 2016/0066325 A1 | 3/2016 | Kim et al. |
| 2016/0066808 A1 | 3/2016 | Hijazi |
| 2016/0066894 A1 | 3/2016 | Barton-Sweeney |
| 2016/0068136 A1 | 3/2016 | Tsogbe et al. |
| 2016/0069692 A1 | 3/2016 | Brennan et al. |
| 2016/0069705 A1 | 3/2016 | Brenner et al. |
| 2016/0069855 A1 | 3/2016 | Nordin |
| 2016/0069975 A1 | 3/2016 | Rothberg et al. |
| 2016/0070456 A1 | 3/2016 | Ricci et al. |
| 2016/0070527 A1 | 3/2016 | Ricci |
| 2016/0070559 A1 | 3/2016 | West et al. |
| 2016/0070611 A1 | 3/2016 | Kim |
| 2016/0070718 A1 | 3/2016 | Lee et al. |
| 2016/0070794 A1 | 3/2016 | Peng |
| 2016/0071333 A1 | 3/2016 | Haidar et al. |
| 2016/0071338 A1 | 3/2016 | McQuade et al. |
| 2016/0071397 A1 | 3/2016 | Logan et al. |
| 2016/0071905 A1 | 3/2016 | Park |
| 2016/0072282 A1 | 3/2016 | Kumagai et al. |
| 2016/0072287 A1 | 3/2016 | Jia et al. |
| 2016/0072493 A1 | 3/2016 | Oh |
| 2016/0072547 A1 | 3/2016 | Muqaibel et al. |
| 2016/0072676 A1 | 3/2016 | Gomadam et al. |
| 2016/0072678 A1 | 3/2016 | Dong et al. |
| 2016/0072729 A1 | 3/2016 | Sasin et al. |
| 2016/0072740 A1 | 3/2016 | Lindner et al. |
| 2016/0072752 A1 | 3/2016 | Nikolayev et al. |
| 2016/0072770 A1 | 3/2016 | Crane et al. |
| 2016/0072832 A1 | 3/2016 | Kim |
| 2016/0072896 A1 | 3/2016 | Petersen et al. |
| 2016/0073232 A1 | 3/2016 | Crawford |
| 2016/0073271 A1 | 3/2016 | Schultz et al. |
| 2016/0073280 A1 | 3/2016 | Rey et al. |
| 2016/0073372 A1 | 3/2016 | Sen et al. |
| 2016/0073886 A1 | 3/2016 | Connor |
| 2016/0075175 A1 | 3/2016 | Biderman et al. |
| 2016/0075177 A1 | 3/2016 | Biderman et al. |
| 2016/0075226 A1 | 3/2016 | Biderman et al. |
| 2016/0075339 A1 | 3/2016 | Versteyhe et al. |
| 2016/0077693 A1 | 3/2016 | Meyer et al. |
| 2016/0078446 A1 | 3/2016 | Trostle |
| 2016/0078458 A1 | 3/2016 | Gold et al. |
| 2016/0078484 A1 | 3/2016 | Emigh et al. |
| 2016/0078554 A1 | 3/2016 | Cote et al. |
| 2016/0078659 A1 | 3/2016 | Bartkiewicz et al. |
| 2016/0078695 A1 | 3/2016 | McClintic et al. |
| 2016/0078741 A1 | 3/2016 | Johnson, Jr. et al. |
| 2016/0079363 A1 | 3/2016 | Lee |
| 2016/0079524 A1 | 3/2016 | Do et al. |
| 2016/0080021 A1 | 3/2016 | Olson |
| 2016/0080030 A1 | 3/2016 | Hui et al. |
| 2016/0080096 A1 | 3/2016 | Kim et al. |
| 2016/0080168 A1 | 3/2016 | Lieder et al. |
| 2016/0080302 A1 | 3/2016 | Woley et al. |
| 2016/0080451 A1 | 3/2016 | Morton et al. |
| 2016/0080486 A1 | 3/2016 | Ram et al. |
| 2016/0080498 A1 | 3/2016 | Lu |
| 2016/0080550 A1 | 3/2016 | Kwon et al. |
| 2016/0080907 A1 | 3/2016 | Saleem |
| 2016/0080935 A1 | 3/2016 | Tonogai |
| 2016/0081127 A1 | 3/2016 | Lee et al. |
| 2016/0081162 A1 | 3/2016 | Reed |
| 2016/0081551 A1 | 3/2016 | Miller et al. |
| 2016/0081586 A1 | 3/2016 | Miller et al. |
| 2016/0082772 A1 | 3/2016 | Biderman et al. |
| 2016/0082839 A1 | 3/2016 | Ricci |
| 2016/0082925 A1 | 3/2016 | Arocha et al. |
| 2016/0082975 A1 | 3/2016 | Lovett et al. |
| 2016/0084936 A1 | 3/2016 | Smith et al. |
| 2016/0085561 A1 | 3/2016 | Starsinic |
| 2016/0085594 A1 | 3/2016 | Wang et al. |
| 2016/0085774 A1 | 3/2016 | Bhamidipati et al. |
| 2016/0085955 A1 | 3/2016 | Lerner |
| 2016/0085983 A1 | 3/2016 | Keohane et al. |
| 2016/0086108 A1 | 3/2016 | Abelow |
| 2016/0086189 A1 | 3/2016 | Chitre |
| 2016/0086228 A1 | 3/2016 | Babb et al. |
| 2016/0086391 A1 | 3/2016 | Ricci |
| 2016/0086397 A1 | 3/2016 | Phillips |
| 2016/0086399 A1 | 3/2016 | Marathe et al. |
| 2016/0086484 A1 | 3/2016 | Feher |
| 2016/0086679 A1 | 3/2016 | Lee |
| 2016/0087011 A1 | 3/2016 | Moon |
| 2016/0087687 A1 | 3/2016 | Kesler et al. |
| 2016/0087760 A1 | 3/2016 | Kwon et al. |
| 2016/0087933 A1 | 3/2016 | Johnson et al. |
| 2016/0088049 A1 | 3/2016 | Seed et al. |
| 2016/0088052 A1 | 3/2016 | Juzswik et al. |
| 2016/0088100 A1 | 3/2016 | Holden et al. |
| 2016/0088372 A1 | 3/2016 | Hemandez-Rosas et al. |
| 2016/0088473 A1 | 3/2016 | Feher |

(56) References Cited

U.S. PATENT DOCUMENTS

| | | |
|---|---|---|
| 2016/0088551 A1 | 3/2016 | Murphy et al. |
| 2016/0088807 A1 | 3/2016 | Bermudez Rodriguez et al. |
| 2016/0089066 A1 | 3/2016 | Hemandez-Rosas et al. |
| 2016/0090105 A1 | 3/2016 | Neubecker et al. |
| 2016/0091540 A1 | 3/2016 | Marti et al. |
| 2016/0091717 A1 | 3/2016 | Wu et al. |
| 2016/0092189 A1 | 3/2016 | Pollack et al. |
| 2016/0092301 A1 | 3/2016 | Ish-Shalom et al. |
| 2016/0092532 A1 | 3/2016 | Jia et al. |
| 2016/0092780 A1 | 3/2016 | Kelley et al. |
| 2016/0092858 A1 | 3/2016 | Giles et al. |
| 2016/0092907 A1 | 3/2016 | Girard et al. |
| 2016/0092911 A1 | 3/2016 | Eccles et al. |
| 2016/0093135 A1 | 3/2016 | Bond et al. |
| 2016/0093154 A1 | 3/2016 | Bytnar et al. |
| 2016/0093509 A1 | 3/2016 | Kim |
| 2016/0094051 A1 | 3/2016 | Soar |
| 2016/0094358 A1 | 3/2016 | Won et al. |
| 2016/0094398 A1 | 3/2016 | Choudhury et al. |
| 2016/0094479 A1 | 3/2016 | Dwarkha et al. |
| 2016/0094502 A1 | 3/2016 | Pollack et al. |
| 2016/0094646 A1 | 3/2016 | Spivack et al. |
| 2016/0094673 A1 | 3/2016 | Savolainen et al. |
| 2016/0094707 A1 | 3/2016 | Stuntebeck et al. |
| 2016/0094720 A1 | 3/2016 | Girard et al. |
| 2016/0094883 A1 | 3/2016 | Tidwell et al. |
| 2016/0094972 A1 | 3/2016 | Girard et al. |
| 2016/0094973 A1 | 3/2016 | Girard et al. |
| 2016/0095148 A1 | 3/2016 | Hemandez-Rosas et al. |
| 2016/0096508 A1 | 4/2016 | Oz et al. |
| 2016/0097648 A1 | 4/2016 | Hannah |
| 2016/0098307 A1 | 4/2016 | Bora et al. |
| 2016/0098325 A1 | 4/2016 | Madou et al. |
| 2016/0098445 A1 | 4/2016 | Riggs et al. |
| 2016/0098670 A1 | 4/2016 | Oz et al. |
| 2016/0098729 A1 | 4/2016 | Bradley et al. |
| 2016/0098790 A1 | 4/2016 | Herman et al. |
| 2016/0098923 A1 | 4/2016 | Patkar |
| 2016/0099806 A1 | 4/2016 | Racklyeft et al. |
| 2016/0099898 A1 | 4/2016 | Watanabe et al. |
| 2016/0099916 A1 | 4/2016 | Glazemakers et al. |
| 2016/0099917 A1 | 4/2016 | Glazemakers et al. |
| 2016/0099927 A1 | 4/2016 | Oz et al. |
| 2016/0099972 A1 | 4/2016 | Qureshi et al. |
| 2016/0100035 A1 | 4/2016 | Martis |
| 2016/0100054 A1 | 4/2016 | Silver |
| 2016/0100273 A1 | 4/2016 | Boran et al. |
| 2016/0100301 A1 | 4/2016 | Gaurav et al. |
| 2016/0100310 A1 | 4/2016 | Lee |
| 2016/0100335 A1 | 4/2016 | Shahmurad et al. |
| 2016/0100346 A1 | 4/2016 | Hall |
| 2016/0100348 A1 | 4/2016 | Cohn et al. |
| 2016/0100362 A1 | 4/2016 | Palanisamy et al. |
| 2016/0100444 A1 | 4/2016 | San Vicente et al. |
| 2016/0100445 A1 | 4/2016 | San Vicente et al. |
| 2016/0100449 A1 | 4/2016 | Jang et al. |
| 2016/0100908 A1 | 4/2016 | Tesar |
| 2016/0103199 A1 | 4/2016 | Rappaport |
| 2016/0103212 A1 | 4/2016 | Nath et al. |
| 2016/0103462 A1 | 4/2016 | Ainsley et al. |
| 2016/0103585 A1 | 4/2016 | Varadharajan et al. |
| 2016/0103666 A1 | 4/2016 | Choi et al. |
| 2016/0103980 A1 | 4/2016 | Ricci et al. |
| 2016/0104005 A1 | 4/2016 | Toussaint et al. |
| 2016/0104123 A1 | 4/2016 | Viswanath et al. |
| 2016/0104131 A1 | 4/2016 | Layng |
| 2016/0104169 A1 | 4/2016 | Suyeyasu et al. |
| 2016/0104327 A1 | 4/2016 | Ghannam et al. |
| 2016/0104365 A1 | 4/2016 | Henderson et al. |
| 2016/0104798 A1 | 4/2016 | Kim |
| 2016/0105371 A1 | 4/2016 | Choi et al. |
| 2016/0105387 A1 | 4/2016 | Jackson |
| 2016/0105406 A1 | 4/2016 | Smith et al. |
| 2016/0105504 A1 | 4/2016 | Vallabhaneni et al. |
| 2016/0105621 A1 | 4/2016 | McMahon et al. |
| 2016/0105644 A1 | 4/2016 | Smith et al. |
| 2016/0105775 A1 | 4/2016 | Azmat |
| 2016/0105782 A1 | 4/2016 | Barbulescu et al. |
| 2016/0105786 A1 | 4/2016 | Suryavanshi |
| 2016/0105841 A1 | 4/2016 | Kang |
| 2016/0105847 A1 | 4/2016 | Smith et al. |
| 2016/0105852 A1 | 4/2016 | Papakipos et al. |
| 2016/0105906 A1 | 4/2016 | Hui et al. |
| 2016/0105918 A1 | 4/2016 | Sumcad et al. |
| 2016/0105943 A1 | 4/2016 | Recker et al. |
| 2016/0107309 A1 | 4/2016 | Walsh et al. |
| 2016/0107509 A1 | 4/2016 | Kirsch et al. |
| 2016/0109940 A1 | 4/2016 | Lyren et al. |
| 2016/0110056 A1 | 4/2016 | Hong et al. |
| 2016/0110148 A1 | 4/2016 | Egle et al. |
| 2016/0110372 A1 | 4/2016 | Cho et al. |
| 2016/0110381 A1 | 4/2016 | Chen et al. |
| 2016/0110554 A1 | 4/2016 | Kang et al. |
| 2016/0110621 A1 | 4/2016 | Tsimhoni et al. |
| 2016/0110774 A1 | 4/2016 | Ahn |
| 2016/0110788 A1 | 4/2016 | Stephenson |
| 2016/0110820 A1 | 4/2016 | Fleck et al. |
| 2016/0110929 A1 | 4/2016 | Park |
| 2016/0110993 A1 | 4/2016 | Marlatt et al. |
| 2016/0111090 A1 | 4/2016 | Holdren et al. |
| 2016/0111472 A1 | 4/2016 | Do et al. |
| 2016/0112216 A1 | 4/2016 | Sargent et al. |
| 2016/0112262 A1 | 4/2016 | Johnson et al. |
| 2016/0112279 A1 | 4/2016 | Kalanithi et al. |
| 2016/0112453 A1 | 4/2016 | Martinez et al. |
| 2016/0112462 A1 | 4/2016 | Silver et al. |
| 2016/0112487 A1 | 4/2016 | Wang et al. |
| 2016/0112684 A1 | 4/2016 | Connor |
| 2016/0112830 A1 | 4/2016 | Soon |
| 2016/0112894 A1 | 4/2016 | Lau et al. |
| 2016/0112929 A1 | 4/2016 | Das et al. |
| 2016/0112950 A1 | 4/2016 | Caracas et al. |
| 2016/0114745 A1 | 4/2016 | Ricci |
| 2016/0114821 A1 | 4/2016 | Ronse |
| 2016/0116571 A1 | 4/2016 | De Wilde et al. |
| 2016/0116977 A1 | 4/2016 | Goldman-Shenhar |
| 2016/0117195 A1 | 4/2016 | Wang |
| 2016/0117318 A1 | 4/2016 | Helland |
| 2016/0117393 A1 | 4/2016 | von Rickenbach et al. |
| 2016/0117716 A1 | 4/2016 | Lin et al. |
| 2016/0117734 A1 | 4/2016 | Lin et al. |
| 2016/0117902 A1 | 4/2016 | Baillargeon et al. |
| 2016/0117945 A1 | 4/2016 | Otte et al. |
| 2016/0118042 A1 | 4/2016 | Talwar et al. |
| 2016/0118442 A1 | 4/2016 | Kim et al. |
| 2016/0118474 A1 | 4/2016 | Jang |
| 2016/0118575 A1 | 4/2016 | Song et al. |
| 2016/0119162 A1 | 4/2016 | Bisson et al. |
| 2016/0119244 A1 | 4/2016 | Wang et al. |
| 2016/0119246 A1 | 4/2016 | Wang |
| 2016/0119383 A1 | 4/2016 | Burke et al. |
| 2016/0119431 A1 | 4/2016 | Bortz et al. |
| 2016/0119434 A1 | 4/2016 | Dong et al. |
| 2016/0119855 A1 | 4/2016 | Unruh |
| 2016/0120448 A1 | 5/2016 | Hemandez-Rosas et al. |
| 2016/0121669 A1 | 5/2016 | Xu |
| 2016/0121912 A1 | 5/2016 | Puttagunta et al. |
| 2016/0123802 A1 | 5/2016 | Likovich et al. |
| 2016/0123834 A1 | 5/2016 | Vilbrandt et al. |
| 2016/0124071 A1 | 5/2016 | Baxley et al. |
| 2016/0124617 A1 | 5/2016 | Ryu et al. |
| 2016/0124694 A1 | 5/2016 | Webster et al. |
| 2016/0124901 A9 | 5/2016 | Banet et al. |
| 2016/0125345 A1 | 5/2016 | Majumdar et al. |
| 2016/0125361 A1 | 5/2016 | Vivas et al. |
| 2016/0125735 A1 | 5/2016 | Tuukkanen |
| 2016/0125864 A1 | 5/2016 | Udell |
| 2016/0125865 A1 | 5/2016 | Shahmurad et al. |
| 2016/0126732 A1 | 5/2016 | Uyeki |
| 2016/0127073 A1 | 5/2016 | Ashrafi et al. |
| 2016/0127087 A1 | 5/2016 | Feher |
| 2016/0127165 A1 | 5/2016 | Feher |
| 2016/0127172 A1 | 5/2016 | Shaw |
| 2016/0127403 A1 | 5/2016 | Baxley et al. |

(56) References Cited

U.S. PATENT DOCUMENTS

| | | |
|---|---|---|
| 2016/0127404 A1 | 5/2016 | Baxley et al. |
| 2016/0127447 A1 | 5/2016 | Jiang et al. |
| 2016/0127457 A1 | 5/2016 | Shaw |
| 2016/0127539 A1 | 5/2016 | Sharma |
| 2016/0127540 A1 | 5/2016 | Sharma et al. |
| 2016/0127541 A1 | 5/2016 | Sharma |
| 2016/0127548 A1 | 5/2016 | Sharma |
| 2016/0127549 A1 | 5/2016 | Sharma |
| 2016/0127552 A1 | 5/2016 | Sharma et al. |
| 2016/0127562 A1 | 5/2016 | Chauhan |
| 2016/0127566 A1 | 5/2016 | Sharma et al. |
| 2016/0127567 A1 | 5/2016 | Kimmel |
| 2016/0127569 A1 | 5/2016 | Kamas et al. |
| 2016/0127624 A1 | 5/2016 | Woo et al. |
| 2016/0127808 A1 | 5/2016 | Wong et al. |
| 2016/0127851 A1 | 5/2016 | Baek et al. |
| 2016/0127871 A1 | 5/2016 | Smith et al. |
| 2016/0127887 A1 | 5/2016 | Ricci |
| 2016/0127907 A1 | 5/2016 | Baxley et al. |
| 2016/0127931 A1 | 5/2016 | Baxley et al. |
| 2016/0128108 A1 | 5/2016 | Saija |
| 2016/0128582 A1 | 5/2016 | Chod et al. |
| 2016/0128617 A1 | 5/2016 | Morris et al. |
| 2016/0128880 A1 | 5/2016 | Blickensderfer et al. |
| 2016/0129310 A1 | 5/2016 | Ahmed et al. |
| 2016/0131492 A1 | 5/2016 | Sheha et al. |
| 2016/0132397 A1 | 5/2016 | Hui et al. |
| 2016/0132630 A1 | 5/2016 | Slaton et al. |
| 2016/0132822 A1 | 5/2016 | Swafford |
| 2016/0132823 A1 | 5/2016 | Swafford et al. |
| 2016/0132832 A1 | 5/2016 | Pinkovezky et al. |
| 2016/0132851 A1 | 5/2016 | Desai et al. |
| 2016/0132863 A1 | 5/2016 | Dodin |
| 2016/0132874 A1 | 5/2016 | Carrott |
| 2016/0132877 A1 | 5/2016 | Carrott |
| 2016/0132951 A1 | 5/2016 | Slaton et al. |
| 2016/0133065 A1 | 5/2016 | Baer et al. |
| 2016/0133070 A1 | 5/2016 | Ikeda |
| 2016/0133107 A1 | 5/2016 | Showen et al. |
| 2016/0133122 A1 | 5/2016 | Ishizawa et al. |
| 2016/0133230 A1 | 5/2016 | Daniels et al. |
| 2016/0133322 A1 | 5/2016 | Zamir et al. |
| 2016/0133343 A1 | 5/2016 | Bae et al. |
| 2016/0134062 A1 | 5/2016 | Wang et al. |
| 2016/0134161 A1 | 5/2016 | Hui et al. |
| 2016/0134468 A1 | 5/2016 | Hui et al. |
| 2016/0134514 A1 | 5/2016 | Hui et al. |
| 2016/0134516 A1 | 5/2016 | Hui et al. |
| 2016/0134539 A1 | 5/2016 | Hui et al. |
| 2016/0134554 A1 | 5/2016 | Deckers |
| 2016/0134562 A1 | 5/2016 | Yousefi et al. |
| 2016/0134630 A1 | 5/2016 | Tofighbakhsh |
| 2016/0134633 A1 | 5/2016 | Gaddam et al. |
| 2016/0134930 A1 | 5/2016 | Swafford |
| 2016/0135036 A1 | 5/2016 | Rodzevski et al. |
| 2016/0135039 A1 | 5/2016 | Droste et al. |
| 2016/0137089 A1 | 5/2016 | Wu et al. |
| 2016/0138926 A1 | 5/2016 | Annapureddy et al. |
| 2016/0139067 A1 | 5/2016 | Grace |
| 2016/0139234 A1 | 5/2016 | Ganick et al. |
| 2016/0139272 A1 | 5/2016 | Basnayake |
| 2016/0139755 A1 | 5/2016 | Bushmitch |
| 2016/0140062 A1 | 5/2016 | Moyer |
| 2016/0140063 A1 | 5/2016 | Moyer |
| 2016/0140146 A1 | 5/2016 | Wexler et al. |
| 2016/0140168 A1 | 5/2016 | Rankin, Jr. et al. |
| 2016/0140353 A1 | 5/2016 | Biswas et al. |
| 2016/0140546 A1 | 5/2016 | Taratine et al. |
| 2016/0140608 A1 | 5/2016 | Gaudet et al. |
| 2016/0140614 A1 | 5/2016 | Brubaker |
| 2016/0140776 A1 | 5/2016 | Ricci |
| 2016/0140834 A1 | 5/2016 | Tran |
| 2016/0140844 A1 | 5/2016 | Njihia |
| 2016/0140870 A1 | 5/2016 | Connor |
| 2016/0141744 A1 | 5/2016 | Smith et al. |
| 2016/0141894 A1 | 5/2016 | Beaston |
| 2016/0142248 A1 | 5/2016 | Thubert et al. |
| 2016/0142402 A1 | 5/2016 | Kim |
| 2016/0142410 A1 | 5/2016 | Mazzara, Jr. |
| 2016/0142597 A1 | 5/2016 | Warren |
| 2016/0142856 A1 | 5/2016 | Worrall et al. |
| 2016/0142864 A1 | 5/2016 | Leigh |
| 2016/0142880 A1 | 5/2016 | Talluri et al. |
| 2016/0142882 A1 | 5/2016 | Coughlin et al. |
| 2016/0142891 A1 | 5/2016 | Virhia |
| 2016/0142901 A1 | 5/2016 | Leppanen et al. |
| 2016/0142906 A1 | 5/2016 | Park et al. |
| 2016/0142916 A1 | 5/2016 | Yocam et al. |
| 2016/0143004 A1 | 5/2016 | Stromberg et al. |
| 2016/0143075 A1 | 5/2016 | Tucker et al. |
| 2016/0146494 A1 | 5/2016 | Rajan et al. |
| 2016/0146495 A1 | 5/2016 | Malve et al. |
| 2016/0147233 A1 | 5/2016 | Whinnery |
| 2016/0147293 A1 | 5/2016 | Park et al. |
| 2016/0147782 A1 | 5/2016 | Roseman et al. |
| 2016/0148103 A1 | 5/2016 | Sarrafzadeh et al. |
| 2016/0148269 A1 | 5/2016 | Lamont |
| 2016/0148509 A1 | 5/2016 | Fayfield et al. |
| 2016/0148558 A1 | 5/2016 | Ernst et al. |
| 2016/0148780 A1 | 5/2016 | Agrawal et al. |
| 2016/0148974 A1 | 5/2016 | Lee |
| 2016/0148979 A1 | 5/2016 | Kim |
| 2016/0149120 A1 | 5/2016 | Park et al. |
| 2016/0149121 A1 | 5/2016 | Oh et al. |
| 2016/0149177 A1 | 5/2016 | Sugeno et al. |
| 2016/0149755 A1 | 5/2016 | Kim |
| 2016/0149777 A1 | 5/2016 | Kim |
| 2016/0149805 A1 | 5/2016 | Hui et al. |
| 2016/0149853 A1 | 5/2016 | Anderson et al. |
| 2016/0149856 A1 | 5/2016 | Hui et al. |
| 2016/0149990 A1 | 5/2016 | Du |
| 2016/0150089 A1 | 5/2016 | Garg |
| 2016/0150298 A1 | 5/2016 | Kim |
| 2016/0150350 A1 | 5/2016 | Ingale et al. |
| 2016/0150482 A1 | 5/2016 | Lee |
| 2016/0150501 A1 | 5/2016 | Hui et al. |
| 2016/0150575 A1 | 5/2016 | Andersen et al. |
| 2016/0152180 A1 | 6/2016 | Kirsch et al. |
| 2016/0153796 A1 | 6/2016 | Stankoulov |
| 2016/0154113 A1 | 6/2016 | Leibner et al. |
| 2016/0154406 A1 | 6/2016 | Im et al. |
| 2016/0154413 A1 | 6/2016 | Trivedi et al. |
| 2016/0154864 A1 | 6/2016 | Mangan et al. |
| 2016/0155288 A1 | 6/2016 | Bobes et al. |
| 2016/0155326 A1 | 6/2016 | Ricci et al. |
| 2016/0155503 A1 | 6/2016 | Yoon |
| 2016/0155933 A1 | 6/2016 | Kim |
| 2016/0156450 A1 | 6/2016 | Hui et al. |
| 2016/0156514 A1 | 6/2016 | Salonidis et al. |
| 2016/0156575 A1 | 6/2016 | Jeong et al. |
| 2016/0156652 A1 | 6/2016 | Paffenroth et al. |
| 2016/0157044 A1 | 6/2016 | Ekberg et al. |
| 2016/0157179 A1 | 6/2016 | Jung |
| 2016/0157221 A1 | 6/2016 | Kim et al. |
| 2016/0157298 A1 | 6/2016 | Zhang et al. |
| 2016/0158640 A1 | 6/2016 | Gupta et al. |
| 2016/0159186 A1 | 6/2016 | Slawson |
| 2016/0161310 A1 | 6/2016 | Leaders et al. |
| 2016/0162120 A1 | 6/2016 | Nishioka |
| 2016/0162552 A1 | 6/2016 | Morris et al. |
| 2016/0162682 A1 | 6/2016 | Bowers |
| 2016/0162827 A1 | 6/2016 | Tomkins et al. |
| 2016/0162870 A1 | 6/2016 | Henson et al. |
| 2016/0162882 A1 | 6/2016 | McClung |
| 2016/0162900 A1 | 6/2016 | Dutt et al. |
| 2016/0162938 A1 | 6/2016 | LeBeau et al. |
| 2016/0162946 A1 | 6/2016 | Delli Santi et al. |
| 2016/0163001 A1 | 6/2016 | Murrell et al. |
| 2016/0163133 A1 | 6/2016 | Ricci |
| 2016/0163135 A1 | 6/2016 | Olsen et al. |
| 2016/0164282 A1 | 6/2016 | Bellala et al. |
| 2016/0164695 A1 | 6/2016 | Fabre et al. |
| 2016/0164745 A1 | 6/2016 | Quigley et al. |
| 2016/0164748 A1 | 6/2016 | Kim |

(56) References Cited

U.S. PATENT DOCUMENTS

| | | |
|---|---|---|
| 2016/0164819 A1 | 6/2016 | Shrivastava |
| 2016/0164981 A1 | 6/2016 | LeBeau et al. |
| 2016/0164982 A1 | 6/2016 | LeBeau et al. |
| 2016/0165000 A1 | 6/2016 | Havoc Pennington et al. |
| 2016/0165002 A1 | 6/2016 | LeBeau et al. |
| 2016/0165404 A1 | 6/2016 | Brisebois |
| 2016/0165417 A1 | 6/2016 | Yang et al. |
| 2016/0165487 A1 | 6/2016 | Zhu et al. |
| 2016/0165965 A1 | 6/2016 | Ellis et al. |
| 2016/0167486 A1 | 6/2016 | Yang et al. |
| 2016/0167641 A1 | 6/2016 | Yoon |
| 2016/0169682 A1 | 6/2016 | Gepner et al. |
| 2016/0169683 A1 | 6/2016 | Lynch |
| 2016/0169684 A1 | 6/2016 | Jamshidi Nekou et al. |
| 2016/0169689 A1 | 6/2016 | Davidson |
| 2016/0169930 A1 | 6/2016 | Korhonen et al. |
| 2016/0170733 A1 | 6/2016 | Martin et al. |
| 2016/0170775 A1 | 6/2016 | Rockwell et al. |
| 2016/0170871 A1 | 6/2016 | Hyun et al. |
| 2016/0170971 A1 | 6/2016 | McSherry et al. |
| 2016/0170996 A1 | 6/2016 | Frank et al. |
| 2016/0171122 A1 | 6/2016 | Tonshal et al. |
| 2016/0171155 A1 | 6/2016 | Do et al. |
| 2016/0171374 A1 | 6/2016 | Kim |
| 2016/0171405 A1 | 6/2016 | Burke |
| 2016/0171492 A1 | 6/2016 | Carrott |
| 2016/0171538 A1 | 6/2016 | Balasubramanian et al. |
| 2016/0171591 A1 | 6/2016 | Williams et al. |
| 2016/0171599 A1 | 6/2016 | Bray et al. |
| 2016/0171885 A1 | 6/2016 | Lynch |
| 2016/0172721 A1 | 6/2016 | Komatsu et al. |
| 2016/0172904 A1 | 6/2016 | Recker et al. |
| 2016/0173385 A1 | 6/2016 | Isaksson et al. |
| 2016/0173428 A1 | 6/2016 | Balasubramanian et al. |
| 2016/0173511 A1 | 6/2016 | Bratspiess et al. |
| 2016/0173513 A1 | 6/2016 | Rohde et al. |
| 2016/0173609 A1 | 6/2016 | Schmerler |
| 2016/0173646 A1 | 6/2016 | Austel et al. |
| 2016/0173647 A1 | 6/2016 | Richardson et al. |
| 2016/0173689 A1 | 6/2016 | Klaban |
| 2016/0173827 A1 | 6/2016 | Dannan et al. |
| 2016/0173921 A1 | 6/2016 | Stokes et al. |
| 2016/0173959 A1 | 6/2016 | Seema et al. |
| 2016/0173996 A1 | 6/2016 | Edgar et al. |
| 2016/0174039 A1 | 6/2016 | Huang |
| 2016/0174046 A1 | 6/2016 | Wilden et al. |
| 2016/0174073 A1 | 6/2016 | Yu |
| 2016/0174129 A1 | 6/2016 | McNamee et al. |
| 2016/0174148 A1 | 6/2016 | Seed et al. |
| 2016/0174333 A1 | 6/2016 | Kim et al. |
| 2016/0174840 A1 | 6/2016 | Udoh et al. |
| 2016/0175723 A1 | 6/2016 | Boeckle |
| 2016/0176397 A1 | 6/2016 | Prokhorov et al. |
| 2016/0176398 A1 | 6/2016 | Prokhorov et al. |
| 2016/0177846 A1 | 6/2016 | Wittliff |
| 2016/0177850 A1 | 6/2016 | Mogavero et al. |
| 2016/0177881 A1 | 6/2016 | Wicks |
| 2016/0177895 A1 | 6/2016 | Wilson |
| 2016/0178035 A1 | 6/2016 | Tay |
| 2016/0178048 A1 | 6/2016 | Lippert et al. |
| 2016/0178225 A1 | 6/2016 | Vallikannu et al. |
| 2016/0178387 A1 | 6/2016 | Yamasaki et al. |
| 2016/0178724 A1 | 6/2016 | Ganick et al. |
| 2016/0178744 A1 | 6/2016 | Kluge et al. |
| 2016/0178796 A1 | 6/2016 | Abramowitz |
| 2016/0179416 A1 | 6/2016 | Mutha et al. |
| 2016/0179774 A1 | 6/2016 | McAteer et al. |
| 2016/0179829 A9 | 6/2016 | Burris |
| 2016/0179936 A1 | 6/2016 | Mathur et al. |
| 2016/0180019 A1 | 6/2016 | Van Rooyen et al. |
| 2016/0180060 A1 | 6/2016 | Nelson |
| 2016/0180156 A1 | 6/2016 | Marcheselli et al. |
| 2016/0180384 A1 | 6/2016 | Ramer et al. |
| 2016/0180404 A1 | 6/2016 | Stern et al. |
| 2016/0180468 A1 | 6/2016 | Buss et al. |
| 2016/0180478 A1 | 6/2016 | Cunningham |
| 2016/0180500 A1 | 6/2016 | Barnes |
| 2016/0180595 A1 | 6/2016 | Grossinger et al. |
| 2016/0180598 A1 | 6/2016 | Rogers et al. |
| 2016/0180607 A1 | 6/2016 | Wittliff |
| 2016/0180667 A1 | 6/2016 | Bunker et al. |
| 2016/0180705 A1 | 6/2016 | Liu et al. |
| 2016/0180707 A1 | 6/2016 | MacNeille et al. |
| 2016/0180713 A1 | 6/2016 | Bernhardt et al. |
| 2016/0180715 A1 | 6/2016 | Burke et al. |
| 2016/0180717 A1 | 6/2016 | Ubhi et al. |
| 2016/0180721 A1 | 6/2016 | Otulic |
| 2016/0180728 A1 | 6/2016 | Clark et al. |
| 2016/0180905 A1 | 6/2016 | Kim et al. |
| 2016/0180928 A1 | 6/2016 | Kim |
| 2016/0180960 A1 | 6/2016 | Lee |
| 2016/0181204 A1 | 6/2016 | Do |
| 2016/0181315 A1 | 6/2016 | Lee et al. |
| 2016/0181316 A1 | 6/2016 | Lee |
| 2016/0181317 A1 | 6/2016 | Yoon |
| 2016/0181318 A1 | 6/2016 | Dong et al. |
| 2016/0181320 A1 | 6/2016 | Kim |
| 2016/0181514 A1 | 6/2016 | Kim et al. |
| 2016/0181520 A1 | 6/2016 | Park |
| 2016/0181522 A1 | 6/2016 | Kim et al. |
| 2016/0182121 A1 | 6/2016 | Shaffer et al. |
| 2016/0182170 A1 | 6/2016 | Daoura et al. |
| 2016/0182415 A1 | 6/2016 | Ames et al. |
| 2016/0182475 A1 | 6/2016 | Uzun |
| 2016/0182531 A1 | 6/2016 | Rubakha et al. |
| 2016/0182574 A1 | 6/2016 | Kim et al. |
| 2016/0182688 A1 | 6/2016 | Mitchell et al. |
| 2016/0182801 A1 | 6/2016 | Luk et al. |
| 2016/0182816 A1 | 6/2016 | Luk et al. |
| 2016/0182856 A1 | 6/2016 | Child et al. |
| 2016/0182940 A1 | 6/2016 | Assayag et al. |
| 2016/0183029 A1 | 6/2016 | Kang et al. |
| 2016/0183037 A1 | 6/2016 | Grohman |
| 2016/0183041 A1 | 6/2016 | Sanders et al. |
| 2016/0183351 A1 | 6/2016 | Snyder et al. |
| 2016/0183695 A1 | 6/2016 | Veron |
| 2016/0183799 A1 | 6/2016 | San Vicente et al. |
| 2016/0183818 A1 | 6/2016 | Richards et al. |
| 2016/0184155 A1 | 6/2016 | Streeter et al. |
| 2016/0184710 A1 | 6/2016 | Zerr et al. |
| 2016/0184755 A1 | 6/2016 | Chen et al. |
| 2016/0185216 A1 | 6/2016 | Clarke et al. |
| 2016/0185222 A1 | 6/2016 | Ricci et al. |
| 2016/0185326 A1 | 6/2016 | Brooks et al. |
| 2016/0185351 A1 | 6/2016 | Jerger et al. |
| 2016/0186191 A1 | 6/2016 | Franklin et al. |
| 2016/0186219 A1 | 6/2016 | Franklin et al. |
| 2016/0186285 A1 | 6/2016 | Kim et al. |
| 2016/0186681 A1 | 6/2016 | Ravi et al. |
| 2016/0187127 A1 | 6/2016 | Purohit et al. |
| 2016/0187144 A1 | 6/2016 | Modica et al. |
| 2016/0187148 A1 | 6/2016 | Unger et al. |
| 2016/0187460 A1 | 6/2016 | Zeng et al. |
| 2016/0187491 A1 | 6/2016 | Scott et al. |
| 2016/0187492 A1 | 6/2016 | Raghunathan et al. |
| 2016/0187493 A1 | 6/2016 | Salasky et al. |
| 2016/0187654 A1 | 6/2016 | Border et al. |
| 2016/0188181 A1 | 6/2016 | Smith |
| 2016/0188190 A1 | 6/2016 | Ricci et al. |
| 2016/0188350 A1 | 6/2016 | Shah et al. |
| 2016/0188405 A1 | 6/2016 | Li et al. |
| 2016/0188597 A1 | 6/2016 | Moore |
| 2016/0188602 A1 | 6/2016 | Glover et al. |
| 2016/0188756 A1 | 6/2016 | Gonzalez-Banos et al. |
| 2016/0188824 A1 | 6/2016 | Geleijnse et al. |
| 2016/0188876 A1 | 6/2016 | Harris |
| 2016/0188883 A1 | 6/2016 | Wang et al. |
| 2016/0188895 A1 | 6/2016 | Liu et al. |
| 2016/0188996 A1 | 6/2016 | Modica et al. |
| 2016/0189098 A1 | 6/2016 | Beaurepaire et al. |
| 2016/0189101 A1 | 6/2016 | Kantor et al. |
| 2016/0189127 A1 | 6/2016 | Amarnath et al. |
| 2016/0189146 A1 | 6/2016 | Cattone |
| 2016/0189164 A1 | 6/2016 | Tolksdorf et al. |

(56) References Cited

U.S. PATENT DOCUMENTS

| | | |
|---|---|---|
| 2016/0189174 A1 | 6/2016 | Heath |
| 2016/0189186 A1 | 6/2016 | Fabrikant et al. |
| 2016/0189270 A1 | 6/2016 | Mellott et al. |
| 2016/0189273 A1 | 6/2016 | Eramian |
| 2016/0189281 A1 | 6/2016 | Kumit et al. |
| 2016/0189285 A1 | 6/2016 | Mellott et al. |
| 2016/0189381 A1 | 6/2016 | Rhoads |
| 2016/0189385 A1 | 6/2016 | Modica et al. |
| 2016/0189425 A1 | 6/2016 | Li et al. |
| 2016/0189439 A1 | 6/2016 | Vetterick et al. |
| 2016/0189453 A1 | 6/2016 | Johnson et al. |
| 2016/0189454 A1 | 6/2016 | Johnson et al. |
| 2016/0189459 A1 | 6/2016 | Johnson et al. |
| 2016/0189491 A1 | 6/2016 | Sloo et al. |
| 2016/0189496 A1 | 6/2016 | Modi et al. |
| 2016/0189500 A1 | 6/2016 | Kim et al. |
| 2016/0189502 A1 | 6/2016 | Johnson et al. |
| 2016/0189503 A1 | 6/2016 | Johnson et al. |
| 2016/0189505 A1 | 6/2016 | Boettcher et al. |
| 2016/0189506 A1 | 6/2016 | Peterson et al. |
| 2016/0189509 A1 | 6/2016 | Malhotra et al. |
| 2016/0189513 A1 | 6/2016 | Sloo |
| 2016/0189524 A1 | 6/2016 | Poder et al. |
| 2016/0189528 A1 | 6/2016 | Lee et al. |
| 2016/0189529 A1 | 6/2016 | Lee et al. |
| 2016/0189531 A1 | 6/2016 | Modi et al. |
| 2016/0189532 A1 | 6/2016 | Malhotra et al. |
| 2016/0189533 A1 | 6/2016 | Modi et al. |
| 2016/0189542 A1 | 6/2016 | Myer |
| 2016/0189544 A1 | 6/2016 | Ricci |
| 2016/0189752 A1 | 6/2016 | Galant et al. |
| 2016/0190687 A1 | 6/2016 | Shao et al. |
| 2016/0190691 A1 | 6/2016 | Piskun |
| 2016/0190806 A1 | 6/2016 | Taimela et al. |
| 2016/0190828 A1 | 6/2016 | Nakamura et al. |
| 2016/0190868 A1 | 6/2016 | Shao et al. |
| 2016/0190869 A1 | 6/2016 | Shao et al. |
| 2016/0191265 A1 | 6/2016 | Cohn et al. |
| 2016/0191295 A1 | 6/2016 | Dong et al. |
| 2016/0191339 A1 | 6/2016 | Gupta et al. |
| 2016/0191356 A1 | 6/2016 | Sundaresan |
| 2016/0191426 A1 | 6/2016 | Koch et al. |
| 2016/0191436 A1 | 6/2016 | Yu |
| 2016/0191439 A1 | 6/2016 | Chakra et al. |
| 2016/0191474 A1 | 6/2016 | Hinh |
| 2016/0191584 A1 | 6/2016 | Dickow et al. |
| 2016/0191594 A1 | 6/2016 | Moustafa et al. |
| 2016/0191673 A1 | 6/2016 | Bohannon et al. |
| 2016/0191712 A1 | 6/2016 | Bouzid et al. |
| 2016/0191716 A1 | 6/2016 | Sharma |
| 2016/0191717 A1 | 6/2016 | Ramprasad et al. |
| 2016/0191775 A1 | 6/2016 | Naguib et al. |
| 2016/0191958 A1 | 6/2016 | Nauseef et al. |
| 2016/0192111 A1 | 6/2016 | Choi et al. |
| 2016/0192118 A1 | 6/2016 | Lee et al. |
| 2016/0192135 A1 | 6/2016 | Stremel et al. |
| 2016/0192141 A1 | 6/2016 | Park et al. |
| 2016/0192154 A1 | 6/2016 | Modica et al. |
| 2016/0192157 A1 | 6/2016 | Wirola et al. |
| 2016/0192166 A1 | 6/2016 | deCharms |
| 2016/0192168 A1 | 6/2016 | Lee et al. |
| 2016/0192277 A1 | 6/2016 | Starsinic |
| 2016/0192289 A1 | 6/2016 | Visuri et al. |
| 2016/0192321 A9 | 6/2016 | Reed et al. |
| 2016/0192346 A1 | 6/2016 | Chien et al. |
| 2016/0192458 A1 | 6/2016 | Keith |
| 2016/0193583 A1 | 7/2016 | Licitar |
| 2016/0193694 A1 | 7/2016 | Dinkelman |
| 2016/0193729 A1 | 7/2016 | Williams |
| 2016/0193889 A1 | 7/2016 | Slawson |
| 2016/0193895 A1 | 7/2016 | Aich et al. |
| 2016/0193934 A1 | 7/2016 | Marathe et al. |
| 2016/0193937 A1 | 7/2016 | Dalum |
| 2016/0194007 A1 | 7/2016 | Furuya |
| 2016/0194087 A1 | 7/2016 | Nalim |
| 2016/0194288 A1 | 7/2016 | Melander et al. |
| 2016/0194584 A1 | 7/2016 | Ngantung et al. |
| 2016/0194942 A1 | 7/2016 | Wiegman et al. |
| 2016/0195006 A1 | 7/2016 | Morgan et al. |
| 2016/0195027 A1 | 7/2016 | Mori et al. |
| 2016/0195047 A1 | 7/2016 | Carter et al. |
| 2016/0195055 A1 | 7/2016 | Suzuki et al. |
| 2016/0195082 A1 | 7/2016 | Wiegman et al. |
| 2016/0195186 A1 | 7/2016 | Shamshiri et al. |
| 2016/0195291 A1 | 7/2016 | Hauenstein |
| 2016/0195401 A1 | 7/2016 | Lu et al. |
| 2016/0195509 A1 | 7/2016 | Jamieson et al. |
| 2016/0195602 A1 | 7/2016 | Meadow |
| 2016/0195856 A1 | 7/2016 | Spero |
| 2016/0195864 A1 | 7/2016 | Kim |
| 2016/0195876 A1 | 7/2016 | Mattsson et al. |
| 2016/0196010 A1 | 7/2016 | Sheha et al. |
| 2016/0196131 A1 | 7/2016 | Searle et al. |
| 2016/0196132 A1 | 7/2016 | Searle et al. |
| 2016/0196150 A1 | 7/2016 | Jing et al. |
| 2016/0196176 A1 | 7/2016 | Thompson |
| 2016/0196198 A1 | 7/2016 | Ajith Kumar et al. |
| 2016/0196274 A1 | 7/2016 | Gadde et al. |
| 2016/0196389 A1 | 7/2016 | Moturu et al. |
| 2016/0196432 A1 | 7/2016 | Main et al. |
| 2016/0196451 A1 | 7/2016 | Le Jouan |
| 2016/0196525 A1 | 7/2016 | Kantor et al. |
| 2016/0196544 A1 | 7/2016 | Norair |
| 2016/0196583 A1 | 7/2016 | Altberg et al. |
| 2016/0196596 A1 | 7/2016 | Van Wie et al. |
| 2016/0196620 A1 | 7/2016 | MacLaughlin |
| 2016/0196629 A1 | 7/2016 | Sheha et al. |
| 2016/0196722 A1 | 7/2016 | Davis et al. |
| 2016/0196745 A1 | 7/2016 | Ricci |
| 2016/0196751 A1 | 7/2016 | Jarrell |
| 2016/0196753 A1 | 7/2016 | Jarrell |
| 2016/0197036 A1 | 7/2016 | Lee et al. |
| 2016/0197333 A1 | 7/2016 | DeKeuster et al. |
| 2016/0197489 A1 | 7/2016 | Kurs et al. |
| 2016/0197503 A1 | 7/2016 | Steigerwald et al. |
| 2016/0197519 A1 | 7/2016 | Carter et al. |
| 2016/0197776 A1 | 7/2016 | Das |
| 2016/0197782 A1 | 7/2016 | Hort et al. |
| 2016/0197783 A1 | 7/2016 | Hort et al. |
| 2016/0197800 A1 | 7/2016 | Hui et al. |
| 2016/0197831 A1 | 7/2016 | De Foy et al. |
| 2016/0197993 A1 | 7/2016 | Perkowski et al. |
| 2016/0198002 A1 | 7/2016 | Penilla et al. |
| 2016/0198049 A1 | 7/2016 | Iwai |
| 2016/0198244 A1 | 7/2016 | Lund et al. |
| 2016/0198296 A1 | 7/2016 | Jung et al. |
| 2016/0198297 A1 | 7/2016 | Jodlauk et al. |
| 2016/0198387 A1 | 7/2016 | Hall et al. |
| 2016/0198404 A1 | 7/2016 | Tsiatsis et al. |
| 2016/0198485 A1 | 7/2016 | Yousefi et al. |
| 2016/0198522 A1 | 7/2016 | Miller et al. |
| 2016/0198548 A1 | 7/2016 | Monaci et al. |
| 2016/0198644 A1 | 7/2016 | Lameli et al. |
| 2016/0198950 A1 | 7/2016 | Gross et al. |
| 2016/0199576 A1 | 7/2016 | Savage |
| 2016/0199812 A1 | 7/2016 | Aoki |
| 2016/0200202 A1 | 7/2016 | She et al. |
| 2016/0200254 A1 | 7/2016 | Raab |
| 2016/0200310 A1 | 7/2016 | Amemiya et al. |
| 2016/0200315 A1 | 7/2016 | Fracchia et al. |
| 2016/0201168 A1 | 7/2016 | Shishido et al. |
| 2016/0201532 A1 | 7/2016 | Chanko et al. |
| 2016/0201533 A1 | 7/2016 | Upadhyay et al. |
| 2016/0201555 A1 | 7/2016 | Eda |
| 2016/0201581 A1 | 7/2016 | Wittkopf et al. |
| 2016/0201586 A1 | 7/2016 | Serrano et al. |
| 2016/0201633 A1 | 7/2016 | Quinteros |
| 2016/0201766 A1 | 7/2016 | Kato et al. |
| 2016/0201772 A1 | 7/2016 | Lohr et al. |
| 2016/0202070 A1 | 7/2016 | Habib et al. |
| 2016/0202076 A1 | 7/2016 | Feng |
| 2016/0202082 A1 | 7/2016 | Vandanapu et al. |
| 2016/0202200 A1 | 7/2016 | Nakano et al. |
| 2016/0202699 A1 | 7/2016 | Knapp et al. |

(56) References Cited

U.S. PATENT DOCUMENTS

| | | |
|---|---|---|
| 2016/0202755 A1 | 7/2016 | Connor |
| 2016/0202850 A1 | 7/2016 | Langlois et al. |
| 2016/0202942 A1 | 7/2016 | Walkin et al. |
| 2016/0203211 A1 | 7/2016 | Milton et al. |
| 2016/0203300 A1 | 7/2016 | Hu et al. |
| 2016/0203347 A1 | 7/2016 | Bartholomew et al. |
| 2016/0203373 A1 | 7/2016 | Menashe et al. |
| 2016/0203382 A1 | 7/2016 | Gardiner et al. |
| 2016/0203435 A1 | 7/2016 | Waltniel |
| 2016/0203490 A1 | 7/2016 | Gupta et al. |
| 2016/0203497 A1 | 7/2016 | Tietzen et al. |
| 2016/0203520 A1 | 7/2016 | Das et al. |
| 2016/0203626 A1 | 7/2016 | Bostick et al. |
| 2016/0203639 A1 | 7/2016 | Bostick et al. |
| 2016/0203651 A1 | 7/2016 | Heath et al. |
| 2016/0203652 A1 | 7/2016 | Throop et al. |
| 2016/0203661 A1 | 7/2016 | Pudar et al. |
| 2016/0203712 A1 | 7/2016 | Blandin et al. |
| 2016/0203718 A1 | 7/2016 | Lloreda et al. |
| 2016/0203879 A1 | 7/2016 | Ingraham et al. |
| 2016/0204440 A1 | 7/2016 | Todoriki et al. |
| 2016/0204507 A1 | 7/2016 | Karjalainen |
| 2016/0204795 A1 | 7/2016 | Huang et al. |
| 2016/0204826 A1 | 7/2016 | Feher |
| 2016/0204831 A1 | 7/2016 | Isoda et al. |
| 2016/0204913 A1 | 7/2016 | Agee et al. |
| 2016/0204914 A1 | 7/2016 | Agee et al. |
| 2016/0204990 A1 | 7/2016 | Shattil |
| 2016/0205016 A1 | 7/2016 | Shattil |
| 2016/0205067 A1 | 7/2016 | Cha et al. |
| 2016/0205082 A1 | 7/2016 | Puderer et al. |
| 2016/0205096 A1 | 7/2016 | Hoyos et al. |
| 2016/0205217 A1 | 7/2016 | Choi et al. |
| 2016/0205238 A1 | 7/2016 | Abramson et al. |
| 2016/0205419 A1 | 7/2016 | Ricci et al. |
| 2016/0205422 A1 | 7/2016 | Saptharishi |
| 2016/0205450 A1 | 7/2016 | Gartseev et al. |
| 2016/0205504 A1 | 7/2016 | Chen et al. |
| 2016/0205506 A1 | 7/2016 | Turner et al. |
| 2016/0205513 A1 | 7/2016 | Choudhry |
| 2016/0205538 A1 | 7/2016 | Kweon et al. |
| 2016/0205560 A1 | 7/2016 | Hyslop et al. |
| 2016/0207389 A1 | 7/2016 | Yang et al. |
| 2016/0207390 A1 | 7/2016 | Yang et al. |
| 2016/0207391 A1 | 7/2016 | Yang et al. |
| 2016/0207392 A1 | 7/2016 | Zhang et al. |
| 2016/0207454 A1 | 7/2016 | Cuddihy et al. |
| 2016/0207494 A1 | 7/2016 | Hector, Jr. et al. |
| 2016/0207495 A1 | 7/2016 | Le et al. |
| 2016/0207523 A1 | 7/2016 | Kotsuji et al. |
| 2016/0207541 A1 | 7/2016 | Mansur et al. |
| 2016/0207778 A1 | 7/2016 | Rossi |
| 2016/0207817 A1 | 7/2016 | Hojaji et al. |
| 2016/0208023 A1 | 7/2016 | Lee et al. |
| 2016/0208024 A1 | 7/2016 | Kim et al. |
| 2016/0208243 A1 | 7/2016 | Zhang et al. |
| 2016/0208458 A1 | 7/2016 | Juricak et al. |
| 2016/0208605 A1 | 7/2016 | Morrow et al. |
| 2016/0208692 A1 | 7/2016 | Hanlon et al. |
| 2016/0208695 A1 | 7/2016 | Wells |
| 2016/0208725 A1 | 7/2016 | Fukuda et al. |
| 2016/0208732 A1 | 7/2016 | Mori et al. |
| 2016/0208742 A1 | 7/2016 | Pande |
| 2016/0208764 A1 | 7/2016 | Mann et al. |
| 2016/0208913 A1 | 7/2016 | Kuwahara et al. |
| 2016/0209059 A1 | 7/2016 | Castillo et al. |
| 2016/0209060 A1 | 7/2016 | Castillo et al. |
| 2016/0209061 A1 | 7/2016 | Castillo et al. |
| 2016/0209062 A1 | 7/2016 | Castillo et al. |
| 2016/0209066 A1 | 7/2016 | Castillo et al. |
| 2016/0209067 A1 | 7/2016 | Castillo et al. |
| 2016/0209068 A1 | 7/2016 | Castillo et al. |
| 2016/0209224 A1 | 7/2016 | Dickow et al. |
| 2016/0209648 A1 | 7/2016 | Haddick et al. |
| 2016/0209831 A1 | 7/2016 | Pal |
| 2016/0209842 A1 | 7/2016 | Thakur et al. |
| 2016/0209843 A1 | 7/2016 | Meuleau et al. |
| 2016/0209845 A1 | 7/2016 | Kojo et al. |
| 2016/0209848 A1 | 7/2016 | Kojo et al. |
| 2016/0209997 A1 | 7/2016 | Lee et al. |
| 2016/0210044 A1 | 7/2016 | Mitkar et al. |
| 2016/0210110 A1 | 7/2016 | Feldman |
| 2016/0210283 A1 | 7/2016 | Kim et al. |
| 2016/0210332 A1 | 7/2016 | Milton et al. |
| 2016/0210382 A1 | 7/2016 | Alaniz et al. |
| 2016/0210383 A1 | 7/2016 | Alaniz et al. |
| 2016/0210525 A1 | 7/2016 | Yang et al. |
| 2016/0210578 A1 | 7/2016 | Raleigh et al. |
| 2016/0210588 A1 | 7/2016 | Wheelock et al. |
| 2016/0210591 A1 | 7/2016 | Lafrance |
| 2016/0210602 A1 | 7/2016 | Siddique et al. |
| 2016/0210775 A1 | 7/2016 | Alaniz et al. |
| 2016/0210794 A1 | 7/2016 | Fazi |
| 2016/0210862 A1 | 7/2016 | Hisano |
| 2016/0210952 A1 | 7/2016 | Turner |
| 2016/0211932 A1 | 7/2016 | Schmauderer et al. |
| 2016/0211957 A1 | 7/2016 | Kenney et al. |
| 2016/0211985 A1 | 7/2016 | Castillo et al. |
| 2016/0212086 A1 | 7/2016 | Mathew et al. |
| 2016/0212145 A1 | 7/2016 | Harrison |
| 2016/0212201 A1 | 7/2016 | Munemann |
| 2016/0212460 A1 | 7/2016 | Ramaswamy et al. |
| 2016/0212508 A1 | 7/2016 | Guglielmo et al. |
| 2016/0212577 A1 | 7/2016 | Dor et al. |
| 2016/0212586 A1 | 7/2016 | Ziskind et al. |
| 2016/0212587 A1 | 7/2016 | Cho et al. |
| 2016/0212588 A1 | 7/2016 | Garcia et al. |
| 2016/0212652 A1 | 7/2016 | Iwai |
| 2016/0212684 A1 | 7/2016 | Li et al. |
| 2016/0212695 A1 | 7/2016 | Lynch et al. |
| 2016/0212708 A1 | 7/2016 | Kim et al. |
| 2016/0212740 A1 | 7/2016 | Hui et al. |
| 2016/0212941 A1 | 7/2016 | Halmann |
| 2016/0214490 A1 | 7/2016 | Soo et al. |
| 2016/0214533 A1 | 7/2016 | Doyle et al. |
| 2016/0214535 A1 | 7/2016 | Penilla et al. |
| 2016/0214598 A1 | 7/2016 | Tabata et al. |
| 2016/0214610 A1 | 7/2016 | Kotsuji et al. |
| 2016/0214632 A1 | 7/2016 | Cooper et al. |
| 2016/0214706 A1 | 7/2016 | Gratzer |
| 2016/0214716 A1 | 7/2016 | Knoblach et al. |
| 2016/0214723 A1 | 7/2016 | Fox et al. |
| 2016/0214724 A1 | 7/2016 | Fox et al. |
| 2016/0215087 A1 | 7/2016 | Rukavina et al. |
| 2016/0215680 A1 | 7/2016 | Quix |
| 2016/0215681 A1 | 7/2016 | Brinkman et al. |
| 2016/0215706 A1 | 7/2016 | Glugla |
| 2016/0215718 A1 | 7/2016 | Willcox et al. |
| 2016/0215748 A1 | 7/2016 | Glugla et al. |
| 2016/0215858 A1 | 7/2016 | Lee et al. |
| 2016/0215996 A1 | 7/2016 | Blair et al. |
| 2016/0216126 A1 | 7/2016 | Park et al. |
| 2016/0216130 A1 | 7/2016 | Abramson et al. |
| 2016/0216141 A1 | 7/2016 | Leaders et al. |
| 2016/0216362 A1 | 7/2016 | Subramanian et al. |
| 2016/0216699 A1 | 7/2016 | Pekar et al. |
| 2016/0216940 A1 | 7/2016 | Trammell |
| 2016/0217103 A1 | 7/2016 | Kim |
| 2016/0217124 A1 | 7/2016 | Sarikaya et al. |
| 2016/0217146 A1 | 7/2016 | Schmidt |
| 2016/0217159 A1 | 7/2016 | Dahan et al. |
| 2016/0217203 A1 | 7/2016 | Mansoor |
| 2016/0217217 A1 | 7/2016 | Boudville |
| 2016/0217313 A1 | 7/2016 | Cuti et al. |
| 2016/0217325 A1 | 7/2016 | Bose et al. |
| 2016/0217377 A1 | 7/2016 | Senarath et al. |
| 2016/0217384 A1 | 7/2016 | Leonard et al. |
| 2016/0217459 A1 | 7/2016 | Lindner et al. |
| 2016/0217470 A1 | 7/2016 | Gerard et al. |
| 2016/0217492 A1 | 7/2016 | Anderson |
| 2016/0217519 A1 | 7/2016 | Kozat et al. |
| 2016/0217578 A1 | 7/2016 | Can et al. |
| 2016/0217590 A1 | 7/2016 | Mullins et al. |
| 2016/0217635 A1 | 7/2016 | Pudar et al. |

(56) References Cited

U.S. PATENT DOCUMENTS

| | | |
|---|---|---|
| 2016/0217664 A1 | 7/2016 | Bradford |
| 2016/0217674 A1 | 7/2016 | Stewart et al. |
| 2016/0217694 A1 | 7/2016 | Batla et al. |
| 2016/0217695 A1 | 7/2016 | Peeters et al. |
| 2016/0217767 A1 | 7/2016 | Ben-Bassat |
| 2016/0217784 A1 | 7/2016 | Gelfenbeyn et al. |
| 2016/0218528 A1 | 7/2016 | Sugeno et al. |
| 2016/0218843 A1 | 7/2016 | Inoue et al. |
| 2016/0218884 A1 | 7/2016 | Ebrom et al. |
| 2016/0218965 A1 | 7/2016 | Thubert et al. |
| 2016/0219011 A1 | 7/2016 | Vanderhulst |
| 2016/0219024 A1 | 7/2016 | Verzun et al. |
| 2016/0219028 A1 | 7/2016 | Baltes et al. |
| 2016/0219088 A1 | 7/2016 | Ma et al. |
| 2016/0219117 A1 | 7/2016 | Marlatt et al. |
| 2016/0219118 A1 | 7/2016 | Trammell |
| 2016/0219248 A1 | 7/2016 | Reznik et al. |
| 2016/0219348 A1 | 7/2016 | Formo et al. |
| 2016/0219349 A1 | 7/2016 | Shaw et al. |
| 2016/0219420 A1 | 7/2016 | Sah et al. |
| 2016/0219505 A1 | 7/2016 | Subramanian et al. |
| 2016/0219516 A1 | 7/2016 | Subramanian et al. |
| 2016/0219517 A1 | 7/2016 | Ylamurto et al. |
| 2016/0219523 A1 | 7/2016 | Twitchell, Jr. et al. |
| 2016/0219552 A1 | 7/2016 | Chen |
| 2016/0219615 A1 | 7/2016 | Chakrabarti et al. |
| 2016/0219679 A1 | 7/2016 | Snyder et al. |
| 2016/0220198 A1 | 8/2016 | Proud |
| 2016/0220324 A1 | 8/2016 | Tesar |
| 2016/0220743 A1 | 8/2016 | Guthrie et al. |
| 2016/0220885 A1 | 8/2016 | Huston et al. |
| 2016/0220954 A1 | 8/2016 | Foo et al. |
| 2016/0221439 A1 | 8/2016 | Platz et al. |
| 2016/0221453 A1 | 8/2016 | Bridges et al. |
| 2016/0221456 A1 | 8/2016 | Rhodes et al. |
| 2016/0221485 A1 | 8/2016 | Harris et al. |
| 2016/0221578 A1 | 8/2016 | Tang et al. |
| 2016/0221592 A1 | 8/2016 | Puttagunta et al. |
| 2016/0221768 A1 | 8/2016 | Kadaba et al. |
| 2016/0222482 A1 | 8/2016 | Murakami et al. |
| 2016/0222483 A1 | 8/2016 | Murakami et al. |
| 2016/0222485 A1 | 8/2016 | Murakami et al. |
| 2016/0222820 A1 | 8/2016 | Truesdale |
| 2016/0222841 A1 | 8/2016 | Vorih et al. |
| 2016/0222852 A1 | 8/2016 | Ren et al. |
| 2016/0222867 A1 | 8/2016 | Lee |
| 2016/0222868 A1 | 8/2016 | Alger et al. |
| 2016/0222894 A1 | 8/2016 | Hagari |
| 2016/0222895 A1 | 8/2016 | Norton et al. |
| 2016/0222899 A1 | 8/2016 | Glugla |
| 2016/0222903 A1 | 8/2016 | Glauber et al. |
| 2016/0222905 A1 | 8/2016 | Syed et al. |
| 2016/0222911 A1 | 8/2016 | Salenbien et al. |
| 2016/0222912 A1 | 8/2016 | Ni |
| 2016/0222972 A1 | 8/2016 | Nuhn |
| 2016/0223078 A1 | 8/2016 | Honma et al. |
| 2016/0223214 A1 | 8/2016 | Turner et al. |
| 2016/0223215 A1 | 8/2016 | Buda et al. |
| 2016/0223216 A1 | 8/2016 | Buda et al. |
| 2016/0223217 A1 | 8/2016 | Buda et al. |
| 2016/0223218 A1 | 8/2016 | Barrett |
| 2016/0223345 A1 | 8/2016 | Thakur et al. |
| 2016/0223347 A1 | 8/2016 | Ricci et al. |
| 2016/0223351 A1 | 8/2016 | Sasse et al. |
| 2016/0223355 A1 | 8/2016 | Habib et al. |
| 2016/0223511 A1 | 8/2016 | Koshnick et al. |
| 2016/0223577 A1 | 8/2016 | Klosinski, Jr. et al. |
| 2016/0223578 A1 | 8/2016 | Klosinski, Jr. et al. |
| 2016/0223638 A1 | 8/2016 | Kravets et al. |
| 2016/0223663 A1 | 8/2016 | Schmalenberg et al. |
| 2016/0224030 A1 | 8/2016 | Wulff et al. |
| 2016/0224104 A1 | 8/2016 | Husain et al. |
| 2016/0224137 A1 | 8/2016 | Bolin et al. |
| 2016/0224328 A1 | 8/2016 | Risbood et al. |
| 2016/0224435 A1 | 8/2016 | Kripalani et al. |
| 2016/0224696 A1 | 8/2016 | Bhatawadekar et al. |
| 2016/0224724 A1 | 8/2016 | Zhao et al. |
| 2016/0224725 A1 | 8/2016 | Von Hoff et al. |
| 2016/0224726 A1 | 8/2016 | Von Hoff et al. |
| 2016/0224727 A1 | 8/2016 | Von Hoff et al. |
| 2016/0224728 A1 | 8/2016 | Von Hoff et al. |
| 2016/0224729 A1 | 8/2016 | Von Hoff et al. |
| 2016/0224742 A1 | 8/2016 | Von Hoff et al. |
| 2016/0224745 A1 | 8/2016 | Von Hoff et al. |
| 2016/0224746 A1 | 8/2016 | Von Hoff et al. |
| 2016/0224747 A1 | 8/2016 | Von Hoff et al. |
| 2016/0224773 A1 | 8/2016 | Ramaci |
| 2016/0224786 A1 | 8/2016 | Swidowski et al. |
| 2016/0224798 A1 | 8/2016 | Lim |
| 2016/0224803 A1 | 8/2016 | Frank et al. |
| 2016/0224828 A1 | 8/2016 | Bose et al. |
| 2016/0224916 A1 | 8/2016 | Brandon et al. |
| 2016/0224919 A1 | 8/2016 | Diaconu |
| 2016/0224930 A1 | 8/2016 | Kadaba et al. |
| 2016/0224951 A1 | 8/2016 | Hoffberg |
| 2016/0225027 A1 | 8/2016 | Ramer et al. |
| 2016/0225072 A1 | 8/2016 | Brady et al. |
| 2016/0225087 A1 | 8/2016 | Oberlechner |
| 2016/0225095 A1 | 8/2016 | Biemer et al. |
| 2016/0225108 A1 | 8/2016 | Fishberg |
| 2016/0225183 A1 | 8/2016 | Lee et al. |
| 2016/0225198 A1 | 8/2016 | Punjabi et al. |
| 2016/0225203 A1 | 8/2016 | Asmar et al. |
| 2016/0225248 A1 | 8/2016 | Rodriguez, Jr. et al. |
| 2016/0225255 A1 | 8/2016 | Thakur et al. |
| 2016/0225259 A1 | 8/2016 | Harris et al. |
| 2016/0225272 A1 | 8/2016 | Shea |
| 2016/0225273 A1 | 8/2016 | Baruah et al. |
| 2016/0225278 A1 | 8/2016 | Leddy |
| 2016/0225412 A1 | 8/2016 | Zises |
| 2016/0225425 A1 | 8/2016 | Kim et al. |
| 2016/0225984 A1 | 8/2016 | Sim et al. |
| 2016/0226207 A1 | 8/2016 | Fullerton et al. |
| 2016/0226305 A1 | 8/2016 | Estes |
| 2016/0226590 A1 | 8/2016 | Jobert et al. |
| 2016/0226653 A1 | 8/2016 | Bharadia et al. |
| 2016/0226671 A1 | 8/2016 | Lemoine |
| 2016/0226732 A1 | 8/2016 | Kim et al. |
| 2016/0226761 A1 | 8/2016 | Hui et al. |
| 2016/0226840 A1 | 8/2016 | Buccella et al. |
| 2016/0226841 A1 | 8/2016 | Linnakangas et al. |
| 2016/0226847 A1 | 8/2016 | Bone et al. |
| 2016/0226859 A1 | 8/2016 | Sondhi et al. |
| 2016/0226900 A1 | 8/2016 | Fajardo Verano et al. |
| 2016/0226903 A1 | 8/2016 | Arcamone et al. |
| 2016/0226940 A1 | 8/2016 | Ozzie et al. |
| 2016/0226968 A1 | 8/2016 | Hsieh et al. |
| 2016/0226983 A1 | 8/2016 | Mahmud |
| 2016/0226990 A1 | 8/2016 | Brandstetter et al. |
| 2016/0226995 A1 | 8/2016 | Senarath et al. |
| 2016/0227017 A1 | 8/2016 | Kotab |
| 2016/0227018 A1 | 8/2016 | Lee et al. |
| 2016/0227019 A1 | 8/2016 | Seol et al. |
| 2016/0227028 A1 | 8/2016 | Chan et al. |
| 2016/0227096 A1 | 8/2016 | Brav et al. |
| 2016/0227168 A1 | 8/2016 | Vendrow |
| 2016/0227259 A1 | 8/2016 | Brav et al. |
| 2016/0227287 A1 | 8/2016 | McKissick et al. |
| 2016/0227311 A1 | 8/2016 | Ushakov |
| 2016/0227336 A1 | 8/2016 | Sakri et al. |
| 2016/0227341 A1 | 8/2016 | Norris et al. |
| 2016/0227346 A1 | 8/2016 | Lu et al. |
| 2016/0227361 A1 | 8/2016 | Booth et al. |
| 2016/0227363 A1 | 8/2016 | Connors |
| 2016/0227371 A1 | 8/2016 | Wang et al. |
| 2016/0227375 A1 | 8/2016 | Farrell et al. |
| 2016/0227377 A1 | 8/2016 | Kuenzi et al. |
| 2016/0227422 A1 | 8/2016 | Partheniou et al. |
| 2016/0227463 A1 | 8/2016 | Baugh et al. |
| 2016/0227464 A1 | 8/2016 | Senarath et al. |
| 2016/0227510 A1 | 8/2016 | Reed et al. |
| 2016/0227583 A1 | 8/2016 | Chavva et al. |
| 2016/0227655 A1 | 8/2016 | Han et al. |
| 2016/0228064 A1 | 8/2016 | Jung et al. |

(56) References Cited

U.S. PATENT DOCUMENTS

| | | |
|---|---|---|
| 2016/0228091 A1 | 8/2016 | Chiang et al. |
| 2016/0228767 A1 | 8/2016 | Nakayama et al. |
| 2016/0228771 A1 | 8/2016 | Watson |
| 2016/0228776 A1 | 8/2016 | Miura et al. |
| 2016/0228852 A1 | 8/2016 | Biberger et al. |
| 2016/0228946 A1 | 8/2016 | Itamura et al. |
| 2016/0229271 A1 | 8/2016 | Dassen et al. |
| 2016/0229342 A1 | 8/2016 | Taylor et al. |
| 2016/0229376 A1 | 8/2016 | Mahmoud et al. |
| 2016/0229404 A1 | 8/2016 | Byun |
| 2016/0229405 A1 | 8/2016 | Shimizu et al. |
| 2016/0229435 A1 | 8/2016 | Ryan |
| 2016/0229467 A1 | 8/2016 | Miller et al. |
| 2016/0229522 A1 | 8/2016 | Pachikara et al. |
| 2016/0229547 A1 | 8/2016 | Fisher et al. |
| 2016/0230619 A1 | 8/2016 | McCarthy, Jr. |
| 2016/0230658 A1 | 8/2016 | Hanlon et al. |
| 2016/0230692 A1 | 8/2016 | Auffret et al. |
| 2016/0230781 A1 | 8/2016 | Barth et al. |
| 2016/0230784 A1 | 8/2016 | Shani et al. |
| 2016/0230855 A1 | 8/2016 | Antchak et al. |
| 2016/0231031 A1 | 8/2016 | Bruno |
| 2016/0231122 A1 | 8/2016 | Beaurepaire |
| 2016/0231129 A1 | 8/2016 | Erez et al. |
| 2016/0231131 A1 | 8/2016 | Verheijen et al. |
| 2016/0231132 A1 | 8/2016 | Maiwand et al. |
| 2016/0231399 A1 | 8/2016 | Rothberg et al. |
| 2016/0231402 A1 | 8/2016 | Rothberg et al. |
| 2016/0231403 A1 | 8/2016 | Rothberg et al. |
| 2016/0231404 A1 | 8/2016 | Rothberg et al. |
| 2016/0231414 A1 | 8/2016 | Steiner |
| 2016/0231573 A1 | 8/2016 | Mullins et al. |
| 2016/0231718 A1 | 8/2016 | Logan et al. |
| 2016/0231725 A1 | 8/2016 | Carter et al. |
| 2016/0231739 A1 | 8/2016 | Tofte et al. |
| 2016/0231817 A1 | 8/2016 | Tannenbaum et al. |
| 2016/0231825 A1 | 8/2016 | Thijssen |
| 2016/0231915 A1 | 8/2016 | Nhan et al. |
| 2016/0232062 A1 | 8/2016 | Vibhor et al. |
| 2016/0232080 A1 | 8/2016 | Bhattacharya |
| 2016/0232116 A1 | 8/2016 | Bone et al. |
| 2016/0232167 A1 | 8/2016 | Ham et al. |
| 2016/0232196 A1 | 8/2016 | Nielsen et al. |
| 2016/0232283 A1 | 8/2016 | Von Hoff et al. |
| 2016/0232284 A1 | 8/2016 | Von Hoff et al. |
| 2016/0232285 A1 | 8/2016 | Von Hoff et al. |
| 2016/0232286 A1 | 8/2016 | Von Hoff et al. |
| 2016/0232287 A1 | 8/2016 | Von Hoff et al. |
| 2016/0232288 A1 | 8/2016 | Von Hoff et al. |
| 2016/0232289 A1 | 8/2016 | Von Hoff et al. |
| 2016/0232352 A1 | 8/2016 | Chen et al. |
| 2016/0232387 A1 | 8/2016 | Myers et al. |
| 2016/0232479 A1 | 8/2016 | Skaaksrud |
| 2016/0232481 A1 | 8/2016 | Skaaksrud |
| 2016/0232484 A1 | 8/2016 | Skaaksrud |
| 2016/0232485 A1 | 8/2016 | Skaaksrud |
| 2016/0232486 A1 | 8/2016 | Skaaksrud |
| 2016/0232488 A1 | 8/2016 | Skaaksrud |
| 2016/0232489 A1 | 8/2016 | Skaaksrud |
| 2016/0232502 A1 | 8/2016 | Barbulescu et al. |
| 2016/0232546 A1 | 8/2016 | Ranft et al. |
| 2016/0232565 A1 | 8/2016 | Goergen |
| 2016/0232566 A1 | 8/2016 | Bonalle |
| 2016/0232571 A1 | 8/2016 | Moshfeghi |
| 2016/0232600 A1 | 8/2016 | Purves |
| 2016/0232621 A1 | 8/2016 | Ethington et al. |
| 2016/0232625 A1 | 8/2016 | Akutagawa et al. |
| 2016/0232627 A1 | 8/2016 | Smith et al. |
| 2016/0232635 A1 | 8/2016 | Saksonov et al. |
| 2016/0232713 A1 | 8/2016 | Lee |
| 2016/0232715 A1 | 8/2016 | Lee |
| 2016/0232725 A1 | 8/2016 | Plowman et al. |
| 2016/0232748 A1 | 8/2016 | Pierce et al. |
| 2016/0232774 A1 | 8/2016 | Noland et al. |
| 2016/0232778 A1 | 8/2016 | Honjo et al. |
| 2016/0232780 A1 | 8/2016 | Cohn et al. |
| 2016/0232788 A1 | 8/2016 | Byun |
| 2016/0233413 A1 | 8/2016 | Zawada et al. |
| 2016/0233474 A1 | 8/2016 | Kagami et al. |
| 2016/0233578 A1 | 8/2016 | Kume et al. |
| 2016/0233582 A1 | 8/2016 | Piskun |
| 2016/0233912 A1 | 8/2016 | Thomas et al. |
| 2016/0234005 A1 | 8/2016 | Hong et al. |
| 2016/0234070 A1 | 8/2016 | Calo et al. |
| 2016/0234186 A1 | 8/2016 | Leblond et al. |
| 2016/0234195 A1 | 8/2016 | Fausak et al. |
| 2016/0234196 A1 | 8/2016 | Fausak et al. |
| 2016/0234216 A1 | 8/2016 | Fausak et al. |
| 2016/0234272 A1 | 8/2016 | Hui et al. |
| 2016/0234273 A1 | 8/2016 | Trammell |
| 2016/0234286 A1 | 8/2016 | Fausak et al. |
| 2016/0234287 A1 | 8/2016 | Sheaffer et al. |
| 2016/0234335 A1 | 8/2016 | Hu et al. |
| 2016/0234338 A1 | 8/2016 | Biron |
| 2016/0234341 A1 | 8/2016 | Dare et al. |
| 2016/0234342 A1 | 8/2016 | Oonk et al. |
| 2016/0234343 A1 | 8/2016 | Fausak et al. |
| 2016/0234350 A1 | 8/2016 | Chakrabarti et al. |
| 2016/0234355 A1 | 8/2016 | Lee et al. |
| 2016/0234356 A1 | 8/2016 | Thomas et al. |
| 2016/0234361 A1 | 8/2016 | Baek et al. |
| 2016/0234362 A1 | 8/2016 | Moon et al. |
| 2016/0234371 A1 | 8/2016 | Kang |
| 2016/0234441 A1 | 8/2016 | Tiana |
| 2016/0234476 A1 | 8/2016 | Millett |
| 2016/0234532 A1 | 8/2016 | Lee et al. |
| 2016/0234606 A1 | 8/2016 | Selig et al. |
| 2016/0234628 A1 | 8/2016 | Rahman et al. |
| 2016/0234629 A1 | 8/2016 | Kim et al. |
| 2016/0234634 A1 | 8/2016 | Rasband et al. |
| 2016/0234642 A1 | 8/2016 | Kim et al. |
| 2016/0234646 A1 | 8/2016 | Ngai et al. |
| 2016/0234647 A1 | 8/2016 | MacDonald et al. |
| 2016/0234648 A1 | 8/2016 | Letz et al. |
| 2016/0234654 A1 | 8/2016 | Tosa et al. |
| 2016/0234662 A1 | 8/2016 | Heubel |
| 2016/0234668 A1 | 8/2016 | Lee |
| 2016/0234669 A1 | 8/2016 | Feher |
| 2016/0234673 A1 | 8/2016 | Fujinami |
| 2016/0234683 A1 | 8/2016 | Bone et al. |
| 2016/0234765 A1 | 8/2016 | Tannenbaum et al. |
| 2016/0235236 A1 | 8/2016 | Byers et al. |
| 2016/0235341 A1 | 8/2016 | Choi et al. |
| 2016/0235359 A1 | 8/2016 | Cho et al. |
| 2016/0235366 A1 | 8/2016 | Holmes et al. |
| 2016/0235524 A1 | 8/2016 | Wortz et al. |
| 2016/0236089 A1 | 8/2016 | Dumont et al. |
| 2016/0236563 A1 | 8/2016 | Ruppert et al. |
| 2016/0236573 A9 | 8/2016 | Severinsky et al. |
| 2016/0236582 A1 | 8/2016 | Wang |
| 2016/0236671 A1 | 8/2016 | Imamura et al. |
| 2016/0236672 A1 | 8/2016 | Yanagida et al. |
| 2016/0236686 A1 | 8/2016 | Hattori et al. |
| 2016/0236694 A1 | 8/2016 | Frazier et al. |
| 2016/0236790 A1 | 8/2016 | Knapp et al. |
| 2016/0236903 A1 | 8/2016 | Blom et al. |
| 2016/0237640 A1 | 8/2016 | Carpenter et al. |
| 2016/0237657 A1 | 8/2016 | Carpenter et al. |
| 2016/0237862 A1 | 8/2016 | Kajita et al. |
| 2016/0237884 A1 | 8/2016 | Yamada et al. |
| 2016/0237890 A1 | 8/2016 | Juan |
| 2016/0237923 A1 | 8/2016 | Kitagawa |
| 2016/0237927 A1 | 8/2016 | Long et al. |
| 2016/0237932 A1 | 8/2016 | Long et al. |
| 2016/0238116 A1 | 8/2016 | Chen |
| 2016/0238272 A1 | 8/2016 | Imes et al. |
| 2016/0238398 A1 | 8/2016 | Hu |
| 2016/0238403 A1 | 8/2016 | Brown et al. |
| 2016/0238406 A1 | 8/2016 | Burtner et al. |
| 2016/0238641 A1 | 8/2016 | Akselrod et al. |
| 2016/0238642 A1 | 8/2016 | Akselrod et al. |
| 2016/0238738 A1 | 8/2016 | Lemoi et al. |
| 2016/0238850 A1 | 8/2016 | Yang |
| 2016/0238851 A1 | 8/2016 | Jeong et al. |

(56) References Cited

U.S. PATENT DOCUMENTS

| | | |
|---|---|---|
| 2016/0239010 A1 | 8/2016 | McDaniel et al. |
| 2016/0239024 A1 | 8/2016 | Fletcher et al. |
| 2016/0239080 A1 | 8/2016 | Marcolina et al. |
| 2016/0239158 A1 | 8/2016 | Zhang et al. |
| 2016/0239184 A1 | 8/2016 | Chapman et al. |
| 2016/0239250 A1 | 8/2016 | Kim et al. |
| 2016/0239287 A1 | 8/2016 | Lim et al. |
| 2016/0239293 A1 | 8/2016 | Hoffman et al. |
| 2016/0239347 A1 | 8/2016 | Lee et al. |
| 2016/0239349 A1 | 8/2016 | Mitkar et al. |
| 2016/0239493 A1 | 8/2016 | Stroganov |
| 2016/0239516 A1 | 8/2016 | Huang |
| 2016/0239555 A1 | 8/2016 | Kumarasamy et al. |
| 2016/0239557 A1 | 8/2016 | Glover et al. |
| 2016/0239573 A1 | 8/2016 | Albert et al. |
| 2016/0239593 A1 | 8/2016 | Pekar et al. |
| 2016/0239629 A1 | 8/2016 | Canon et al. |
| 2016/0239645 A1 | 8/2016 | Heo et al. |
| 2016/0239659 A1 | 8/2016 | Seo et al. |
| 2016/0239686 A1 | 8/2016 | Kwon et al. |
| 2016/0239696 A1 | 8/2016 | Mats et al. |
| 2016/0239749 A1 | 8/2016 | Peredriy et al. |
| 2016/0239759 A1 | 8/2016 | Sung |
| 2016/0239799 A1 | 8/2016 | Burch et al. |
| 2016/0239801 A1 | 8/2016 | Burch et al. |
| 2016/0239802 A1 | 8/2016 | Burch et al. |
| 2016/0239823 A1 | 8/2016 | Bengtsson et al. |
| 2016/0239839 A1 | 8/2016 | Dillard et al. |
| 2016/0239845 A1 | 8/2016 | Ibrahim et al. |
| 2016/0239849 A1 | 8/2016 | Othmer |
| 2016/0239857 A1 | 8/2016 | Milton et al. |
| 2016/0239869 A1 | 8/2016 | Wong et al. |
| 2016/0239875 A1 | 8/2016 | Williams |
| 2016/0239879 A1 | 8/2016 | Williams |
| 2016/0239903 A1 | 8/2016 | Othmer |
| 2016/0239904 A1 | 8/2016 | Washington et al. |
| 2016/0239921 A1 | 8/2016 | Bray et al. |
| 2016/0239925 A1 | 8/2016 | Biemer et al. |
| 2016/0239926 A1 | 8/2016 | Biemer et al. |
| 2016/0239969 A1 | 8/2016 | Davatzikos et al. |
| 2016/0239976 A1 | 8/2016 | Fathi et al. |
| 2016/0240009 A1 | 8/2016 | Lyren |
| 2016/0240010 A1 | 8/2016 | Rosenthal et al. |
| 2016/0240019 A1 | 8/2016 | Tamp |
| 2016/0240036 A1 | 8/2016 | Thakkar et al. |
| 2016/0240050 A1 | 8/2016 | Block et al. |
| 2016/0240061 A1 | 8/2016 | Li et al. |
| 2016/0240062 A1 | 8/2016 | Ritala et al. |
| 2016/0240222 A1 | 8/2016 | Greco et al. |
| 2016/0240223 A1 | 8/2016 | Kim et al. |
| 2016/0240875 A1 | 8/2016 | Rama et al. |
| 2016/0240887 A1 | 8/2016 | Hatta et al. |
| 2016/0240891 A1 | 8/2016 | Hodges et al. |
| 2016/0241133 A1 | 8/2016 | Yamakawa et al. |
| 2016/0241162 A1 | 8/2016 | Yamakawa et al. |
| 2016/0241403 A1 | 8/2016 | Lindemann |
| 2016/0241410 A1 | 8/2016 | Lemoine |
| 2016/0241437 A1 | 8/2016 | Diab et al. |
| 2016/0241445 A1 | 8/2016 | Kim |
| 2016/0241521 A1 | 8/2016 | Kasbarian |
| 2016/0241523 A1 | 8/2016 | Ahn et al. |
| 2016/0241548 A1 | 8/2016 | Kim et al. |
| 2016/0241565 A1 | 8/2016 | Greene et al. |
| 2016/0241569 A1 | 8/2016 | Agrawal et al. |
| 2016/0241648 A1 | 8/2016 | Sharpe et al. |
| 2016/0241699 A1 | 8/2016 | Milnark et al. |
| 2016/0241707 A1 | 8/2016 | Lee et al. |
| 2016/0241713 A1 | 8/2016 | Alm et al. |
| 2016/0241776 A1 | 8/2016 | Kim |
| 2016/0241784 A1 | 8/2016 | Baek et al. |
| 2016/0241993 A1 | 8/2016 | Bellens et al. |
| 2016/0241997 A1 | 8/2016 | Lucas |
| 2016/0241998 A1 | 8/2016 | Choi et al. |
| 2016/0242005 A1 | 8/2016 | Chen et al. |
| 2016/0242034 A1 | 8/2016 | Starsinic et al. |
| 2016/0242043 A1 | 8/2016 | Dong et al. |
| 2016/0242108 A1 | 8/2016 | Kim et al. |
| 2016/0242145 A1 | 8/2016 | Graziano |
| 2016/0242681 A1 | 8/2016 | Shen et al. |
| 2016/0242849 A9 | 8/2016 | Crawford et al. |
| 2016/0243440 A1 | 8/2016 | Miura et al. |
| 2016/0243444 A1 | 8/2016 | Griffin |
| 2016/0243571 A1 | 8/2016 | McLain et al. |
| 2016/0243927 A1 | 8/2016 | Biderman et al. |
| 2016/0243934 A1 | 8/2016 | Gibb et al. |
| 2016/0244011 A1 | 8/2016 | Ricci |
| 2016/0244022 A1 | 8/2016 | Lippman et al. |
| 2016/0244049 A1 | 8/2016 | Petridis et al. |
| 2016/0244067 A1 | 8/2016 | Hunt et al. |
| 2016/0244072 A1 | 8/2016 | Biagini et al. |
| 2016/0244161 A1 | 8/2016 | McClure |
| 2016/0244176 A1 | 8/2016 | Xiao et al. |
| 2016/0244187 A1 | 8/2016 | Byers et al. |
| 2016/0244311 A1 | 8/2016 | Burks et al. |
| 2016/0245190 A1 | 8/2016 | Makled et al. |
| 2016/0245207 A1 | 8/2016 | Ball et al. |
| 2016/0245239 A1 | 8/2016 | Henry |
| 2016/0245241 A1 | 8/2016 | Amaya et al. |
| 2016/0245279 A1 | 8/2016 | Pal et al. |
| 2016/0245350 A1 | 8/2016 | Hoxie et al. |
| 2016/0245395 A1 | 8/2016 | Hong et al. |
| 2016/0245401 A1 | 8/2016 | Washio et al. |
| 2016/0245638 A1 | 8/2016 | Sheinker et al. |
| 2016/0245656 A1 | 8/2016 | Gamzin |
| 2016/0245662 A1 | 8/2016 | Rajagopalan et al. |
| 2016/0245664 A1 | 8/2016 | Soni et al. |
| 2016/0245665 A1 | 8/2016 | Logan et al. |
| 2016/0245686 A1 | 8/2016 | Pal et al. |
| 2016/0245785 A1 | 8/2016 | Marsolek et al. |
| 2016/0245916 A1 | 8/2016 | Weber-Grabau |
| 2016/0246265 A1 | 8/2016 | An et al. |
| 2016/0246292 A1 | 8/2016 | Lawson et al. |
| 2016/0246296 A1 | 8/2016 | Gelinske et al. |
| 2016/0246341 A1 | 8/2016 | Burrell et al. |
| 2016/0246384 A1 | 8/2016 | Mullins et al. |
| 2016/0246481 A1 | 8/2016 | Dakua et al. |
| 2016/0246526 A1 | 8/2016 | Ricci |
| 2016/0246591 A1 | 8/2016 | Eberlein et al. |
| 2016/0246752 A1 | 8/2016 | Luo |
| 2016/0246769 A1 | 8/2016 | Screen et al. |
| 2016/0246815 A1 | 8/2016 | Vibhor et al. |
| 2016/0246819 A1 | 8/2016 | Cosic |
| 2016/0246850 A1 | 8/2016 | Cosic |
| 2016/0246868 A1 | 8/2016 | Cosic |
| 2016/0246879 A1 | 8/2016 | Moss et al. |
| 2016/0246889 A1 | 8/2016 | Forsblom et al. |
| 2016/0246931 A1 | 8/2016 | Rajan et al. |
| 2016/0247005 A1 | 8/2016 | Somani et al. |
| 2016/0247034 A1 | 8/2016 | Lee et al. |
| 2016/0247057 A1 | 8/2016 | Lee et al. |
| 2016/0247080 A1 | 8/2016 | Trantham et al. |
| 2016/0247089 A1 | 8/2016 | Zhao et al. |
| 2016/0247098 A1 | 8/2016 | Bongiomo |
| 2016/0247113 A1 | 8/2016 | Rademaker |
| 2016/0247144 A1 | 8/2016 | Oh et al. |
| 2016/0247153 A1 | 8/2016 | Lesesky |
| 2016/0247175 A1 | 8/2016 | Milton et al. |
| 2016/0247181 A1 | 8/2016 | Rogers |
| 2016/0247199 A1 | 8/2016 | Christensen et al. |
| 2016/0247200 A1 | 8/2016 | Yamaguchi |
| 2016/0247218 A1 | 8/2016 | Stanasolovich et al. |
| 2016/0247221 A1 | 8/2016 | Blumberg et al. |
| 2016/0247238 A1 | 8/2016 | Kunapuli et al. |
| 2016/0247253 A1 | 8/2016 | Kim et al. |
| 2016/0247330 A1 | 8/2016 | Rork et al. |
| 2016/0247333 A1 | 8/2016 | Rockwell et al. |
| 2016/0247335 A1 | 8/2016 | Daily et al. |
| 2016/0247342 A1 | 8/2016 | Kusens et al. |
| 2016/0247353 A1 | 8/2016 | Pallow |
| 2016/0247354 A1 | 8/2016 | Arnone et al. |
| 2016/0247364 A1 | 8/2016 | Herman et al. |
| 2016/0247377 A1 | 8/2016 | Ricci |
| 2016/0247378 A1 | 8/2016 | Baczuk et al. |
| 2016/0247404 A1 | 8/2016 | Srivastava et al. |

(56) References Cited

U.S. PATENT DOCUMENTS

| | | |
|---|---|---|
| 2016/0247537 A1 | 8/2016 | Ricciardi |
| 2016/0247566 A1 | 8/2016 | Kim |
| 2016/0247856 A1 | 8/2016 | Song et al. |
| 2016/0247858 A1 | 8/2016 | Kim et al. |
| 2016/0248009 A1 | 8/2016 | Lee |
| 2016/0248115 A1 | 8/2016 | Hatta et al. |
| 2016/0248345 A1 | 8/2016 | McCowen |
| 2016/0248481 A1 | 8/2016 | Richter et al. |
| 2016/0248631 A1 | 8/2016 | Duchesneau |
| 2016/0248661 A1 | 8/2016 | Dasgupta et al. |
| 2016/0248676 A1 | 8/2016 | Thanasekaran |
| 2016/0248740 A1 | 8/2016 | Peirce |
| 2016/0248778 A1 | 8/2016 | Erdal |
| 2016/0248779 A1 | 8/2016 | Pappo et al. |
| 2016/0248838 A1 | 8/2016 | AbiEzzi et al. |
| 2016/0248863 A1 | 8/2016 | Tseng et al. |
| 2016/0248865 A1 | 8/2016 | Dotan-Cohen et al. |
| 2016/0248871 A1 | 8/2016 | Seed et al. |
| 2016/0248906 A1 | 8/2016 | Schrader et al. |
| 2016/0249024 A1 | 8/2016 | Yajima |
| 2016/0249100 A1 | 8/2016 | Basso et al. |
| 2016/0249148 A1 | 8/2016 | Ilkorur et al. |
| 2016/0249161 A1 | 8/2016 | Roskind et al. |
| 2016/0249163 A1 | 8/2016 | Haverinen |
| 2016/0249175 A1 | 8/2016 | Repenning et al. |
| 2016/0249177 A1 | 8/2016 | Sandel et al. |
| 2016/0249181 A1 | 8/2016 | Taniguchi |
| 2016/0249192 A1 | 8/2016 | Cai et al. |
| 2016/0249195 A1 | 8/2016 | Grube et al. |
| 2016/0249254 A1 | 8/2016 | Giloh et al. |
| 2016/0249281 A1 | 8/2016 | Sahni |
| 2016/0249293 A1 | 8/2016 | Lee |
| 2016/0249318 A1 | 8/2016 | Forstall et al. |
| 2016/0249319 A1 | 8/2016 | Dotan-Cohen et al. |
| 2016/0249400 A1 | 8/2016 | Somasandharam et al. |
| 2016/0249435 A1 | 8/2016 | Modi et al. |
| 2016/0249439 A1 | 8/2016 | Recker et al. |
| 2016/0249781 A1 | 9/2016 | Chen |
| 2016/0249782 A1 | 9/2016 | Chen |
| 2016/0249815 A1 | 9/2016 | Freeman et al. |
| 2016/0249853 A1 | 9/2016 | Ricci |
| 2016/0249857 A1 | 9/2016 | Choi et al. |
| 2016/0250557 A1 | 9/2016 | Ocko et al. |
| 2016/0250752 A1 | 9/2016 | Djugash et al. |
| 2016/0250916 A1 | 9/2016 | Hirano et al. |
| 2016/0250941 A1 | 9/2016 | OConnell et al. |
| 2016/0250943 A1 | 9/2016 | OConnell et al. |
| 2016/0250985 A1 | 9/2016 | Ricci |
| 2016/0251012 A1 | 9/2016 | Schneider et al. |
| 2016/0251025 A1 | 9/2016 | Oldknow et al. |
| 2016/0251167 A1 | 9/2016 | Van Mill et al. |
| 2016/0251743 A1 | 9/2016 | Teramoto et al. |
| 2016/0251961 A1 | 9/2016 | Herbruck et al. |
| 2016/0251991 A1 | 9/2016 | Randall |
| 2016/0252023 A1 | 9/2016 | Srinivasan et al. |
| 2016/0252025 A1 | 9/2016 | Martin et al. |
| 2016/0252053 A1 | 9/2016 | Johnson et al. |
| 2016/0252325 A1 | 9/2016 | Sammut et al. |
| 2016/0252366 A1 | 9/2016 | Park et al. |
| 2016/0252381 A1 | 9/2016 | Kwak et al. |
| 2016/0252888 A1 | 9/2016 | Kim et al. |
| 2016/0252909 A1 | 9/2016 | Webber et al. |
| 2016/0252932 A1 | 9/2016 | Seo et al. |
| 2016/0252939 A1 | 9/2016 | Bang et al. |
| 2016/0252944 A1 | 9/2016 | Kim et al. |
| 2016/0252980 A1 | 9/2016 | Park et al. |
| 2016/0253039 A1 | 9/2016 | Heo et al. |
| 2016/0253041 A1 | 9/2016 | Park et al. |
| 2016/0253047 A1 | 9/2016 | Kim et al. |
| 2016/0253083 A1 | 9/2016 | Lee et al. |
| 2016/0253089 A1 | 9/2016 | Lee et al. |
| 2016/0253142 A1 | 9/2016 | Choi et al. |
| 2016/0253155 A1 | 9/2016 | McNeil et al. |
| 2016/0253218 A1 | 9/2016 | Kim et al. |
| 2016/0253222 A1 | 9/2016 | Adams et al. |
| 2016/0253254 A1 | 9/2016 | Krishnan et al. |
| 2016/0253274 A1 | 9/2016 | Huang et al. |
| 2016/0253313 A1 | 9/2016 | Breske et al. |
| 2016/0253318 A1 | 9/2016 | Lee et al. |
| 2016/0253340 A1 | 9/2016 | Barth et al. |
| 2016/0253342 A1 | 9/2016 | Ramer et al. |
| 2016/0253348 A1 | 9/2016 | Mauti, Jr. |
| 2016/0253385 A1 | 9/2016 | Thombre et al. |
| 2016/0253394 A1 | 9/2016 | Elias et al. |
| 2016/0253440 A1 | 9/2016 | Iyengar et al. |
| 2016/0253458 A1 | 9/2016 | Batwani |
| 2016/0253478 A1 | 9/2016 | Li et al. |
| 2016/0253479 A1 | 9/2016 | Fauci |
| 2016/0253481 A1 | 9/2016 | Tian et al. |
| 2016/0253498 A1 | 9/2016 | Valencia et al. |
| 2016/0253500 A1 | 9/2016 | Alme et al. |
| 2016/0253563 A1 | 9/2016 | Lam et al. |
| 2016/0253582 A1 | 9/2016 | Di et al. |
| 2016/0253595 A1 | 9/2016 | Mathur et al. |
| 2016/0253639 A1 | 9/2016 | Sharma |
| 2016/0253642 A1 | 9/2016 | Efird |
| 2016/0253651 A1 | 9/2016 | Park et al. |
| 2016/0253652 A1 | 9/2016 | Je et al. |
| 2016/0253653 A1 | 9/2016 | Jacob et al. |
| 2016/0253656 A1 | 9/2016 | Dragushan et al. |
| 2016/0253657 A1 | 9/2016 | Sohn et al. |
| 2016/0253666 A1 | 9/2016 | Lee et al. |
| 2016/0253667 A1 | 9/2016 | Jacob et al. |
| 2016/0253669 A1 | 9/2016 | Yoon et al. |
| 2016/0253670 A1 | 9/2016 | Kim et al. |
| 2016/0253689 A1 | 9/2016 | Milton et al. |
| 2016/0253699 A1 | 9/2016 | Liu et al. |
| 2016/0253707 A1 | 9/2016 | Momin et al. |
| 2016/0253709 A1 | 9/2016 | Chen et al. |
| 2016/0253710 A1 | 9/2016 | Publicover et al. |
| 2016/0253712 A1 | 9/2016 | Higgins |
| 2016/0253735 A1 | 9/2016 | Scudillo et al. |
| 2016/0253737 A1 | 9/2016 | Chang et al. |
| 2016/0253746 A1 | 9/2016 | Morrison |
| 2016/0253750 A1 | 9/2016 | Visbal et al. |
| 2016/0253758 A1 | 9/2016 | Riggle |
| 2016/0253761 A1 | 9/2016 | Davey et al. |
| 2016/0253779 A1 | 9/2016 | Dark et al. |
| 2016/0253814 A1 | 9/2016 | Fathi et al. |
| 2016/0253848 A1 | 9/2016 | Taniguchi |
| 2016/0253890 A1 | 9/2016 | Rabinowitz et al. |
| 2016/0253908 A1 | 9/2016 | Chambers et al. |
| 2016/0253924 A1 | 9/2016 | Kwak et al. |
| 2016/0254511 A1 | 9/2016 | Hatta et al. |
| 2016/0254588 A1 | 9/2016 | Kim et al. |
| 2016/0254590 A1 | 9/2016 | Seo et al. |
| 2016/0254687 A1 | 9/2016 | Tanaka et al. |
| 2016/0254832 A1 | 9/2016 | Yoo et al. |
| 2016/0254859 A1 | 9/2016 | Lee et al. |
| 2016/0254906 A1 | 9/2016 | Castellucci et al. |
| 2016/0254942 A1 | 9/2016 | de Luna |
| 2016/0254950 A1 | 9/2016 | Lim et al. |
| 2016/0254959 A1 | 9/2016 | Arndt |
| 2016/0254963 A1 | 9/2016 | Vibhor et al. |
| 2016/0255006 A1 | 9/2016 | Feld et al. |
| 2016/0255015 A1 | 9/2016 | Hrabak et al. |
| 2016/0255017 A1 | 9/2016 | Chowdhary et al. |
| 2016/0255032 A1 | 9/2016 | Vendrow et al. |
| 2016/0255037 A1 | 9/2016 | Spivack et al. |
| 2016/0255050 A1 | 9/2016 | Grayson et al. |
| 2016/0255106 A1 | 9/2016 | Maria |
| 2016/0255140 A1 | 9/2016 | Shattil |
| 2016/0255153 A1 | 9/2016 | Ayers et al. |
| 2016/0255161 A1 | 9/2016 | Lim et al. |
| 2016/0255162 A1 | 9/2016 | Frieder et al. |
| 2016/0255164 A1 | 9/2016 | Takamura et al. |
| 2016/0255249 A1 | 9/2016 | Pan et al. |
| 2016/0255305 A1 | 9/2016 | Ritchey et al. |
| 2016/0255322 A1 | 9/2016 | Kerofsky et al. |
| 2016/0255398 A1 | 9/2016 | Lee et al. |
| 2016/0255408 A1 | 9/2016 | Ricci |
| 2016/0255420 A1 | 9/2016 | McCleland et al. |
| 2016/0255438 A1 | 9/2016 | Erven et al. |
| 2016/0255455 A1 | 9/2016 | Kulavik et al. |

(56) References Cited

U.S. PATENT DOCUMENTS

| | | |
|---|---|---|
| 2016/0255466 A1 | 9/2016 | Shuster et al. |
| 2016/0255480 A1 | 9/2016 | Moguillansky |
| 2016/0255481 A9 | 9/2016 | Arnold et al. |
| 2016/0255493 A1 | 9/2016 | Lihosit et al. |
| 2016/0255495 A1 | 9/2016 | Huang et al. |
| 2016/0255513 A1 | 9/2016 | Lihosit et al. |
| 2016/0255531 A1 | 9/2016 | Stein et al. |
| 2016/0255536 A1 | 9/2016 | Venkatraman et al. |
| 2016/0255559 A1 | 9/2016 | Droste et al. |
| 2016/0255575 A1 | 9/2016 | Ricci |
| 2016/0255600 A1 | 9/2016 | Hayami et al. |
| 2016/0255618 A1 | 9/2016 | Forenza et al. |
| 2016/0255763 A1 | 9/2016 | Canyon |
| 2016/0255778 A1 | 9/2016 | Redden et al. |
| 2016/0255781 A1 | 9/2016 | Chen et al. |
| 2016/0256082 A1 | 9/2016 | Ely et al. |
| 2016/0256097 A1 | 9/2016 | Manautou et al. |
| 2016/0256260 A1 | 9/2016 | Wortz et al. |
| 2016/0256262 A1 | 9/2016 | Wortz et al. |
| 2016/0256263 A1 | 9/2016 | Wortz et al. |
| 2016/0256267 A1 | 9/2016 | Wortz et al. |
| 2016/0256315 A1 | 9/2016 | Wortz et al. |
| 2016/0256781 A1 | 9/2016 | Bronstein Bendayan |
| 2016/0257000 A1 | 9/2016 | Guerin et al. |
| 2016/0257198 A1 | 9/2016 | Buttolo et al. |
| 2016/0257252 A1 | 9/2016 | Zaitsev et al. |
| 2016/0257288 A1 | 9/2016 | Miller et al. |
| 2016/0257291 A1 | 9/2016 | Kim |
| 2016/0257297 A1 | 9/2016 | Oshiumi et al. |
| 2016/0257299 A1 | 9/2016 | Ikedaya et al. |
| 2016/0257310 A1 | 9/2016 | Sprock et al. |
| 2016/0257413 A1 | 9/2016 | Newman et al. |
| 2016/0257415 A1 | 9/2016 | Ye et al. |
| 2016/0257421 A1 | 9/2016 | Ye et al. |
| 2016/0257424 A1 | 9/2016 | Stabler et al. |
| 2016/0258119 A1 | 9/2016 | Krolnik et al. |
| 2016/0258144 A1 | 9/2016 | Tayenaka et al. |
| 2016/0258202 A1 | 9/2016 | Scalisi |
| 2016/0258209 A1 | 9/2016 | Berman et al. |
| 2016/0258369 A1 | 9/2016 | Hayman et al. |
| 2016/0258380 A1 | 9/2016 | Cygan, Jr. et al. |
| 2016/0258410 A1 | 9/2016 | Cygan, Jr. et al. |
| 2016/0258497 A1 | 9/2016 | Bouton et al. |
| 2016/0258647 A1 | 9/2016 | Imes et al. |
| 2016/0258754 A1 | 9/2016 | MacFarlane |
| 2016/0258758 A1 | 9/2016 | Houston et al. |
| 2016/0258762 A1 | 9/2016 | Taylor et al. |
| 2016/0258764 A1 | 9/2016 | Phuyal et al. |
| 2016/0258765 A1 | 9/2016 | Peterson et al. |
| 2016/0258767 A1 | 9/2016 | Nevrekar et al. |
| 2016/0258770 A1 | 9/2016 | Mason et al. |
| 2016/0258776 A1 | 9/2016 | Di Censo et al. |
| 2016/0259027 A1 | 9/2016 | Said |
| 2016/0259032 A1 | 9/2016 | Hehn et al. |
| 2016/0259046 A1 | 9/2016 | Carlbom et al. |
| 2016/0259061 A1 | 9/2016 | Carter |
| 2016/0259307 A1 | 9/2016 | Matsuoka et al. |
| 2016/0259316 A1 | 9/2016 | Ohta et al. |
| 2016/0259341 A1 | 9/2016 | High et al. |
| 2016/0259356 A1 | 9/2016 | Converse |
| 2016/0259404 A1 | 9/2016 | Woods |
| 2016/0259425 A1 | 9/2016 | Lovitt et al. |
| 2016/0259426 A1 | 9/2016 | Yuen et al. |
| 2016/0259432 A1 | 9/2016 | Bau et al. |
| 2016/0259451 A1 | 9/2016 | Bau et al. |
| 2016/0259509 A1 | 9/2016 | Alexander et al. |
| 2016/0259546 A1 | 9/2016 | Shim |
| 2016/0259623 A1 | 9/2016 | Sumner et al. |
| 2016/0259656 A1 | 9/2016 | Sumner et al. |
| 2016/0259789 A1 | 9/2016 | Shrinath et al. |
| 2016/0259804 A1 | 9/2016 | Subramaniam et al. |
| 2016/0259821 A1 | 9/2016 | Rao et al. |
| 2016/0259848 A1 | 9/2016 | Mohammed et al. |
| 2016/0259905 A1 | 9/2016 | Park et al. |
| 2016/0259906 A1 | 9/2016 | Iucha et al. |
| 2016/0259950 A1 | 9/2016 | Rittman et al. |
| 2016/0259956 A1 | 9/2016 | Wassingbo |
| 2016/0260016 A1 | 9/2016 | Barrett et al. |
| 2016/0260019 A1 | 9/2016 | Riquelme Ruiz et al. |
| 2016/0260029 A1 | 9/2016 | Gelfenbeyn et al. |
| 2016/0260033 A1 | 9/2016 | Keyngnaert et al. |
| 2016/0260048 A1 | 9/2016 | Uerbach et al. |
| 2016/0260049 A1 | 9/2016 | High et al. |
| 2016/0260067 A1 | 9/2016 | Holman et al. |
| 2016/0260069 A1 | 9/2016 | Holman et al. |
| 2016/0260075 A1 | 9/2016 | deKozan et al. |
| 2016/0260100 A1 | 9/2016 | Wiesman |
| 2016/0260107 A1 | 9/2016 | Seth et al. |
| 2016/0260108 A1 | 9/2016 | Bracewell |
| 2016/0260135 A1 | 9/2016 | Zomet et al. |
| 2016/0260148 A1 | 9/2016 | High et al. |
| 2016/0260158 A1 | 9/2016 | High et al. |
| 2016/0260161 A1 | 9/2016 | Atchley et al. |
| 2016/0260207 A1 | 9/2016 | Fryshman |
| 2016/0260261 A1 | 9/2016 | Hsu |
| 2016/0260288 A1 | 9/2016 | Arnone et al. |
| 2016/0260302 A1 | 9/2016 | Ellers et al. |
| 2016/0260303 A1 | 9/2016 | Strulovitch et al. |
| 2016/0260315 A1 | 9/2016 | Singh et al. |
| 2016/0260317 A1 | 9/2016 | Lyman |
| 2016/0260319 A1 | 9/2016 | Jeffery et al. |
| 2016/0260322 A1 | 9/2016 | Chen et al. |
| 2016/0260332 A1 | 9/2016 | Downey et al. |
| 2016/0260413 A1 | 9/2016 | You et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0260948 A1 | 9/2016 | Nishimoto |
| 2016/0260986 A1 | 9/2016 | Devoe et al. |
| 2016/0261031 A1 | 9/2016 | Dion et al. |
| 2016/0261151 A1 | 9/2016 | Kim et al. |
| 2016/0261268 A1 | 9/2016 | Rakova et al. |
| 2016/0261291 A1 | 9/2016 | Colella et al. |
| 2016/0261397 A1 | 9/2016 | Kenney et al. |
| 2016/0261425 A1 | 9/2016 | Horton et al. |
| 2016/0261458 A1 | 9/2016 | Huang |
| 2016/0261641 A1 | 9/2016 | Mattes et al. |
| 2016/0261670 A1 | 9/2016 | Lyon et al. |
| 2016/0261697 A1 | 9/2016 | Killpack et al. |
| 2016/0261727 A1 | 9/2016 | Yang et al. |
| 2016/0261733 A1 | 9/2016 | Cho |
| 2016/0261803 A1 | 9/2016 | Eom |
| 2016/0261829 A1 | 9/2016 | Olsson et al. |
| 2016/0261837 A1 | 9/2016 | Thompson et al. |
| 2016/0261841 A1 | 9/2016 | Mathew et al. |
| 2016/0261977 A1 | 9/2016 | Arrasvuori et al. |
| 2016/0261981 A1 | 9/2016 | Kaufman et al. |
| 2016/0261984 A1 | 9/2016 | Shrinath |
| 2016/0262068 A1 | 9/2016 | Won et al. |
| 2016/0262082 A1 | 9/2016 | Flynn et al. |
| 2016/0262087 A1 | 9/2016 | Thondapu et al. |
| 2016/0262118 A1 | 9/2016 | Kim et al. |
| 2016/0262191 A1 | 9/2016 | Flynn et al. |
| 2016/0262201 A1 | 9/2016 | Visuri et al. |
| 2016/0262205 A1 | 9/2016 | Flynn et al. |
| 2016/0275190 A1 | 9/2016 | Seed et al. |
| 2016/0277469 A1 | 9/2016 | Gilson et al. |
| 2016/0285880 A1 | 9/2016 | Nakamura et al. |
| 2016/0291940 A1 | 10/2016 | Searle et al. |
| 2016/0291959 A1 | 10/2016 | Searle et al. |
| 2016/0294493 A2 | 10/2016 | Daoura et al. |
| 2016/0294605 A1 | 10/2016 | Searle et al. |
| 2016/0294614 A1 | 10/2016 | Searle et al. |
| 2016/0301546 A1 | 10/2016 | Meier et al. |
| 2016/0328526 A1 | 11/2016 | Park et al. |
| 2016/0329965 A1 | 11/2016 | Cook et al. |
| 2016/0330074 A1 | 11/2016 | Cook et al. |
| 2016/0330140 A1 | 11/2016 | Cook et al. |
| 2016/0330613 A1 | 11/2016 | Cook et al. |
| 2016/0335731 A1 | 11/2016 | Hall |
| 2016/0337206 A1 | 11/2016 | Bugenhagen et al. |
| 2016/0337346 A1 | 11/2016 | Momchilov et al. |
| 2016/0337441 A1* | 11/2016 | Bloomquist ........ H04L 67/2828 |

(56) References Cited

U.S. PATENT DOCUMENTS

| | | |
|---|---|---|
| 2016/0342935 A1 | 11/2016 | Greenberg et al. |
| 2016/0354039 A1 | 12/2016 | Soto et al. |
| 2016/0358479 A1 | 12/2016 | Riedelsheimer et al. |
| 2016/0366553 A1 | 12/2016 | Belimpasakis et al. |
| 2016/0381087 A1 | 12/2016 | Addepalli et al. |
| 2017/0005515 A1 | 1/2017 | Sanders et al. |
| 2017/0006009 A1 | 1/2017 | Hessler |
| 2017/0006034 A1 | 1/2017 | Link |
| 2017/0006135 A1 | 1/2017 | Siebel et al. |
| 2017/0008162 A1 | 1/2017 | Tsubota |
| 2017/0011010 A1 | 1/2017 | Eom et al. |
| 2017/0011210 A1 | 1/2017 | Cheong et al. |
| 2017/0012857 A1 | 1/2017 | Li et al. |
| 2017/0025000 A1 | 1/2017 | Lagassey |
| 2017/0026157 A1 | 1/2017 | Bugenhagen et al. |
| 2017/0026472 A1 | 1/2017 | Bugenhagen et al. |
| 2017/0026893 A1 | 1/2017 | Lagassey |
| 2017/0039038 A1 | 2/2017 | Huber et al. |
| 2017/0041271 A1 | 2/2017 | Tal et al. |
| 2017/0041304 A1 | 2/2017 | Tal et al. |
| 2017/0041381 A1 | 2/2017 | Tal et al. |
| 2017/0041388 A1 | 2/2017 | Tal et al. |
| 2017/0046366 A1 | 2/2017 | Rahman et al. |
| 2017/0054594 A1 | 2/2017 | Decenzo et al. |
| 2017/0063566 A1 | 3/2017 | Seminario et al. |
| 2017/0063967 A1 | 3/2017 | Kitchen et al. |
| 2017/0063968 A1 | 3/2017 | Kitchen et al. |
| 2017/0078398 A1 | 3/2017 | Haidar et al. |
| 2017/0080332 A1 | 3/2017 | Poisner et al. |
| 2017/0083585 A1 | 3/2017 | Chen et al. |
| 2017/0085446 A1 | 3/2017 | Zhong et al. |
| 2017/0085447 A1 | 3/2017 | Chen et al. |
| 2017/0086281 A1 | 3/2017 | Avrahamy |
| 2017/0087453 A1 | 3/2017 | Poisner et al. |
| 2017/0093645 A1 | 3/2017 | Zhong et al. |
| 2017/0093687 A1 | 3/2017 | Wu et al. |
| 2017/0093848 A1 | 3/2017 | Poisner et al. |
| 2017/0110784 A1 | 4/2017 | Vermes et al. |
| 2017/0118307 A1 | 4/2017 | Beaurepaire et al. |
| 2017/0124193 A1 | 5/2017 | Li et al. |
| 2017/0124562 A1 | 5/2017 | Hessler |
| 2017/0126741 A1 | 5/2017 | Lang et al. |
| 2017/0132194 A1 | 5/2017 | Lee |
| 2017/0139996 A1 | 5/2017 | Marquardt et al. |
| 2017/0149937 A1 | 5/2017 | Ren et al. |
| 2017/0164264 A1 | 6/2017 | Kato et al. |
| 2017/0168472 A1 | 6/2017 | Ando et al. |
| 2017/0171359 A1 | 6/2017 | Ando et al. |
| 2017/0171715 A1 | 6/2017 | Edwards et al. |
| 2017/0176034 A1 | 6/2017 | Hussain et al. |
| 2017/0180567 A1 | 6/2017 | Sharma et al. |
| 2017/0195166 A1 | 7/2017 | Keerthi et al. |
| 2017/0201504 A1 | 7/2017 | Funk |
| 2017/0201521 A1 | 7/2017 | Bruno et al. |
| 2017/0206034 A1 | 7/2017 | Fetik |
| 2017/0220633 A1 | 8/2017 | Porath et al. |
| 2017/0220651 A1 | 8/2017 | Mathew et al. |
| 2017/0220672 A1 | 8/2017 | Sainani et al. |
| 2017/0220685 A1 | 8/2017 | Yan et al. |
| 2017/0220938 A1 | 8/2017 | Sainani et al. |
| 2017/0221463 A1 | 8/2017 | Lenhert |
| 2017/0223030 A1 | 8/2017 | Merza |
| 2017/0227965 A1 | 8/2017 | Decenzo et al. |
| 2017/0230800 A1 | 8/2017 | Edwards et al. |
| 2017/0245096 A1 | 8/2017 | Baroudi et al. |
| 2017/0251325 A1 | 8/2017 | Sakamoto et al. |
| 2017/0256007 A1 | 9/2017 | Barman |
| 2017/0257257 A1 | 9/2017 | Dawes et al. |
| 2018/0063467 A1* | 3/2018 | Gaynor ............... G11B 27/031 |
| 2018/0240322 A1* | 8/2018 | Potucek .................. E04H 4/14 |
| 2018/0341895 A1* | 11/2018 | Kislovskiy ............ G06Q 10/04 |

\* cited by examiner

SYSTEM AND METHOD FOR INTERFACING WITH A VEHICULAR CONTROLLER AREA NETWORK

CROSS REFERENCE TO RELATED APPLICATIONS

This application is a continuation application of co-pending U.S. patent application Ser. No. 15/703,487, filed Sep. 13, 2017, which is hereby incorporated herein by reference, which claims priority to U.S. Provisional Application No. 62/394,026, filed Sep. 13, 2016, the entirety of which is expressly incorporated herein by reference.

In cases where the present application conflicts with a document incorporated by reference, the present application controls.

FIELD OF THE INVENTION

The present invention relates to the field of telematics, and more particularly to a system and method for communicating with and through a controller area network of a vehicle with a local server and a remote server.

BACKGROUND OF THE INVENTION

All of the patents and patent applications, and other references described below and listed in Table 1 are hereby explicitly incorporated by reference in the description of the present invention in their entirety.

There are a number of known telematics technologies. Typically, these involve cars and land vehicles, and integrate navigational functions, though some such systems do not require location or navigational information. Marine use of telematics and electronic engine controls is well developed.

U.S. Pat. No. 6,273,771 discloses a control system for a marine vessel incorporates a marine propulsion system that can be attached to a marine vessel and connected in signal communication with a serial communication bus and a controller. A plurality of input devices and output devices are also connected in signal communication with the communication bus and a bus access manager, such as a CAN Kingdom network, is connected in signal communication with the controller to regulate the incorporation of additional devices to the plurality of devices in signal communication with the bus whereby the controller is connected in signal communication with each of the plurality of devices on the communication bus. The input and output devices can each transmit messages to the serial communication bus for receipt by other devices.

The control of a marine vessel, such as a pleasure craft used for fishing, water skiing, or other leisure activities, requires the implementation of many different input and output devices. For example, input signals are provided by speedometers, tachometers, depth finders, and various temperature and pressure sensors. Engine control units (ECU's) provide output signals to control the operation of various components related to the internal combustion engine of the marine propulsion system used to provide thrust for the marine vessel. In marine vessels that use transducers as input devices, such as speed sensors, temperature sensors, and pressure sensors, it is typical for each transducer to be separately and individually connected in signal communication with an appropriate gauge located on the control panel at the helm of the vessel. For example, a speed measuring transducer (e.g. paddlewheel) may be connected by a pair of wires to a speedometer gauge on a control panel of the marine vessel. Similarly, a pressure transducer disposed in pressure sensing relation with an oil system or a cooling system would typically be connected by a pair of wires to a separate gauge on a control panel at the helm of the marine vessel. Similarly, temperature transducers and other sensors would be connected to their associated gauges on a control panel. If the marine propulsion system is provided with actuators to cause the propulsion system to trim or tilt relative to the marine vessel, switches would typically be provided at the helm to activate the trim and tilt cylinders and position transducers would be attached to the marine propulsion system and connected, by appropriate wires, to gauges on the control panel to inform the marine vessel operator of the actual position of the marine propulsion system.

The Controller Area Network (CAN) communication system has been used in many types of automotive and industrial applications. The basic principle of a CAN communication system is that data messages transmitted from any node on a CAN bus do not contain addresses of either the transmitting node or of any intended receiving node. Instead, the content of the message is labeled by an identifier that is unique throughout the network. All other nodes on the network receive the message and each performs an acceptance test on the identifier to determine if the message, and thus its content, is relevant to that particular node. If the message is relevant, it will be processed. Otherwise, it is ignored. A two-wire bus is usually provided and consists of a twisted pair of conductors. CAN is able to operate in extremely harsh environments and its extensive error checking mechanisms ensure that any transmission errors are detected. The National Marine Electronic Association (NMEA) has developed an international standard intended to permit ready and satisfactory communication between electronic marine instruments, navigation equipment, and communications equipment when interconnected via an appropriate system. The interconnection is intended to be by means of a two-conductor, shielded, twisted pair of wires.

U.S. Pat. No. 5,469,150 discloses a sensor actuator bus system. A four-wire bus is provided with a two-wire power bus and a two-wire signal bus and a plurality of sensors and actuators attached to both two-wire busses. A modification is provided to the standard CAN protocol, in which the standard CAN header, of a data packet, is modified to incorporate a shortened device identifier priority. By shortening the identifier field of the CAN header three bits are made available for use as a short form protocol data unit which can be used to contain binary information representing both the change of status of an identified device and the current status of the device. The same three-bit PDU can be used to acknowledge receipt of the change of status information. In order to retain all of the beneficial capabilities of the standard CAN protocol, the three-bit short form PDU can also be used to identify the use of additional bytes of a data field so that a device can take advantage of the more complex capabilities of the standard CAN protocol. However, in situations where a mere change of status report is sufficient, the length of a message is reduced from a minimum of three bytes to a length of two bytes to obtain the significant benefits of increased speed of message transmission.

In certain systems, such as large industrial control systems, it may be sufficient to create a control system in which no new devices are expected to be added to the system after its initial design and manufacture. Alternatively, if the original manufacturer of the industrial control system retains control of all additional equipment added to the system, appropriate regulation of the signal exchanges can be retained. However, when one manufacturer originally creates a control system using CAN and other manufacturers add components to the system, without the knowledge of the original manufacturer, the orderly processing of signals and messages maybe compromised by the added components. The Can Kingdom system addresses several problems inherent in a standard controller area network system (CAN) when used in circumstances in which subsequent suppliers and users provide components that are later connected to an existing controller area network system and which are not under the control of the original manufacturer and supplier of the system. U.S. Pat. No. 5,383,116 describes a device for controlling a member in a system. The apparatus or manufacturing system in which a first member executes a desired function or action which is controllable as a function of at least one parameter characteristic for a second member is provided by this system. A first detector detects signals corresponding to values of the at least one parameter of the second member. At least one transmitter receives the detected signals and assigns coded/numbered messages for each value of the parameter. The apparatus further includes at least one receiver with a control module for controlling the desired action of the first member. The signal transmission between the transmitter and the receiver occurs over a connection bus and the signals are transmitted in the form of the coded/numbered messages in a predetermined order, with well-defined transmission times between the first detector and the transmitter and between the transmitter and the receiver. A control unit controls operation of the receiver module and sends thereto at least information regarding a desired parameter value at which a corresponding desired function or action is to be executed by the first member, or a desired message number to be selected. The receiver obtains the requested desired message number or, based on the desired parameter value and the time information for the desired action or function of the first member selects itself and receives a corresponding message number containing the parameter value. Based on the message number, the receiver generates an activation signal for the first member.

U.S. Pat. No. 5,446,846 describes a distributed computer system arrangement, having interconnected module units which perform logical operations at different locations. A serial data bus interconnects all of the modules units through a connecting device which enables the module to communicate over the serial bus. Identification information is stored in a memory to identify the module unit to other module units communicating over the bus. A logic circuit transfers the identification information to the module unit during an initialization phase of the system. Each module need not know where it is being connected along the serial bus, as all information for communicating over the bus is provided by the connecting device.

A marine vessel control system according to U.S. Pat. No. 6,273,771 comprises a marine propulsion system attached to the marine vessel. The propulsion system can comprise one or more outboard motors, jet drives, a sterndrive system, or an inboard propulsion system. The control system further comprises a communication bus which is a serial communication bus on which all messages relating to the control of the marine vessel and its various systems are transmitted. The system further comprises a controller connected to the communication bus. The controller can be a microprocessor associated directly with the marine propulsion system or, alternatively, can be a centrally located microprocessor or a plurality of microprocessors associated in signal communication with each other for control of the marine vessel. A plurality of devices may be connected in signal communication with the communication bus. The plurality of devices comprises input devices and output devices. The input devices provide signals to the controller which are representative of various parameters detected and measured by the input devices. The output devices comprise various actuators that respond to commands from the controller to maintain or change certain physical conditions relating to the marine vessel. These output devices can be pumps, stepper motors associated with the engine's throttle plate, hydraulic cylinders or electric servo motors associated with trim tabs or with the propulsion system to change the trim and tilt of the system, hydraulic actuators used to change the position of the marine propulsion system relative to the marine vessel to affect steering, or any other output device necessary to control the operation of the marine vessel or its various systems. A bus access manager regulates the incorporation of additional devices to the plurality of devices in signal communication with the communication bus, which may be a CAN Kingdom network. The use of a bus access manager addition of components on the bus which were not part of the originally configured system. The controller is effectively connected in signal communication with each of the plurality of devices, both input devices and output devices, that are connected to the communication bus. The prioritization and interpretation of the various signals received by the plurality of devices on the communication bus are regulated by the bus access manager which comprises a CAN Kingdom network. The plurality of input devices connected to the communication bus can comprise a global positioning system (GPS), a weather information source, pitch and yaw sensors, wind speed sensors, light sensors, an internet source, various manual inputs such as switches and levers, a speedometer, a fluid level sensor for sensing the fluid level of fuel and lubrication, motion sensors, smoke detectors, depth sensors, heat sensors, target acquisition radar systems, and a chart plotter. Other input devices capable of providing a signal that is representative of a monitored parameter can also be connected to the communication bus. Individual sensors can alternatively be connected as inputs to one or more microprocessors which, in turn, are connected to the communication bus. In this way, the intermediate microprocessors can receive data from the individual sensors and reformulate the date prior to transmitting the reformulated data to the communication bus for eventual receipt by a primary controller which is connected to the communication bus. Output devices connected in signal communication with the communication bus can comprise a propeller blade pitch control mechanism, running lights, a speed control mechanism such as throttle plate control systems and fuel per cycle control systems, trim tabs, climate control systems, steering mechanisms, lighting fixtures, drive trim mechanisms, and a transmission gear selecting mechanism. Other output devices can also be connected in signal communication with the communication bus, either directly or through an intermediate microcontroller.

FIG. 6 is a schematic representation showing how a plurality of input devices can be used to provide signals to a controller, such as an engine control unit (ECU) and how the engine control unit can provide output signals to a plurality of output devices. Typically, the controller 10 comprises a microprocessor that receives signals from the various input devices. For example, the controller 10 can receive position signals from the global positioning system (GPS) 12 in the form of longitude and latitude positions. Weather information 14 can be received in the form of warnings and coded weather status signals. Pitch and yaw sensors 16 can provide signals to the controller 10 that are representative of the physical position and attitude of the marine vessel, in terms of pitch and yaw, relative to a reference plane. A wind speed sensor 18 can provide information regarding the wind speed in the vicinity of the marine vessel. Light sensors 20 can be used to provide signals to the controller 10 that are representative of the degree of light present in a preselected location. By being connected to the internet 22, the controller can receive signals relating to messages intended to be received by the marine vessel or other types of data requested by the controller 10. The manual inputs 24 can comprise various switches, levers, and other manual input devices that allow a marine vessel operator to communicate with the controller 10. Sensor inputs 25 can provide information relating to either depth of water, locations of shoals or reefs, or the presence of underwater objects. The speedometer 26, fluid level sensors 28, motion sensors 30, and smoke detectors 32 can all provide signals to the controller 10 that relate to various conditions being monitored on the marine vessel. A depth sensor 34 provides an input signal to the controller 10 relating to the depth of water directly under the marine vessel. Sensors 36, such as heat sensors, can monitor certain parameters, such as temperature, of the engine and its various fluids. Target acquisition systems 38, such as a radar system, can be used to determine whether or not another vessel or structure is in the vicinity of the marine vessel. This can then be communicated to the controller 10 as an input signal. A chart plotter 40 can provide signals to the controller 10 that relate to the geographical position of the marine vessel with respect to various shorelines, buoys, and other features relating to the navigation of the marine vessel. The controller 10 can provide output signals to many output devices on the marine vessel. For example, the controller 10 can provide signals to change the propeller blade pitch 50 if the marine vessel is provided with a controllable pitch propeller. In a typical application, the controller 10 would receive the signal from a manually controlled thrust demand lever and provide signals to a propeller blade pitch control system 50 in conjunction with a speed control mechanism 52, such as a throttle controller of a carbureted engine or fueling controller of a fuel injected system. The controller 10 can also change the status of running lights 54 in response to signals from the light sensors 20. The trim tabs 56 and the drive trim 58 are changed in response to output signals from the controller based on manual input signals received from the operator of the vessel in conjunction with pitch and yaw sensors 16, speedometer signals 26 and other manual inputs. The climate control system 58 can be regulated by the controller 10 with output signals that are determined as a function of manual inputs 24 and various temperature measurement devices on the marine vessel. The steering control 60 is changed by the controller 10 in response to either manual inputs 24, such as movement of the steering wheel, or signals provided by the global positioning system 12, chart plotter 40 and target acquisition system 38. The lighting 62 of the marine vessel can be changed in response to manual inputs 24 or light sensors 20, depending on the desires of the marine vessel operator. Similarly, if the marine vessel is provided with a transmission 64, the controller 10 can change the gear setting of the transmission based on manual inputs 24, such a thrust demand lever, and the speedometer 26. Although FIG. 6 shows a plurality of inputs and a plurality of outputs relating to the controller 10, it should be understood that FIG. 6 is not intended as an all-inclusive display of inputs and outputs. Many other devices can be provided on a marine vessel and connected in signal communication with the controller 10. In marine control systems known to those skilled in the art, the input devices are typically connected to the controller 10 with individual pairs of wires. Similarly, the output devices are also individually connected to the controller 10 with no direct communication link between individual input devices with other input devices or with the output devices. In other words, all signals from the input devices are wired directly to the controller and all signals from the controller to the output devices are wired directly between those output devices. In a complex marine vessel with many input devices and many output devices, the wiring system can become significantly complex. If any input devices or output devices are subsequently added to the marine vessel, those new devices must be wired directly to the controller 10 and, in a typical application, the controller 10 must be reprogrammed to accommodate the signals received from the input devices and the signals provided to the output devices.

FIG. 7 shows a system with a controller 10, input devices 71-73, and output devices 81-83, connected to a common communication bus 21. Rather than having each input and output device individually connected to the controller 10. Similarly, the controller 10 can provide command output signals to the output devices 81-83 to cause them to perform desired actions. Through the use of a controller area network (CAN) the amount of interconnecting wires between the input devices, output devices, and controller 10 is significantly reduced. The controller area network (CAN) provides an arbitration scheme effectively eliminates collisions or interferences between message packets.

Typical propulsion systems for small marine vessels under 1000 horsepower are disjointed and fragmented in terms of integrating all of the engine, drive, and vessel specific functions into the system that can provide the full benefit of such integration. Typically, throttle control, shifting control, and steering control, are individual and separate systems that are not directly related to each other. A propulsion control system can utilize an engine with a controller, or engine control unit, that has full control over engine running conditions in terms of the generated torque and speed provided by the engine. In larger marine vessels, the boat can have two or even three helms instead of just a single helm location. In addition, the marine vessel can be powered by two, three, or four engines, requiring coordination.

Modern marine engines are equipped with a variety of sensors that can be used for the purpose of diagnostics in order to monitor and detect existing or future problems. These sensors can provide valuable information on the state of the health of fuel injectors, spark plugs, lubrication systems, temperature, water and oil pressure, vibration, voltage, electrical power consumption, and many other parameters that can be monitored for the purpose of predicting the onset of a future component failure. The data may be provided by the various sensors and conversion of the data via a serial bus integrated into a display unit placed at the helm of the vessel. The user can obtain automated indication of existing and potential problems and also be provided with information on how to service the engine if such an option is available. Alternatively, the information can be transferred, via a form of wireless link, to a service response center where software can analyze the signatures collected from the variety of sensors and, based on this analysis, determine a diagnostic assessment. The communication can be from the boat to another remotely located device or from a remote device to the boat. This feature can be used to implement a true predictive maintenance system or a "just-in-time" maintenance system and, as a result, reduce the overall cost of the ownership of the marine vessel. The possibility to rerun remote diagnostics will allow the owner or operator of a marine vessel to perform the diagnostic test without actually visiting a repair or maintenance facility. It will also allow a marine repair facility to be prepared for the marine vessel when it is eventually brought to the facility for maintenance or service. This can also be expanded to include not only engine diagnostics, but other vessel subsystems such as electrical motors for hydraulic pumps, bilge pumps, fresh water pumps, trim tabs, and electrical systems on the vessel. With these features, the overall ease of maintenance and operation of the marine vessel will be significantly enhanced and will allow the marine vessel operator to operate the diagnostic systems of the boat subsystems without having to visit a service center.

In FIG. 8, the communication gateway 600 is shown connected to a satellite communication system 604, a VHS 606, and a cellular link 608. The helm computer 308 is connected to a display, such as an LCD, for communication with the operator. In addition, the communication gateway 600, the helm computer 308, the vessel control unit, and the engine control unit are all connected in signal communication with the serial communication bus 21. The engine sensing components and the vessel sensing components are connected to the ECU and VCU, respectively, and signals received from these sensing components are transmitted by the associated control units to the serial communication bus 21.

FIG. 9 shows the schematic representation of a marine vessel 700 provided with a wide variety of devices which are all connected in signal communication with a serial CAN communication bus 21. The marine vessel 700 is schematically shown with a single helm position and a single engine 711. The engine is linked to a transmission 802, a steering actuator 804, and a trim control system 808. The propeller 721 is driven by the engine 711 to provide propulsive thrust for the marine vessel 700. A vessel control module (VCM) is connected in signal communication with a blower 820, a battery 824, and a bilge monitor 830 which can sense various conditions in the bilge of the marine vessel 700, such as water level or the accumulation of fumes. A live well 834 is provided to store fish in an environment that keeps the fish alive. A depth finder 840 is shown schematically at the stern of the marine vessel 700. Two trim tabs, 841 and 842 are connected in signal communication with the vessel control module VCM which, in turn, is connected to the serial communication bus 21. A collision avoidance system 38 provides a radar signal to detect the presence of objects in front of the marine vessel. Attitude sensors, such as pitch and yaw sensors 16 determine the physical attitude of the vessel to aid the vessel control module VCM in controlling the trim 808 of the propulsion system and the trim tabs, 841 and 842. A joystick module 850 allows an operator control of the vessel during docking procedures. A keyless entry system 860 allows an operator to unlock various security devices as the marine vessel operator approaches the boat. An auto pilot system 870 can control the movement of the marine vessel according to instructions provided by the operator. A lighting system 874 and an emergency locator device 878 are also shown.

US 2015/0326488, 2016/0198485, 2016/0134562, U.S. Pat. Nos. 9,088,454, 9,031,073, 9,143,384, 9,225,581, 9,258,173, and 9,332,261 disclose a network management module, having a network interface module, memory, and a processing module, which couples to a vehicle communication network.

FIG. 9 shows a segmented bus architecture, in which various busses, which may be of different types, are interconnected, in an automotive application. Many types of vehicles (e.g., automobiles, trucks, buses, agricultural vehicles, marine vessels, and/or aircraft) include a vehicle communication network. The complexity of the vehicle communication network varies depending on the amount of electronic devices within the vehicle. For example, many more advanced vehicles include electronic modules for engine control, and for land vehicles, these may also include transmission control, antilock braking, body control, emissions control, etc. For marine vessels, often there are a plurality of propulsive engines. To support the various electronic devices within the vehicle, the automotive industry has generated numerous communication protocols. The bus protocols include: (1) J1850 and/or OBDII, which are typically used for vehicle diagnostic electronic components; (2) Intellibus, which is typically used for electronic engine control, transmission control other vehicle systems such as climate control, and it may also be used for drive-by-wire electronic control units (ECU); (3) high-speed controller area network (CAN), which is typically used for braking systems and engine management systems; (4) distributed system interface (DSI) and/or Bosch-Siemens-Temic (BST), which is typically used for safety related electronic devices; (5) byteflight, which is typically used for safety critical electronic device applications; (6) local interconnect network (LIN), which is typically used for intelligent actuators and/or intelligent sensors; (7) low-speed controller area network (CAN) and/or Motorola® interconnect (MI), which are typically used for low-speed electronic devices such as Windows, mirrors, seats and/or climate control; (8) mobile media link (MML), domestic digital data (D2B), smartwireX, inter-equipment bus (IEBus), and/or media oriented systems transport (MOST), which are typically used to support multimedia electronic devices within a vehicle such as a audio head unit and amplifiers, CD player, a DVD player, a cellular connection, a Bluetooth connection, peripheral computer connections, rear seat entertainment (RSE) units, a radio, digital storage, and/or a GPS navigation system; (9) Low-Voltage Differential Signaling (LVDS), which are typically used to support, heads up display, instrument panel displays, other digital displays, driver assist digital video cameras, and (10) FlexRay, which may be used for safety critical features and/or by-wire applications. To enable electronic components using different bus protocols to communicate with each other, one or more bus gateways may be included in the vehicle network. For example, in a safety related issue, a safety ECU may need to communicate with a braking ECU, and engine control ECU, and/or a transmission control ECU. In this example, the bus gateway performs some degree of protocol conversion to facilitate the communication between the ECUs of differing communication protocols. A vehicle system may communicate with a server to upload data and/or download data.

FIG. 11 shows a schematic block diagram of a prior art embodiment of a vehicular communication network that includes a unified network fabric (e.g., Ethernet-based), one or more communication links, a gateway, a plurality of vehicle control modules, a network manager, a power manager, one or more processing modules, memory, and/or one or more multimedia processing modules. The communication links may include wired and/or wireless interfaces to support connectivity with cellular devices, Bluetooth devices, infrared devices, and/or computer peripheral devices. For example, a Bluetooth transceiver may be coupled to the unified network fabric to support Bluetooth communications with a portable audio/video unit, with a headset, etc. The network fabric includes a plurality of bridge-routing modules and a plurality of switch modules. Within the network fabric, a bridge-routing module is redundantly coupled to one or more adjacent bridge-routing modules and a switch module is redundantly coupled to one or more bridge-routing modules. The network fabric may be divided into sub-network fabrics that are coupled together via a data bridge. As an example, the network fabric includes a data bridge, a first sub-network fabric operably coupled to first sub-set of the vehicle control modules, and a second sub-network fabric operably coupled to second sub-set of the vehicle control modules. The data bridge facilitates (e.g., initiates, issues an instruction, performs, etc.) communication of a sub-set of the packets between the first and second sub-network fabrics. The gateway may include one or more wireless transceivers to support communication with the highway network, with a home network, and/or to support diagnostic ports for communication with the automobile service providers, the automobile manufacturers, etc. Such a wireless transceiver includes a network interface, which enables it to connect to the unified network fabric.

A multimedia processing module may provide audio, video, text, and/or graphics processing for the vehicle. For instance, the multimedia processing module may support a GPS navigation system, provide rendered video and/or graphic images to displays, processes digital images received by cameras, and/or provides images to other audio/video equipment within the vehicle. The multimedia processing module may be a single processing device or a plurality of processing devices. Such a processing device may be a microprocessor, micro-controller, digital signal processor, microcomputer, central processing unit, field programmable gate array, programmable logic device, state machine, and/or any device that manipulates signals (analog and/or digital) based on hard coding of the circuitry and/or operational instructions. The multimedia processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the multimedia processing module includes more than one processing device, the processing devices may be centrally located (e.g., directly coupled together via a wired and/or wireless bus structure) or may be distributedly located (e.g., cloud computing via indirect coupling via a local area network and/or a wide area network). When the multimedia processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. In an example of operation, a vehicle control module (e.g., a sensor) generates a packet in accordance with the global vehicle network communication protocol (e.g., formats the packet in accordance with the information regarding a network fabric formatting of the packets. The vehicle control module then transmits the packet via the network fabric in accordance with the global vehicle network communication protocol. For instance, the network fabric routes the packet based on content type of the packet (and the destination address) to another vehicle control module and/or to the multimedia processing module. The unified network fabric may have an Ethernet bus structure (or other packet/frame structure) that enables packet/frame-based communication among the plurality of electronic devices within a vehicle. In addition, the vehicle communication network may be a semi-static network thereby allowing preconfigured spanning trees to be utilized for fast reconfiguration of the network; have configured dedicated bandwidth allocation for at least some of the devices to ensure a particular level of data throughput for mission critical and some non-mission critical applications; support virtualized local area networks; support a centralized and/or distributed bus monitoring system; support security and authentication of device replacement and or new device installment; support lossless Ethernet transmissions through redundant paths; support a low latency protocol for mission-critical packets; and/or support fast link fail-over.

Each processing module may perform one or more functions. For instance, a processing module may perform the electronic control functions for the engine, which include, but are not limited to, engine management, vehicle system operations, engine control, and engine diagnostics. Another processing module may perform user environment electronic control functions, which include, but are not limited to, climate control. Yet another processing module may perform safety related electronic control functions. Still another processing module may perform vehicle operation electronic control functions, which include, but are not limited to, by-wire operations, transmission control, etc.

The wireless coupling between the same modules may be in accordance with one or more standardized wireless communication protocols in the 2.4 GHz frequency band, the 5 GHz frequency band, the 60 GHz frequency band, etc. or a may be a proprietary wireless communication protocol. Standardized wireless communication protocols includes, but are not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), radio frequency identification (RFID), Enhanced Data rates for GSM Evolution (EDGE), General Packet Radio Service (GPRS), WCDMA, LTE (Long Term Evolution), WiMAX (worldwide interoperability for microwave access), and/or variations thereof. For example data may be converted to or from one or more symbol streams in accordance with one or more wireless communication standards (e.g., GSM, CDMA, WCDMA, HSUPA, HSDPA, WiMAX, EDGE, GPRS, IEEE 802.11, Bluetooth, ZigBee, universal mobile telecommunications system (UMTS), long term evolution (LTE), IEEE 802.16, evolution data optimized (EV-DO), etc.) and/or a proprietary communication protocol. Such a conversion includes one or more of: scrambling, puncturing, encoding, interleaving, constellation mapping, modulation, frequency spreading, frequency hopping, beam-forming, space-time-block encoding, space-frequency-block encoding, frequency to time domain conversion, and/or digital baseband to intermediate frequency conversion. Note that the module(s) converts the data into or from a single outbound symbol stream for Single Input Single Output (SISO) communications and/or for Multiple Input Single Output (MISO) communications and converts the outbound data into or from multiple outbound symbol streams for Single Input Multiple Output (SIMO) and Multiple Input Multiple Output (MIMO) communications.

FIG. 12 is a logic diagram of an embodiment of a method for fuel consumption optimization of a vehicle. The method begins by determining whether fuel optimization information is received via a communication link 1802. The fuel optimization information is generated by a server that receives information regarding the vehicle's performance, use profile, make, type of fuel used, general information regarding the vehicle, etc. Based on this information, the server generates information that may optimize fuel consumption while the vehicle is in use. When fuel optimization information is received, the method continues by presenting a message to the driver regarding fuel optimization 1804. The method continues by determining whether the operator has acknowledged the fuel optimization method and desires to adjust the performance of the vehicle 1806. If not, the method is complete for this particular fuel optimization message. If, however, the driver has provided an acknowledgment, the method continues by adjusting performance of the vehicle based on the fuel optimization information 1808. For example, the fuel optimization information may regulate the speed at which the vehicle is traveling, may regulate the acceleration of the vehicle, may adjust fuel mixtures, air intake, etc. to reduce fuel consumption while still maintaining an acceptable level of performance.

FIG. 13 is a diagram of an example of resource sharing in a vehicle communication network in a distributed system. The system includes a vehicle 1884, another vehicle 1886, home 1888, and Internet coupled devices. Each of the vehicle 1884 and other vehicle 1886 includes the network fabric 1892, processing resources 1894 and 1918 (e.g., processing modules, CPUs, ECUs, video decoding modules, video encoding modules, etc.), memory 1896 and 1920, and a gateway 1898. The home 1888 includes processing resources 1900 and memory 1902. The Internet coupled devices include memory 1904, processing resources 1906, servers 1908, automobile meta-factor 1910 or services, and/or automobile repair services 1912. In an example of operation, the vehicle 1884 communicates with the home 1888, the other vehicle 1886, and/or the Internet 1890 to request processing resources and/or memory to augment, or off-load, processing within the vehicle 1884 and/or storage of vehicle data. As a more specific example, the vehicle 1884 may be in communication with the home 1888 and requests access to one or more processing resources 1900 to augment, or off-load, video processing within the vehicle 1884. In this specific example, if the home 1888 has available video processing resources 1900, and the vehicle 1884 is authorized to access them, the home 1888 may grant access to the processing resources 1900 for coprocessing of video data for the vehicle 1884. As another more specific example, the vehicle 1884 and other vehicle 1886 may be traveling on the same road and are within wireless communication range of each other. In this instance, the vehicle 1884 requests access to one or more processing resources 1918 of the other vehicle 1886 to augment, or off-load, a process being executed within the vehicle 1884 or needing to be executed. The other vehicle 1886 receives the request, determines whether the vehicle 1884 is authorized to access its processing resources 1918 and/or memory 1920, and, if so, determines whether to grant access to the processing resources 1918 and/or memory 1920. If access is granted, data is exchanged via a wireless communication link between the two vehicles. The health of the link is continually monitored to ensure that data and processing thereof is accurately communicated between vehicles. As yet another more specific example, the vehicle 1884 may request access to Internet processing resources 1906 and/or memory 1904 for augmenting, or offloading, processes within the vehicle and/or storage of vehicle data. In this instance, the vehicle 1884 sends a request via the cellular network 1914 and/or the highway wireless network 1916 to a service provider 1912 coupled to the Internet 1890. The service provider 1912 receives a request, determines whether the vehicle 1884 is authorized to access processing resources 1906 and/or memory 1904, and, if so, determines whether to grant access to the processing resources 1906 and/or memory 1904. If access is granted, the vehicle 1884 utilizes the cellular network 1914 and/or highway wireless network 1916 to communicate with the allocated processing resources 1906 and/or allocated memory resources 1904.

US 2016/0112216 discloses a "black-box" gateway device implemented in a vehicle and configured to interface with an engine computer and a plurality of wireless sensors installed in the vehicle. The gateway device can include a transceiver comprising input ports in communication with conductors that interface with the engine computer installed in an engine of the vehicle; radio frequency communications components comprising dual wireless functionality, including a first functionality for communicating wirelessly within the vehicle and a second functionality for communicating wirelessly over a cellular network disposed outside the vehicle; and one or more antennae that receive wireless signals from the radio frequency components. The transceiver can be configured to wirelessly receive sensor data from the wireless sensors disposed within the vehicle, the sensor data providing information associated with functionality of components of the vehicle. The gateway device can include digital logic circuitry programmed with executable instructions that configure the digital logic circuitry to identify one of the wireless sensors associated with the received sensor data; determine whether to transfer the sensor data over the cellular network to a remote vehicle management system based, at least in part, on a comparison of the sensor data to a threshold associated with the identified sensor; and based on a determination that the sensor data satisfies the threshold, transmit at least a portion of the data to a vehicle management system.

In some configurations, the identification of the sensor is based, at least in part, on header information received with the sensor data. In some configurations, the sensor data comprises at least one of a sensor identity, a location of the sensor, or a type of sensor data. In some configurations, the processor is further configured to determine whether to transfer the sensor data by comparing the received sensor data to previous sensor data. In some configurations, the digital logic circuitry is further configured to determine whether to transfer the sensor data to a vehicle management system based, at least in part, on a determination that a difference between the on a comparison between the received sensor data to the previous sensor data satisfies a change threshold. In some configurations, the digital logic circuitry is further configured to determine whether to transfer the sensor data to the vehicle management system based, at least in part, a defined period of time has elapsed since transmission of previous sensor data. In some configurations, the transceiver is configured to receive the sensor data at periodic intervals. In some configurations, the digital logic circuitry is further configured to filter the sensor data received from the sensor to remove entries where a designated portion of the sensor data is the same. In some configurations, the transceiver is configured to receive sensor data from a plurality of sensors disposed within the vehicle. In some configurations, the gateway module is configured to receive vehicle data from a vehicle communication bus and transmit at least a portion of the vehicle data to the vehicle management system. In some configurations, the vehicle communication bus is a Controller Area Network (CAN) bus. The real-time vehicle diagnostic and prognostic analysis features can be used to perform preventive diagnostic analysis of the engine and vehicle. This analysis can be used to identify potential problems within the vehicle and provide a recommended treatment or service before a failure occurs. Any of the systems and processes described herein can be performed in real time or near-real time.

The vehicle data collected by the onboard vehicle analysis module can include vehicle condition information and engine data, such as vehicle year, make, model, engine/drive train, mileage, engine hours, start cycles, and other information related to vehicle condition. The vehicle data can also include check engine lights, fault codes, DTC codes, engine events, service intervals and other data collected from the engine computer. As mentioned above, the vehicle data collected by the onboard vehicle analysis module can also include sensor data obtained from other sensors in the vehicle, such as tire pressure sensors, accelerometers, gyroscopes, temperature sensors, driver identification sensors (for example, that communicate with an ID badge of a driver via RFID or the like), combinations of the same, or the like.

The onboard vehicle analysis module and the vehicle management system can provide or analyze additional data that can be used for diagnostic analysis. For example, such data can include data provided by the manufacturer regarding diagnostic conditions, data obtained by crowd sourcing or otherwise analyzing data provided by a community of fleet vehicles (including, for example, predictive diagnoses based on community analysis of diagnostic trends), or the like. The vehicle diagnostic functionality performed in the vehicle by the onboard vehicle analysis module or at the vehicle management system by the offboard vehicle analysis module can include, among other things, comparing collected vehicle data to a set of conditions in order to perform preventative diagnostic analysis of the vehicle before a failure occurs. For example, the vehicle analysis module can analyze one or more fault codes in combination with data from the engine, such as mileage, engine hours, number of starter cycles, manufacturer data, or other data to determine whether an engine component should be replaced. The vehicle analysis module can further assess the severity or level of a predicted failure, such as whether it may be a catastrophic failure, a moderate failure, or other less serious failure. The vehicle analysis module can also take into account the predictive cost of the effects of the failure in determining whether to recommend repair or replacement. For example, the vehicle analysis module can determine whether the failure would strand a vehicle or driver, and if so, recommend urgent repair or replacement, while recommending less urgent repair or replacement for less catastrophic failures. Thus, the vehicle analysis module can categorize diagnoses by the severity of predicted events, such as catastrophic events requiring immediate attention, major events requiring attention within specified number of days, minor events that can be evaluated at a next maintenance interval, and/or other categorizations. In one example, the vehicle analysis module may determine that a starter engine should be replaced at the next scheduled service interval.

The offboard vehicle analysis module can output the analysis and prognostic information obtained from the onboard vehicle analysis module to a management device operated by a fleet administrator or the like (which may be a mobile device), or any other device configured to receive notifications and updates from the offboard vehicle analysis module. The output can include, for example, diagnostic codes or other diagnoses of vehicle problems, driver warnings, a list of proposed corrective actions, alarms, and/or other information provided by the onboard vehicle analysis module to the system. Similarly, the onboard vehicle analysis module can provide such outputs directly to the driver via an onboard computer (for example, on a display thereof) or a driver's computing device or phone. The outputs to the driver can include any of the outputs described above, as well as optionally navigation directions to dispatch the driver to a repair facility (for example, a nearest repair facility). The output could include a list of options of available service centers to perform the identified services, from which the driver can select and then be navigated to. Depending on the severity of the predicted failure, the outputs to the driver may, for more severe problems, provide rerouting to a nearest approved maintenance facility and navigate the driver to that location. For less severe problems, the outputs to the driver can indicate that maintenance should be performed soon or the like.

The output can also provide information and alerts to vehicle management system or other fleet management personnel. The onboard vehicle analysis module can analyze diagnostic data against one or more thresholds that are to be met prior to proceeding with changes to the vehicle route and/or recommending repairs. The thresholds can be machine-based and/or human-based thresholds. Machine-based thresholds could be determined by algorithms based on factors such as cost, time, energy usage, disruptive effect, and others. Human-based thresholds can include one or more approvals from the driver, vehicle maintenance personnel, management personnel, or others.

In some embodiments, the onboard vehicle analysis module can filter data received from the engine computer and send a subset of the engine computer data (or other in-vehicle sensor data) to the offboard vehicle analysis module. In some embodiments, the onboard vehicle analysis module monitors the data received by the engine computer for changes. In one embodiment, when a change is detected, the updated data can be sent to the offboard vehicle analysis module. For example, if the onboard vehicle analysis module receives data from the engine computer continuously or substantially continuously, the onboard vehicle analysis module may solely send data that was different from a previous set of data to the offboard vehicle analysis module to conserve bandwidth. In another embodiment, the onboard vehicle analysis module sends data periodically, such as once every hour or once every few hours, or even once a day or at longer intervals for measured parameters that change slowly.

The gateway module can be in communication with a radio transceiver via a wireless or a wired connection (for example, with a serial cable or the like). The radio transceiver can include a GPS module. The GPS module can detect vehicle position. In some embodiments, the radio transceiver and/or GPS module can be incorporated into the gateway module. The radio transceiver can communicate with the vehicle management system using various generation cellular air interface protocols (including, but not limited to, air interface protocols based on code division multiplex access (CDMA), time division multiple access (UEMA), global system for mobile communications (GSM), wireband code division multiplex access (WCDMA), code division multiplex access 3rd generation (CDMA2000), time division synchronous code division multiple access (UE SCDMA), wavelength and time division multiple access (WUEMA), long term evolution (LTE), orthogonal frequency division multiple access (OFDMA), and similar technologies). The radio 240 can also communicate with the vehicle management system using TCP/IP protocols and using various communication protocols including, but not limited to, the family of IEEE 802.11 technical standards ("WiFi"), the IEEE 802.16 standards ("WiMax"), and short message service ("SMS"). More recent standards include LTE, LTE Advanced, UTMS, 3GPP, 4G, 5G, etc.

The radio transceiver can transmit data received from the gateway module to the vehicle management system. The radio transceiver can communicate vehicle positioning data received from the GPS module to the vehicle management system. The radio transceiver can communicate frequently with the vehicle management system. In some instances, the radio can keep the connection to the vehicle management system open, which can guarantee or attempt to guarantee data reliability. The radio transceiver can transmit data periodically, and/or on an as-needed basis with the vehicle management system. In one embodiment, the radio transceiver is a mobile phone and communicates with the vehicle management system by placing a cellular phone call to a server of the vehicle management system.

The gateway module can include sensors. The sensors can be used to monitor operation of the vehicle. The incorporation of sensors within the gateway module can enable vehicle data to be gathered from the sensors without adding additional wires or optical connections to the vehicle. One example of a sensor that may be included in the gateway module is an accelerometer. An accelerometer can be used to detect hard braking, cornering and acceleration. In some instances, the accelerometer data can be used to update vehicle position data without using GPS data or triangulation technology. For example, the accelerometer can provide for short-term vehicle position reporting that operates without resorting to GPS signals.

At least some of the in-vehicle sensors can communicate with the engine computer or other engine hardware configured to receive and process the data. The in-vehicle sensors can be located remotely and can transmit data wirelessly to the engine computer, the gateway module, and/or other data processing hardware.

At least some sensors can communicate with the gateway module. Some sensors can be used that are provided by third party manufacturers. Thus, the sensors may be aftermarket sensors installed on or in the vehicle after manufacture of the vehicle or may be sensors that are installed with the vehicle at manufacture. The sensors can include wireless adapters for communicating with the gateway module. In some embodiments, the sensors include a wireless transmitter and do not include a wireless receiver. Thus, the sensors may be mere transmitters or may instead be transceivers. Some sensors can broadcast data within a specified vicinity of the sensor, which can be received by the gateway module. The sensors can be powered by a power source independent of the vehicle, such as a battery. Some sensors can use long-life batteries such as lithium-ion batteries that can, in some instances, operate for years without replacement. The sensors can include identification information that can be used by the gateway module for identification of the sensor. In one embodiment, the identification information can be a 12-bit (or other length) address associated with the sensor. The sensor identification information can also include additional information such as the type of sensor, the location of the sensor, and other information associated with the sensor. In some embodiments, the gateway device can use the identification information to form a pairing with the sensor, for example, by reading the identification information in a header of a packet transmitted wirelessly by each sensor to the gateway device.

The gateway module can be in communication with some or all of the in-vehicle sensors. For example, the gateway module can be coupled to an OBDII or CAN bus in the vehicle to thereby receive in-vehicle sensor information from the engine computer. In some embodiments, one or more in-vehicle sensors can be directly coupled to the gateway module, or the gateway module can communicate wirelessly with the in-vehicle sensors. For example, the gateway module could receive cargo bay temperature data from a temperature sensor wirelessly transmitting the data. The wireless sensors can use point-to-point transmission using wireless transmission standards such as Bluetooth or Zigbee.

In some embodiments, the gateway module can receive communications from the sensors using a lightweight communication protocol. The communication protocol can be configured so that the sensor can transmit information to the gateway module without requiring a handshake or acknowledgment. The communication protocol can use various techniques to ensure or attempt to ensure the transmission of uncorrupt data from the sensor to the gateway module. The sensors can communicate on Industrial, Scientific, and Medical (ISM) bands using, for example, ISM protocols. The sensors can communicate using different frequencies from each other in order to help reduce collisions between packets at the gateway device and to help ensure that the sensor data is received at the gateway module intact. The sensors (or the gateway device) may employ error correction coding techniques, such as Reed Solomon coding or checksums to ensure or attempt to ensure that packets are properly sent or received at the gateway device.

The sensors can transmit data at low frequency. For example, the sensors can transmit data on a periodic basis (for example, every minute, every few seconds, or some other interval), on an event basis (for example, when data changes), on a pseudo-random or random basis or a combination of different methods. The sensors can transmit the same sensor data multiple times with an interval between each transmission. The interval between the transmissions can be constant or can vary. Sending the same data more than once can help ensure that uncorrupted data is received by the gateway module. For example, a sensor can send data three times in a row to the gateway module. The intervals between each transmission can be a determined amount of time or at pseudo-random intervals. Even if one of the transmissions of data is corrupted, there is a low likelihood that each of the each of the plurality of transmissions will be corrupted. The sensor data can be transmitted in a determined format, including a header and payload. In some embodiments, the sensor data includes a small amount of information, such as less than 100 bytes of information or even a few bytes in each packet. The header can identify the sensor, location of the sensor, type of sensor data and other information associated with the measurement. Some sensors may transmit multiple types of data, the header can identify the type of data that being transmitted by the sensor. Other information can also be included, such as sensor status information. The sensor status information can identify the operational mode, such as active or sleep mode, low battery, or other types of status information that is unrelated to the data being monitored by the sensor. In some instances, some or all of the data can be included in the header. The payload can include the data associated with the sensor, such as video data, temperature data, pressure data, etc. The gateway module can format and process prior to transmitting the data to the vehicle management server. For example the gateway module can covert the received data to a data format that is compatible with the transmission format used to transmit the data to the vehicle management system via the radio transceiver.

The processor and memory of the gateway module can implement various features. Among others, the processor of the gateway module can perform the operations associated with the vehicle analysis module and the vehicle profiling module described above. The gateway module can act as an intermediary processing platform for the vehicle management system. The gateway module can process the data received from the in-vehicle sensors and send a subset of the total data collected to the vehicle management system. The gateway module can collect hundreds or thousands or more data points from sensors, in-vehicle sensors, and the engine computer. The gateway module can, among other things, analyze, categorize, compress, or otherwise process the data before transmitting it to the vehicle management system. By preprocessing the data prior to sending the information to the vehicle management system, the gateway module can determine what data to send to the vehicle management system, which can reduce redundant processing and bandwidth used to continually transmit vehicle data.

The gateway module can monitor several vehicle characteristics. The sensors can provide information to the gateway module at a specific frequency for each vehicle characteristic; however, the sensors may generally be recording data at a faster rate than the monitored vehicle characteristic is changing. As such, sending all of the data to the vehicle management system every time a sensor provides data can waste bandwidth and provide redundant data points for the vehicle management system to process. Advantageously, in certain embodiments, instead of sending all of this data to the vehicle management system, the gateway module processes the data and selectively updates the vehicle management system. The gateway module can also compress the data that is received. The gateway module can selectively compress portions of the data using wavelet transforms or other compression techniques, including any lossy or lossless compression techniques. For example, the data relating to vehicle characteristics that are slowly changing can be compressed.

The gateway module can process vehicle characteristics according to the rate at which the characteristics change. For example, engine characteristics can range from relatively slower changing characteristics, such as tire pressure or average fuel consumption, to relatively faster changing characteristics, such as engine RPM and speed. The gateway module can provide updates to the vehicle management system using different update approaches for each vehicle characteristic, including periodic updates, threshold-based updates, event-based updates, user-specified updates, and/or a combination of methods.

The protocols used for different applications and by different manufacturers can allow for multi module operation on a single bus. While the Controller Area Network (CAN) bus electrical interface is the prevailing standard, other interface and protocol standards have been adopted by standards committees and manufacturers. These protocols include: J1962; ISO 9141; ISO 14230; ISO 15765-4; SAE J 1939; SAE J1850. These are open standards with prescribed electrical (transceiver) operation and defined protocols.

In the computing environment, one or more in-vehicle devices and management devices communicate with the vehicle management system over a network. The in-vehicle devices can include computing devices installed in fleet vehicles. These devices can include navigation functionality, routing functionality, and the like. The in-vehicle devices can receive route information and other information from the vehicle management system. In addition, the in-vehicle devices can report information to the vehicle management system, such as driver location, vehicle sensor data, vehicle status (for example, maintenance, tire pressure, or the like), and so forth. The management devices can be computing devices used by dispatchers, fleet managers, administrators, or other users to manage different aspects of the vehicle management system. For example, a user of a management device can access the vehicle management system to generate routes, dispatch vehicles and drivers, and perform other individual vehicle or fleet management functions. With the management devices, users can access and monitor vehicle information obtained from one or more of the in-vehicle devices by the vehicle management system. Such vehicle status information can include data on vehicle routes used, stops, speed, vehicle feature usage (such as power takeoff device usage), driver behavior and performance, vehicle emissions, vehicle maintenance, energy usage, and the like. In some embodiments, the management devices are in fixed locations, such as at a dispatch center. The management devices can also be used by administrators in the field, and may include mobile devices, laptops, tablets, smartphones, personal digital assistants (PDAs), desktops, or the like. The vehicle management system can be implemented by one or more physical computing devices, such as servers. These servers can be physically co-located or can be geographically separate, for example, in different data centers. In one embodiment, the vehicle management system is implemented as a cloud computing application. For instance, the vehicle management system can be a cloud-implemented platform hosted in one or more virtual servers and/or physical servers accessible to users over the Internet or other network. The vehicle management system may include a fleet management module, a mapping module, a telematics module, a routing module, a dispatch module, and an integration module. These components can, but need not, be integrated together on a common software or hardware platform.

The fleet management module can include functionality for generating, rendering, or otherwise displaying a vehicle management user interface. The vehicle management user interface can include a map or list of vehicles that depicts symbols or other data representative of vehicles. As used herein, the terms "output a user interface for presentation to a user," "presenting a user interface to a user," and the like, in addition to having their ordinary meaning, can also mean (among other things) transmitting user interface information over a network, such that a user device can actually display the user interface.

The system may provide remote vehicle prognostics. The system can use vehicle data for real-time pattern recognition. The vehicle data can include in-vehicle data and other vehicle data accessed over a network. The system can compare a single vehicle's data against other like vehicles to determine exceptional condition, behaviors, and potential failures. A system running remote vehicle prognostics to collect data at a configurable rate (such as 1 Hz) could monitor for out-of-threshold conditions to determine exceptional events based on patterns that match. Vehicles equipped with a remote vehicle prognostics system could provide data to network-based data repository of "community" data that could help supplement the external data pattern recognition. The system can utilize external and vehicle profile data sources to compare against vehicle data. The external data can include databases with OEM/factory (or other derivative) vehicle specifications and operating thresholds. The external data can also include vehicle profile data from vehicles that participate in the RVP community would supplement external data sources. Vehicle profile data could include historical data of operating thresholds deemed normal. Environmental data could also be applied to determine like conditions of vehicles and provide further context of recognized patterns. Combined data could relate to potential failure based on like-vehicle configurations and information which led up to breakdown events, safety concerns. For example, based on a pattern identified for starter seizures, the remote vehicle prognostics could look for operating and environmental conditions that matched a pattern. The Maintenance profile could use real time engine data. Additionally, preventative maintenance schedules and alerts could be provided to the operator and the network based system. The available data sources could include external sources, such as OEM specifications. Vehicles equipped with remote vehicle prognostics could provide additional detail to supplement the "community" data and add to pattern recognition. A vehicle can provide self-profiling information that would also be used to identify operating characteristics outside of defined ranges to provide alerts for the maintenance profile. The environmental profile relates to providing information about environmental conditions, such as driving in rain, snow, ice, and operational characteristics associated with the conditions, such as excess speed, traction control system is disabled, etc. Combined conditions could be analyzed to provide real time indicators to operators (and back to the network-based system) of unsafe operation. Combined conditions could also be applied to the Mechanical, Maintenance and Safety profiles as a factor in pattern identification. Data sources can include external data (weather, road, etc.), vehicle engine data, and additional on-vehicle sensors.

U.S. Pat. No. 9,014,906 discloses a data acquisition device that may detect the particular type of communications protocol employed by ECM, and automatically adapt to the detected protocol in order to communicate with ECM. In these circumstances, data acquisition device may be installed in any one of a number of different types of vehicles, e.g., a class 8 large truck, a class 1 car, or the like, and the installer's act of connecting cable to the vehicle's ECM may prompt the control circuitry of data acquisition device to automatically recognize the type of vehicle in which it is installed. As such, some examples of data acquisition device need not be manufactured or preprogrammed in a vehicle-specific manner. For example, in some implementations, ECM may implement a controller area network (CAN), a local interconnect network (LIN), a vehicle area network (VAN), FlexRay, J1939, ISO-11783, domestic digital bus (D2B), IDB-1394, SmartWireX, MOST, J1850, ISO-9141, J1708, J1587, SPI, IIC, or any other communications protocol for communicating with data acquisition device through data bus. These communications may be further passed on to a portable wireless data transfer and display device. The data acquisition device may detect the combination and/or signal levels implemented over data bus, may analyze incoming data traffic, and/or may query ECM using various protocols and receive corresponding responses in order to determine the protocol in use by ECM.

The data acquisition device may be configured to simultaneously communicate via multiple protocols at once of one or more engine control modules. For instance, data acquisition device may be configured to communicate via the J1939 and J1708 protocols at the same time. This feature may be useful, for example, for a vehicle in which ECM communicates in two different protocols, e.g., communicates some information (braking information) on one engine bus and other information, e.g., fuel information, on another engine bus. Also, this feature may be useful when a single vehicle includes multiple ECMs that employed different protocols. Thus, data acquisition device may to gather some vehicle information appears on one engine bus, and to gather other vehicle information on another engine bus.

U.S. Pat. No. 8,914,170 discloses a railway telematics system. Data communicated between the vehicles may be network data. In some embodiments, "network data" includes data packets that are configured in a designated packet format. For example, data may be packaged into a data packet that includes a set of data bits that are arranged to form a control portion and a payload portion. The control portion of the data bits may correspond to addresses (e.g., source, destination), error detection codes (e.g., checksums), and sequencing information. The control portion may be found in packet headers and trailers of the corresponding data packet. The payload portion of the data bits may correspond to the information that was requested and/or is used by the vehicle system for a designated purpose, such as for making operational decisions and/or for controlling operations (e.g., tractive efforts, braking efforts, and the like) of the vehicle system. The payload portion may include operating data. Operating data may include different types of data from various components of a vehicle system that are used to control operation of the vehicle system. For example, the operating data may include information from sensors that indicates a performance level or state of a component of the vehicle system. For instance, pressure sensors may be configured to transmit signals indicative of a performance of a braking system (e.g., current brake line pressure). Fuel sensors may be configured to transmit signals that are indicative of a current fuel level or current fuel efficiency. In rail vehicle systems, sensors coupled to the engine or motors may transmit data that indicates a notch (or throttle) level of the rail vehicle system. Sensors may also be coupled to various elements of mechanical systems (e.g., motors, engines, braking systems) and transmit signals when a corresponding element is properly operating and/or has failed. Operating data may also include information from data radios and global positioning system (GPS) units. GPS units may transmit information describing or indicating a position of the vehicle system. Data radios may transmit information regarding one or more different vehicles of the vehicle system.

The payload portion, however, may include other types of data. For example, the payload portion may include planning data that is used by a controller of the vehicle system to generate and/or modify a trip or mission plan. The trip or mission plan may designate operations of the vehicle system over the course of a trip along one or more routes (e.g., tracks, roads, waterways, or the like) in order to achieve some goal, such as to reduce fuel consumption, emissions generation, required shift changes between different teams of operators of the vehicle system, and the like. For example, a trip plan may designate tractive output (e.g., tractive effort, power output, speed, acceleration, and the like) and/or braking effort as a function of time elapsed during the trip and/or distance along a route of the trip such that, if the vehicle system actually operates according to the designated operations (e.g., designated operational settings), the vehicle system will reduce the amount of fuel consumed, reduce the amount emissions generated, reduce the number of times that the vehicle system must stop to change out one or more human operators of the vehicle system, or the like, relative to another, different trip plan that designates one or more different operations of the vehicle system.

The planning data that is used to generate and/or modify a trip plan can include at least one of vehicle data, route data, or trip data to generate the trip plan and may also include the operating data described above. Vehicle data may include information on the characteristics of the vehicle. For example, when the vehicle system is a rail vehicle, the vehicle data may include a number of rail cars, number of locomotives, information relating to an individual locomotive or a consist of locomotives (e.g., model or type of locomotive, weight, power description, performance of locomotive traction transmission, consumption of engine fuel as a function of output power (or fuel efficiency), cooling characteristics), load of a rail vehicle with effective drag coefficients, vehicle-handling rules (e.g., tractive effort ramp rates, maximum braking effort ramp rates), content of rail cars, lower and/or upper limits on power (throttle) settings, etc.

Route data may include information on the route, such as information relating to the geography or topography of various segments along the route (e.g., effective track grade and curvature), speed limits for designated segments of a route, maximum cumulative and/or instantaneous emissions for a designated segment of the route, locations of intersections (e.g., railroad crossings), locations of certain track features (e.g., crests, sags, curves, and super-elevations), locations of mileposts, and locations of grade changes, sidings, depot yards, and fuel stations.

Trip data may include information relating to a designated mission or trip, such as start and end times of the trip, start and end locations, route data that pertains to the designated route (e.g., effective track grade and curvature as function of milepost, speed limits), upper cumulative and/or instantaneous limits on emissions for the trip, fuel consumption permitted for the trip, historical trip data (e.g., how much fuel was used in a previous trip along the designated route), desired trip time or duration, crew (user and/or operator) identification, crew shift expiration time, lower and/or upper limits on power (throttle) settings for designated segments, etc.

U.S. Pat. No. 9,092,914 discloses a system and method used to recognize a vehicle defect or a vehicle inefficiency based on a comparison of the vehicle's operation at a given location with previous records of the vehicle's operation at the same location. A comparison to similar vehicles may also be used to detect a defect or determine vehicle inefficiency. As a vehicle travels along a route, measurements of the vehicle's operating parameters are recorded along with the vehicle location that corresponds with each recorded measurement. In this way, a log of the vehicle's performance at a known location is created. Entries in the log may be compared with a log or a series of logs for the same vehicle for previous trips along the same route. Alternatively, or additionally, the log may be compared with a log or a series of logs for other vehicles that have previously travelled the route. The other vehicles may be the same make, model, and type as the vehicle. Or, the other vehicles may be comprised of different makes, models, and types. In the latter case, the measurements in the logs may be compensated or adjusted for a more accurate comparison between the two vehicles.

A comparison of current measurements with previous measurements recorded at a given location may show that the vehicle has suffered a malfunction, defect, or other issue that is diminishing vehicle efficiency. For example, if the speed of an automobile is fifteen percent lower at a given location on a current trip versus a previous trip, then the automobile's engine may be damaged. The comparison may take into account, for example, the vehicle's weight and throttle position, and external factors, such as wind speed and direction, to reduce the likelihood of a false positive detection of a deficiency. An indication may be made to the vehicle operator that there may be a defect in the vehicle that is causing the apparent deficiency. The indication may also be transmitted via a network to a remote server that may be monitored by the vehicle's owner or maintainer. The vehicle may take any number of forms, including, as examples, a bus, truck, van, mini-van, sports utility vehicle (SUV), helicopter, airplane, construction vehicle, boat, trailer, all-terrain vehicle (ATV), motorcycle, moped, tractor, hybrid vehicle, electric vehicle, ambulance, marine vessel, boat, submarine, or other vehicle.

On-board device may communicate with any number of communication networks, including communication network, which may take any number of forms such as a cellular network. On-board device may communicate according to any number of communication protocols, standards, networks, or topologies. As examples, on-board device may communicate across cellular networks or standards (e.g., 2G, 3G, Universal Mobile Telecommunications System (UMTS), GSM Association, Long Term Evolution (LTE), or more), WiMAX, Bluetooth, WiFi (including 802.11a/b/g/n/ac/ad/ax or others), WiGig, Global Positioning System (GPS) networks, and others available at the time of the filing of this application or that may be developed in the future. On-board device 120 may include processing circuitry, data ports, transmitters, receivers, transceivers, or any combination thereof to communicate across any of the above-listed protocols, standards, networks, or topologies. The on-board device may also collect any vehicle data, such as performance statistics, route information, position data, traffic data, and others. In one example, on-board device may include telemetry functionality to collect and/or send vehicle data. These telemetry functions may include measurements or records of speed, direction, acceleration, pitch, yawl, and roll, and measurements or records of rate of change for speed, direction, acceleration, pitch, yawl, and roll. On-board device includes a sensor interface that may interface with one or more sensors in the vehicle. These sensors may include pressure sensors, gyroscopes, temperature sensors, voltage and current monitors, magnetic sensors, microelectromechanical sensors, mechatronic sensors, position sensors, and compass sensors. These sensors are merely exemplary and the embodiments are not limited to those sensors listed herein. Via sensor interface, on-board device may collect various operating parameters that may be stored in a database, memory, or transmitted over a communication network and stored in a remote database. The database may be operated or maintained by the owner of vehicle. Alternatively, database may be operated or maintained by a third-party that may grant access to database to commercial or private operators and owners of vehicles. Database may be distributed, such as in a cloud of distributed, networked computer servers.

The various operating parameters of the vehicle operation may include, for example, speed, velocity, direction of travel, acceleration, throttle position, brake pedal position, temperature of components in the vehicle, ambient temperature, pressure and/or levels of vehicle fluids (both liquids and gases), vehicle weight, occupancy, measurements of the vehicle's electrical system, fuel efficiency, exhaust measurements, noise measurements, and wind speed. These operating parameters listed are merely exemplary. On-board device associates a location with the operating parameter measurement that was recorded when the vehicle was at that location. Thus, on-board device may create a log of locations and corresponding measurements as the vehicle travels along a route. This log is stored in database or memory, or is uploaded to database over communication network.

If a vehicle is traveling along a route that the vehicle previously travelled, the on-board device may retrieve the logs corresponding to that route for that vehicle. As the vehicle travels along the route for the nth time, the on-board device collects measurements of operating parameters and the corresponding location (e.g., in GPS coordinates) for each measurement. During this time, on-board device may compare the log for the current trip with those logs from previous trips. On-board device may perform an analysis of the data to determine whether there are any anomalies in the current log as compared to past logs. For example, if the fuel efficiency of the vehicle is suddenly far lower than on previous trips, the vehicle may have suffered a defect or malfunction. On-board device may compensate for certain factors, such as vehicle weight, throttle position, wind velocity (speed and direction), and vehicle speed, to prevent or reduce the occurrence of false positive identifications of defects or inefficiencies. Alternatively, on-board device may upload the relevant data via communication network to a remote server or processor to perform the analysis of the recorded operating parameters. The on-board device may also consider recorded operating parameters at locations along a given route of other vehicles. For example, if vehicle is traveling along a new route for which no logs exist for vehicle, on-board device may access logs for other vehicles that have travelled the route for comparison with the operating parameters of vehicle. On-board device may advantageously access logs for vehicles having, for example, the same make, model, type, and approximate mileage as vehicle. Alternatively, on-board device may access logs for broader groups of vehicles that include vehicles of a make, model, type, and/or approximate mileage that is different from those of vehicle. On-board device or some other device, such as a server or processor in communication with communication network, may perform a compensation calculation on the logs of other vehicles so that the comparison with the log from vehicle is more meaningful. For example, individual logs for vehicles of other types may be compensated based on the weight and horsepower of the vehicles. Heavier vehicles or vehicles with greater horsepower may have lower fuel efficiency. Fuel efficiency data from vehicles that are heavier than vehicle should be compensated given the weight difference. Such a comparison may be particularly useful for identifying defects when the fuel efficiency of a lighter vehicle is worse than the fuel efficiency of a heavier vehicle with greater horsepower. On-board device may perform a statistical analysis of the data collected for various operating parameters of vehicle. For example, on-board device may compute the mean, median, and standard deviation of a set of measurements for a given operating parameter. The set may be limited to measurements that were recorded when the vehicle weight was within a predetermined range. Other vehicle parameters may also be accounted for when computing such statistical values. For example, statistical values may be computed for a set of measurements recorded when vehicle is within ten percent of 300 kilograms. Other boundaries or thresholds, such as ambient temperature and wind speed and direction, may be used to limit the set of measurements from which statistical values are calculated. A set of forces acting on vehicle may be considered as predetermined boundaries for validating the statistical values.

When vehicle is operating under conditions that validate a set of statistical values, the current measured operating parameters may be compared against the statistical values to determine whether a defect or inefficiency exists in vehicle. For example, if the vehicle has a speed of 60 miles per hour with a throttle position of 40 degrees at its current location, then the vehicle's speed-to-throttle ratio may be compared against the mean speed-to-throttle ratio at the current location. If the speed-to-throttle ratio is greater than a predetermined number of standard deviations from the mean, then a defect or inefficiency caused by a defect may be recognized. Other statistical analyses may be performed to detect defects. For example, data may be adjusted, compensated, or normalized based on external and internal forces acting on vehicle to improve the accuracy of the comparison. The advantage of adjusting, compensating, or normalizing data and measurements based on such variables, for example, as vehicle weight or ambient temperature, is to make the comparison of prior logs to the current log more accurate and meaningful, i.e., so that the system is comparing "apples to apples" and "oranges to oranges."

U.S. Pat. No. 9,311,670 discloses various aspects of communications systems and telematics systems, for example. In some cases, the technologies may advantageously be used to provide a protocol for efficient or optimized communications. In addition, telematics systems employing the protocols are disclosed, e.g., Third and Fourth Embodiments. Also discussed are data analysis technologies.

US 2016/0241699 discloses a device, system and method for providing wireless data transfer service for mobile devices by using the WWAN and WPAN communications capabilities of in-vehicle telematics systems. This invention will allow data transfer services in situations where the mobile device does not have WWAN capability and in situations where there is a desire not to use the WWAN capability of a mobile device, i.e., the mobile device is a non-secure personal device. This invention will enable businesses to allow its mobile workers to use a variety of mobile devices to run certain authorized, i.e. business-specific, applications to make the mobile workers and the business more efficient and effective. An in-vehicle telematics device is plugged into a diagnostic port of a vehicle, such as an OBD-II port or a J1939 port. Most personal vehicles have OBD-II ports located near the engine or the dashboard. Commercial vehicles will generally have a J1939 diagnostic port. In an embodiment, one component of the telematics device is the communications electronics to support a WWAN connection over one or more of the standard cellular data protocols that are available. Another component is the communications electronics to support a WPAN connection over standard wireless data protocols such as Bluetooth or Wi-Fi. Through these components, the in-vehicle telematics device is able to establish a WWAN connection to a remote server and a WPAN connection to a mobile device. An additional component or feature of the in-vehicle telematics device is software that supports a secure and authenticated WPAN connection between mobile devices running specified software applications that are designed and authorized to utilize such a connection and designed to refuse or disallow a connection from any other mobile devices and/or software. In this embodiment, an additional feature of the in-vehicle telematics device is a software application-programming interface ("API") that provides low-level access to many of its components. In this embodiment, an authorized app on a mobile device, such as a business-specific app that is designed to use the API, has the ability to send commands to the in-vehicle telematics device via the WPAN connection and request a network connection from the WWAN component. In this example, once a WWAN connection has been provided to the authorized app, it can send and receive data to/from a remote server without a mobile device having or using its own WWAN capability. The in-vehicle telematics device includes components that support the electronics and associated software required to capture and log a variety of telematics data such as GPS information (e.g., location, speed, and heading); accelerometer & gyroscope data (e.g., acceleration, deceleration, yaw, cornering force); and vehicle data (e.g., vehicle identification, fuel level, fuel efficiency, active engine diagnostic codes, etc.). This data is captured, logged, and transmitted via the WWAN connection established through the in-vehicle telematics device to a centralized computer system for subsequent review and analysis. An app may be loaded on a mobile device wherein the app is designed and authorized to use the API for the in-vehicle telematics device and has the ability to make requests from specific components of the in-vehicle telematics device via the WPAN connection. Such requests may include real-time GPS information (e.g., location, speed, and heading) and real-time vehicle information (e.g., vehicle identifier, fuel level, active engine diagnostic codes, etc.). An app on the mobile device may be authorized and designed to use the API for the in-vehicle telematics device and has the ability to access previously logged vehicle telematics data via the WPAN connection. The app may be authorized to use the WPAN provided through the in-vehicle telematics device by making the connection through the API by providing a required security token.

Therefore, it is clear that land vehicle telematics systems are reasonably well developed. However, while previous disclosures seek to extrapolate to marine vessels, the fundamental issues differ, and therefore the proposed solutions may be ineffective. In a marine vessel environment, net fuel costs for a voyage may be a key parameter. In contrast to automotive propulsion, typical cruising speed is not limited by an arbitrary speed limit (except in defined coastal channels, for example) or safety per se, but rather the efficient design speed for the vessel under the load, conditions, etc. On the other hand, there is a range of speeds and some flexibility in route planning that is available to a mariner. In a commercial context, the operating costs of a vessel include not only the fuel, but also crew and mission constraints. Therefore, the optimization of a marine vessel using a telematics system is typically quite distinct from land vehicles.

US PATENTS AND PUB. APPS. INCORPORATED BY REFERENCE (37 CFR 1.57(C), (D), (E)) U.S. Pat. Nos. 4,101,056; 4,262,209; 4,389,221; 4,484,543; 4,607,144; 4,615,011; 4,813,242; 4,843,575; 4,972,464; 5,065,393; 5,111,329; 5,192,496; 5,208,912; 5,247,615; 5,307,456; 5,383,116; 5,446,846; 5,453,933; 5,469,150; 5,537,608; 5,562,079; 5,598,343; 5,668,955; 5,691,486; 5,695,325; 5,712,968; 5,719,667; 5,726,984; 5,732,074; 5,745,308; 5,772,963; 5,781,620; 5,784,547; 5,788,927; 5,819,702; 5,844,685; 5,872,627; 5,873,256; 5,883,378; 5,901,214; 5,908,599; 5,910,099; 5,934,885; 5,935,221; 5,936,986; 5,943,241; 5,953,681; 5,973,842; 5,992,474; 6,012,100; 6,026,151; 6,038,492; 6,042,249; 6,058,179; 6,067,442; 6,073,172; 6,092,375; 6,131,809; 6,145,494; 6,148,179; 6,157,636; 6,160,998; 6,161,071; 6,163,681; 6,167,238; 6,167,239; 6,173,159; 6,212,184; 6,230,194; 6,230,480; 6,232,957; 6,273,771; 6,289,881; 6,302,654; 6,324,675; 6,333,753; 6,336,063; 6,349,403; 6,353,734; 6,353,785; 6,356,794; 6,370,454; 6,370,475; 6,381,324; 6,389,010; 6,397,963; 6,405,132; 6,443,125; 6,453,222; 6,456,599; 6,481,222; 6,494,045; 6,496,858; 6,496,885; 6,500,089; 6,512,967; 6,519,751; 6,526,352; 6,542,083; 6,553,336; 6,559,769; 6,567,709; 6,571,136; 6,577,937; 6,587,765; 6,597,906; 6,606,848; 6,614,886; 6,615,186; 6,621,827; 6,625,539; 6,640,145; 6,658,414; 6,661,884; 6,675,081; 6,694,313; 6,705,418; 6,711,409; 6,711,548; 6,720,920; 6,721,572; 6,725,281; 6,728,603; 6,755,266; 6,758,089; 6,766,502; 6,768,944; 6,771,742; 6,785,277; 6,792,759; 6,826,460; 6,847,947; 6,850,510; 6,850,834; 6,853,894; 6,856,598; 6,857,263; 6,873,261; 6,883,322; 6,895,310; 6,895,327; 6,904,341; 6,919,803; 6,920,134; 6,952,181; 6,952,645; 6,954,736; 6,956,506; 6,957,133; 6,961,312; 6,963,146; 6,965,816; 6,965,818; 6,978,206; 6,980,092; 6,981,055; 6,988,026; 6,988,995; 6,993,421; 6,996,397; 7,017,145; 7,024,317; 7,027,488; 7,032,002; 7,035,856; 7,039,606; 7,043,357; 7,054,710; 7,054,837; 7,057,376; 7,062,371; 7,065,420; 7,072,843; 7,080,353; 7,085,637; 7,089,099; 7,089,307; 7,092,799; 7,092,898; 7,103,460; 7,110,880; 7,113,127; 7,113,839; 7,120,596; 7,126,580; 7,126,581; 7,131,259; 7,140,026; 7,142,535; 7,149,206; 7,164,117; 7,167,553; 7,168,748; 7,171,379; 7,173,605; 7,174,243; 7,175,555; 7,177,397; 7,177,738; 7,184,866; 7,194,372; 7,202,776; 7,207,041; 7,210,356; 7,225,037; 7,228,211; 7,229,017; 7,233,857; 7,242,311; 7,243,945; 7,247,124; 7,248,841; 7,260,369; 7,269,517; 7,272,475; 7,274,332; 7,274,699; 7,278,567; 7,280,810; 7,283,904; 7,284,058; 7,286,918; 7,295,098; 7,295,925; 7,299,130; 7,302,313; 7,302,315; 7,305,291; 7,308,664; 7,313,467; 7,317,975; 7,327,226; 7,330,112; 7,330,117; 7,330,784; 7,333,026; 7,343,341; 7,343,627; 7,348,895; 7,356,343; 7,358,851; 7,359,782; 7,362,239; 7,366,151; 7,370,639; 7,370,983; 7,376,191; 7,379,800; 7,386,372; 7,403,560; 7,407,029; 7,408,453; 7,412,422; 7,415,126; 7,418,346; 7,420,954; 7,421,321; 7,421,334; 7,426,437; 7,430,261; 7,430,470; 7,441,189; 7,443,857; 7,444,210; 7,448,042; 7,457,628; 7,457,693; 7,460,507; 7,464,010; 7,464,179; 7,465,231; 7,466,218; 7,466,975; 7,467,034; 7,474,228; 7,480,550; 7,483,774; 7,484,008; 7,486,181; 7,493,565; 7,497,201; 7,502,672; 7,505,836; 7,518,502; 7,522,980; 7,523,237; 7,523,803; 7,525,484; 7,527,288; 7,532,640; 7,532,880; 7,546,257; 7,548,787; 7,549,327; 7,549,821; 7,551,063; 7,552,801; 7,554,441; 7,555,370; 7,558,574; 7,558,668; 7,561,881; 7,561,963; 7,565,155; 7,571,036; 7,571,111; 7,571,128; 7,574,867; 7,577,938; 7,580,384; 7,580,782; 7,581,434; 7,583,618; 7,584,685; 7,586,861; 7,586,907; 7,586,953; 7,590,589; 7,593,733; 7,593,999; 7,594,682; 7,596,242; 7,603,125; 7,603,471; 7,603,894; 7,606,156; 7,610,011; 7,610,146; 7,620,316; 7,620,516; 7,620,603; 7,627,320; 7,629,899; 7,629,963; 7,630,717; 7,630,802; 7,630,806; 7,633,934; 7,634,465; 7,636,410; 7,646,743; 7,647,180; 7,650,210; 7,650,431; 7,657,354; 7,658,184; 7,660,437; 7,663,502; 7,664,931; 7,672,119; 7,672,756; 7,673,620; 7,676,062; 7,683,774; 7,684,605; 7,684,910; 7,685,294; 7,688,218; 7,688,743; 7,688,811; 7,693,626; 7,693,720; 7,697,467; 7,702,588; 7,706,398; 7,711,368; 7,714,712; 7,714,778; 7,715,375; 7,715,376; 7,720,488; 7,725,114; 7,738,678; 7,753,010; 7,756,199; 7,756,616; 7,760,080; 7,760,703; 7,764,231; 7,765,961; 7,768,951; 7,769,386; 7,769,513; 7,772,966; 7,774,111; 7,775,582; 7,778,769; 7,782,814; 7,782,864; 7,783,291; 7,783,403; 7,783,507; 7,783,908; 7,786,864; 7,787,882; 7,788,607; 7,789,795; 7,791,503; 7,796,081; 7,797,267;

7,799,986; 7,801,500; 7,805,143; 7,809,374; 7,812,766; 7,818,098; 7,819,003; 7,826,540; 7,831,347; 7,836,437; 7,840,342; 7,840,355; 7,840,558; 7,840,735; 7,840,839; 7,848,316; 7,848,358; 7,853,395; 7,853,537; 7,864,752; 7,873,452; 7,873,911; 7,877,110; 7,880,594; 7,880,609; 7,881,730; 7,882,267; 7,885,145; 7,885,252; 7,887,604; 7,889,096; 7,891,004; 7,894,810; 7,894,951; 7,895,342; 7,896,059; 7,899,007; 7,899,491; 7,899,616; 7,899,621; 7,900,215; 7,903,029; 7,904,041; 7,904,219; 7,904,569; 7,908,051; 7,912,016; 7,912,043; 7,912,625; 7,912,645; 7,916,706; 7,917,103; 7,920,102; 7,920,553; 7,920,944; 7,928,735; 7,930,053; 7,933,252; 7,936,713; 7,937,093; 7,937,094; 7,938,321; 7,940,673; 7,945,359; 7,949,405; 7,949,529; 7,949,893; 7,953,425; 7,953,528; 7,957,365; 7,957,727; 7,961,094; 7,962,285; 7,965,764; 7,966,306; 7,970,496; 7,975,120; 7,975,288; 7,977,287; 7,978,774; 7,979,172; 7,979,173; 7,979,315; 7,983,678; 7,983,802; 7,983,817; 7,983,835; 7,983,836; 7,987,027; 7,990,283; 7,991,525; 7,996,185; 7,997,723; 8,000,897; 8,005,467; 8,009,026; 8,009,028; 8,014,789; 8,014,793; 8,014,995; 8,018,907; 8,019,500; 8,019,501; 8,022,942; 8,024,084; 8,024,112; 8,028,602; 8,032,153; 8,035,508; 8,036,788; 8,044,809; 8,045,962; 8,047,432; 8,049,615; 8,050,419; 8,050,673; 8,054,203; 8,055,403; 8,060,282; 8,060,308; 8,064,960; 8,065,342; 8,068,979; 8,073,198; 8,075,484; 8,078,441; 8,079,118; 8,082,096; 8,085,705; 8,085,768; 8,085,924; 8,086,481; 8,086,771; 8,090,560; 8,090,598; 8,090,620; 8,095,152; 8,095,279; 8,098,753; 8,099,111; 8,100,750; 8,103,208; 8,103,227; 8,103,443; 8,103,762; 8,108,174; 8,112,110; 8,112,405; 8,115,620; 8,117,547; 8,121,628; 8,125,328; 8,126,601; 8,126,642; 8,135,077; 8,135,362; 8,135,413; 8,136,011; 8,138,897; 8,139,029; 8,139,749; 8,139,820; 8,140,358; 8,144,790; 8,145,225; 8,145,379; 8,149,707; 8,149,825; 8,150,453; 8,155,817; 8,155,867; 8,157,035; 8,157,047; 8,157,162; 8,159,338; 8,160,536; 8,160,547; 8,160,581; 8,161,748; 8,165,146; 8,165,803; 8,166,139; 8,169,311; 8,175,886; 8,180,041; 8,180,908; 8,184,632; 8,185,412; 8,185,647; 8,185,648; 8,188,837; 8,189,703; 8,190,081; 8,190,143; 8,190,193; 8,194,133; 8,194,595; 8,195,148; 8,195,468; 8,195,774; 8,200,243; 8,201,089; 8,203,433; 8,209,073; 8,209,120; 8,209,514; 8,212,685; 8,212,691; 8,213,861; 8,213,967; 8,219,312; 8,228,801; 8,228,879; 8,229,618; 8,229,624; 8,229,776; 8,229,835; 8,231,270; 8,238,264; 8,238,896; 8,238,897; 8,239,076; 8,243,025; 8,244,779; 8,246,467; 8,255,144; 8,259,822; 8,260,537; 8,260,736; 8,262,019; 8,265,100; 8,265,855; 8,265,868; 8,266,030; 8,271,187; 8,275,351; 8,275,522; 8,275,649; 8,280,646; 8,281,188; 8,290,425; 8,290,516; 8,294,568; 8,295,816; 8,296,949; 8,297,198; 8,301,639; 8,306,560; 8,310,363; 8,311,140; 8,311,509; 8,311,722; 8,311,858; 8,311,983; 8,312,479; 8,315,337; 8,319,605; 8,319,666; 8,320,914; 8,321,125; 8,321,524; 8,323,041; 8,325,642; 8,326,258; 8,326,470; 8,326,522; 8,326,667; 8,327,146; 8,334,841; 8,335,547; 8,340,629; 8,340,902; 8,342,279; 8,345,857; 8,346,391; 8,347,243; 8,351,925; 8,352,575; 8,354,927; 8,354,997; 8,358,222; 8,366,541; 8,369,295; 8,369,893; 8,373,581; 8,374,725; 8,380,640; 8,384,538; 8,384,670; 8,386,091; 8,386,115; 8,390,474; 8,391,829; 8,391,849; 8,392,065; 8,392,322; 8,396,449; 8,396,665; 8,397,848; 8,401,572; 8,406,944; 8,406,988; 8,407,152; 8,408,720; 8,410,945; 8,412,421; 8,412,584; 8,412,675; 8,414,366; 8,416,067; 8,417,452; 8,417,618; 8,417,823; 8,420,984; 8,423,017; 8,423,287; 8,423,362; 8,428,622; 8,428,789; 8,428,799; 8,432,269; 8,433,471; 8,438,028; 8,438,030; 8,438,633; 8,442,528; 8,442,550; 8,442,690; 8,442,904; 8,447,025; 8,447,607; 8,447,661; 8,451,739; 8,452,271; 8,452,310; 8,452,486; 8,456,294; 8,457,686; 8,463,449; 8,463,521; 8,467,376; 8,467,384; 8,467,936; 8,468,126; 8,473,127; 8,473,140; 8,477,019; 8,482,395; 8,482,399; 8,483,245; 8,483,949; 8,484,314; 8,487,871; 8,488,598; 8,489,433; 8,493,366; 8,494,510; 8,495,225; 8,497,838; 8,498,774; 8,499,030; 8,499,096; 8,502,498; 8,503,300; 8,503,932; 8,504,016; 8,508,347; 8,509,222; 8,509,226; 8,509,260; 8,509,753; 8,509,773; 8,509,986; 8,510,470; 8,514,825; 8,514,846; 8,514,849; 8,515,616; 8,515,873; 8,520,816; 8,521,548; 8,526,311; 8,526,930; 8,527,135; 8,528,680; 8,531,180; 8,531,312; 8,531,316; 8,532,090; 8,532,275; 8,532,674; 8,537,687; 8,537,747; 8,537,770; 8,537,991; 8,538,621; 8,538,785; 8,539,040; 8,539,769; 8,542,196; 8,542,695; 8,542,715; 8,543,143; 8,543,287; 8,543,328; 8,543,330; 8,547,962; 8,547,967; 8,548,508; 8,553,644; 8,553,865; 8,554,688; 8,554,896; 8,560,313; 8,560,609; 8,561,086; 8,564,455; 8,565,948; 8,566,410; 8,570,372; 8,570,875; 8,571,030; 8,572,176; 8,577,003; 8,577,390; 8,577,528; 8,577,568; 8,577,730; 8,577,771; 8,578,282; 8,581,688; 8,582,775; 8,583,304; 8,583,318; 8,583,333; 8,583,520; 8,588,213; 8,589,018; 8,594,467; 8,594,616; 8,595,034; 8,595,094; 8,599,537; 8,599,822; 8,600,590; 8,600,741; 8,600,830; 8,600,932; 8,601,595; 8,601,813; 8,604,901; 8,605,589; 8,606,373; 8,611,953; 8,612,107; 8,612,134; 8,612,141; 8,612,273; 8,612,478; 8,612,856; 8,614,669; 8,615,253; 8,615,254; 8,615,345; 8,615,355; 8,615,648; 8,615,773; 8,619,037; 8,619,681; 8,620,360; 8,620,846; 8,621,075; 8,626,208; 8,626,465; 8,626,661; 8,630,443; 8,630,608; 8,630,619; 8,630,768; 8,630,787; 8,630,795; 8,632,182; 8,634,800; 8,635,091; 8,635,272; 8,638,202; 8,639,234; 8,639,494; 8,639,508; 8,643,715; 8,644,303; 8,644,313; 8,645,348; 8,649,819; 8,649,969; 8,652,041; 8,653,953; 8,655,487; 8,655,593; 8,660,549; 8,660,735; 8,660,780; 8,661,149; 8,666,053; 8,666,395; 8,666,437; 8,666,538; 8,666,756; 8,666,801; 8,670,877; 8,674,842; 8,675,514; 8,675,629; 8,675,671; 8,675,851; 8,676,199; 8,676,402; 8,676,468; 8,676,491; 8,677,507; 8,682,364; 8,682,485; 8,686,922; 8,687,650; 8,687,790; 8,688,088; 8,688,142; 8,688,313; 8,688,320; 8,688,532; 8,688,671; 8,690,337; 8,692,101; 8,693,340; 8,693,347; 8,693,358; 8,693,500; 8,693,664; 8,694,328; 8,700,299; 8,700,728; 8,705,360; 8,705,527; 8,706,330; 8,706,416; 8,706,583; 8,706,584; 8,706,640; 8,711,735; 8,711,868; 8,712,192; 8,712,379; 8,712,395; 8,712,909; 8,713,299; 8,718,617; 8,718,844; 8,719,125; 8,719,183; 8,719,198; 8,719,339; 8,719,592; 8,723,698; 8,723,824; 8,725,126; 8,725,326; 8,725,396; 8,725,407; 8,725,561; 8,725,657; 8,726,084; 8,726,222; 8,726,968; 8,731,155; 8,731,581; 8,731,627; 8,731,741; 8,731,832; 8,732,023; 8,732,405; 8,737,972; 8,738,368; 8,738,389; 8,738,708; 8,738,741; 8,743,870; 8,744,421; 8,744,745; 8,745,167; 8,749,350; 8,750,123; 8,750,826; 8,750,832; 8,750,884; 8,750,943; 8,751,066; 8,751,083; 8,751,098; 8,751,153; 8,751,290; 8,751,777; 8,751,793; 8,754,766; 8,755,362; 8,755,371; 8,755,764; 8,755,774; 8,755,776; 8,755,837; 8,756,062; 8,756,995; 8,757,495; 8,760,499; 8,761,101; 8,761,390; 8,761,722; 8,761,736; 8,762,151; 8,762,188; 8,762,285; 8,767,627; 8,768,319; 8,768,569; 8,768,617; 8,768,799; 8,768,838; 8,769,467; 8,774,232; 8,774,389; 8,774,777; 8,774,844; 8,775,283; 8,775,631; 8,775,674; 8,775,964; 8,779,936; 8,779,944; 8,779,947; 8,780,386; 8,780,772; 8,780,889; 8,780,893; 8,781,657; 8,781,715; 8,781,898; 8,782,222; 8,786,437; 8,786,464; 8,787,323; 8,787,913; 8,787,977; 8,787,987; 8,788,114; 8,788,200; 8,788,565; 8,788,731; 8,788,973; 8,791,600; 8,792,227; 8,792,478; 8,793,031; 8,793,034; 8,793,063; 8,793,064; 8,793,066; 8,796,881; 8,797,719; 8,797,958; 8,798,048; 8,798,592;

8,798,594; 8,798,595; 8,798,623; 8,798,847; 8,798,919;
8,799,035; 8,799,461; 8,799,756; 8,799,829; 8,804,702;
8,805,110; 8,805,270; 8,805,339; 8,805,425; 8,805,639;
8,805,734; 8,810,192; 8,811,952; 8,812,526; 8,812,620;
8,812,695; 8,812,702; 8,816,528; 8,817,652; 8,817,957;
8,818,325; 8,818,659; 8,818,879; 8,819,659; 8,823,537;
8,823,740; 8,823,976; 8,824,784; 8,825,002; 8,825,022;
8,825,058; 8,825,358; 8,825,907; 8,826,533; 8,831,205;
8,831,597; 8,831,652; 8,831,814; 8,831,826; 8,831,994;
8,832,100; 8,832,228; 8,832,649; 8,832,716; 8,836,073;
8,836,489; 8,837,363; 8,838,169; 8,838,385; 8,838,783;
8,839,412; 8,842,747; 8,843,103; 8,843,110; 8,843,153;
8,843,269; 8,843,395; 8,843,396; 8,848,558; 8,848,608;
8,848,702; 8,849,313; 8,849,507; 8,849,563; 8,849,652;
8,849,715; 8,849,806; 8,849,931; 8,855,469; 8,855,575;
8,855,839; 8,860,564; 8,861,005; 8,861,349; 8,861,354;
8,861,491; 8,861,512; 8,861,703; 8,862,120; 8,862,299;
8,862,346; 8,862,736; 8,863,256; 8,863,734; 8,867,544;
8,868,030; 8,868,106; 8,868,288; 8,868,661; 8,868,753;
8,869,038; 8,869,235; 8,872,650; 8,874,282; 8,874,477;
8,874,761; 8,879,112; 8,879,242; 8,879,417; 8,879,519;
8,879,520; 8,880,248; 8,880,582; 8,881,027; 8,882,662;
8,884,782; 8,885,572; 8,885,648; 8,886,389; 8,886,393;
8,886,422; 8,886,563; 8,886,830; 8,886,925; 8,890,717;
8,890,746; 8,891,483; 8,891,753; 8,892,139; 8,892,271;
8,892,297; 8,892,451; 8,893,141; 8,896,430; 8,896,438;
8,896,524; 8,896,875; 8,898,236; 8,901,043; 8,902,081;
8,902,255; 8,902,860; 8,902,865; 8,903,062; 8,903,354;
8,903,954; 8,907,775; 8,908,039; 8,909,202; 8,912,753;
8,913,171; 8,913,732; 8,914,141; 8,914,170; 8,914,184;
8,914,447; 8,917,159; 8,917,240; 8,917,308; 8,917,628;
8,918,229; 8,918,232; 8,918,240; 8,918,547; 8,918,841;
8,919,848; 8,922,360; 8,922,391; 8,922,590; 8,923,186;
8,923,499; 8,923,888; 8,924,241; 8,925,808; 8,929,358;
8,929,394; 8,929,522; 8,929,548; 8,929,857; 8,929,877;
8,930,229; 8,930,231; 8,930,572; 8,934,414; 8,934,917;
8,935,019; 8,935,094; 8,935,172; 8,935,319; 8,935,326;
8,935,368; 8,936,762; 8,937,967; 8,938,230; 8,942,664;
8,947,239; 8,947,531; 8,948,190; 8,948,366; 8,948,442;
8,948,566; 8,948,727; 8,949,321; 8,949,823; 8,953,570;
8,954,059; 8,954,255; 8,954,274; 8,954,479; 8,954,480;
8,954,516; 8,956,231; 8,957,623; 8,958,346; 8,958,779;
8,958,988; 8,959,084; 8,965,412; 8,965,677; 8,965,779;
8,965,901; 8,966,121; 8,971,216; 8,971,524; 8,971,846;
8,971,873; 8,971,887; 8,971,957; 8,972,053; 8,972,163;
8,972,165; 8,972,177; 8,972,295; 8,972,736; 8,974,302;
8,976,141; 8,977,408; 8,977,423; 8,977,639; 8,977,755;
8,979,159; 8,979,363; 8,983,046; 8,983,506; 8,983,681;
8,983,718; 8,983,762; 8,984,094; 8,984,581; 8,989,018;
8,989,699; 8,989,718; 8,989,954; 8,989,972; 8,990,840;
8,994,546; 8,994,591; 8,995,284; 8,995,316; 8,995,451;
8,995,637; 8,995,643; 8,995,662; 8,995,815; 8,995,968;
8,995,973; 8,995,979; 8,995,982; 8,996,198; 8,996,210;
8,996,287; 8,996,418; 8,996,419; 8,996,698; 8,996,712;
9,000,557; 9,001,666; 9,002,350; 9,002,567; 9,002,645;
9,002,734; 9,003,293; 9,003,294; 9,003,443; 9,003,455;
9,007,302; 9,008,854; 9,008,856; 9,008,906; 9,008,958;
9,009,177; 9,009,250; 9,011,153; 9,014,678; 9,014,884;
9,014,888; 9,014,906; 9,014,910; 9,014,953; 9,014,966;
9,015,071; 9,015,497; 9,020,038; 9,020,491; 9,020,697;
9,020,743; 9,020,760; 9,020,761; 9,021,021; 9,021,052;
9,025,754; 9,030,321; 9,031,073; 9,031,089; 9,031,531;
9,031,758; 9,031,781; 9,031,845; 9,031,986; 9,032,891;
9,033,116; 9,035,897; 9,036,499; 9,036,591; 9,037,406;
9,037,451; 9,037,852; 9,037,920; 9,043,016; 9,043,073;
9,043,151; 9,043,282; 9,043,433; 9,047,717; 9,047,783;
9,049,040; 9,049,042; 9,049,143; 9,049,179; 9,049,298;
9,049,985; 9,053,516; 9,055,022; 9,055,102; 9,055,928;
9,058,141; 9,058,406; 9,058,703; 9,059,978; 9,060,341;
9,061,599; 9,062,617; 9,063,525; 9,063,542; 9,063,829;
9,064,010; 9,064,011; 9,064,174; 9,064,422; 9,065,765;
9,067,136; 9,067,565; 9,068,852; 9,068,856; 9,069,599;
9,069,794; 9,070,100; 9,070,168; 9,070,173; 9,070,291;
9,071,619; 9,071,892; 9,073,405; 9,074,892; 9,075,136;
9,075,561; 9,075,826; 9,076,175; 9,077,641; 9,078,200;
9,079,470; 9,079,497; 9,081,418; 9,081,485; 9,081,653;
9,081,860; 9,081,944; 9,082,100; 9,082,103; 9,082,238;
9,082,239; 9,082,243; 9,082,303; 9,082,414; 9,083,414;
9,083,581; 9,083,802; 9,084,091; 9,084,105; 9,084,118;
9,085,334; 9,086,285; 9,087,099; 9,087,215; 9,087,216;
9,087,319; 9,088,454; 9,088,572; 9,088,903; 9,090,295;
9,090,339; 9,091,551; 9,091,558; 9,091,581; 9,092,914;
9,092,984; 9,094,436; 9,096,234; 9,097,549; 9,098,080;
9,098,232; 9,098,367; 9,098,433; 9,098,590; 9,098,952;
9,098,957; 9,098,958; 9,099,000; 9,099,526; 9,100,503;
9,100,873; 9,103,671; 9,103,679; 9,104,239; 9,104,287;
9,104,538; 9,105,051; 9,105,066; 9,105,189; 9,105,304;
9,106,286; 9,106,729; 9,107,058; 9,107,089; 9,107,195;
9,108,579; 9,108,646; 9,110,996; 9,111,125; 9,111,234;
9,111,333; 9,111,604; 9,112,700; 9,112,721; 9,112,996;
9,113,182; 9,113,288; 9,113,289; 9,114,812; 9,116,786;
9,116,818; 9,117,190; 9,117,318; 9,118,383; 9,118,593;
9,119,128; 9,121,719; 9,122,621; 9,123,058; 9,123,098;
9,123,186; 9,124,650; 9,124,957; 9,125,042; 9,126,514;
9,127,955; 9,127,959; 9,128,798; 9,128,809; 9,128,867;
9,128,906; 9,129,133; 9,129,449; 9,129,605; 9,130,647;
9,130,760; 9,130,930; 9,131,397; 9,132,806; 9,134,353;
9,134,398; 9,134,955; 9,134,986; 9,135,155; 9,135,569;
9,135,731; 9,135,756; 9,135,759; 9,135,764; 9,136,153;
9,137,262; 9,137,364; 9,137,389; 9,140,560; 9,140,565;
9,140,567; 9,140,715; 9,141,171; 9,141,220; 9,141,772;
9,142,071; 9,142,072; 9,142,142; 9,143,203; 9,143,384;
9,143,529; 9,143,530; 9,145,059; 9,145,149; 9,146,118;
9,146,120; 9,147,219; 9,147,296; 9,147,297; 9,147,298;
9,147,353; 9,148,702; 9,148,743; 9,149,236; 9,150,272;
9,151,692; 9,152,202; 9,152,488; 9,152,933; 9,153,084;
9,153,132; 9,154,324; 9,154,976; 9,157,383; 9,159,098;
9,160,612; 9,160,629; 9,160,755; 9,160,851; 9,160,869;
9,161,258; 9,161,700; 9,163,718; 9,163,952; 9,165,466;
9,166,888; 9,166,936; 9,166,987; 9,167,097; 9,167,619;
9,170,583; 9,170,648; 9,170,913; 9,171,201; 9,171,471;
9,172,116; 9,172,680; 9,173,100; 9,173,128; 9,173,154;
9,173,566; 9,173,593; 9,173,594; 9,175,967; 9,176,924;
9,177,476; 9,178,720; 9,179,253; 9,179,311; 9,179,487;
9,179,488; 9,180,747; 9,182,764; 9,182,996; 9,183,273;
9,183,380; 9,183,560; 9,183,572; 9,183,584; 9,183,685;
9,184,778; 9,185,142; 9,185,675; 9,187,085; 9,188,449;
9,188,451; 9,189,879; 9,190,844; 9,191,135; 9,191,138;
9,191,505; 9,191,515; 9,191,634; 9,191,866; 9,195,984;
9,195,993; 9,196,005; 9,197,297; 9,197,599; 9,197,906;
9,200,561; 9,200,902; 9,200,921; 9,201,575; 9,201,979;
9,202,186; 9,202,318; 9,202,465; 9,203,553; 9,203,652;
9,203,680; 9,203,864; 9,204,251; 9,204,257; 9,204,351;
9,204,359; 9,208,123; 9,208,626; 9,208,780; 9,209,871;
9,209,977; 9,210,249; 9,210,256; 9,210,276; 9,210,708;
9,211,811; 9,213,090; 9,213,447; 9,213,944; 9,213,947;
9,214,191; 9,215,212; 9,215,317; 9,215,319; 9,215,322;
9,215,683; 9,215,728; 9,215,986; 9,216,068; 9,218,689;
9,218,698; 9,218,718; 9,219,572; 9,219,677; 9,219,678;
9,221,428; 9,221,452; 9,223,878; 9,223,897; 9,224,249;
9,224,250; 9,225,376; 9,225,581; 9,225,782; 9,225,839;
9,225,844; 9,226,012; 9,226,115; 9,226,117; 9,226,216;
9,227,595; 9,228,843; 9,229,734; 9,229,800; 9,229,903;
9,229,906; 9,230,002; 9,230,232; 9,230,379; 9,230,438;

9,231,823; 9,232,007; 9,232,451; 9,233,315; 9,234,780;
9,235,941; 9,237,543; 9,238,465; 9,239,989; 9,240,018;
9,240,019; 9,240,082; 9,240,763; 9,241,314; 9,242,653;
9,245,266; 9,245,434; 9,246,207; 9,246,335; 9,246,862;
9,247,378; 9,247,434; 9,247,478; 9,248,790; 9,250,079;
9,250,327; 9,251,193; 9,251,628; 9,251,648; 9,251,693;
9,253,127; 9,253,200; 9,253,545; 9,254,092; 9,254,099;
9,254,798; 9,255,810; 9,256,679; 9,256,992; 9,258,148;
9,258,173; 9,258,193; 9,258,198; 9,258,260; 9,258,419;
9,258,695; 9,258,758; 9,258,765; 9,259,986; 9,260,976;
9,261,376; 9,262,370; 9,262,439; 9,262,787; 9,262,934;
9,264,151; 9,264,292; 9,264,344; 9,264,758; 9,264,846;
9,264,877; 9,268,882; 9,269,203; 9,269,267; 9,270,541;
9,270,676; 9,270,819; 9,270,824; 9,270,952; 9,271,023;
9,271,133; 9,271,238; 9,272,714; 9,272,853; 9,273,972;
9,273,976; 9,274,132; 9,275,387; 9,275,417; 9,276,736;
9,276,737; 9,276,964; 9,277,092; 9,277,370; 9,277,378;
9,277,443; 9,277,481; 9,277,486; 9,277,492; 9,277,525;
9,278,655; 9,280,212; 9,280,294; 9,280,403; 9,280,435;
9,280,559; 9,280,605; 9,280,902; 9,280,919; 9,281,942;
9,281,970; 9,282,029; 9,282,110; 9,282,200; 9,282,201;
9,282,202; 9,283,862; 9,283,954; 9,284,015; 9,285,229;
9,285,382; 9,285,430; 9,285,966; 9,286,029; 9,286,244;
9,286,266; 9,286,471; 9,286,736; 9,288,048; 9,288,148;
9,288,173; 9,288,608; 9,290,074; 9,290,146; 9,290,153;
9,290,227; 9,290,229; 9,291,466; 9,292,014; 9,292,133;
9,292,602; 9,292,909; 9,292,952; 9,292,978; 9,292,979;
9,292,996; 9,293,039; 9,293,042; 9,294,635; 9,296,273;
9,296,299; 9,296,338; 9,297,662; 9,298,803; 9,299,066;
9,299,250; 9,300,699; 9,300,719; 9,300,817; 9,301,242;
9,301,310; 9,305,317; 9,305,411; 9,305,867; 9,306,891;
9,307,351; 9,307,407; 9,307,448; 9,307,493; 9,310,216;
9,311,586; 9,311,670; 9,311,805; 9,312,929; 9,312,968;
9,313,106; 9,313,316; 9,313,629; 9,313,661; 9,315,109;
9,315,151; 9,317,351; 9,317,566; 9,317,574; 9,317,855;
9,317,972; 9,317,983; 9,319,140; 9,319,212; 9,319,361;
9,319,362; 9,319,523; 9,319,836; 9,321,467; 9,322,658;
9,323,232; 9,323,246; 9,323,342; 9,323,429; 9,323,601;
9,323,781; 9,324,089; 9,324,096; 9,324,198; 9,324,234;
9,325,525; 9,325,560; 9,325,662; 9,325,805; 9,325,847;
9,325,849; 9,326,091; 9,326,096; 9,326,101; 9,326,133;
9,326,134; 9,326,149; 9,326,189; 9,326,266; 9,328,674;
9,329,049; 9,329,675; 9,329,815; 9,330,465; 9,330,567;
9,332,137; 9,332,261; 9,332,363; 9,332,396; 9,332,397;
9,332,551; 9,333,424; 9,335,180; 9,335,760; 9,336,235;
9,336,333; 9,336,403; 9,338,026; 9,338,112; 9,338,125;
9,338,170; 9,338,190; 9,338,289; 9,338,479; 9,338,515;
9,338,527; 9,338,727; 9,338,731; 9,339,209; 9,339,714;
9,340,251; 9,341,483; 9,341,490; 9,342,228; 9,342,499;
9,342,888; 9,342,927; 9,342,965; 9,342,975; 9,342,976;
9,343,057; 9,344,211; 9,344,219; 9,344,233; 9,344,515;
9,344,576; 9,344,856; 9,344,883; 9,345,059; 9,346,514;
9,347,779; 9,348,577; 9,349,016; 9,349,215; 9,349,234;
9,349,280; 9,349,410; 9,349,487; 9,350,005; 9,350,547;
9,350,617; 9,350,635; 9,350,645; 9,350,649; 9,350,683;
9,350,690; 9,350,808; 9,350,861; 9,350,909; 9,351,060;
9,351,106; 9,351,113; 9,351,124; 9,351,174; 9,351,193;
9,351,242; 9,351,246; 9,351,299; 9,351,301; 9,351,353;
9,351,640; 9,352,650; 9,353,965; 9,354,069; 9,354,339;
9,354,709; 9,355,064; 9,355,157; 9,355,410; 9,355,416;
9,355,423; 9,355,504; 9,355,506; 9,355,530; 9,356,234;
9,356,666; 9,356,727; 9,356,731; 9,356,819; 9,356,858;
9,356,875; 9,356,898; 9,356,899; 9,356,905; 9,356,953;
9,356,983; 9,357,047; 9,357,048; 9,357,345; 9,357,384;
9,357,475; 9,357,573; 9,357,933; 9,358,551; 9,359,018;
9,359,036; 9,360,323; 9,360,990; 9,361,358; 9,361,387;
9,361,465; 9,361,478; 9,361,481; 9,361,522; 9,361,603;
9,361,605; 9,361,650; 9,361,778; 9,363,016; 9,363,166;
9,363,250; 9,363,383; 9,363,626; 9,363,636; 9,363,638;
9,363,643; 9,363,646; 9,363,651; 9,363,679; 9,363,861;
9,364,158; 9,365,212; 9,366,542; 9,366,704; 9,367,512;
9,367,521; 9,367,632; 9,367,800; 9,367,803; 9,367,860;
9,367,968; 9,368,022; 9,368,029; 9,368,180; 9,368,356;
9,369,182; 9,369,215; 9,369,328; 9,369,341; 9,369,351;
9,369,382; 9,369,415; 9,369,419; 9,369,572; 9,369,758;
9,369,884; 9,369,888; 9,369,901; 9,369,919; 9,369,959;
9,369,995; 9,370,125; 9,371,099; 9,372,074; 9,372,092;
9,372,123; 9,372,213; 9,372,477; 9,372,934; 9,372,999;
9,373,102; 9,373,116; 9,373,201; 9,373,207; 9,373,251;
9,373,258; 9,373,345; 9,373,394; 9,373,625; 9,374,151;
9,374,177; 9,374,242; 9,374,280; 9,374,281; 9,374,330;
9,374,355; 9,374,661; 9,374,670; 9,374,677; 9,374,706;
9,374,709; 9,374,772; 9,374,799; 9,374,870; 9,375,145;
9,375,847; 9,376,123; 9,377,314; 9,377,319; 9,377,955;
9,378,223; 9,378,359; 9,378,485; 9,378,507; 9,378,601;
9,378,602; 9,378,819; 9,379,666; 9,380,008; 9,380,106;
9,380,119; 9,380,120; 9,380,160; 9,380,423; 9,380,491;
9,380,531; 9,380,586; 9,380,738; 9,380,741; 9,380,949;
9,380,952; 9,383,206; 9,383,214; 9,383,895; 9,384,075;
9,384,111; 9,384,500; 9,384,511; 9,384,609; 9,384,828;
9,385,311; 9,385,312; 9,385,783; 9,385,911; 9,385,933;
9,386,046; 9,386,150; 9,386,164; 9,386,405; 9,386,465;
9,386,522; 9,386,553; 9,386,578; 9,386,590; 9,387,861;
9,387,940; 9,389,094; 9,389,095; 9,389,260; 9,389,611;
9,389,893; 9,390,103; 9,390,229; 9,390,240; 9,390,397;
9,390,402; 9,390,418; 9,390,436; 9,390,451; 9,390,501;
9,390,608; 9,390,620; 9,390,628; 9,391,273; 9,391,745;
9,391,784; 9,391,789; 9,391,878; 9,391,968; 9,391,986;
9,392,099; 9,392,123; 9,392,452; 9,392,459; 9,392,508;
9,392,669; 9,392,941; 9,393,491; 9,393,500; 9,393,879;
9,393,920; 9,395,196; 9,395,880; 9,396,051; 9,396,344;
9,396,385; 9,396,541; 9,396,655; 9,396,867; 9,397,522;
9,397,724; 9,397,795; 9,397,936; 9,398,035; 9,398,066;
9,398,116; 9,398,171; 9,398,213; 9,398,420; 9,398,437;
9,398,467; 9,398,576; 9,399,430; 9,400,591; 9,400,659;
9,400,890; 9,401,056; 9,401,057; 9,401,087; 9,401,088;
9,401,100; 9,401,178; 9,401,191; 9,401,204; 9,401,205;
9,401,610; 9,401,783; 9,401,812; 9,401,822; 9,401,845;
9,401,850; 9,401,863; 9,401,923; 9,401,970; 9,401,977;
9,401,987; 9,402,158; 9,402,159; 9,402,216; 9,402,242;
9,402,245; 9,403,482; 9,403,521; 9,403,539; 9,404,759;
9,405,597; 9,405,772; 9,405,892; 9,406,086; 9,406,168;
9,406,176; 9,406,231; 9,406,336; 9,406,380; 9,407,367;
9,407,542; 9,407,603; 9,407,646; 9,407,706; 9,407,709;
9,407,878; 9,407,942; 9,408,028; 9,408,032; 9,408,036;
9,408,043; 9,408,048; 9,408,176; 9,408,477; 9,409,074;
9,410,813; 9,410,823; 9,410,833; 9,411,451; 9,411,734;
9,411,740; 9,411,893; 9,411,916; 9,411,955; 9,411,967;
9,412,248; 9,412,270; 9,412,273; 9,412,282; 9,412,361;
9,412,387; 9,412,430; 9,412,444; 9,412,621; 9,412,997;
9,413,468; 9,413,615; 9,413,643; 9,413,715; 9,413,779;
9,413,884; 9,413,906; 9,414,198; 9,414,210; 9,414,239;
9,414,293; 9,414,780; 9,415,125; 9,416,987; 9,417,069;
9,417,078; 9,417,084; 9,417,331; 9,417,754; 9,417,834;
9,418,008; 9,418,040; 9,418,115; 9,418,339; 9,418,340;
9,418,393; 9,418,489; 9,418,491; 9,418,537; 9,418,705;
9,418,838; 9,419,458; 9,419,802; 9,419,810; 9,420,043;
9,420,107; 9,420,116; 9,420,121; 9,420,227; 9,420,402;
9,420,405; 9,420,410; 9,420,423; 9,420,431; 9,420,432;
9,420,453; 9,420,514; 9,420,592; 9,423,505; 9,423,914;
9,424,007; 9,424,291; 9,424,618; 9,424,672; 9,424,729;
9,424,861; 9,424,862; 9,425,618; 9,425,905; 9,425,954;
9,425,963; 9,426,020; 9,426,035; 9,426,040; 9,426,075;
9,426,110; 9,426,225; 9,426,229; 9,426,232; 9,426,239;

9,426,289; 9,426,616; 9,426,627; 9,426,716; 9,426,720; 9,426,772; 9,427,581; 9,428,186; 9,428,191; 9,428,192; 9,428,270; 9,429,431; 9,429,445; 9,429,657; 9,429,659; 9,429,661; 9,429,926; 9,429,944; 9,430,029; 9,430,043; 9,430,106; 9,430,207; 9,430,420; 9,430,463; 9,430,491; 9,430,732; 9,430,860; 9,430,936; 9,431,006; 9,431,028; 9,431,125; 9,432,152; 9,432,248; 9,432,271; 9,432,312; 9,432,450; 9,432,502; 9,432,713; 9,432,720; 9,432,806; 9,432,808; 9,432,828; 9,432,833; 9,432,855; 9,432,908; 9,432,912; 9,432,925; 9,433,020; 9,433,062; 9,434,359; 9,434,371; 9,434,372; 9,434,902; 9,435,104; 9,435,233; 9,435,238; 9,435,274; 9,435,288; 9,435,298; 9,435,310; 9,435,402; 9,435,406; 9,435,414; 9,435,652; 9,435,657; 9,436,181; 9,436,183; 9,436,220; 9,436,231; 9,436,568; 9,436,702; 9,436,917; 9,436,931; 9,436,948; 9,436,956; 9,437,033; 9,437,099; 9,437,103; 9,437,110; 9,437,113; 9,437,271; 9,437,289; 9,437,766; 9,437,890; 9,437,903; 9,438,581; 9,438,677; 9,438,684; 9,438,731; 9,438,949; 9,439,035; 9,439,038; 9,439,043; 9,439,126; 9,439,129; 9,439,232; 9,439,240; 9,439,530; 9,439,563; 9,439,567; 9,439,574; 9,439,584; 9,439,596; 9,439,995; 9,440,146; 9,440,192; 9,440,352; 9,440,526; 9,440,545; 9,440,552; 9,440,555; 9,440,635; 9,440,638; 9,440,641; 9,440,654; 9,440,657; 9,440,660; 9,440,688; 9,440,689; 9,441,511; 9,441,532; 9,441,533; 9,441,549; 9,441,560; 9,441,563; 9,441,570; 9,441,571; 9,441,580; 9,441,581; 9,441,588; 9,441,695; 9,441,708; 9,441,720; 9,441,725; 9,441,726; 9,441,847; 9,441,971; 9,441,979; 9,441,982; 9,441,983; 9,441,987; 9,441,999; 9,442,100; 9,442,290; 9,442,496; 9,442,526; 9,442,548; 9,442,564; 9,442,626; 9,442,647; 9,442,888; 9,442,905; 9,442,906; 9,442,963; 9,443,019; 9,443,024; 9,443,036; 9,443,046; 9,443,090; 9,443,097; 9,443,152; 9,443,192; 9,443,199; 9,443,202; 9,443,204; 9,443,243; 9,443,248; 9,443,253; 9,443,255; 9,443,270; 9,443,272; 9,443,298; 9,443,309; 9,443,326; 9,443,358; 9,443,370; 9,443,383; 9,443,406; 9,443,407; 9,443,409; 9,443,413; 9,443,417; 9,443,425; 9,443,429; 9,443,430; 9,443,433; 9,443,508; 9,443,521; 9,443,581; 9,443,908; 9,443,909; 9,443,911; 9,444,252; 9,444,422; 9,444,520; 9,444,547; 9,444,565; 9,444,692; 9,444,711; 9,444,719; 9,444,727; 9,444,752; 9,444,798; 9,444,805; 9,444,811; 9,444,826; 9,444,856; 9,444,859; 9,444,866; 9,444,881; 9,444,892; 9,444,902; 9,444,916; 9,444,924; 9,445,081; 9,445,138; 9,445,209; 9,445,214; 9,445,220; 9,445,227; 9,445,231; 9,445,232; 9,445,234; 9,445,238; 9,445,239; 9,445,241; 9,445,248; 9,445,251; 9,445,270; 9,445,288; 9,445,339; 9,445,341; 9,445,353; 9,445,360; 9,445,368; 9,445,445; 9,445,447; 9,445,451; 9,445,524; RE40,073; RE40,479; RE45,757; RE45,975; 20010023576; 20010026549; 20010037316; 20010038674; 20020006807; 20020018724; 20020032510; 20020039381; 20020049535; 20020052677; 20020054578; 20020059075; 20020063001; 20020063002; 20020064707; 20020065165; 20020065589; 20020065698; 20020073243; 20020087478; 20020095859; 20020105228; 20020105968; 20020107873; 20020110146; 20020120490; 20020122055; 20020122196; 20020124007; 20020127978; 20020141438; 20020144038; 20020146015; 20020178130; 20020181633; 20020184062; 20020186144; 20020188892; 20020198632; 20020199156; 20030001779; 20030002047; 20030004778; 20030014521; 20030016770; 20030018794; 20030043073; 20030053105; 20030055666; 20030063004; 20030065432; 20030073406; 20030086515; 20030086539; 20030088644; 20030093187; 20030098804; 20030105567; 20030109245; 20030112456; 20030125849; 20030133423; 20030137426; 20030141990; 20030143554; 20030150215; 20030154418; 20030156733; 20030158771; 20030167178; 20030182183; 20030183467; 20030191568; 20030204747; 20030209893; 20030221118; 20030227382; 20030228005; 20030229528; 20030230443; 20030231163; 20030231208; 20030233302; 20030236072; 20040010349; 20040015073; 20040022175; 20040022232; 20040028222; 20040031256; 20040034455; 20040051783; 20040054821; 20040054953; 20040055282; 20040057432; 20040059477; 20040064064; 20040078141; 20040081079; 20040081193; 20040088448; 20040090962; 20040096059; 20040111195; 20040112654; 20040124255; 20040126782; 20040129478; 20040130442; 20040132629; 20040133907; 20040142722; 20040148169; 20040148284; 20040153362; 20040153537; 20040153859; 20040162482; 20040184584; 20040184928; 20040184929; 20040184930; 20040184931; 20040186714; 20040186819; 20040193304; 20040198386; 20040203730; 20040209653; 20040210437; 20040218548; 20040218582; 20040219909; 20040228325; 20040236706; 20040249637; 20040250539; 20040254904; 20040258163; 20040260585; 20040266457; 20050002417; 20050002578; 20050002579; 20050005167; 20050012721; 20050017488; 20050017966; 20050022210; 20050046584; 20050055193; 20050059046; 20050060069; 20050060070; 20050065678; 20050065711; 20050065779; 20050068918; 20050069083; 20050071778; 20050071882; 20050075119; 20050080519; 20050080520; 20050083965; 20050085928; 20050126182; 20050131607; 20050134115; 20050134440; 20050134503; 20050136902; 20050137735; 20050137763; 20050137786; 20050140696; 20050141565; 20050141752; 20050143097; 20050143916; 20050144648; 20050147057; 20050150230; 20050151517; 20050152318; 20050162514; 20050165886; 20050168573; 20050171660; 20050175079; 20050186933; 20050187677; 20050188349; 20050188350; 20050192186; 20050192727; 20050198958; 20050203683; 20050209746; 20050215239; 20050216151; 20050216331; 20050227674; 20050237296; 20050246190; 20050251604; 20050253397; 20050254460; 20050261062; 20050263254; 20050264404; 20050273218; 20050278055; 20050278076; 20050278098; 20050280555; 20050285445; 20050286436; 20050286466; 20050286486; 20050286781; 20060017582; 20060025897; 20060026017; 20060041370; 20060041845; 20060044146; 20060047379; 20060047419; 20060050018; 20060052922; 20060055564; 20060061795; 20060062363; 20060064232; 20060066480; 20060066481; 20060066482; 20060066483; 20060069529; 20060069530; 20060069531; 20060074557; 20060079752; 20060080013; 20060080442; 20060081086; 20060083403; 20060089236; 20060092033; 20060092043; 20060095199; 20060095756; 20060097855; 20060099944; 20060102075; 20060107090; 20060118088; 20060122746; 20060123053; 20060129975; 20060132297; 20060138225; 20060143454; 20060144997; 20060148414; 20060161269; 20060161320; 20060164230; 20060167595; 20060167784; 20060171410; 20060173268; 20060180371; 20060182034; 20060184295; 20060184445; 20060184657; 20060185434; 20060191995; 20060194566; 20060199167; 20060200008; 20060200259; 20060206246; 20060208169; 20060211446; 20060212193; 20060212194; 20060212300; 20060217864; 20060220842; 20060224151; 20060229090; 20060235579; 20060243043; 20060244581; 20060244720; 20060250967; 20060253539; 20060253763; 20060259259; 20060259274; 20060259866; 20060265117; 20060268007; 20060271246; 20060276201; 20060284839; 20060287783; 20060287915; 20060293850; 20060293954; 20060293955; 20070001869; 20070001876; 20070002077; 20070005202; 20070005609; 20070006101; 20070008186; 20070015119; 20070021915; 20070022072; 20070030116; 20070032220; 20070032246; 20070032250; 20070032266; 20070032832; 20070038137; 20070057781; 20070069947; 20070075919; 20070076312; 20070079012; 20070079383; 20070083329; 20070083491; 20070085697;

20070086482; 20070086624; 20070087733; 20070087756; 20070091983; 20070092103; 20070093947; 20070094366; 20070096565; 20070098496; 20070103835; 20070106559; 20070107034; 20070108267; 20070109111; 20070112729; 20070118364; 20070118372; 20070118373; 20070118374; 20070118378; 20070118430; 20070119859; 20070120996; 20070121712; 20070124451; 20070126561; 20070126631; 20070126632; 20070126696; 20070127688; 20070130547; 20070130952; 20070139216; 20070149184; 20070152107; 20070152804; 20070155360; 20070156312; 20070156320; 20070168486; 20070168578; 20070169723; 20070171029; 20070173986; 20070173992; 20070174633; 20070179706; 20070179798; 20070179799; 20070179800; 20070185768; 20070191995; 20070192221; 20070200758; 20070200847; 20070202890; 20070205881; 20070209608; 20070211022; 20070211023; 20070211031; 20070214462; 20070220437; 20070227344; 20070238427; 20070238520; 20070244838; 20070247282; 20070252734; 20070258642; 20070261072; 20070261103; 20070262574; 20070263506; 20070265018; 20070265733; 20070271014; 20070272216; 20070282506; 20070287473; 20070294199; 20070294636; 20070298765; 20070299587; 20080015131; 20080015771; 20080015976; 20080019187; 20080021605; 20080021964; 20080025204; 20080027604; 20080027605; 20080027606; 20080028474; 20080030345; 20080032622; 20080036580; 20080039983; 20080039995; 20080040004; 20080040005; 20080040023; 20080040029; 20080040223; 20080040258; 20080040287; 20080042410; 20080042815; 20080043868; 20080046149; 20080046150; 20080047329; 20080049906; 20080049907; 20080049908; 20080051955; 20080051957; 20080052070; 20080052071; 20080052413; 20080053240; 20080057886; 20080061959; 20080062856; 20080063155; 20080064413; 20080065290; 20080071534; 20080071882; 20080085040; 20080086240; 20080088441; 20080088462; 20080089338; 20080089402; 20080094212; 20080095300; 20080097845; 20080098175; 20080098275; 20080100140; 20080100572; 20080100706; 20080101460; 20080103655; 20080106436; 20080108372; 20080109221; 20080109470; 20080111666; 20080114502; 20080119966; 20080125958; 20080126149; 20080129475; 20080133126; 20080133136; 20080133219; 20080133231; 20080133232; 20080137589; 20080140278; 20080140318; 20080143595; 20080144519; 20080144944; 20080147245; 20080147253; 20080147263; 20080147265; 20080147266; 20080147267; 20080147271; 20080147410; 20080147571; 20080147686; 20080150786; 20080152128; 20080154452; 20080154459; 20080154495; 20080154629; 20080155478; 20080156406; 20080156569; 20080157940; 20080158096; 20080159416; 20080159560; 20080161986; 20080161987; 20080161988; 20080161989; 20080162036; 20080162132; 20080162860; 20080165018; 20080167123; 20080167819; 20080167821; 20080174423; 20080177436; 20080178292; 20080180654; 20080181151; 20080186164; 20080188240; 20080194273; 20080195942; 20080200209; 20080205535; 20080212272; 20080215202; 20080215231; 20080215891; 20080216567; 20080218427; 20080222496; 20080228346; 20080228908; 20080229194; 20080235515; 20080236275; 20080240070; 20080243611; 20080243783; 20080243821; 20080244216; 20080250869; 20080252485; 20080252495; 20080253275; 20080253353; 20080255784; 20080257066; 20080257067; 20080262646; 20080266323; 20080266389; 20080269958; 20080270074; 20080270076; 20080272906; 20080272923; 20080276107; 20080276271; 20080278314; 20080281585; 20080282817; 20080284575; 20080288129; 20080288215; 20080288878; 20080301452; 20080301767; 20080303693; 20080308249; 20080318622; 20090012675; 20090015400; 20090016216; 20090019341; 20090021486; 20090023446; 20090024636; 20090027056; 20090027223; 20090027229; 20090029670; 20090029671; 20090030605; 20090030652; 20090033540; 20090034630; 20090034631; 20090034656; 20090036090; 20090037047; 20090037097; 20090040029; 20090042592; 20090043407; 20090043415; 20090043441; 20090043506; 20090043653; 20090044073; 20090045910; 20090046538; 20090048750; 20090051566; 20090055190; 20090055824; 20090055843; 20090058593; 20090061852; 20090063045; 20090063154; 20090063226; 20090064155; 20090066667; 20090067336; 20090071421; 20090076803; 20090088187; 20090088990; 20090092114; 20090092284; 20090093236; 20090094527; 20090094555; 20090098852; 20090099708; 20090099886; 20090102401; 20090102638; 20090105041; 20090106036; 20090109037; 20090109795; 20090110235; 20090119538; 20090119657; 20090122812; 20090125180; 20090132153; 20090138715; 20090139781; 20090140887; 20090141991; 20090143923; 20090143953; 20090144127; 20090150023; 20090153468; 20090154992; 20090163194; 20090164053; 20090164216; 20090164551; 20090167524; 20090168849; 20090170434; 20090170537; 20090170539; 20090171684; 20090172102; 20090177351; 20090178022; 20090187297; 20090190755; 20090192662; 20090193781; 20090194996; 20090198856; 20090200988; 20090216138; 20090219992; 20090222438; 20090228157; 20090232408; 20090235044; 20090240308; 20090240391; 20090240427; 20090243828; 20090245533; 20090247132; 20090247153; 20090247187; 20090248222; 20090248235; 20090248236; 20090248302; 20090249074; 20090258333; 20090261971; 20090262929; 20090267758; 20090270113; 20090271151; 20090281864; 20090283080; 20090284391; 20090287407; 20090292858; 20090299600; 20090299857; 20090301791; 20090303016; 20090303187; 20090306834; 20090306866; 20090307031; 20090310591; 20090312595; 20090312668; 20090313178; 20090314129; 20090319868; 20090322560; 20090323967; 20090324047; 20090325596; 20090325612; 20100004762; 20100004853; 20100010958; 20100014768; 20100015583; 20100017001; 20100017236; 20100022820; 20100029284; 20100030582; 20100030586; 20100033342; 20100033372; 20100038158; 20100041958; 20100042453; 20100042498; 20100042578; 20100049516; 20100052945; 20100054279; 20100060942; 20100060943; 20100063368; 20100063614; 20100067595; 20100069724; 20100070748; 20100073158; 20100076249; 20100076634; 20100076764; 20100076853; 20100080377; 20100081860; 20100081861; 20100082361; 20100082559; 20100082751; 20100088163; 20100094490; 20100094688; 20100094769; 20100094981; 20100099346; 20100100036; 20100100315; 20100100507; 20100101226; 20100105315; 20100106356; 20100114339; 20100114944; 20100115126; 20100122127; 20100124920; 20100124949; 20100125383; 20100125561; 20100130811; 20100131642; 20100132692; 20100140976; 20100141435; 20100141657; 20100142448; 20100142701; 20100150120; 20100151989; 20100152960; 20100153207; 20100159869; 20100161167; 20100164790; 20100165287; 20100167702; 20100167721; 20100167722; 20100167727; 20100167737; 20100167745; 20100169009; 20100171642; 20100174428; 20100176949; 20100179849; 20100182438; 20100185615; 20100190493; 20100191403; 20100191801; 20100192042; 20100195634; 20100198435; 20100201891; 20100202616; 20100202652; 20100205450; 20100207754; 20100208852; 20100211346; 20100211724; 20100214056; 20100214090; 20100214411; 20100217535; 20100220514; 20100220708; 20100225450; 20100225493; 20100226527; 20100228434; 20100229002; 20100231527; 20100234071; 20100235285; 20100246287; 20100246289; 20100253618; 20100256835; 20100256836; 20100256852; 20100256859; 20100256903; 20100260102; 20100261465; 20100262321; 20100262408; 20100268423; 20100268619;

20100268958; 20100274397; 20100274816; 20100277308; 20100278413; 20100279768; 20100280751; 20100281011; 20100281321; 20100282851; 20100282856; 20100283626; 20100286830; 20100289627; 20100299020; 20100299200; 20100302145; 20100305779; 20100309042; 20100312547; 20100313740; 20100316163; 20100317420; 20100323626; 20100324955; 20100332113; 20100332363; 20100332715; 20110001638; 20110002371; 20110002410; 20110002411; 20110003606; 20110003607; 20110003608; 20110004487; 20110004513; 20110010079; 20110010349; 20110012720; 20110015797; 20110016063; 20110016199; 20110016514; 20110018498; 20110018998; 20110022423; 20110026850; 20110029455; 20110029644; 20110034176; 20110035461; 20110038307; 20110039527; 20110039528; 20110039533; 20110039537; 20110039538; 20110039556; 20110039559; 20110039586; 20110039587; 20110040552; 20110044193; 20110046870; 20110050575; 20110051948; 20110052001; 20110054767; 20110055092; 20110055172; 20110058109; 20110060480; 20110065416; 20110066902; 20110071952; 20110075611; 20110075709; 20110076653; 20110081922; 20110082621; 20110083128; 20110083647; 20110088674; 20110092251; 20110095904; 20110095914; 20110095940; 20110098016; 20110098029; 20110098056; 20110105098; 20110106374; 20110112690; 20110112761; 20110113107; 20110118934; 20110119523; 20110122797; 20110125500; 20110125855; 20110128118; 20110128163; 20110130892; 20110130893; 20110131074; 20110131235; 20110131241; 20110131269; 20110137489; 20110137691; 20110137825; 20110137895; 20110140871; 20110141925; 20110143811; 20110144839; 20110144911; 20110144963; 20110144987; 20110145042; 20110145089; 20110145507; 20110149341; 20110151898; 20110153148; 20110153175; 20110153178; 20110153367; 20110154411; 20110158492; 20110161138; 20110161380; 20110166733; 20110166739; 20110172910; 20110172911; 20110176428; 20110176606; 20110179106; 20110191465; 20110196552; 20110196644; 20110196805; 20110199389; 20110201302; 20110202270; 20110205246; 20110206112; 20110207463; 20110208551; 20110208567; 20110208667; 20110209544; 20110212305; 20110212713; 20110212717; 20110217957; 20110225259; 20110225416; 20110246246; 20110249714; 20110250933; 20110257882; 20110258310; 20110265127; 20110267222; 20110270486; 20110270488; 20110270723; 20110270724; 20110272677; 20110273568; 20110276565; 20110277000; 20110281562; 20110282526; 20110282527; 20110282631; 20110282663; 20110282668; 20110282700; 20110285633; 20110288700; 20110288721; 20110288737; 20110288867; 20110291823; 20110293042; 20110294466; 20110295577; 20110297070; 20110297333; 20110301839; 20110302214; 20110306329; 20110307283; 20110314210; 20110316679; 20120008509; 20120016551; 20120022764; 20120023522; 20120027028; 20120028597; 20120028599; 20120028607; 20120028617; 20120028635; 20120028656; 20120028680; 20120028681; 20120029763; 20120029801; 20120029945; 20120030470; 20120030541; 20120030706; 20120036038; 20120036400; 20120046036; 20120046044; 20120046110; 20120049793; 20120050067; 20120053759; 20120053784; 20120054036; 20120058775; 20120058826; 20120065831; 20120069131; 20120072266; 20120072317; 20120072322; 20120072341; 20120072533; 20120072922; 20120078063; 20120078440; 20120078754; 20120079149; 20120083969; 20120084103; 20120087430; 20120089299; 20120089329; 20120093078; 20120094657; 20120095920; 20120100873; 20120101671; 20120101911; 20120105637; 20120106350; 20120106446; 20120106447; 20120106448; 20120106469; 20120106526; 20120106537; 20120106544; 20120106549; 20120106550; 20120106551; 20120106565; 20120106653; 20120109406; 20120109407; 20120109446; 20120109447; 20120109649; 20120109831; 20120110356; 20120116556; 20120116766; 20120120296; 20120121033; 20120123629; 20120123631; 20120123670; 20120127206; 20120127922; 20120127976; 20120128034; 20120137333; 20120140080; 20120140757; 20120142367; 20120142397; 20120143397; 20120144272; 20120146766; 20120146810; 20120147863; 20120149356; 20120150541; 20120151402; 20120155547; 20120157083; 20120158436; 20120165101; 20120167585; 20120172088; 20120173234; 20120173900; 20120173905; 20120178478; 20120179325; 20120179365; 20120181973; 20120181982; 20120187916; 20120190386; 20120191293; 20120191495; 20120192241; 20120197449; 20120197486; 20120197637; 20120197643; 20120198220; 20120202530; 20120203434; 20120203557; 20120206345; 20120209117; 20120209505; 20120209609; 20120209634; 20120209756; 20120214323; 20120215446; 20120216626; 20120217091; 20120219039; 20120220258; 20120221188; 20120221217; 20120221548; 20120223829; 20120223830; 20120224617; 20120224827; 20120226421; 20120226889; 20120226963; 20120227041; 20120229377; 20120229381; 20120231821; 20120232679; 20120235624; 20120235807; 20120236152; 20120239251; 20120239462; 20120243438; 20120244847; 20120244850; 20120245934; 20120246177; 20120246733; 20120246735; 20120250607; 20120252364; 20120252400; 20120252475; 20120253548; 20120253550; 20120253587; 20120253632; 20120253822; 20120253861; 20120253862; 20120253867; 20120253888; 20120253889; 20120253892; 20120254876; 20120257697; 20120258776; 20120259527; 20120259732; 20120259951; 20120262283; 20120264376; 20120268359; 20120271503; 20120274555; 20120274745; 20120281181; 20120281741; 20120282933; 20120283954; 20120284376; 20120284399; 20120284404; 20120286725; 20120289166; 20120289187; 20120289258; 20120290449; 20120290692; 20120290900; 20120296517; 20120296567; 20120296579; 20120302254; 20120302265; 20120303548; 20120304126; 20120313910; 20120314570; 20120315994; 20120318590; 20120320033; 20120320825; 20120323474; 20120323499; 20120323577; 20120324366; 20120324578; 20120324727; 20120327918; 20120329482; 20130002443; 20130005251; 20130006674; 20130006675; 20130006769; 20130012179; 20130013347; 20130013348; 20130016209; 20130018836; 20130024060; 20130027404; 20130027552; 20130030552; 20130030873; 20130030876; 20130032634; 20130033381; 20130034130; 20130035901; 20130040076; 20130040636; 20130044137; 20130046418; 20130046419; 20130046432; 20130046439; 20130046446; 20130046510; 20130046559; 20130054016; 20130054024; 20130054050; 20130054078; 20130054363; 20130055347; 20130060583; 20130062966; 20130063094; 20130064313; 20130069803; 20130076649; 20130079959; 20130080172; 20130080173; 20130085638; 20130090782; 20130092800; 20130094298; 20130096799; 20130096815; 20130097084; 20130097197; 20130097414; 20130097459; 20130103195; 20130103238; 20130109416; 20130110329; 20130111345; 20130111415; 20130111513; 20130118000; 20130130639; 20130130665; 20130130675; 20130131975; 20130132286; 20130132854; 20130134730; 20130136412; 20130138714; 20130141247; 20130143495; 20130143546; 20130143601; 20130144462; 20130144463; 20130144474; 20130145065; 20130145279; 20130145297; 20130145360; 20130145401; 20130145482; 20130148748; 20130148753; 20130149985; 20130149998; 20130151031; 20130151034; 20130151046; 20130151065; 20130151088; 20130151288; 20130152003; 20130154298; 20130154817; 20130154982; 20130157870; 20130158778; 20130158821; 20130159805; 20130163511; 20130164712; 20130164713; 20130164714; 20130164715; 20130166097; 20130166170;

20130167159; 20130169226; 20130173284; 20130173285; 20130173293; 20130173294; 20130173295; 20130173296; 20130173297; 20130173298; 20130173299; 20130173300; 20130173301; 20130173302; 20130173303; 20130173304; 20130173305; 20130173393; 20130179007; 20130179188; 20130179198; 20130181931; 20130182863; 20130184886; 20130184964; 20130184965; 20130188463; 20130191018; 20130191644; 20130194126; 20130195264; 20130197730; 20130197776; 20130197875; 20130198245; 20130198737; 20130198802; 20130200991; 20130201316; 20130203400; 20130204466; 20130204484; 20130204493; 20130204524; 20130204943; 20130205026; 20130205174; 20130205412; 20130207817; 20130208729; 20130211828; 20130211832; 20130211976; 20130213344; 20130215235; 20130217409; 20130218379; 20130218412; 20130218446; 20130219039; 20130219872; 20130225201; 20130226369; 20130226543; 20130227648; 20130229141; 20130231052; 20130231800; 20130232289; 20130235203; 20130238424; 20130238443; 20130238700; 20130239845; 20130240678; 20130241026; 20130244210; 20130245837; 20130245852; 20130245863; 20130245864; 20130245880; 20130245945; 20130246183; 20130250933; 20130253325; 20130253782; 20130254035; 20130255560; 20130257718; 20130257904; 20130260722; 20130261846; 20130261874; 20130261907; 20130261939; 20130261942; 20130261953; 20130261966; 20130262111; 20130262349; 20130267046; 20130267253; 20130268950; 20130271273; 20130271275; 20130273901; 20130273968; 20130273980; 20130275209; 20130275226; 20130275227; 20130275368; 20130275569; 20130275761; 20130278440; 20130278441; 20130278442; 20130278443; 20130279500; 20130279695; 20130281023; 20130281045; 20130281133; 20130281140; 20130281141; 20130281324; 20130282238; 20130282267; 20130282271; 20130282277; 20130282357; 20130282482; 20130282491; 20130282925; 20130282946; 20130283345; 20130285855; 20130285903; 20130287193; 20130287201; 20130288659; 20130289820; 20130289821; 20130289874; 20130290106; 20130290199; 20130293367; 20130293394; 20130293471; 20130295888; 20130295889; 20130297078; 20130297162; 20130297175; 20130297199; 20130297207; 20130297250; 20130297404; 20130301584; 20130303138; 20130303197; 20130304347; 20130304348; 20130304349; 20130304475; 20130304519; 20130304581; 20130304616; 20130305087; 20130308495; 20130308907; 20130310010; 20130311002; 20130311297; 20130316703; 20130316743; 20130317694; 20130317732; 20130318022; 20130318380; 20130318529; 20130324242; 20130325249; 20130325323; 20130325442; 20130325610; 20130329139; 20130329634; 20130332024; 20130332070; 20130335449; 20130336235; 20130337762; 20130337782; 20130337801; 20130337830; 20130338971; 20130338972; 20130339098; 20130339266; 20130339387; 20130339981; 20130340444; 20130342020; 20130342368; 20130342460; 20130344859; 20140005484; 20140005485; 20140005486; 20140005487; 20140005488; 20140005489; 20140005555; 20140006129; 20140006347; 20140006555; 20140006772; 20140007006; 20140007048; 20140007182; 20140007183; 20140007192; 20140007193; 20140007214; 20140007222; 20140012431; 20140012664; 20140012665; 20140015690; 20140015977; 20140016499; 20140018034; 20140019135; 20140019170; 20140019522; 20140022954; 20140023026; 20140025312; 20140025494; 20140025502; 20140025503; 20140026020; 20140028023; 20140028783; 20140031005; 20140031010; 20140031033; 20140031082; 20140031989; 20140031991; 20140031992; 20140032062; 20140032130; 20140032800; 20140036922; 20140038836; 20140039812; 20140040134; 20140040343; 20140043204; 20140045482; 20140046585; 20140046701; 20140046761; 20140047011; 20140047448; 20140050148; 20140050701; 20140052316; 20140052353; 20140052384; 20140052496; 20140053090; 20140053804; 20140055358; 20140058266; 20140058570; 20140058800; 20140058666; 20140059468; 20140064288; 20140067152; 20140067225; 20140067313; 20140069899; 20140070943; 20140071167; 20140071995; 20140072111; 20140074468; 20140075198; 20140078991; 20140079160; 20140079297; 20140080428; 20140080457; 20140081483; 20140081493; 20140081517; 20140081793; 20140081813; 20140088871; 20140089089; 20140089241; 20140089286; 20140091950; 20140092424; 20140092438; 20140094976; 20140095170; 20140095234; 20140095263; 20140095264; 20140095335; 20140095342; 20140095551; 20140095586; 20140095587; 20140095588; 20140095632; 20140095645; 20140095939; 20140095971; 20140096009; 20140096010; 20140096011; 20140096012; 20140096013; 20140096015; 20140096016; 20140096017; 20140096018; 20140096019; 20140096020; 20140096021; 20140096022; 20140096026; 20140096029; 20140096037; 20140096038; 20140096039; 20140096040; 20140096041; 20140098671; 20140098685; 20140101611; 20140107923; 20140108786; 20140109080; 20140111380; 20140112527; 20140113548; 20140114532; 20140114554; 20140114555; 20140114562; 20140114696; 20140114718; 20140114829; 20140114844; 20140114849; 20140114850; 20140119535; 20140119575; 20140120867; 20140121873; 20140121959; 20140122243; 20140125584; 20140125598; 20140128072; 20140129038; 20140129160; 20140129332; 20140130756; 20140132210; 20140133392; 20140133639; 20140133767; 20140135048; 20140136019; 20140136927; 20140136992; 20140140233; 20140141744; 20140141812; 20140143171; 20140143839; 20140143889; 20140151456; 20140156087; 20140157086; 20140160359; 20140162219; 20140163768; 20140163963; 20140164113; 20140164124; 20140164125; 20140167697; 20140168262; 20140169503; 20140180498; 20140180557; 20140180723; 20140180727; 20140180825; 20140180884; 20140180885; 20140180886; 20140181100; 20140184430; 20140188379; 20140188533; 20140188753; 20140189430; 20140190248; 20140191574; 20140191842; 20140191886; 20140192181; 20140193047; 20140194149; 20140195044; 20140195045; 20140195046; 20140195047; 20140195071; 20140195102; 20140195153; 20140195197; 20140195272; 20140195663; 20140195808; 20140195921; 20140199965; 20140199989; 20140200718; 20140200740; 20140200742; 20140200756; 20140201064; 20140201126; 20140201671; 20140202800; 20140206392; 20140207338; 20140207619; 20140211803; 20140211842; 20140213238; 20140214212; 20140214311; 20140214526; 20140214527; 20140214762; 20140214763; 20140215491; 20140215513; 20140218187; 20140220945; 20140222241; 20140222610; 20140222976; 20140223112; 20140223208; 20140226589; 20140226879; 20140226887; 20140228043; 20140228223; 20140235209; 20140236434; 20140236718; 20140240088; 20140240170; 20140240289; 20140240349; 20140244125; 20140244148; 20140244156; 20140247892; 20140248852; 20140249696; 20140249697; 20140249712; 20140249714; 20140249927; 20140250228; 20140253172; 20140253375; 20140253883; 20140256304; 20140257867; 20140258469; 20140260190; 20140263628; 20140263629; 20140263861; 20140266594; 20140266635; 20140266793; 20140267074; 20140267741; 20140268229; 20140269441; 20140269442; 20140269443; 20140269466; 20140270158; 20140270172; 20140271114; 20140273924; 20140273937; 20140273939; 20140273940; 20140273947; 20140273955; 20140273998; 20140274016; 20140277757; 20140277831; 20140277862; 20140277878; 20140277887; 20140277917; 20140277971; 20140278038; 20140278071; 20140278075; 20140278081; 20140278086; 20140278096; 20140278101;

20140278555; 20140278573; 20140278599; 20140278607; 20140278608; 20140278623; 20140278847; 20140279019; 20140279326; 20140279535; 20140280961; 20140281953; 20140282470; 20140285660; 20140286731; 20140287723; 20140288713; 20140288812; 20140288831; 20140288884; 20140288915; 20140289020; 20140289249; 20140294013; 20140298237; 20140298906; 20140300583; 20140300584; 20140300922; 20140301376; 20140301666; 20140302774; 20140302895; 20140303944; 20140306799; 20140306814; 20140306817; 20140306826; 20140306833; 20140306834; 20140306835; 20140307265; 20140307655; 20140307724; 20140307770; 20140308902; 20140309789; 20140309790; 20140309804; 20140309805; 20140309806; 20140309813; 20140309814; 20140309815; 20140309838; 20140309839; 20140309847; 20140309849; 20140309852; 20140309853; 20140309862; 20140309863; 20140309864; 20140309865; 20140309866; 20140309867; 20140309868; 20140309869; 20140309870; 20140309871; 20140309872; 20140309873; 20140309874; 20140309875; 20140309876; 20140309877; 20140309878; 20140309879; 20140309880; 20140309885; 20140309886; 20140309891; 20140309892; 20140309893; 20140309913; 20140309919; 20140309920; 20140309921; 20140309922; 20140309923; 20140309927; 20140309929; 20140309930; 20140309934; 20140309935; 20140309982; 20140310031; 20140310075; 20140310103; 20140310186; 20140310243; 20140310277; 20140310359; 20140310379; 20140310594; 20140310610; 20140310702; 20140310739; 20140310788; 20140312839; 20140313208; 20140315527; 20140316764; 20140316903; 20140317112; 20140318293; 20140320315; 20140320421; 20140321363; 20140321453; 20140324510; 20140324572; 20140325030; 20140325113; 20140327778; 20140327981; 20140333664; 20140335487; 20140335818; 20140335822; 20140336834; 20140336868; 20140336918; 20140337253; 20140337338; 20140337765; 20140340242; 20140340348; 20140341475; 20140341852; 20140342659; 20140342711; 20140343819; 20140343831; 20140344065; 20140344124; 20140344393; 20140344460; 20140344718; 20140347482; 20140347491; 20140347978; 20140349256; 20140349257; 20140350776; 20140353300; 20140354686; 20140357295; 20140358291; 20140358294; 20140358361; 20140358362; 20140358749; 20140358896; 20140359477; 20140359552; 20140362195; 20140362807; 20140362954; 20140362992; 20140364096; 20140365228; 20140365517; 20140365518; 20140366644; 20140369237; 20140370839; 20140371891; 20140372454; 20140372532; 20140372880; 20140373639; 20140375428; 20140375447; 20140376827; 20140378055; 20140378170; 20140378171; 20140379169; 20140379182; 20140380106; 20140380132; 20140380240; 20140380296; 20140380408; 20140380442; 20140380505; 20150002281; 20150003238; 20150003267; 20150003396; 20150003400; 20150005911; 20150005984; 20150006035; 20150006375; 20150007155; 20150009863; 20150011194; 20150012152; 20150012647; 20150015363; 20150016777; 20150017997; 20150018622; 20150019068; 20150019266; 20150019329; 20150019550; 20150020152; 20150023196; 20150023256; 20150023949; 20150025727; 20150025748; 20150025917; 20150026047; 20150026312; 20150026376; 20150027681; 20150029094; 20150029405; 20150029541; 20150029838; 20150029941; 20150029987; 20150031331; 20150032264; 20150032291; 20150032303; 20150032424; 20150032671; 20150032860; 20150035665; 20150036485; 20150036679; 20150038123; 20150038125; 20150039214; 20150039389; 20150039398; 20150039666; 20150039827; 20150039936; 20150040134; 20150040175; 20150043012; 20150043420; 20150043445; 20150043594; 20150044964; 20150046023; 20150046062; 20150046147; 20150046263; 20150046306; 20150046554; 20150048641; 20150050527; 20150050907; 20150051787; 20150052987; 20150053304; 20150053779; 20150053780; 20150053781; 20150054647; 20150056945; 20150056951; 20150056984; 20150057028; 20150057838; 20150057926; 20150058191; 20150058233; 20150061603; 20150061895; 20150062168; 20150063213; 20150063329; 20150065168; 20150066287; 20150066861; 20150067536; 20150071115; 20150072668; 20150073639; 20150073647; 20150073649; 20150074013; 20150074732; 20150075167; 20150077054; 20150077056; 20150078247; 20150078393; 20150078538; 20150078539; 20150078543; 20150078741; 20150081158; 20150081462; 20150083869; 20150085095; 20150087224; 20150088618; 20150088779; 20150089083; 20150089084; 20150089236; 20150093981; 20150094035; 20150094876; 20150094968; 20150095156; 20150095219; 20150095238; 20150095336; 20150095841; 20150097798; 20150097860; 20150097861; 20150097863; 20150097864; 20150100179; 20150100195; 20150100197; 20150100238; 20150100621; 20150100633; 20150102568; 20150102569; 20150102570; 20150102571; 20150102572; 20150102593; 20150102914; 20150103662; 20150103994; 20150106204; 20150106526; 20150106668; 20150109120; 20150109145; 20150110078; 20150110080; 20150110081; 20150110180; 20150110258; 20150111288; 20150111570; 20150111591; 20150112504; 20150112543; 20150112545; 20150112730; 20150112731; 20150112800; 20150112871; 20150112884; 20150113006; 20150113638; 20150116078; 20150116079; 20150116100; 20150116275; 20150116276; 20150117387; 20150120082; 20150120331; 20150120402; 20150120476; 20150121071; 20150121287; 20150121457; 20150121460; 20150123619; 20150126203; 20150126873; 20150127321; 20150127376; 20150127390; 20150127431; 20150127527; 20150128013; 20150128123; 20150128284; 20150128285; 20150128287; 20150128597; 20150129581; 20150130767; 20150130811; 20150131489; 20150131794; 20150133108; 20150133113; 20150134430; 20150134513; 20150135028; 20150135067; 20150135101; 20150135328; 20150137993; 20150138097; 20150138977; 20150139042; 20150141035; 20150141043; 20150141759; 20150142255; 20150142257; 20150142262; 20150142264; 20150142418; 20150142428; 20150142526; 20150145955; 20150146000; 20150146886; 20150148963; 20150148964; 20150148965; 20150149084; 20150149219; 20150149256; 20150149336; 20150150046; 20150150124; 20150150493; 20150153910; 20150154709; 20150154712; 20150156525; 20150156556; 20150157947; 20150159895; 20150159899; 20150159900; 20150159901; 20150159902; 20150159903; 20150159904; 20150160019; 20150160633; 20150161122; 20150161149; 20150161415; 20150161587; 20150161828; 20150161890; 20150163121; 20150163631; 20150163819; 20150163832; 20150163945; 20150164437; 20150165905; 20150166073; 20150168174; 20150168175; 20150168365; 20150168821; 20150169406; 20150169867; 20150170072; 20150170289; 20150170290; 20150170427; 20150170440; 20150170653; 20150171368; 20150172236; 20150172306; 20150172919; 20150175067; 20150175161; 20150175397; 20150177007; 20150177010; 20150177521; 20150178578; 20150178661; 20150178700; 20150178723; 20150178990; 20150179004; 20150180701; 20150180763; 20150181029; 20150181032; 20150181417; 20150185031; 20150185218; 20150185825; 20150186094; 20150187019; 20150187137; 20150187138; 20150187357; 20150188949; 20150188961; 20150189559; 20150189671; 20150191150; 20150192421; 20150192423; 20150192495; 20150192500; 20150193007; 20150193729; 20150193857; 20150193858; 20150193861; 20150193924; 20150193987; 20150193994; 20150193996; 20150195146; 20150195186; 20150195290; 20150195408; 20150197247; 20150197248; 20150198450; 20150198451;

20150198459; 20150198946; 20150199855; 20150199965; 20150200782; 20150200811; 20150200957; 20150201297; 20150201361; 20150202962; 20150202976; 20150205367; 20150205482; 20150206356; 20150207809; 20150207885; 20150208140; 20150208457; 20150210168; 20150210217; 20150213065; 20150213432; 20150213433; 20150215459; 20150215954; 20150215986; 20150217291; 20150218872; 20150220150; 20150220597; 20150220995; 20150222553; 20150222708; 20150222759; 20150223043; 20150223151; 20150223273; 20150224845; 20150225188; 20150226135; 20150227227; 20150227890; 20150228077; 20150229604; 20150230048; 20150231491; 20150231982; 20150231985; 20150231986; 20150232065; 20150232083; 20150234477; 20150234767; 20150235088; 20150235370; 20150235441; 20150235447; 20150236927; 20150237128; 20150237537; 20150237552; 20150237661; 20150238073; 20150238857; 20150239398; 20150239478; 20150241225; 20150241230; 20150241231; 20150241295; 20150241705; 20150241959; 20150242113; 20150242258; 20150242575; 20150242816; 20150242943; 20150243100; 20150243105; 20150243106; 20150244656; 20150244805; 20150244806; 20150244826; 20150244877; 20150245215; 20150247723; 20150247975; 20150247976; 20150248169; 20150248170; 20150248286; 20150248287; 20150248737; 20150248787; 20150248788; 20150248789; 20150248791; 20150248792; 20150248793; 20150248795; 20150248881; 20150249685; 20150249744; 20150250385; 20150250396; 20150251074; 20150252757; 20150254357; 20150254570; 20150254592; 20150254719; 20150254781; 20150255063; 20150256377; 20150256444; 20150256467; 20150256617; 20150257080; 20150259020; 20150260527; 20150260529; 20150261554; 20150261691; 20150261812; 20150261813; 20150261828; 20150261856; 20150261866; 20150262238; 20150262433; 20150262483; 20150262484; 20150263856; 20150264089; 20150264130; 20150264427; 20150264480; 20150264549; 20150264554; 20150268054; 20150268055; 20150268056; 20150268662; 20150268724; 20150269250; 20150269383; 20150269489; 20150269524; 20150269617; 20150269790; 20150269791; 20150270968; 20150271019; 20150271132; 20150271201; 20150272694; 20150274017; 20150276254; 20150276417; 20150278814; 20150278950; 20150281155; 20150281156; 20150281906; 20150282041; 20150282061; 20150282717; 20150284103; 20150285642; 20150286975; 20150288634; 20150289116; 20150291055; 20150291164; 20150293644; 20150293668; 20150293755; 20150295808; 20150295869; 20150295910; 20150296037; 20150296224; 20150296319; 20150296436; 20150296441; 20150297082; 20150297311; 20150298153; 20150298555; 20150301527; 20150301528; 20150301592; 20150301599; 20150301732; 20150301787; 20150301797; 20150301819; 20150302250; 20150302625; 20150302642; 20150302643; 20150302644; 20150302652; 20150302655; 20150302656; 20150302657; 20150302658; 20150302659; 20150302660; 20150302661; 20150302662; 20150302663; 20150302664; 20150302665; 20150302667; 20150302732; 20150302735; 20150302739; 20150302851; 20150304207; 20150304504; 20150304797; 20150304935; 20150307082; 20150307106; 20150309263; 20150309264; 20150309535; 20150309874; 20150309981; 20150310020; 20150310389; 20150310652; 20150311903; 20150312380; 20150312404; 20150312415; 20150312801; 20150314789; 20150316406; 20150316980; 20150316982; 20150317515; 20150317745; 20150317839; 20150318705; 20150319044; 20150319116; 20150319473; 20150319511; 20150319551; 20150319681; 20150324058; 20150324270; 20150324469; 20150324736; 20150324791; 20150325093; 20150325123; 20150326447; 20150326488; 20150326545; 20150326919; 20150330803; 20150330804; 20150331398; 20150331422; 20150331686; 20150332174; 20150332242; 20150332419; 20150332441; 20150333378; 20150334176; 20150334248; 20150334249; 20150334434; 20150334543; 20150335978; 20150337400; 20150338226; 20150339570; 20150339593; 20150339857; 20150341005; 20150341241; 20150341268; 20150341296; 20150341757; 20150341862; 20150344055; 20150347005; 20150347429; 20150347848; 20150348339; 20150348543; 20150350075; 20150350177; 20150350711; 20150350758; 20150350967; 20150350995; 20150355855; 20150355988; 20150356104; 20150356497; 20150356781; 20150356782; 20150356783; 20150356784; 20150356794; 20150358074; 20150358234; 20150358352; 20150358461; 20150358525; 20150358762; 20150358852; 20150360671; 20150362995; 20150365255; 20150365328; 20150365519; 20150365664; 20150365846; 20150365981; 20150366504; 20150367736; 20150368566; 20150369138; 20150369505; 20150369660; 20150370248; 20150370935; 20150371153; 20150371226; 20150371336; 20150371459; 20150371465; 20150372954; 20150373022; 20150373482; 20150373502; 20150373554; 20150373583; 20150378433; 20150378574; 20150379303; 20150379408; 20150379765; 20150379770; 20150379788; 20150379995; 20150381297; 20150381441; 20150381543; 20150381547; 20150381666; 20150381886; 20150382149; 20150382263; 20150382278; 20150382286; 20150382319; 20160001765; 20160003635; 20160003636; 20160003637; 20160004502; 20160004686; 20160004788; 20160007203; 20160009304; 20160011861; 20160012215; 20160012401; 20160012465; 20160012650; 20160012758; 20160012813; 20160013979; 20160013998; 20160014057; 20160014070; 20160014151; 20160014450; 20160015273; 20160016523; 20160016626; 20160016627; 20160016628; 20160016630; 20160016631; 20160016633; 20160016634; 20160016635; 20160016636; 20160016651; 20160019238; 20160019532; 20160019556; 20160019592; 20160019651; 20160019980; 20160020864; 20160020943; 20160020967; 20160020979; 20160020987; 20160020988; 20160020997; 20160021006; 20160021009; 20160021010; 20160021011; 20160021013; 20160021014; 20160021017; 20160021018; 20160021038; 20160021039; 20160021049; 20160021116; 20160021126; 20160021152; 20160021484; 20160021596; 20160021647; 20160022520; 20160023621; 20160025497; 20160025514; 20160025979; 20160026239; 20160026253; 20160026476; 20160026542; 20160026659; 20160026729; 20160026991; 20160027029; 20160027045; 20160027273; 20160028011; 20160028243; 20160028605; 20160028609; 20160028615; 20160028658; 20160028668; 20160028722; 20160028729; 20160028750; 20160028751; 20160028752; 20160028753; 20160028754; 20160028755; 20160028762; 20160028763; 20160028764; 20160028778; 20160028827; 20160028899; 20160029155; 20160029167; 20160029194; 20160029346; 20160029368; 20160029422; 20160030825; 20160033264; 20160033985; 20160034133; 20160034148; 20160034152; 20160034158; 20160034166; 20160034167; 20160034329; 20160034764; 20160034867; 20160034876; 20160034879; 20160034896; 20160034941; 20160034954; 20160034994; 20160035005; 20160035052; 20160035096; 20160035144; 20160035148; 20160035150; 20160035972; 20160036519; 20160036747; 20160036764; 20160036842; 20160036868; 20160036909; 20160036949; 20160036989; 20160036990; 20160036991; 20160037294; 20160037304; 20160037307; 20160037389; 20160037445; 20160037477; 20160037478; 20160039356; 20160039426; 20160039430; 20160039653; 20160040996; 20160040998; 20160041024; 20160041559; 20160041820; 20160042079; 20160042153; 20160042172; 20160042382; 20160042972; 20160043300; 20160043313; 20160043370; 20160043429; 20160043554; 20160043571; 20160043945; 20160043973; 20160044035;

20160044054; 20160044108; 20160044120; 20160044121; 20160044129; 20160044355; 20160044454; 20160044461; 20160044510; 20160044661; 20160044697; 20160045841; 20160047662; 20160047879; 20160048266; 20160048580; 20160048688; 20160048842; 20160049203; 20160049408; 20160049582; 20160049813; 20160049823; 20160049824; 20160050061; 20160050137; 20160050183; 20160050265; 20160050315; 20160050379; 20160050514; 20160050520; 20160050535; 20160050541; 20160050548; 20160050553; 20160050674; 20160050705; 20160051791; 20160052473; 20160052512; 20160052762; 20160054021; 20160054140; 20160054736; 20160055116; 20160055232; 20160055499; 20160055551; 20160055740; 20160055747; 20160056209; 20160056211; 20160056246; 20160056847; 20160056938; 20160057084; 20160057143; 20160057571; 20160058315; 20160058335; 20160058390; 20160059412; 20160059662; 20160059865; 20160061472; 20160061618; 20160062583; 20160063062; 20160063102; 20160063191; 20160063497; 20160063868; 20160064659; 20160064947; 20160064999; 20160065517; 20160065520; 20160065572; 20160065719; 20160065928; 20160066123; 20160066125; 20160066127; 20160066162; 20160066221; 20160066246; 20160066325; 20160066808; 20160066894; 20160068136; 20160069692; 20160069705; 20160069855; 20160069975; 20160070456; 20160070527; 20160070559; 20160070611; 20160070718; 20160070794; 20160071333; 20160071338; 20160071397; 20160071905; 20160072282; 20160072287; 20160072493; 20160072547; 20160072676; 20160072678; 20160072729; 20160072740; 20160072752; 20160072770; 20160072832; 20160072896; 20160073232; 20160073271; 20160073280; 20160073372; 20160073886; 20160075175; 20160075177; 20160075226; 20160075339; 20160077693; 20160078446; 20160078458; 20160078484; 20160078554; 20160078659; 20160078695; 20160078741; 20160079363; 20160079524; 20160080021; 20160080030; 20160080096; 20160080168; 20160080302; 20160080451; 20160080486; 20160080498; 20160080550; 20160080907; 20160080935; 20160081127; 20160081162; 20160081551; 20160081586; 20160082772; 20160082839; 20160082925; 20160082975; 20160084936; 20160085561; 20160085594; 20160085774; 20160085955; 20160085983; 20160086108; 20160086189; 20160086228; 20160086391; 20160086397; 20160086399; 20160086484; 20160086679; 20160087011; 20160087687; 20160087760; 20160088049; 20160088052; 20160088100; 20160088372; 20160088473; 20160088551; 20160088807; 20160089066; 20160090105; 20160091540; 20160091717; 20160092189; 20160092301; 20160092532; 20160092780; 20160092858; 20160092907; 20160092911; 20160093135; 20160093154; 20160093509; 20160094051; 20160094358; 20160094398; 20160094479; 20160094502; 20160094646; 20160094673; 20160094707; 20160094720; 20160094883; 20160094972; 20160094973; 20160095148; 20160096508; 20160097648; 20160098307; 20160098325; 20160098445; 20160098670; 20160098729; 20160098790; 20160098923; 20160099806; 20160099898; 20160099916; 20160099917; 20160099927; 20160099972; 20160100054; 20160100273; 20160100301; 20160100310; 20160100335; 20160100346; 20160100348; 20160100362; 20160100444; 20160100445; 20160100449; 20160100908; 20160103199; 20160103212; 20160103462; 20160103666; 20160103980; 20160104123; 20160104131; 20160104169; 20160104327; 20160104365; 20160104798; 20160105371; 20160105387; 20160105406; 20160105504; 20160105621; 20160105644; 20160105775; 20160105782; 20160105786; 20160105841; 20160105847; 20160105852; 20160105906; 20160105918; 20160105943; 20160107309; 20160107509; 20160109940; 20160110056; 20160110148; 20160110372; 20160110381; 20160110554; 20160110621; 20160110774; 20160110788; 20160110820; 20160110929; 20160110993; 20160111090; 20160111472; 20160112216; 20160112279; 20160112453; 20160112462; 20160112487; 20160112684; 20160112830; 20160112894; 20160112929; 20160112950; 20160114745; 20160114821; 20160116571; 20160116977; 20160117393; 20160117716; 20160117734; 20160117902; 20160117945; 20160118042; 20160118442; 20160118474; 20160118575; 20160119162; 20160119383; 20160119431; 20160119434; 20160119855; 20160120448; 20160121669; 20160121912; 20160123802; 20160123834; 20160124071; 20160124617; 20160124694; 20160124901; 20160125345; 20160125361; 20160125735; 20160125864; 20160125865; 20160126732; 20160127073; 20160127087; 20160127165; 20160127172; 20160127403; 20160127404; 20160127447; 20160127457; 20160127539; 20160127540; 20160127541; 20160127548; 20160127549; 20160127552; 20160127562; 20160127566; 20160127567; 20160127569; 20160127624; 20160127808; 20160127851; 20160127871; 20160127887; 20160127907; 20160127931; 20160128108; 20160128582; 20160128617; 20160128880; 20160129310; 20160131492; 20160132397; 20160132630; 20160132822; 20160132823; 20160132832; 20160132851; 20160132863; 20160132874; 20160132877; 20160132951; 20160133065; 20160133070; 20160133107; 20160133122; 20160133230; 20160133322; 20160133343; 20160134062; 20160134161; 20160134468; 20160134514; 20160134516; 20160134539; 20160134562; 20160134630; 20160134633; 20160134930; 20160135036; 20160135039; 20160137089; 20160138926; 20160139067; 20160139234; 20160139272; 20160139755; 20160140062; 20160140063; 20160140146; 20160140168; 20160140353; 20160140546; 20160140608; 20160140614; 20160140776; 20160140834; 20160140844; 20160140870; 20160141744; 20160141894; 20160142248; 20160142402; 20160142410; 20160142597; 20160142856; 20160142864; 20160142880; 20160142882; 20160142891; 20160142906; 20160142916; 20160143004; 20160143075; 20160146494; 20160146495; 20160147233; 20160147293; 20160147782; 20160148103; 20160148269; 20160148509; 20160148558; 20160148780; 20160148974; 20160148979; 20160149120; 20160149121; 20160149177; 20160149755; 20160149777; 20160149805; 20160149853; 20160149856; 20160149990; 20160150089; 20160150298; 20160150350; 20160150482; 20160150501; 20160152180; 20160153796; 20160154406; 20160154413; 20160155288; 20160155326; 20160155503; 20160155933; 20160156450; 20160156514; 20160156575; 20160156652; 20160157044; 20160157179; 20160157221; 20160157298; 20160158640; 20160159186; 20160161310; 20160162120; 20160162552; 20160162682; 20160162827; 20160162870; 20160162882; 20160162900; 20160162938; 20160162946; 20160163001; 20160163133; 20160163135; 20160164282; 20160164695; 20160164745; 20160164748; 20160164819; 20160164981; 20160164982; 20160165000; 20160165002; 20160165404; 20160165417; 20160165487; 20160165965; 20160167486; 20160167641; 20160169682; 20160169683; 20160169684; 20160169689; 20160169930; 20160170733; 20160170775; 20160170871; 20160170971; 20160170996; 20160171122; 20160171155; 20160171374; 20160171405; 20160171492; 20160171538; 20160171591; 20160171599; 20160171885; 20160172721; 20160172904; 20160173385; 20160173428; 20160173511; 20160173513; 20160173609; 20160173646; 20160173647; 20160173689; 20160173827; 20160173921; 20160173959; 20160173996; 20160174039; 20160174046; 20160174073; 20160174129; 20160174148; 20160174333; 20160174840; 20160175723; 20160176397; 20160176398; 20160177846; 20160177850; 20160177881; 20160177895; 20160178035; 20160178048; 20160178225; 20160178387; 20160178724; 20160178744;

20160178796; 20160179416; 20160179774; 20160179829; 20160179936; 20160180019; 20160180060; 20160180156; 20160180384; 20160180404; 20160180468; 20160180478; 20160180500; 20160180595; 20160180598; 20160180607; 20160180667; 20160180705; 20160180707; 20160180713; 20160180715; 20160180717; 20160180721; 20160180728; 20160180905; 20160180928; 20160180960; 20160181204; 20160181315; 20160181316; 20160181317; 20160181318; 20160181320; 20160181514; 20160181520; 20160181522; 20160182121; 20160182170; 20160182415; 20160182475; 20160182574; 20160182688; 20160182801; 20160182816; 20160182856; 20160182940; 20160183029; 20160183037; 20160183041; 20160183351; 20160183695; 20160183799; 20160183818; 20160184155; 20160184755; 20160185216; 20160185222; 20160185326; 20160185351; 20160186191; 20160186219; 20160186285; 20160186681; 20160187127; 20160187144; 20160187148; 20160187460; 20160187654; 20160188181; 20160188190; 20160188405; 20160188597; 20160188602; 20160188756; 20160188824; 20160188876; 20160188883; 20160188895; 20160188996; 20160189098; 20160189101; 20160189127; 20160189146; 20160189164; 20160189174; 20160189186; 20160189270; 20160189273; 20160189285; 20160189381; 20160189385; 20160189425; 20160189439; 20160189453; 20160189454; 20160189459; 20160189491; 20160189496; 20160189500; 20160189502; 20160189503; 20160189505; 20160189506; 20160189509; 20160189513; 20160189524; 20160189528; 20160189529; 20160189531; 20160189532; 20160189533; 20160189542; 20160189544; 20160189752; 20160190687; 20160190691; 20160190806; 20160190828; 20160190868; 20160190869; 20160191265; 20160191295; 20160191339; 20160191356; 20160191426; 20160191436; 20160191439; 20160191584; 20160191594; 20160191673; 20160191712; 20160191716; 20160191717; 20160191775; 20160191958; 20160192111; 20160192118; 20160192135; 20160192141; 20160192154; 20160192157; 20160192166; 20160192168; 20160192277; 20160192289; 20160192321; 20160192346; 20160192458; 20160193583; 20160193694; 20160193729; 20160193889; 20160193895; 20160193934; 20160193937; 20160194007; 20160194087; 20160194288; 20160194584; 20160194942; 20160195006; 20160195027; 20160195047; 20160195055; 20160195082; 20160195186; 20160195291; 20160195401; 20160195509; 20160195602; 20160195856; 20160195864; 20160195876; 20160196010; 20160196131; 20160196132; 20160196150; 20160196176; 20160196274; 20160196389; 20160196432; 20160196451; 20160196525; 20160196544; 20160196583; 20160196596; 20160196620; 20160196629; 20160196722; 20160196745; 20160196751; 20160196753; 20160197036; 20160197333; 20160197489; 20160197503; 20160197519; 20160197776; 20160197782; 20160197783; 20160197800; 20160197831; 20160197993; 20160198002; 20160198049; 20160198244; 20160198296; 20160198297; 20160198387; 20160198404; 20160198485; 20160198522; 20160198548; 20160198644; 20160198950; 20160199576; 20160199812; 20160200202; 20160200254; 20160200310; 20160200315; 20160201168; 20160201532; 20160201533; 20160201555; 20160201581; 20160201586; 20160201633; 20160201766; 20160201772; 20160202070; 20160202076; 20160202082; 20160202200; 20160202699; 20160202755; 20160202850; 20160202942; 20160203211; 20160203300; 20160203347; 20160203373; 20160203382; 20160203435; 20160203490; 20160203497; 20160203520; 20160203626; 20160203639; 20160203651; 20160203652; 20160203661; 20160203712; 20160203718; 20160203879; 20160204440; 20160204507; 20160204795; 20160204826; 20160204831; 20160204913; 20160204914; 20160204990; 20160205016; 20160205067; 20160205082; 20160205096; 20160205217; 20160205238; 20160205419; 20160205422; 20160205450; 20160205504; 20160205506; 20160205513; 20160205538; 20160205560; 20160207389; 20160207390; 20160207391; 20160207392; 20160207454; 20160207494; 20160207495; 20160207523; 20160207541; 20160207778; 20160207817; 20160208023; 20160208024; 20160208243; 20160208458; 20160208605; 20160208692; 20160208695; 20160208725; 20160208732; 20160208742; 20160208764; 20160208913; 20160209059; 20160209060; 20160209061; 20160209062; 20160209066; 20160209067; 20160209068; 20160209224; 20160209648; 20160209831; 20160209842; 20160209843; 20160209845; 20160209848; 20160209997; 20160210044; 20160210110; 20160210283; 20160210332; 20160210382; 20160210383; 20160210525; 20160210578; 20160210588; 20160210591; 20160210602; 20160210775; 20160210794; 20160210862; 20160210952; 20160211932; 20160211957; 20160211985; 20160212086; 20160212145; 20160212201; 20160212460; 20160212508; 20160212577; 20160212586; 20160212587; 20160212588; 20160212652; 20160212684; 20160212695; 20160212708; 20160212740; 20160212941; 20160214490; 20160214533; 20160214535; 20160214598; 20160214610; 20160214632; 20160214706; 20160214716; 20160214723; 20160214724; 20160215087; 20160215680; 20160215681; 20160215706; 20160215718; 20160215748; 20160215858; 20160215996; 20160216126; 20160216130; 20160216141; 20160216362; 20160216699; 20160216940; 20160217103; 20160217124; 20160217146; 20160217159; 20160217203; 20160217313; 20160217325; 20160217377; 20160217384; 20160217459; 20160217470; 20160217492; 20160217519; 20160217578; 20160217590; 20160217635; 20160217664; 20160217674; 20160217694; 20160217695; 20160217767; 20160217784; 20160218528; 20160218843; 20160218884; 20160218965; 20160219011; 20160219024; 20160219028; 20160219088; 20160219117; 20160219118; 20160219248; 20160219348; 20160219349; 20160219420; 20160219505; 20160219516; 20160219517; 20160219523; 20160219552; 20160219615; 20160219679; 20160220198; 20160220324; 20160220743; 20160220885; 20160220954; 20160221439; 20160221453; 20160221456; 20160221485; 20160221578; 20160221592; 20160221768; 20160222482; 20160222483; 20160222485; 20160222820; 20160222841; 20160222852; 20160222867; 20160222868; 20160222894; 20160222895; 20160222899; 20160222903; 20160222905; 20160222911; 20160222912; 20160222972; 20160223078; 20160223214; 20160223215; 20160223216; 20160223217; 20160223218; 20160223345; 20160223347; 20160223351; 20160223355; 20160223511; 20160223577; 20160223578; 20160223638; 20160223663; 20160224030; 20160224104; 20160224137; 20160224328; 20160224435; 20160224696; 20160224724; 20160224725; 20160224726; 20160224727; 20160224728; 20160224729; 20160224742; 20160224745; 20160224746; 20160224747; 20160224773; 20160224786; 20160224798; 20160224803; 20160224828; 20160224916; 20160224919; 20160224930; 20160224951; 20160225027; 20160225072; 20160225087; 20160225095; 20160225108; 20160225183; 20160225198; 20160225203; 20160225248; 20160225255; 20160225259; 20160225272; 20160225273; 20160225278; 20160225412; 20160225425; 20160225984; 20160226207; 20160226305; 20160226590; 20160226653; 20160226671; 20160226732; 20160226761; 20160226840; 20160226841; 20160226847; 20160226859; 20160226900; 20160226903; 20160226940; 20160226968; 20160226983; 20160226990; 20160226995; 20160227017; 20160227018; 20160227019; 20160227028; 20160227096; 20160227168; 20160227259; 20160227287; 20160227311; 20160227336; 20160227341; 20160227346; 20160227361; 20160227363; 20160227371; 20160227375; 20160227377; 20160227422;

20160227463; 20160227464; 20160227510; 20160227583; 20160227655; 20160228064; 20160228091; 20160228767; 20160228771; 20160228776; 20160228852; 20160228946; 20160229271; 20160229342; 20160229376; 20160229404; 20160229405; 20160229435; 20160229467; 20160229522; 20160229547; 20160230619; 20160230658; 20160230692; 20160230781; 20160230784; 20160230855; 20160231031; 20160231122; 20160231129; 20160231131; 20160231132; 20160231399; 20160231402; 20160231403; 20160231404; 20160231414; 20160231573; 20160231718; 20160231725; 20160231739; 20160231817; 20160231825; 20160231915; 20160232062; 20160232080; 20160232116; 20160232167; 20160232196; 20160232283; 20160232284; 20160232285; 20160232286; 20160232287; 20160232288; 20160232289; 20160232352; 20160232387; 20160232479; 20160232481; 20160232484; 20160232485; 20160232486; 20160232488; 20160232489; 20160232502; 20160232546; 20160232565; 20160232566; 20160232571; 20160232600; 20160232621; 20160232625; 20160232627; 20160232635; 20160232713; 20160232715; 20160232725; 20160232748; 20160232774; 20160232778; 20160232780; 20160232788; 20160233413; 20160233474; 20160233578; 20160233582; 20160233912; 20160234005; 20160234070; 20160234186; 20160234195; 20160234196; 20160234216; 20160234272; 20160234273; 20160234286; 20160234287; 20160234335; 20160234338; 20160234341; 20160234342; 20160234343; 20160234350; 20160234355; 20160234356; 20160234361; 20160234362; 20160234371; 20160234441; 20160234476; 20160234532; 20160234606; 20160234628; 20160234629; 20160234634; 20160234642; 20160234646; 20160234647; 20160234648; 20160234654; 20160234662; 20160234668; 20160234669; 20160234673; 20160234683; 20160234765; 20160235236; 20160235341; 20160235359; 20160235366; 20160235524; 20160236089; 20160236563; 20160236573; 20160236582; 20160236671; 20160236672; 20160236686; 20160236694; 20160236790; 20160236903; 20160237640; 20160237657; 20160237862; 20160237884; 20160237890; 20160237923; 20160237927; 20160237932; 20160238116; 20160238272; 20160238398; 20160238403; 20160238406; 20160238641; 20160238642; 20160238738; 20160238850; 20160238851; 20160239010; 20160239024; 20160239080; 20160239158; 20160239184; 20160239250; 20160239287; 20160239293; 20160239347; 20160239349; 20160239493; 20160239516; 20160239555; 20160239557; 20160239573; 20160239593; 20160239629; 20160239645; 20160239659; 20160239686; 20160239696; 20160239749; 20160239759; 20160239799; 20160239801; 20160239802; 20160239823; 20160239839; 20160239845; 20160239849; 20160239857; 20160239869; 20160239875; 20160239879; 20160239903; 20160239904; 20160239921; 20160239925; 20160239926; 20160239969; 20160239976; 20160240009; 20160240010; 20160240019; 20160240036; 20160240050; 20160240061; 20160240062; 20160240222; 20160240223; 20160240875; 20160240887; 20160240891; 20160241133; 20160241162; 20160241410; 20160241437; 20160241445; 20160241521; 20160241523; 20160241548; 20160241565; 20160241569; 20160241648; 20160241699; 20160241707; 20160241713; 20160241776; 20160241784; 20160241993; 20160241997; 20160241998; 20160242005; 20160242034; 20160242043; 20160242108; 20160242145; 20160242681; 20160242849; 20160243440; 20160243444; 20160243571; 20160243927; 20160243934; 20160244011; 20160244022; 20160244049; 20160244067; 20160244072; 20160244161; 20160244176; 20160244187; 20160244311; 20160245190; 20160245207; 20160245239; 20160245241; 20160245279; 20160245350; 20160245395; 20160245401; 20160245638; 20160245656; 20160245662; 20160245664; 20160245665; 20160245686; 20160245785; 20160245916; 20160246265; 20160246292; 20160246296; 20160246341; 20160246384; 20160246481; 20160246526; 20160246591; 20160246752; 20160246769; 20160246815; 20160246819; 20160246850; 20160246868; 20160246879; 20160246889; 20160246931; 20160247005; 20160247034; 20160247057; 20160247080; 20160247089; 20160247098; 20160247113; 20160247144; 20160247153; 20160247175; 20160247181; 20160247199; 20160247200; 20160247218; 20160247221; 20160247238; 20160247253; 20160247330; 20160247333; 20160247335; 20160247342; 20160247353; 20160247354; 20160247364; 20160247377; 20160247378; 20160247404; 20160247537; 20160247566; 20160247856; 20160247858; 20160248009; 20160248115; 20160248345; 20160248481; 20160248631; 20160248661; 20160248676; 20160248740; 20160248778; 20160248779; 20160248838; 20160248863; 20160248865; 20160248871; 20160248906; 20160249024; 20160249100; 20160249148; 20160249161; 20160249163; 20160249175; 20160249177; 20160249181; 20160249192; 20160249195; 20160249254; 20160249281; 20160249293; 20160249318; 20160249319; 20160249400; 20160249435; 20160249439; 20160249781; 20160249782; 20160249815; 20160249853; 20160249857; 20160250557; 20160250752; 20160250916; 20160250941; 20160250943; 20160250985; 20160251012; 20160251025; 20160251167; 20160251743; 20160251961; 20160251991; 20160252023; 20160252025; 20160252053; 20160252325; 20160252366; 20160252381; 20160252888; 20160252909; 20160252932; 20160252939; 20160252944; 20160252980; 20160253039; 20160253041; 20160253047; 20160253083; 20160253089; 20160253142; 20160253155; 20160253218; 20160253222; 20160253254; 20160253274; 20160253313; 20160253318; 20160253340; 20160253342; 20160253348; 20160253385; 20160253394; 20160253440; 20160253458; 20160253478; 20160253479; 20160253481; 20160253498; 20160253500; 20160253563; 20160253582; 20160253595; 20160253639; 20160253642; 20160253651; 20160253652; 20160253653; 20160253656; 20160253657; 20160253666; 20160253667; 20160253669; 20160253670; 20160253689; 20160253699; 20160253707; 20160253709; 20160253710; 20160253712; 20160253735; 20160253737; 20160253746; 20160253750; 20160253758; 20160253761; 20160253779; 20160253814; 20160253848; 20160253890; 20160253908; 20160253924; 20160254511; 20160254588; 20160254590; 20160254687; 20160254832; 20160254859; 20160254906; 20160254942; 20160254950; 20160254959; 20160254963; 20160255006; 20160255015; 20160255017; 20160255032; 20160255037; 20160255050; 20160255106; 20160255140; 20160255153; 20160255162; 20160255164; 20160255249; 20160255305; 20160255322; 20160255398; 20160255408; 20160255420; 20160255438; 20160255455; 20160255466; 20160255480; 20160255481; 20160255493; 20160255495; 20160255513; 20160255531; 20160255536; 20160255559; 20160255575; 20160255600; 20160255618; 20160255763; 20160255778; 20160255781; 20160256082; 20160256097; 20160256260; 20160256262; 20160256263; 20160256267; 20160256315; 20160256781; 20160257000; 20160257198; 20160257252; 20160257288; 20160257291; 20160257297; 20160257299; 20160257310; 20160257413; 20160257415; 20160257421; 20160257424; 20160258119; 20160258144; 20160258202; 20160258209; 20160258369; 20160258380; 20160258410; 20160258497; 20160258647; 20160258754; 20160258758; 20160258762; 20160258764; 20160258765; 20160258767; 20160258770; 20160258776; 20160259027; 20160259032; 20160259046; 20160259061; 20160259307; 20160259316; 20160259341; 20160259356; 20160259404; 20160259425; 20160259426; 20160259432; 20160259451; 20160259509; 20160259546; 20160259623; 20160259656; 20160259789;

20160259804; 20160259821; 20160259848; 20160259905; 20160259906; 20160259950; 20160259956; 20160260016; 20160260019; 20160260029; 20160260033; 20160260048; 20160260049; 20160260067; 20160260069; 20160260075; 20160260100; 20160260107; 20160260108; 20160260135; 20160260148; 20160260158; 20160260161; 20160260207; 20160260261; 20160260288; 20160260302; 20160260303; 20160260315; 20160260317; 20160260319; 20160260322; 20160260332; 20160260413; 20160260431; 20160260433; 20160260434; 20160260436; 20160260948; 20160260986; 20160261031; 20160261151; 20160261268; 20160261291; 20160261397; 20160261425; 20160261458; 20160261641; 20160261670; 20160261697; 20160261727; 20160261733; 20160261803; 20160261829; 20160261837; 20160261841; 20160261977; 20160261981; 20160261984; 20160262068; 20160262082; 20160262087; 20160262118; 20160262191; 20160262201; and 20160262205.

SUMMARY OF THE INVENTION

The present invention relates to a system and method for acquiring, managing, analyzing and using data obtained from components of a vehicle. The invention comprises various combinations, subcombinations, permutations and modifications of the various elements as disclosed herein. The various references cited herein are each expressly incorporated herein by reference in their entirety, and the various element and technologies disclosed therein are part of the disclosure of the invention, and can be used in place of or together with the various elements and technologies as consistent with the present disclosure and claims.

One aspect of the technology provides an interface to a controller area network within the vehicle, which, for example, provides messages regarding an engine state, fuel system state, and other information. The controller area network also permits control signals to be sent from a controller device to the vehicle components, though typically this option is not employed, due to potential safety and reliability issues. Further, the present technology may itself be implemented as a distributed network system, and advantageously may intercommunicate between subcomponents through the controller area network. The controller area network may itself be a CAN bus type system, implemented according to various industry standards or proprietary protocols. In such systems, a standard type electronic interface specification may be employed, though with different electrical connectors, messages, and protocol details.

Characteristic of controller area network messages is that they tend to be short, and therefore require context for interpretation, and are part of a real-time control system with asynchronous operation, that is, the messages on the bus require prioritization so that critical messages do not encounter congestion that would case the system to lapse from criteria for real-time response.

Therefore, a device according to the present technology that acquires information from the bus (without itself being the designated target or endpoint) can operate without materially adversely impacting the controller area network, but any messages or communications sent over the bus should comply with express or implied protocol constraints. Controller area networks tend to be implemented within proprietary systems, and the technology according to the present invention may be added to the controller area network aftermarket, so that the manufacturer which implemented the controller area network would typically not have tested and fully qualified the additional device for its system. Therefore, the technology may employ a learning system which monitors the controller area network bus to determine bus operation characteristics, and typically implement its functionality within the headroom of the network without competition or contention with native messages.

In some cases, the present technology will be implemented to add new critical functions to an existing "legacy" system, and these functions may be considered to have higher priority than certain native messages. Therefore, deference to native messages and communications is not a limiting constraint, rather a desirable design practice.

Further, in some cases, the present technology remediates defects of a "legacy" control system, and acts to override or suppress certain native messages. In that case, the technology may implement certain types of interference which prevent a message from being successfully communicated. For example, the technology may intentionally interfere with the message to prevent successful receipt, and then send a false acknowledgement to prevent retransmission. Typically, the technology will instead send a modified or alternate message, which might suppress any request for retransmission. Thus, the technology may be implemented as a "man in the middle".

The present technology also provides an improvement and/or addition to a typical controller area network communication protocol, with cryptographic endpoint verification. That is, messages, acknowledgements, and requests for retransmission may be sent which are digitally signed by a verified sender or target, and thus more immune from "man in the middle" circumvention. In many cases, communications over the controller area network bus are not subject to acknowledgement, and for example may be broadcast over the bus. In this case, suppression of messages may be implemented by non-protocol-compliant interference designed to suppress any hardware or protocol based error or collision detection.

The present technology also provides a controller area network bridging and routing function, to permit the controller area network messages to be communicated beyond the physical limits of a single hardware bus. For example, in case of a physical failure of the bus, or a required extension of the bus, a bridge or extender function may be implemented in a wired or wireless network, without physically modifying the existing bus, with the exception of adding a new node. In this case, the technology would typically pass messages between portions of the bus, and therefore should comply with express and implied protocol constraints. Therefore, data from new sensors may be logically added to the bus, or new controlled actuators logically added to the bus. Advantageously, the additional functionality may be suppressed during conduct of a legacy diagnostic mode (that does not contemplate addition of new sensors or actuators), and incompatible communications and commands suppressed to ensure compatibility.

CAN bus is described in en.wikipedia.org/wiki/CAN_bus and www.can-wiki.info/doku.php, expressly incorporated herein by reference. NMEA 2000 is describe in en.wikipedia.org/wiki/NMEA_2000 and www.nmea.org/Assets/july%202010%20nmea2000_v1-301_app_b_pgn_field_list.pdf, expressly incorporated herein by reference.

The GPS system is generally described in en.wikipedia.org/wiki/Global_Positioning_System. More generally, there are a number of global navigation satellite systems. en.wikipedia.org/wiki/Satellite_navigation.

The system typically provides a database stored in non-volatile memory, such as flash memory. See, en.wikipedia.org/wiki/Flash_memory.

A remote data telecommunication interface may be implemented through cellular, satellite communications, wired network, wireless local area networks (e.g., IEEE-802.11 family), personal area networks (e.g., IEEE-802.15 family), VHF and maritime band radios, etc. In general, LAN and PAN radio frequency communications are ineffective for the remote data telecommunications due to range limitations, except when near shore.

A structured query language database interface may be provided. See, en.wikipedia.org/wiki/SQL, en.wikipedia.org/wiki/SQLite. The system may monitor the controller area network interface bus for messages. The system may further filter the messages, and extract information messages from the filtered messages. The system may store at least a portion of the extracted information in the database in conjunction with time information, and the geolocation information. The system may further generate a structured query to the structured query language database interface to retrieve the stored extracted information. The system may process the retrieved stored extracted information with respect to at least one statistical model. The system may execute at least one telecommunication rule with respect to a selective communication of at least a portion of the stored extracted information over the remote data telecommunication interface to a remote database. The telecommunication rule may be a telecommunications cost sensitive telecommunication rule.

The system may, in a local analysis mode, propose a change in a current operating parameter for the vehicle based on at least the statistical model, extracted information messages, the determined geolocation, a predicted fuel cost, and at least one of a mission constraint, a non-fuel cost of operations for the vehicle, and a non-fuel net benefit of operations of the vehicle.

The system may, in a remote analysis mode, receive a message through the remote data telecommunication interface of a proposed change in a current operating parameter for the vehicle based on at least a database of operational parameters for a plurality of vehicles, the extracted information messages in the remote database, the determined geolocation, a predicted fuel cost, and at least one of a mission constraint, a non-fuel cost of operations for the vehicle, and a non-fuel net benefit of operations of the vehicle. The vehicle may be a marine vessel. The device may further provide at least one of a personal area network interface, and a local area network interface, wherein the at least one automated processor receives sensor data through the at least one of the personal area network interface and the local area network interface, and includes the sensor data with the extracted information in the database in conjunction with the time information and the geolocation information. The remote data telecommunication interface may be a satellite radio communication system interface, and/or provide connectivity to or through the Internet.

The selective communication of the at least a portion of the stored extracted information over the remote data telecommunication interface may communicate the at least a portion of the stored extracted information to a cloud database. See, en.wikipedia.org/wiki/Cloud_computing. The cloud database may be accessible through the Internet.

The system may further include at least one of a personal area network interface (e.g., IEEE-802.15 family of standards, see en.wikipedia.org/wiki/Personal_area_network, en.wikipedia.org/wiki/IEEE_802.15) and a local area network interface (e.g., IEEE-802.11 family of standards, see en.wikipedia.org/wiki/Wireless_LAN, en.wikipedia.org/wiki/IEEE_802.11).

The system may have at least one automated processor configured to provide a human user interface to a portable interface device by communications through the at least one of the personal area network interface and the local area network interface. A human user interface is not strictly required, but may facilitate setup, diagnostics, and use, as well as provide additional functionality for a user. See, en.wikipedia.org/wiki/User_interface. Such user interfaces may be called "virtual user interfaces", because the device presenting the user interface is distinct from the target of the interface communications. Indeed, the system that generates the user interface structures, which may be HTML, JAVA/Javascript, or other interface language or page description language, may itself be distinct from the target device.

The processor of the system may extract at least all engine and fuel information from the messages on the controller area network interface bus. That is, the system may selectively capture relevant or contextually relevant messages, which for a fuel management system comprise the engine and fuel messages, but for example, not entertainment system messages. Examples of context dependent messages are, for example, sewage tank level messages. Such messages may be important, especially when the vessel is near a sewage deposit facility, but are less relevant during a voyage where there are few if any action options. For the information which is acquired and filtered, the messages are typically aggregated over a period of time, which may be less than a second to minutes or hours. Typically, the messages are aggregated into a record, and stored periodically. For example, fuel and engine system messages may be generated asynchronously every 200 mS. The system may capture these messages, and every second, statistically process the aggregated messages to define a record which is stored in the database. If the data appears anomalous, or is indicative of operation outside of a normal or expected range, individual messages may be retained, though typically these would be recorded in an error or anomaly log, and not in the regular periodic message database. This is because the subsequent processing to the periodic message database may or may not be tolerant of potential artifacts in the data, while error processing and analysis typically would seek to analyze the raw message stream. Therefore, the processor analyzes the messages in real-time, and on one hand, filters potentially anomalous messages, through, for example, processing in accordance with a statistical data model, error detection and correction, etc., to define a "clean" database which can be accessed for normal operation purposes. Evidence of possible errors, artifacts, anomalies, and deviations, may trigger a raw data recording mode or alternate message processing and storage mode, separate from the statistical data filtering and storage of periodic records in the SQL database, and the messages may then be subject to non-statistical processing and perhaps uploaded to a remote server for detailed analysis. Assuming that the system is not aberrant, all engine and fuel information may be aggregated into periodic records, and stored as the extracted information in the database. If an aberrant condition is detected, the processor has various options with respect to the records to be stored in the database. Since early indications of such conditions may represent system noise or transient conditions, which are not indicative of problems, the records may be stored in the database with filtering and error correction in accordance with a statistical model of the normal range of operation, optionally with a flag indicating the synthesis. As further data is received, the processor may determine that a true problem is emerging. In that case, further records may be stored without an underlying presumption of normal operation, and the previously stored "error corrected" records may be reprocessed to indicate the onset of aberrancy. Alternately, the statistical filter may be used to detect the immediate onset of aberrant data, and immediately indicate the issues in the records in the database. In the former case, there will be a latency in the database reflecting the issues, but false positive indications will be low, and true positive indications reliable. In the latter case, ancillary processing and analysis systems and remote communications will better reflect current status, but may have a high false positive rate with relatively lower quality of qualitative determinations. Of course, the processor may provide both types of output concurrently, with the target device for the database selecting which set of records is most appropriate. It is noted that the statistical model implemented by the processor may be adaptive and finely tuned, such that the processor has high discrimination of emergence of aberrant conditions, and therefore the ancillary devices may rely on determinations made by the processor.

In typical operation, the remote database is limited to receipt of stored records from the database, and therefore this scheme places high reliance on the local processor to detect deviations from normal. Therefore, in an additional mode of operation, error/anomaly logs which include unfiltered/raw data and messages may also be uploaded to the remote server for analysis.

The system may be used to improve efficiency of the vessel, and in a commercial context, profits from use of the vessel. A key cost of operation is marine fuel and the cost of that fuel, e.g., the unit cost of fuel, such as dollars per gallon, may be manually or automatically input. In an automatic system, a remote database may store fuel prices at various locations, and guide the user to lowest cost fuel as may be appropriate, bearing in mind the travel cost and time incurred. Other costs of operation include manpower cost, and for longer voyages, vessel costs and opportunity costs for a selected use of the vessel. Beyond an optimum speed, fuel efficiency of a vessel (miles or knots per gallon) declines rapidly. However, other costs of operating the vessel are time sensitive, and faster speeds may reduce overall mission duration. On the other hand, in some cases, the duration is not dependent on speed. By factoring in both fuel costs and an economic equivalent of urgency, a target "optimum" speed and fuel consumption may be calculated. This may be conveyed to the vessel operator, or provided as a self-optimizing throttle control, especially for cruising. The operating cost (or urgency benefit, especially for leisure boating) of the vessel per unit time requires external input to the system since the manpower cost or benefits may not be available through calculations. The system then calculates an estimated mission cost as a function of at least an estimated total fuel cost and an estimated total time cost, as a function of operating conditions of the vehicle over an operating range. That is, over a range of available and feasible operating conditions (including navigational choices), how much fuel will be consumed and how long will it take? Then the operating conditions may be optimized using this information to achieve a lowest estimated mission cost within the operating range. Typically, the output is a suggestion and not an automatically implemented control output. However, the system may be integrated within an autopilot system within safe and reasonable constraints. Automated control may be used, for example, to optimize relationship of the craft to wind, currents, other vessels, sea conditions and weather, etc. For example, the optimum is often expressed in terms of an engine RPM. However, depending on wind and currents, and also navigational route, this does not have a direct correspondence to time, which is an independent variable that impacts a cost-benefit optimization. Since many of these conditions cannot be known in advance, the control system may perform a real-time optimization of engine speed, and perhaps navigational route and other ship systems.

In some cases, the vessel is not only a commercial vessel, but the benefits (e.g., revenues) from operation are variable. For example, a fishing vessel has an optimum route and speed dependent on fuel costs, manpower costs and vessel costs (though these may be fixed), as well as anticipated catch. For example, the highest yield fishing area may be further from harbor than an alternate, yet require additional cruising time and additional fuel consumption to reach the fishery. If the vessel is to go at all to the anticipated high yield region, how fast should the vessel go to optimize the profits of the vessel? Therefore, using an optimization criterion, or multiple optimization criteria, the costs may be optimized (minimized), or the cost-benefit optimized (profit maximized).

Thus, according to one embodiment, a per unit fuel cost is input or determined, along with an estimated time cost function (e.g., how much does it cost per hour to run the vessel), and an estimated revenue function (e.g., what are the independent variables associated with vessel revenues). The processor then calculates an estimated mission profit dependent on at least an estimated total fuel cost, an estimated total time cost, and an estimated revenue, as a function of operating conditions of the vehicle. This typically takes the form of an equation or graph, of estimated mission profits, with the estimated total fuel cost, estimated total time cost, and estimated revenue being dependent on the operating conditions. Based on this function or graph, the operating conditions may then be optimized to achieve a highest profit as a function of the estimated revenue, the estimated total time cost and the estimated total fuel cost at the optimized operating conditions.

According to another embodiment, fuel cost parameters and estimated time cost parameters are received, and a range of estimated mission costs calculated comprising an estimated total fuel cost, and an estimated total time cost, as a function of a range of operating conditions of the vehicle. The operating conditions may then be optimized with respect to an optimization parameter and the estimated mission cost at the optimized operating conditions. The calculated range of estimated mission costs may be calculated dependent on a record of actual historical operating cost parameters for the vehicle. The range of estimated mission costs comprising an estimated total fuel cost, and an estimated total time cost, may be calculated as a function of a range of operating conditions of the vehicle dependent on a record of actual historical operating cost parameters for other vehicles.

The remote data telecommunication interface comprises a cellular telecommunication system. See, en.wikipedia.org/wiki/Cellular_network, en.wikipedia.org/wiki/Mobile-_broadband; en.wikipedia.org/wiki/3G, en.wikipedia.org/wiki/4G, en.wikipedia.org/wiki/5G.

The at least one telecommunication rule may comprise synchronizing the database with the remote database only over remote data telecommunication interface connections having a communication cost below a predetermined threshold. That is, complete synchronization preferably occurs where the communication costs are negligible or free. For example, shore WiFi, or wired Ethernet access typically has sufficiently low communications costs to permit a complete synchronization.

The at least one telecommunication rule may comprise transmitting a subset of the retrieved stored extracted information to the remote database over a metered remote data telecommunication interface connection, selectively in dependence on an estimated communication cost. That is, satellite data communications and metered cellular usage typically impose usage costs or caps that limit massive data communication usage, and therefore a communication mode is employed which incurs communication costs as required. See, en.wikipedia.org/wiki/Satellite_phone; en.wikipedia.org/wiki/Satellite_Internet_access.

The at least one telecommunication rule may comprise communicating portions of the retrieved stored extracted information with the remote database over one of a plurality of a remote data telecommunication interface connections in dependence a telecommunication cost and at least one of a connection speed, a connection reliability, and a connection availability. The at least one automated processor may be configured to communicate a quantity of data over the remote data telecommunication interface selectively dependent on a data communications cost. For example, where options such as cellular data access, satellite communications, and VHF data communications are available, the speed, cost and reliability of each option may be weighed, in determining which option to employ.

The at least one automated processor is configured to perform data compression and cryptographic processing of the retrieved stored extracted information. This permits secure connections, using SSL or VPN technology, or simply encrypted data files or packets, and minimizes communications burdens.

The system may receive at least one profile through the remote data telecommunication interface, and to propose the change in the current operating parameter based on at least the received profile. For example, the fuel formulation and volatility (especially for gasoline) may vary seasonally. The change in characteristics may be communicated from a remote central server to the device, so that the device can alter its processing based on the changed composition. Other types of profiles may be communicated, and used by the local processor accordingly.

The at least one automated processor may be configured to propose an optimum change in the current operating parameter. Typically, an optimum condition is with respect to an optimization criterion, which may be stated or implied. For example, a cost optimization typically strictly minimizes cost, while a cost-benefit optimization must consider benefits, which may be non-economic in nature or subject to some discretion or external inputs.

The system may communicate with another vehicle monitoring system through communications through the remote data telecommunication interface or by direct communications through a radio transceiver.

The system is not limited to being a listener on the controller area network, and may use the network for its own communications, and to emit control messages. For example, the system may communicate messages to other cooperative system components, may transmit the structured query to the structured query language database interface through the controller area network bus, transmit sensor data to the structured query language database interface through the controller area network bus, communicate with the remote data telecommunication interface through the controller area network bus, and/or communicate with a memory storing the at least one statistical model through the controller area network bus.

Similarly, the system may use a wireless network, e.g., a personal area network interface, and a local area network interface, to communicate with various system components, such as sensors and a memory storing the at least one statistical model. The at least one statistical model may comprise a statistical model configured to statistically filter outlier data. The system may receive input(s) representing at least one of a real-time water speed, a wind speed, and a load of the vehicle. Other sensors may also be provided. Likewise, actuators, both on the controller area network bus and off of it may communicate with the system.

It is therefore an object to provide a vehicle monitoring system, comprising: an interface configured to communicate with a vehicle communication bus configured for at least communicating real-time control and status messages to a vehicle propulsion system; a nonvolatile memory; a global navigation satellite system receiver configured to determine a geolocation of the vehicle; a remote data telecommunication interface; a database interface for access of a database stored in the nonvolatile memory; and at least one automated processor, configured to: monitor the vehicle communication bus for messages; filter the messages, and extract information from the filtered messages; store at least a portion of the extracted information in the database in conjunction with time information, and the geolocation information; generate a query to the database interface to retrieve the stored extracted information; execute at least one telecommunication rule with respect to a selective communication of at least a portion of the database over the remote data telecommunication interface to a remote system; and indicate at least one of: a predicted net fuel consumption, and a proposed change in a current operating parameter for the vehicle based on the determined geolocation, at least one of a mission constraint, the database, and a parameter selected from at least one of: a predicted fuel consumption, a predicted non-fuel cost of operations for the vehicle, and a predicted non-fuel net benefit of operations of the vehicle.

The at least one automated processor may be further configured to receive a remotely received proposed change in a current operating parameter for the vehicle through the remote data telecommunication interface, wherein the remotely received proposed change in a current operating parameter is dependent on a remote database of operational parameters for a plurality of vehicles.

The vehicle may be a marine vessel.

The system may further comprise a wireless interface comprising at least one of a personal area network interface, and a local area network interface, wherein the at least one automated processor is configured to receive sensor data through the wireless interface, and include the sensor data with the extracted information in the database in conjunction with the time information and the geolocation information.

The telecommunication rule may comprise a telecommunications cost-sensitive telecommunication rule. The remote system may comprise a cloud database. The at least one telecommunication rule may comprise communicating at least a portion of the database to the remote system dependent on a communication cost.

The at least one automated processor may be further configured to: extract engine and fuel information from the messages on the vehicle communication bus; aggregate the engine and fuel information into periodic records; and store the periodic records as the extracted information in the database.

The vehicle communication bus may comprise a CAN bus.

The system may further comprise an input configured to receive a fuel cost per unit and an estimated time cost, wherein the at least one automated processor is further configured to at least one of:

calculate an estimated mission cost as a function of at least an estimated total fuel cost and an estimated total time cost, as a function of operating conditions of the vehicle over an operating range, and optimize the operating conditions to achieve a lowest estimated mission cost within the operating range;

calculate an estimated mission profit based on at least an estimated total fuel cost, an estimated total time cost, and an estimated revenue, as a function of operating conditions of the vehicle, and optimize the operating conditions to achieve a highest mission profit as a function of the estimated revenue, the estimated total time cost and the estimated total fuel cost at the optimized operating conditions; or calculate an estimate of a range of mission costs comprising an estimated total fuel cost, and an estimated total time cost, as a function of a range of operating conditions of the vehicle, and optimize the operating conditions with respect to an optimization parameter and the estimated mission cost at the optimized operating conditions. the calculated estimate may be dependent on a record of actual historical operating cost parameters for the vehicle. The calculated estimate may be dependent on a record of actual historical operating cost parameters for other vehicles.

The at least one automated processor may be further configured to communicate through the remote data telecommunication interface with a corresponding remote data telecommunication interface of another vehicle. The at least one automated processor may be further configured to transmit at least one message through the vehicle communication bus. The at least one automated processor may be further configured to communicate with the remote data telecommunication interface through the vehicle communication bus. The at least one automated processor may be further configured to process the extracted information with respect to at least one statistical model, to indicate the proposed change in the current operating parameter for the vehicle.

The database may comprise a structured query language database, and the query may comprise a structured query language query, and at least one automated processor is further configured to transmit at least one of the structured query language query and the extracted information to the database interface through the vehicle communication bus.

It is a further object to provide a vehicle monitoring method, comprising: communicating messages with a vehicle communication bus configured for at least communicating real-time control and status messages to a vehicle propulsion system; receiving a real-time geolocation of the vehicle; extracting information from the vehicle communication bus; storing records in a database representing extracted information, a time, and a geolocation associated with the extracted information; selectively communicating at least a portion of the database over a remote data telecommunication interface; and determining at least one of an operating parameter for the vehicle and a predicted net fuel consumption based on at least operating statistics of the vehicle derived from the database.

It is a still further object to provide a vehicle monitoring method, comprising: communicating with a vehicle communication bus configured for at least communicating real-time control and status messages to a vehicle propulsion system; determining a geolocation of the vehicle; monitoring the vehicle communication bus for messages; filtering the messages, and extracting information from the filtered messages; storing at least a portion of the extracted information in a database in conjunction with time information, and the geolocation; generating a query to the database to retrieve the stored extracted information; applying at least one telecommunication rule with respect to a selective communication of at least a portion of the database over a remote data telecommunication interface to a remote system; and indicating at least one of: a predicted net fuel consumption, and a proposed change in a current operating parameter for the vehicle based on the determined geolocation, at least one of a mission constraint, the database, and a parameter selected from at least one of: a predicted fuel consumption, a predicted non-fuel cost of operations for the vehicle, and a predicted non-fuel net benefit of operations of the vehicle. The data derived from the extracted information may be transmitted to a cloud server using secure reliable communications through the remote data telecommunication interface to provide a forensically reliable virtual black box.

It is also an object to provide a vehicle monitoring system, comprising: an interface configured to communicate with a controller area network bus; a nonvolatile memory; a global navigation satellite system receiver configured to determine a geolocation of the vehicle; a remote data telecommunication interface; a structured query language database interface for a database stored in the nonvolatile memory; and at least one automated processor, configured to: monitor the controller area network interface bus for messages; filter the messages, and extract information messages from the filtered messages; store at least a portion of the extracted information in the database in conjunction with time information, and the geolocation information; generate a structured query to the structured query language database interface to retrieve the stored extracted information; optionally process the retrieved stored extracted information with respect to at least one statistical model; execute at least one telecommunication rule with respect to a selective communication of at least a portion of the stored extracted information over the remote data telecommunication interface to a remote database; in a local analysis mode, propose a change in a current operating parameter for the vehicle based on at least the extracted information messages, the determined geolocation, a predicted fuel cost, optionally the statistical model, and at least one of a mission constraint, a non-fuel cost of operations for the vehicle, and a non-fuel net benefit of operations of the vehicle; and in a remote analysis mode, receive a message through the remote data telecommunication interface of a proposed change in a current operating parameter for the vehicle based on at least a database of operational parameters for a plurality of vehicles, the extracted information messages in the remote database, the determined geolocation, a predicted fuel cost, and at least one of a mission constraint, a non-fuel cost of operations for the vehicle, and a non-fuel net benefit of operations of the vehicle.

The vehicle may be a marine vessel. The telecommunication rule may comprise a telecommunications cost-sensitive telecommunication rule. The remote data telecommunication interface may comprise a satellite radio communication system interface. The remote data telecommunication interface may comprise an interface to the Internet. The cloud database may be accessible through the Internet. The remote data telecommunication interface may comprise a cellular telecommunication system. The at least one automated processor may be configured to perform data compression and cryptographic processing of the retrieved stored extracted information. The system may receive an input representing at least one of a real-time water speed, a wind speed, and a load of the vehicle.

The system may further comprise at least one of a personal area network interface, and a local area network interface, wherein the at least one automated processor receives sensor data through the at least one of the personal area network interface and the local area network interface, and includes the sensor data with the extracted information in the database in conjunction with the time information and the geolocation information.

The selective communication of the at least a portion of the stored extracted information over the remote data telecommunication interface may communicate the at least a portion of the stored extracted information to a cloud database.

The system may further comprise at least one of a personal area network interface, and a local area network interface, wherein the at least one automated processor is further configured to provide a human user interface to a portable interface device by communications through the at least one of the personal area network interface and the local area network interface.

The at least one automated processor may be further configured to: extract at least all engine and fuel information from the messages on the controller area network interface bus; aggregate the at least all engine and fuel information into periodic records; and store the periodic records as the extracted information in the database.

The system may further comprise an input configured to receive a fuel cost per unit and an estimated time cost, wherein the at least one automated processor is further configured to: calculate an estimated mission cost as a function of at least an estimated total fuel cost and an estimated total time cost, as a function of operating conditions of the vehicle over an operating range, and optimize the operating conditions to achieve a lowest estimated mission cost within the operating range.

The system may further comprise an input configured to receive a fuel cost per unit, an estimated time cost function, and an estimated revenue function, wherein the at least one automated processor is further configured to: calculate an estimated mission profit based on at least an estimated total fuel cost, an estimated total time cost, and an estimated revenue, as a function of operating conditions of the vehicle, and optimize the operating conditions to achieve a highest mission profit as a function of the estimated revenue, the estimated total time cost and the estimated total fuel cost at the optimized operating conditions.

The system may further comprise an input configured to receive fuel cost parameters and estimated time cost parameters, wherein the at least one automated processor is further configured to: calculate a range of estimated mission costs comprising an estimated total fuel cost, and an estimated total time cost, as a function of a range of operating conditions of the vehicle, and optimize the operating conditions with respect to an optimization parameter and the estimated mission cost at the optimized operating conditions. The calculated range of estimated mission costs comprising an estimated total fuel cost, and an estimated total time cost, as a function of a range of operating conditions of the vehicle may be dependent on a record of actual historical operating cost parameters for the vehicle. The calculated range of estimated mission costs comprising an estimated total fuel cost, and an estimated total time cost, as a function of a range of operating conditions of the vehicle may be dependent on a record of actual historical operating cost parameters for other vehicles.

The at least one telecommunication rule may comprise synchronizing the database with the remote database only over remote data telecommunication interface connections having a communication cost below a predetermined threshold. The at least one telecommunication rule may comprise transmitting a subset of the retrieved stored extracted information to the remote database over a metered remote data telecommunication interface connection, selectively in dependence on an estimated communication cost. The at least one telecommunication rule may comprise communicating portions of the retrieved stored extracted information with the remote database over one of a plurality of a remote data telecommunication interface connections in dependence a telecommunication cost and at least one of a connection speed, a connection reliability, and a connection availability.

The at least one automated processor may be further configured to communicate a quantity of data over the remote data telecommunication interface selectively dependent on a data communications cost. The at least one automated processor may be further configured to receive at least one profile through the remote data telecommunication interface, and to propose the change in the current operating parameter based on at least the received profile. The at least one automated processor may be further configured to propose an optimum change in the current operating parameter. The at least one automated processor may be further configured to communicate with another vehicle monitoring system through communications through the remote data telecommunication interface.

The system may further comprise a radio transceiver, wherein the at least one automated processor is further configured to communicate with another vehicle monitoring system by direct communications through the radio transceiver.

The at least one automated processor may be configured to transmit at least one message to an automated processor system through the controller area network bus, to communicate the structured query to the structured query language database interface, sensor data to the structured query language database interface, information with the remote data telecommunication interface through the controller area network bus, information to or from a memory storing the at least one statistical model through the controller area network bus, and/or information to or from a memory storing the at least one statistical model through at least one of a personal area network interface, and a local area network interface.

The at least one statistical model may comprises a statistical model executing on the at least one automated processor configured to statistically filter outlier data.

It is also an object to provide a vehicle monitoring system, comprising: an interface configured to at least communicate with a controller area network bus; an input configured to receive a determined real-time geolocation of the vehicle; a remote data telecommunication interface; a database; at least one automated processor, configured to: extract information from the controller area network bus; store records in the database representing the extracted information, a time, and the real-time geolocation; selectively communicate at least a portion of the database over the remote data telecommunication interface; and determine at least one of an operating parameter for the vehicle and a predicted net fuel cost based on at least the operating statistics and a fuel unit cost. The information in the database may be processed to determine operating statistics.

The vehicle may be a marine vessel. The determined real-time geolocation of the vehicle may comprise a global navigation satellite system receiver configured to determine a geolocation of the vehicle. The database may comprise a structured query language database interface for a database stored in nonvolatile memory. The at least one automated processor may be further configured to monitor the controller area network interface bus for messages, and to filter the monitored messages. The at least one automated processor may be further configured to generate a structured query to the structured query language database interface to access the stored extracted information. The at least one automated processor may be further configured to process the database with respect to at least one statistical model. The at least one automated processor may be further configured to execute at least one telecommunication rule with respect to a selective communication of at least a portion of the database over the remote data telecommunication interface to a remote database. The at least one automated processor may be further configured to, in a local analysis mode, propose a change in a current operating parameter for the vehicle based on at least a statistical model, extracted information, the determined real-time geolocation, a predicted fuel cost, and at least one of a mission constraint, a non-fuel cost of operations for the vehicle, and a non-fuel net benefit of operations of the vehicle. The at least one automated processor is further configured to, in a remote analysis mode, receive a message through the remote data telecommunication interface of a proposed change in a current operating parameter for the vehicle based on at least a database of operational parameters for a plurality of vehicles, the extracted information in the remote database, the determined real-time geolocation, a predicted fuel cost, and at least one of a mission constraint, a non-fuel cost of operations for the vehicle, and a non-fuel net benefit of operations of the vehicle. The telecommunication rule may comprise a telecommunications cost-sensitive telecommunication rule. The at least one automated processor may be further configured to selectively communicate a portion of the stored extracted information over the remote data telecommunication interface to a cloud database. The cloud database may be accessible through the Internet. The remote data telecommunication interface may comprise a cellular telecommunication system. The at least one automated processor is configured to perform data compression and cryptographic processing of the extracted information. The at least one automated processor may be further configured to receive an input representing at least one of a real-time water speed, a wind speed, and a load of the vehicle. The at least one automated processor may be further configured to statistically filter outlier information from the controller area network bus dependent on a statistical data model.

The system may further comprise at least one of a personal area network interface, and a local area network interface, wherein the at least one automated processor is configured to receive sensor data through the at least one of the personal area network interface and the local area network interface, and to include the received sensor data with the extracted information in the database in conjunction with the time information and the real-time geolocation information.

The remote data telecommunication interface may comprise a satellite radio communication system interface. The remote data telecommunication interface may comprise an interface to the Internet.

The system may further comprise at least one of a personal area network interface, and a local area network interface, wherein the at least one automated processor is further configured to provide a human user interface to a portable interface device by communications through the at least one of the personal area network interface and the local area network interface.

The at least one automated processor may be further configured to: extract at least all engine and fuel information from the messages on the controller area network interface bus; aggregate the at least all engine and fuel information into periodic records; and store the periodic records as the extracted information in the database.

The system may further comprise an input configured to receive a fuel cost per unit and an estimated time cost, wherein the at least one automated processor is further configured to: calculate an estimated mission cost as a function of at least the estimated total fuel cost and the estimated total time cost, over an operating range of operating conditions of the vehicle, and optimize the operating conditions to achieve a lowest estimated mission cost within the operating range. The system may further comprise an input configured to receive a unit fuel cost, an estimated time cost function, and an estimated revenue function, wherein the at least one automated processor is further configured to: calculate an estimated mission profit function representing an estimated total fuel cost, an estimated total time cost, and an estimated revenue, as a function of operating conditions of the vehicle, and optimize the operating conditions to achieve a highest mission profit as a function of the estimated revenue, the estimated time cost, and the estimated total fuel cost at the optimized operating conditions. The system may further comprise an input configured to receive fuel cost parameters and estimated time cost parameters, wherein the at least one automated processor is further configured to: calculate an estimated mission cost function comprising an estimated total fuel cost, and an estimated total time cost, responsive to a range of operating conditions of the vehicle, and optimize the operating conditions with respect to an optimization parameter and the estimated mission cost at the optimized operating conditions. The calculated estimated mission cost may be dependent on a record of actual historical operating cost parameters for the vehicle and/or for other vehicles.

The at least one automated processor may be further configured to control communication through the remote data telecommunication interface in dependence on at least one communication-cost dependent telecommunication rule. The at least one automated processor may be further configured to control communications through the remote data telecommunication interface selectively in dependence a telecommunication cost and at least one of a connection speed, a connection reliability, and a connection availability. The at least one automated processor may be further configured to selectively communicate a quantity of data over the remote data telecommunication interface based on a data communications cost. The at least one automated processor may be further configured to determine an optimum state for the operating parameter.

The at least one automated processor may be further configured to receive at least one profile through the remote data telecommunication interface, and to determine the at least one of an operating parameter for the vehicle and the predicted net fuel cost further based on at least the received profile.

The at least one automated processor may be further configured to communicate with another vehicle monitoring system through communications through the remote data telecommunication interface or to communicate with another vehicle monitoring system by direct communications through a radio transceiver.

The at least one automated processor may be further configured to transmit at least one message to an automated processor system through the controller area network bus, to transmit a request for information from the database through the controller area network bus, to transmit sensor data to the database through the controller area network bus, and/or to communicate with the remote data telecommunication interface through the controller area network bus.

It is another object to provide a vehicle monitoring method, comprising: communicating messages with a controller area network bus; receiving a real-time geolocation of the vehicle; extracting information from the controller area network bus; storing records in a database representing extracted information, a time, and the real-time geolocation; selectively communicating at least a portion of the database over a remote data telecommunication interface; and determining at least one of an operating parameter for the vehicle and a predicted net fuel cost based on at least the operating statistics and a fuel unit cost. The database may be processed to determine operating statistics.

The software system may be distributed across a number of software units i.e. fronts, database servers, application servers, and a master. The software units may be executed on the same physical hardware, and/or distributed across hardware in combinations and sub-combinations as required. The distributed hardware may communicate over a high-speed data backbone. The high-speed data backbone may be secured from external networks. The distributed hardware may communicate with further groups of hardware, distributed or otherwise. Groups of inter-communicating hardware may have one or more remote telecommunication interface, and may communicate with a remote server via the at least one remote telecom interface. The fronts may communicate with external networks, sensors, actuators/controller, and/or telecom devices, over wired or wireless networks. In one embodiment, such communications is limited to the fronts, and other devices are restricted from direct access to the communication network. The fronts therefore may act as proxy servers, routers or firewalls.

The processor may be further programmed to execute applications based on a known framework, which may include database access functions, user alerts, notification functions, a web server, and/or web based data access functions (webservices API). In a vessel-based implementation, the application framework can access remote servers' databases and/or processing units. The application framework may include a protocol for synchronization between a local and remote database. This synchronization may be prioritized, and may have configurable data priority for higher or lower importance data.

The at least one automated processor may comprise a plurality of processors, each provided with a separate respective interface configured to communicate with the vehicle communication bus, and intercommunicating with each other through the vehicle communication bus. Similarly, in a method according to the invention, said determining at least one of the operating parameter for the vehicle and the predicted net fuel consumption based on at least operating statistics of the vehicle derived from the database may be performed by a plurality of automated processors, each having a respective interface to the vehicle communication bus, and communicating with each other through the vehicle communication bus. The various steps, and aspects of a single step, of the method may be distributed across a plurality of separate automated processors, each having a respective interface to the vehicle communication bus, the plurality of separate automated processors intercommunicating through the vehicle communication bus. A plurality of processors may also be provided which intercommunicate using a separate communication network, which may be isolated from the vehicle communication bus.

The software system may be used to provide a remote virtual "black box" for storage of forensically valuable information which may be analyzed to determine the state of the system at the time of an incident. This requires real-time communication of data, since in event of a catastrophic event, the latency before the software system becomes unavailable to transmit data may be short. Therefore, a reliable communication modality, such as satellite data communications may be used. However, such communications have limited bandwidth, and have metered data charges. Therefore, the transmitted data is preferably compressed and may be pre-processed by a filter, analyzer, machine learning algorithm, statistical process or model, neural network, etc., to extract and prioritize communication of useful information. Full database synchronization and replication may be deferred in some cases until lower cost and/or higher bandwidth communications are available. In some cases, fault tolerant communications may be used, such as mesh networks and mobile ad hoc communication networks, which can bypass expensive or unavailable infrastructure. When communicating across non-private networks, encryption and various web technologies may be employed.

See, U.S. Pat. Nos. 6,169,992; 7,590,589; 7,801,058; 7,983,835; 8,027,273; 8,060,017; 8,085,686; 8,194,541; 8,228,954; 8,255,469; 8,280,009; 8,351,861; 8,370,863; 8,397,065; 8,411,590; 8,498,224; 8,509,431; 8,515,409; 8,533,803; 8,571,519; 8,600,830; 8,626,844; 8,761,008; 8,768,492; 8,803,089; 8,822,924; 8,839,347; 8,843,127; 8,848,721; 8,856,252; 8,874,477; 8,886,948; 9,025,607; 9,026,235; 9,055,105; 9,059,929; 9,059,942; 9,063,165; 9,075,146; 9,090,295; 9,100,989; 9,103,920; 9,112,788; 9,115,989; 9,141,618; 9,143,912; 9,166,845; 9,171,079; 9,178,829; 9,185,521; 9,185,560; 9,218,609; 9,225,760; 9,225,793; 9,231,904; 9,246,794; 9,258,208; 9,264,243; 9,264,892; 9,275,093; 9,277,400; 9,277,477; 9,295,922; 9,311,670; 9,338,086; 9,344,512; 9,350,809; 9,359,018; 9,371,099; 9,407,624; 9,412,208; 9,417,331; 9,417,691; 9,418,339; 9,424,608; 9,429,661; 9,429,926; 9,436,449; 9,450,760; 9,456,302; 9,460,228; 9,462,040; 9,467,533; 9,467,925; 9,485,210; 9,485,673; 9,495,401; 9,549,364; 9,563,771; 9,590,790; 9,591,087; 9,591,451; 9,613,011; 9,614,964; 9,618,222; 9,632,664; 9,634,928; 9,639,623; 9,645,709; 9,665,662; 9,667,501; 9,668,103; 9,679,072; 9,679,336; 9,690,559; 9,692,756; 9,692,878; 9,693,375; 9,703,670; 9,705,751; 9,712,486; 9,715,496; 9,730,017; 9,733,975; 9,734,473; 9,747,440; 9,747,663; 9,749,410; 9,756,050; 9,756,549; 20060095199; 20060167784; 20070087756; 20080025330; 20080072261; 20090085769; 20090122797; 20090252134; 20100074141; 20100100899; 20100142421; 20100142445; 20100142446; 20100142447; 20100142448; 20100150120; 20100235285; 20100285774; 20100302945; 20100302947; 20100304759; 20100306320; 20100316033; 20100317420; 20110004513; 20110019652; 20110103393; 20110210816; 20110223937; 20110238751;

20110273568; 20110289520; 20120063436; 20120083303; 20120101900; 20120106428; 20120134287; 20120135723; 20120197988; 20120230370; 20120243408; 20120257624; 20120300758; 20120309417; 20120310975; 20120311657; 20120314660; 20120329384; 20130039433; 20130066891; 20130103765; 20130143529; 20130143535; 20130151563; 20130166726; 20130176334; 20130179576; 20130250969; 20130310951; 20130320212; 20130325357; 20130336316; 20140018097; 20140047322; 20140067758; 20140081793; 20140114554; 20140114555; 20140172946; 20140180439; 20140185499; 20140222729; 20140263989; 20140264047; 20140268601; 20140269514; 20140277613; 20140285519; 20140293928; 20140299783; 20140310349; 20140312242; 20140349684; 20140362847; 20150010153; 20150016248; 20150081247; 20150111591; 20150113172; 20150128205; 20150188949; 20150192682; 20150231524; 20150264138; 20150264626; 20150264627; 20150268355; 20150268936; 20150268949; 20150269130; 20150269383; 20150286663; 20150288622; 20150319170; 20150324568; 20150331398; 20150338525; 20150363563; 20160016096; 20160027054; 20160029182; 20160050159; 20160055225; 20160087933; 20160094398; 20160100035; 20160103585; 20160104005; 20160112262; 20160117195; 20160117318; 20160119244; 20160119246; 20160134554; 20160142901; 20160150575; 20160154113; 20160154864; 20160156450; 20160180500; 20160182170; 20160182531; 20160184710; 20160187491; 20160187492; 20160187493; 20160188350; 20160189281; 20160191474; 20160195602; 20160196131; 20160196132; 20160196198; 20160217217; 20160224951; 20160226732; 20160241403; 20160255161; 20160275190; 20160277469; 20160285880; 20160291940; 20160291959; 20160294493; 20160294605; 20160294614; 20160301546; 20160328526; 20160329965; 20160330074; 20160330140; 20160330613; 20160335731; 20160337206; 20160337346; 20160342935; 20160354039; 20160358479; 20160366553; 20160381087; 20170005515; 20170006009; 20170006034; 20170006135; 20170008162; 20170011010; 20170011210; 20170012857; 20170025000; 20170026157; 20170026472; 20170026893; 20170039038; 20170041271; 20170041304; 20170041381; 20170041388; 20170046366; 20170054594; 20170063566; 20170063967; 20170063968; 20170078398; 20170080332; 20170083585; 20170085446; 20170085447; 20170086281; 20170087453; 20170093645; 20170093687; 20170093848; 20170110784; 20170118307; 20170124193; 20170124562; 20170126741; 20170132194; 20170139996; 20170149937; 20170164264; 20170168472; 20170171359; 20170171715; 20170176034; 20170180567; 20170195166; 20170201504; 20170201521; 20170206034; 20170220633; 20170220651; 20170220672; 20170220685; 20170220938; 20170221463; 20170223030; 20170227965; 20170230800; 20170245096; 20170251325; 20170256007; and 20170257257; which are each expressly incorporated herein by reference in their entirety.

DETAILED DESCRIPTION OF THE PREFERRED EMBODIMENTS

A preferred implementation of the technology provides an enclosure having connectors which electrically interface with a controller area network of a marine vessel, having an embedded computer which executes an operating system, such as Linux, having a sufficient amount of flash storage to store a database and programs, and having power requirements supported by a vessel based power supply. Such an embedded computing system, known in the art as a gateway or Edge device, will be referred to here as a DataHub.

It is noted that the preferred implementation is not limited to maritime applications, and may be used in cars, trucks, light and heavy industrial equipment, rail, aircraft, robotics, and other systems. As such, the various features of such systems disclosed in the incorporated reference may advantageously be combined with the additional features, combinations and sub-combinations of features provided herein.

Figure 1:
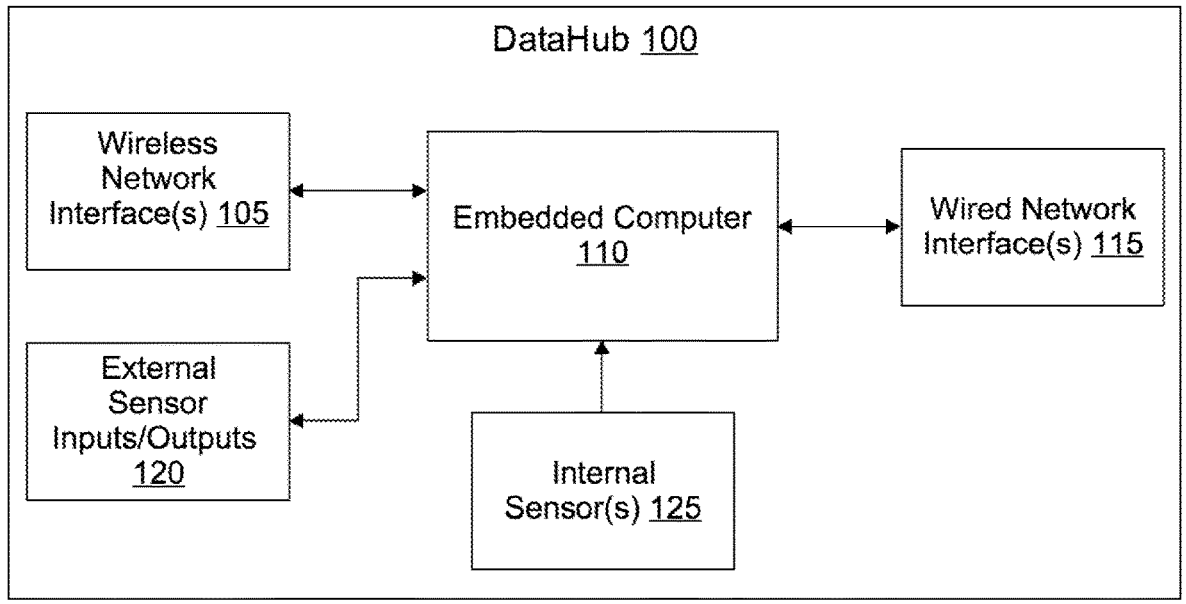
FIG. 1 shows a system architecture, including internal sensors, external sensor inputs/outputs and network interfaces.

In the preferred embodiment, data collection, aggregation, analysis, storage, and communication is accomplished by one or more DataHubs. FIG. 1 shows the DataHub system architecture 100, including internal sensors 125 (e.g. Global Positioning System (GPS), accelerometer, magnetometer, barometer, etc.), external sensor inputs/outputs 120 (e.g. analog or digital input/output) for connection to individual sensors (e.g. thermocouples, resistance temperature detectors, pressure transducers/switches, etc.), and wired network interfaces 115 (e.g. CAN bus, Ethernet, Serial, etc.) for standard marine networks, engine interfaces, or integrated data generating devices such as Radar, LIDAR, sonar, etc. The DataHub 100 may also incorporate one or more radio or telecommunication interface(s) 115 implementing IEEE 802.11 Wi-Fi, IEEE 802.15 Bluetooth, and/or any of a number of cellular/satellite protocols.

Figure 2:
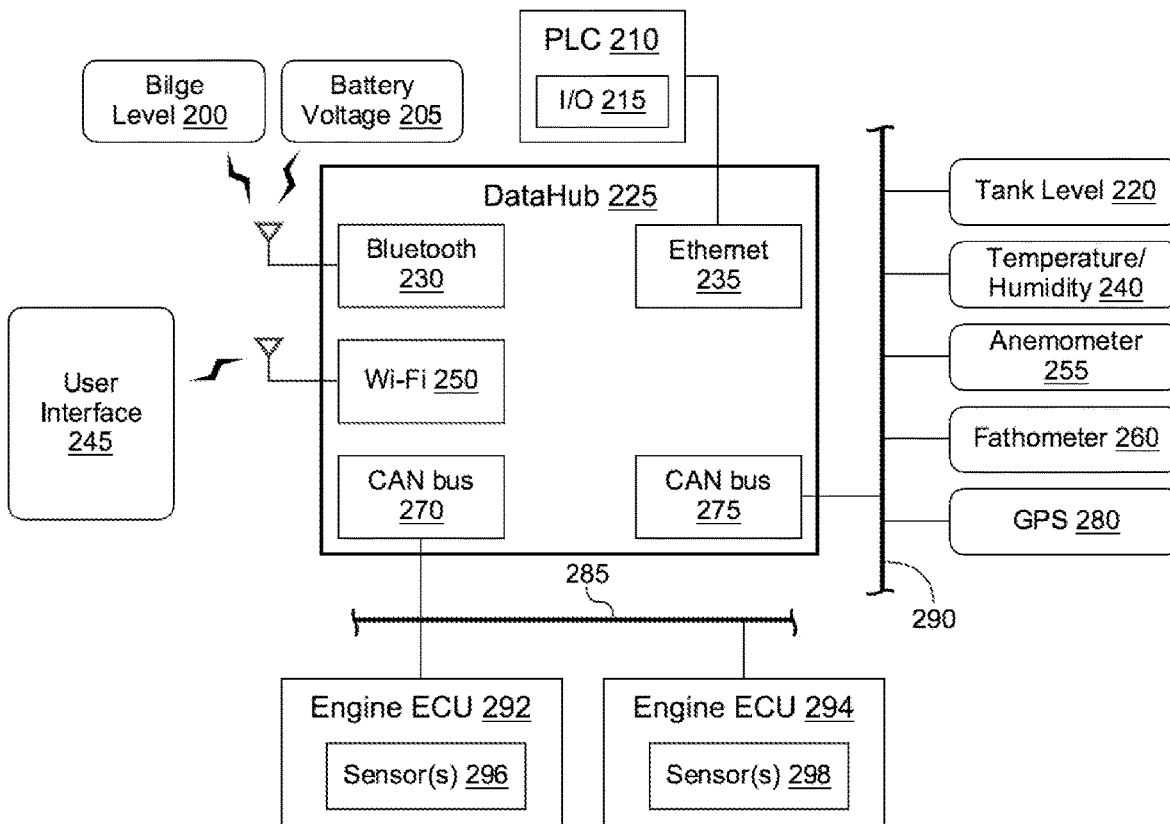
FIG. 2. shows a detailed embodiment of an example system according to the present invention.

FIG. 2. shows a detailed embodiment of an example system. In the embodiment, one CAN bus interface 275 provides communication with an NMEA 2000 network 290, including a fuel tank level sensor 220, a temperature and humidity sensor 240, an anemometer 255, a fathometer 260, and a GPS 280. A second CAN bus interface 270 connects to one or more engine ECUs 292, 294 over controller area network 285 using the SAE J1939 communication protocol, providing a multitude of sensors 296, 298 including engine revolutions per minute (RPM), engine load, fuel flow, fuel pressure, oil temperature and pressure, coolant temperature and pressure, battery voltage, and other parameters.

In an embodiment, an Ethernet interface 235 communicates with a Programmable Logic Controller (PLC) or similar real-time or near real-time device(s) 210, which may incorporate, act upon, or interface with its own inputs and/or outputs 215. Communication with such a real-time or near real-time system(s) may occur via MODBUS TCP, Ethernet/IP, EtherCat, BACnet, or another Ethernet based protocol(s). Since the DataHub 225 may interface with multiple real-time or near real-time systems and is not necessarily constrained to real-time performance, in an embodiment, the DataHub 225 may act as a high level interface, configuration store, analysis processor, or task executor etc. for one or multiple, disparate or connected real-time or near real-time systems.

In an embodiment, the integrated Bluetooth interface 230 communicates with additional sensors, for example bilge level 200 and battery voltage sensors 205. A LAN/PAN interface 250 (e.g. Bluetooth, Wi-Fi, Ethernet, etc.) may also allow for interaction with a user interface device 245, which may be a tablet or other computer interface.

Figure 3:
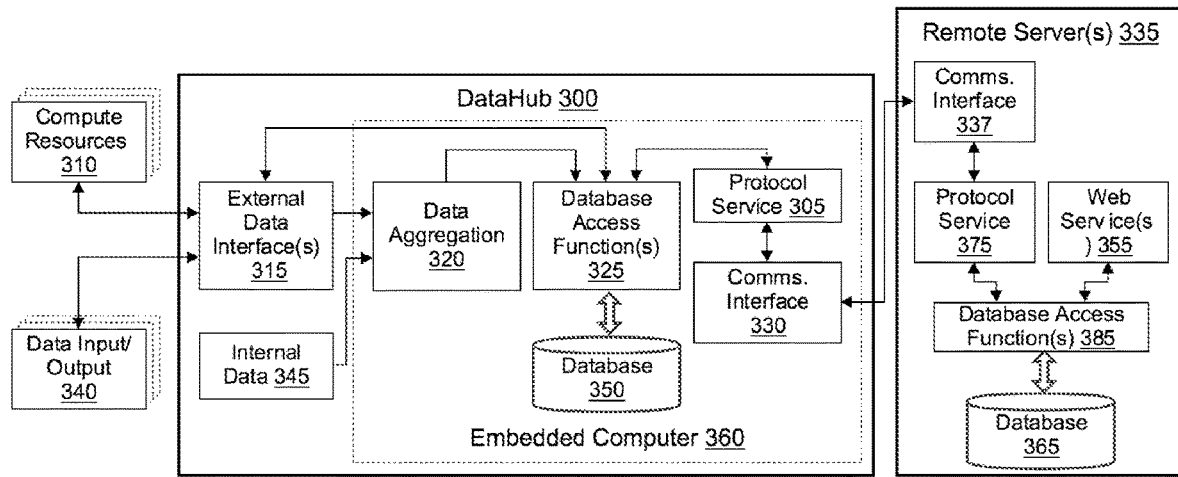
FIG. 3 shows a data flow architecture for the system according to the present invention.

In an embodiment, a multitude of input sources transmit data to the DataHub, which collects, aggregates, processes, and/or stores that data or an appropriate subsection thereof. FIG. 3 shows a data flow architecture for the implemented system. Internal input data 345 (e.g. real-time clock, GPS, accelerometer, etc.) and external input data 340 (Bluetooth sensors, engine data, NMEA 2000 data from vehicle systems, etc.) are stored as periodic records in the Database 355 via the requisite Database Access Functions 325.

In an implementation, the Database 350 and associated Database Access Function(s) 325 act as the storage and retrieval mechanism for both raw and processed sensor data as well as historic, partitioned, and predicted data. The Database 350 may or may not be partitioned and can consist of separate historic, current, and analysis databases as needed. User and vessel metadata, configuration data, alert and notification data, and other types of data and metadata as applicable may also be stored. In an embodiment, a variety of computing resources, including the embedded computer 360 or other vehicle-based computer resources 310 may request data from the local Database 350 via the Database Access Function(s) 325. That data may then be analyzed, processed, or further manipulated locally (i.e. on the vehicle) or transmitted, using a multitude of telecommunication interfaces 330 (e.g. Wi-fi, cellular, satellite, etc.) to a remote server 335 (e.g. a cloud database) through the local 305 and remote 375 Protocol Service.

In an implementation, the Protocol Service 305, 375 provides secure communications between a Datahub(s) 300 and a remote server(s) 335 or between a Datahub(s) 300 and an additional Datahub(s) 300 as necessary. The transmitted data may be compressed to save bandwidth. Transport security may be implemented via software encryption protocols such as the Secure Sockets Layer (SSL) and/or Transport Layer Security (TLS) and/or an application specific integrated circuit (ASIC) or other circuitry implementing encryption and/or other cryptographic functionality.

In an embodiment, the Protocol Service 305, 375 may enable application level, bi-directional communication and synchronization of a Database(s) 350 between a DataHub(s) 300 and a remote database(s) 365. The Protocol Service 305, 375 may provide synchronization of device metadata such as DataHub 300 configuration changes initiated from one of a remote or a local user interface(s) and DataHub 300 performance statistics. The Protocol Service 305, 375 may enable message passing, be they alerts, digital input state changes, control messages etc., between a Datahub(s) 300 and a remote server(s) 335 or between a Datahub(s) 300 and an additional Datahub(s) 300 as necessary.

In an embodiment, the Protocol Service 305, 375 is a service executed on DataHubs 300 and remote servers 335, functioning as both a client and a server. In a client role, the service queries a local Database 350 for data, commands, or messages to be communicated to a remote server(s) 335 and attempts to send until successful. In a server role, the service listens for data, commands, or messages and if received, stores them and responds to the client with success or failure status for each data, command, or message. The client service updates its local Database 350 to indicate which records were successfully communicated to the server. Since the relationships between devices and cloud is bi-directional, DataHubs 300 and remote servers 335 can act as Protocol Service 305, 375 clients or servers simultaneously and communicate messages between one or many, potentially disparate systems.

In an embodiment, the Protocol Service 305, 375 enables a human or automated system to issue functional or diagnostic commands to be executed on a remote DataHub(s) 300. In the case of commands or data to be sent to remote assets, which may have intermittent connectivity, these commands or data may be queued and retried until such time as the remote system becomes connected. An expiration time may be configured after which attempts to send certain commands or data would cease.

In an implementation, data priority may or may not be configured in the Protocol Service 305, 375. As an example, raw sensor data may be deemed low priority and transmitted to a remote server(s) 335 over a low-cost cellular network when and as connectivity becomes available; alert and/or notification data, however, may be deemed high priority and transmitted to a remote server(s) 335 as soon as feasible using a high-cost, high-availability satellite network.

In an implementation, data stored in a remote database(s) 365 can enable web services 355 such as workflow automation, vehicle reporting, long-term storage of vehicle data or multiple vehicles' data, and a real-time data access from an Internet connected computer.

In an embodiment, the DataHub provides or has access to a multitude of telecommunications interfaces 330, and thus may be used as a remote communications hub for the vehicle as a whole. Communication routing rules may be stored in the local Database 350 or generally in non-volatile memory on the Embedded Computer 360 or elsewhere. The execution of these routing rules by the Datahub(s) 300 enables communication of engine and other vehicle critical data as well as pictures, speed, location, and other data as applicable, both for functional and social purposes, over a cost or other-parameter optimized channel.

Figure 4A:
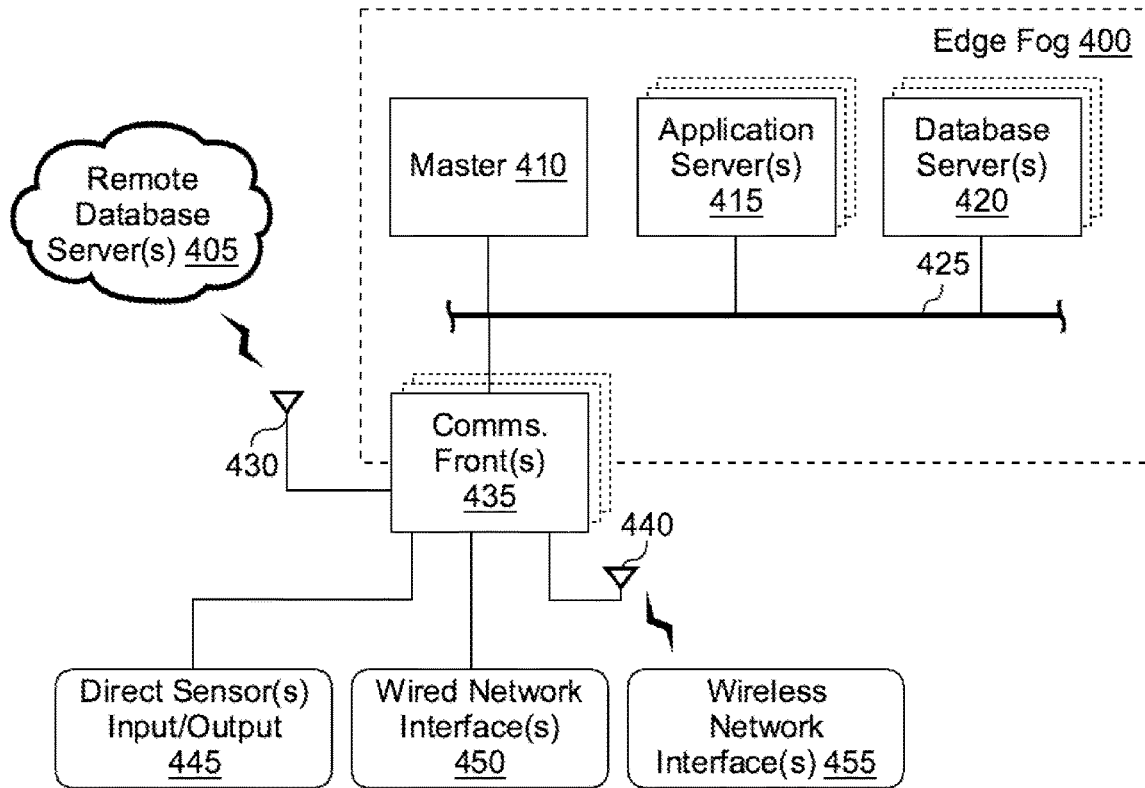
FIG. 4A shows an embodiment of a distributed system architecture according to the present invention.

FIG. 4A shows an embodiment of a distributed system that expands the capabilities of a single DataHub (i.e. a single Edge device) into a distributed computing system, referred to here as an Edge Fog 400. An Edge Fog 400 may reside at the Edge, that is, in a location that facilitates the collection of sensor data, which may or may not be difficult, expensive, or otherwise impractical to move. An Edge Fog 400 facilitates local analysis of this potentially high-volume or high-precision data. In an implementation, an Edge Fog 400 allows for a single or many physical hardware devices to be networked together thus increasing compute, storage, and/or memory resources in order to collect, analyze, store, and/or communicate all or a subset of a potentially large amount of data that may otherwise overload a single Edge device.

In an embodiment of an Edge Fog 400, a number of software units may exist: a master 410, a communication front(s) 435, a database server(s) 420, and an application server(s) 415. A master 410 stores and provides access to system-wide metadata for example sensor configuration data and the configuration, either static or dynamic, of the Edge Fog 400 system topology. The master 410 also coordinates time synchronization of RTCs and/or other parameters of the units in the Edge Fog 400.

In an embodiment, the database server(s) 420 store and run a partitioned or non-partitioned database(s) consisting of historical, current, and/or analysis data. The application server(s) 415 access data stored on a database server(s) 420 and then may execute analysis applications and/or serve data via an output communications front 435 for consumption by a local user interface(s) or other local or remote compute resources as needed. The communication front(s) 435 may be configured as any or all of an input communication front (e.g. wired 450 or wireless 455 network interfaces or direct sensor inputs 445 for data input), output communication front 435 (e.g. wired 450 or wireless 455 network interfaces such as an Ethernet interface 450 for connection to a user interface or digital outputs 445), or a remote communication front 435 (e.g. satellite or cellular telecommunication interfaces 430 for transferring data to a remote database 405).

In an implementation, any combination of these software units can be executed on the same or separate physical servers. For example, a master 410, a database server 420, an application server 415, and a communication front(s) 435 may be run on a single physical unit, which may or may not be a DataHub. Additionally, a master 410 and a database server 420 may run on a single unit with an application server 415 and a communication front(s) 435 running on a separate unit or in any combination or permutation as necessary.

In an implementation, the communication front(s) 435 has at least two communication interfaces: at least one interface communicates with the internal Edge Fog data bus 425 and at least one interface communicates with any of a variety of sensors, real-time or non-real-time computing systems, user interfaces, etc. external to the Edge Fog 400. The communication fronts also define the security boundary between the secured Edge Fog 400 and any external networks, sensors, etc. 445, 450, 455. The master 410, database server(s) 420, and application server(s) 415 need at least one network interface to connect to the internal Edge Fog data bus 425.

Figure 4B:
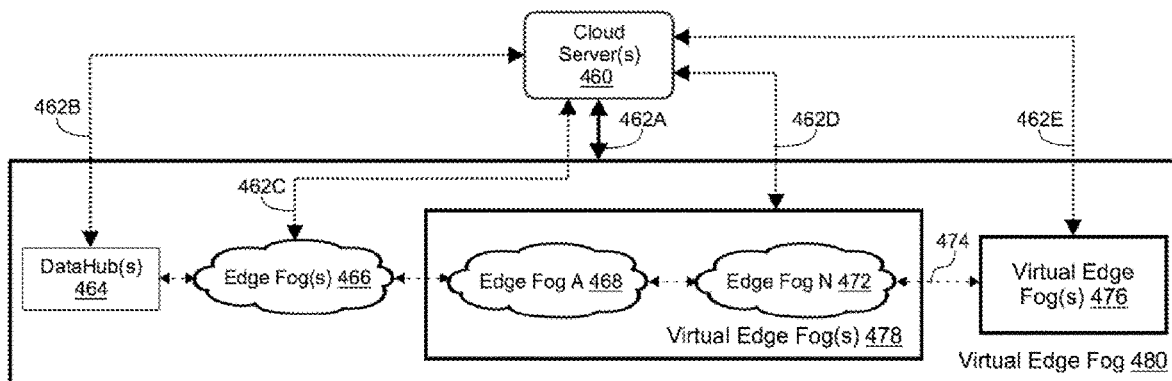
FIG. 4B shows an extension of the distributed topology of FIG. 4A.

FIG. 4B. shows an extension of the distributed topology of FIG. 4A in which one or many DataHubs 464 or local Edge Fogs 466 can communicate together across a high-bandwidth, low latency data bus 474 to form a Virtual Edge Fog 480. The Virtual Edge Fog 480 helps to further scale/increase compute power, storage, and/or memory to collect, analyze, store, or communicate a potentially large amount of data, and/or to simplify and abstract one or more assets (e.g. marine engines, diesel generators, electric motors, etc.) or groups of assets (e.g. pairs of propulsion engines or elements of a dynamic positioning system) for higher level analysis.

In an embodiment, the Virtual Edge Fog 480 can contain one or more Edge Fogs 466, DataHubs 464, or other Virtual Edge Fogs 478 in any combination or sub-combination as needed, using a data backbone 474 such as 1 Gbps Ethernet. A Virtual Edge Fog 480 may have one or more wired or wireless connections 462A, B, C, D, E to a cloud server(s) 460. While at least one connection 462A is required to move data from a Virtual Edge Fog 480 to a cloud server(s) 460, further connections 462B, C, D, E may or may not be implemented to, for example, decrease connection latency or increase connection throughput as needed. Additionally, the cloud server(s) 460 may reside on a public cloud, private cloud (e.g. on or off-premises), or as a combination of public and private (i.e. hybrid cloud) as needed.

Figure 5:
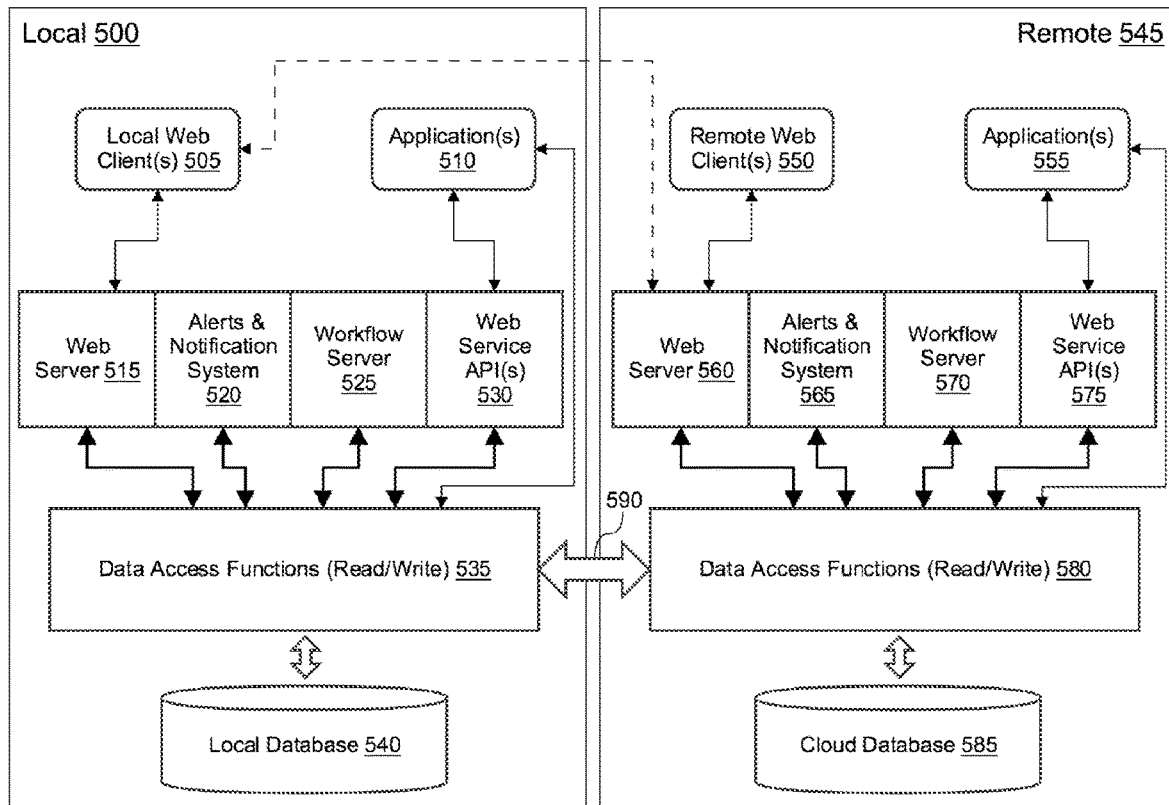
FIG. 5 shows an embodiment of a system according to the present invention which provides an application execution platform, supporting an application execution framework.
Figure 6:
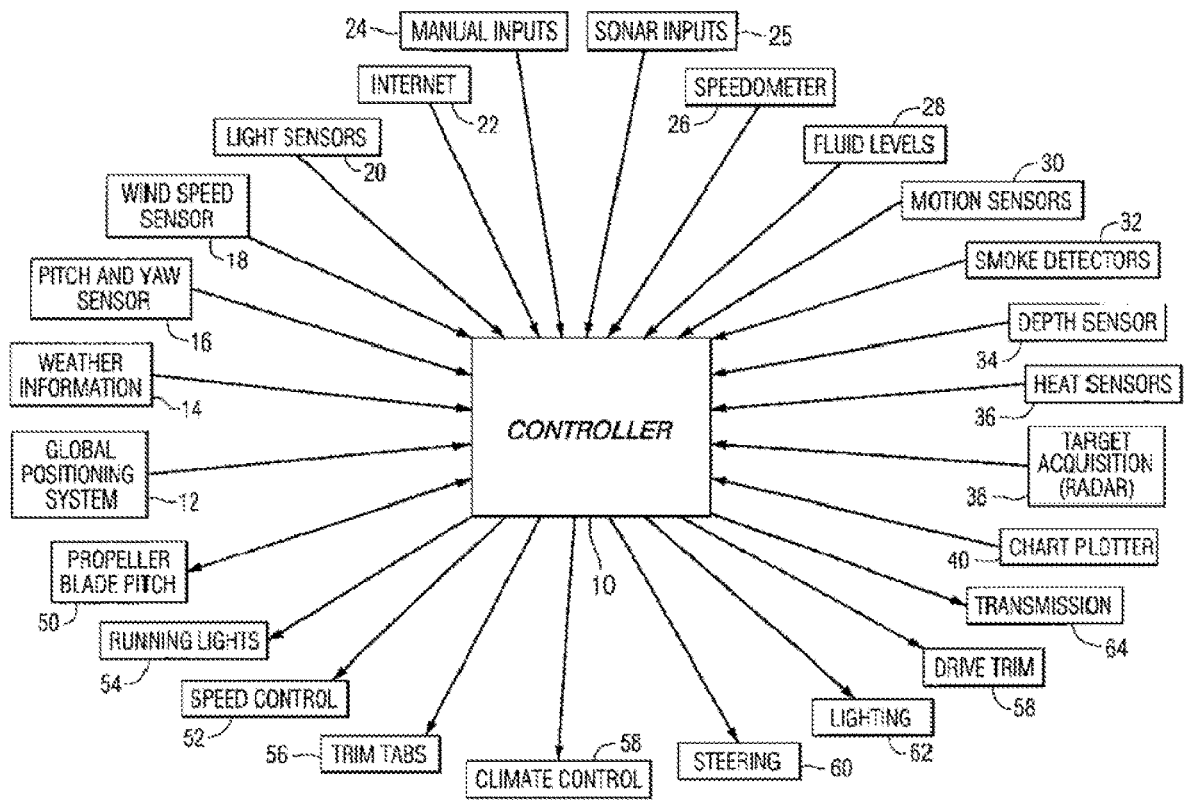
FIG. 6 shows a prior art system controller architecture.
Figure 7:
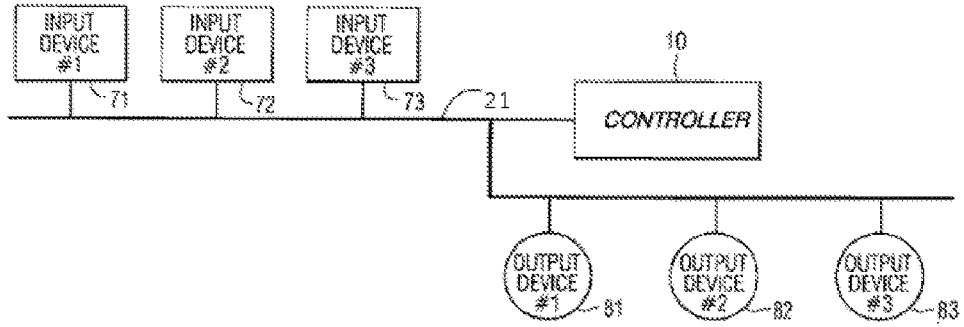
FIG. 7 shows a prior art system controller network architecture.
Figure 8:
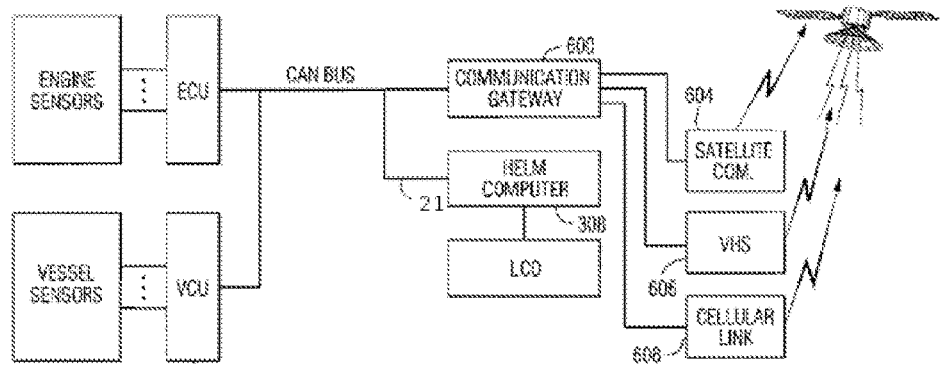
FIG. 8 shows a prior art multi-controller CAN bus network.
Figure 9:
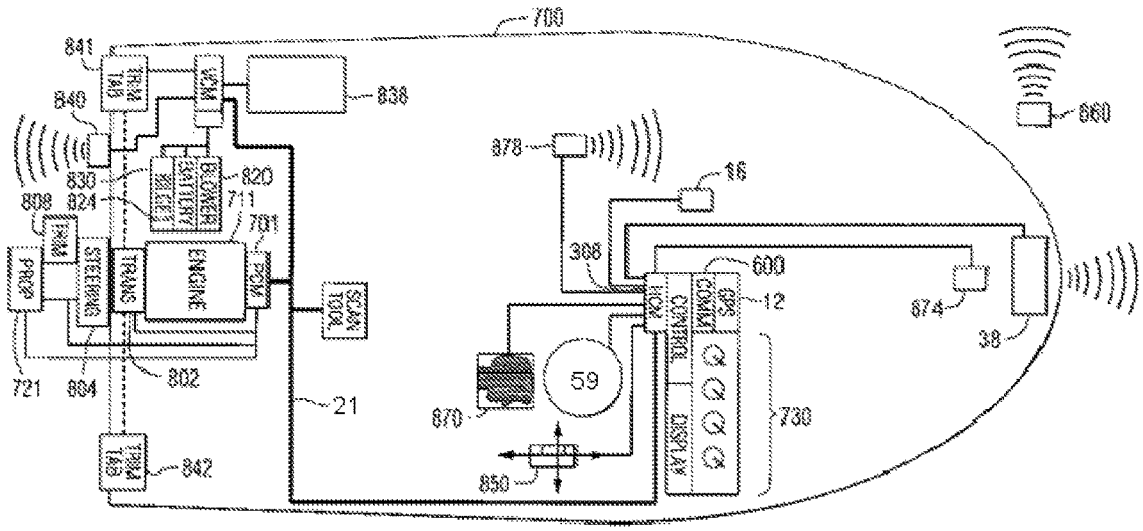
FIG. 9 shows a prior art marine vessel configuration.
Figure 10:
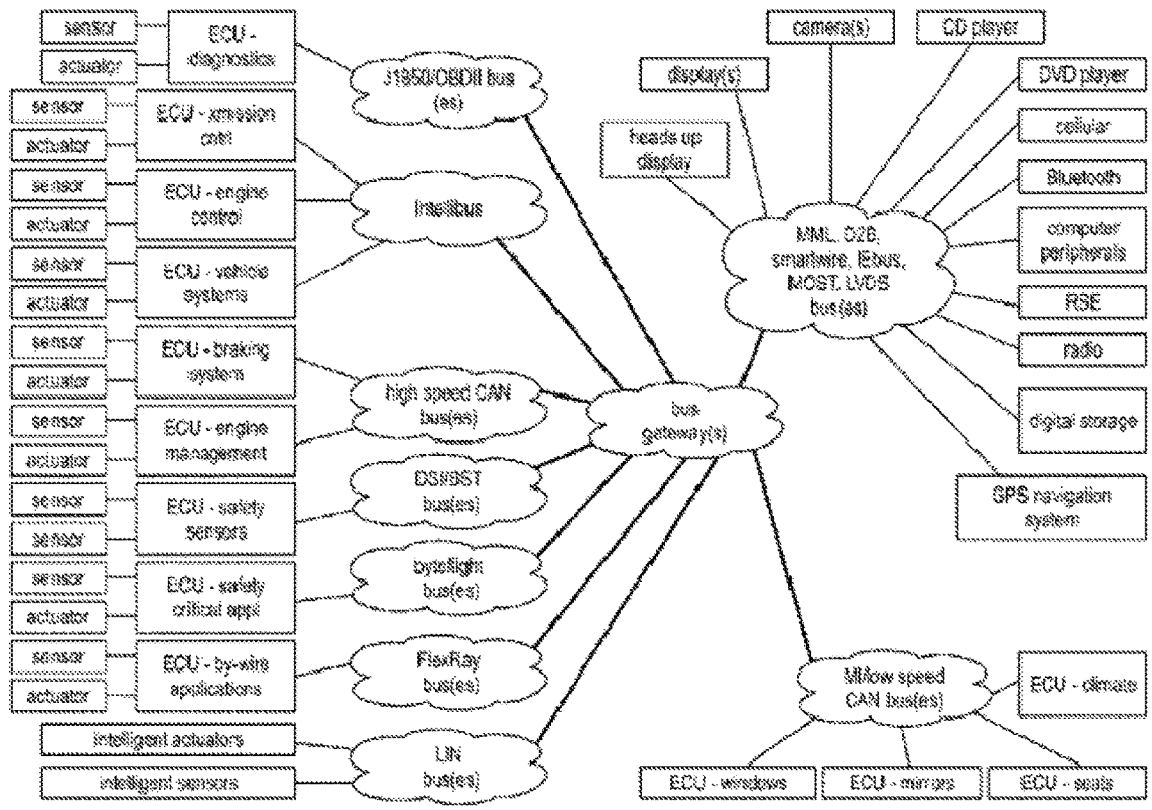
FIG. 10 shows a prior art automotive vehicle architecture.
Figure 11:
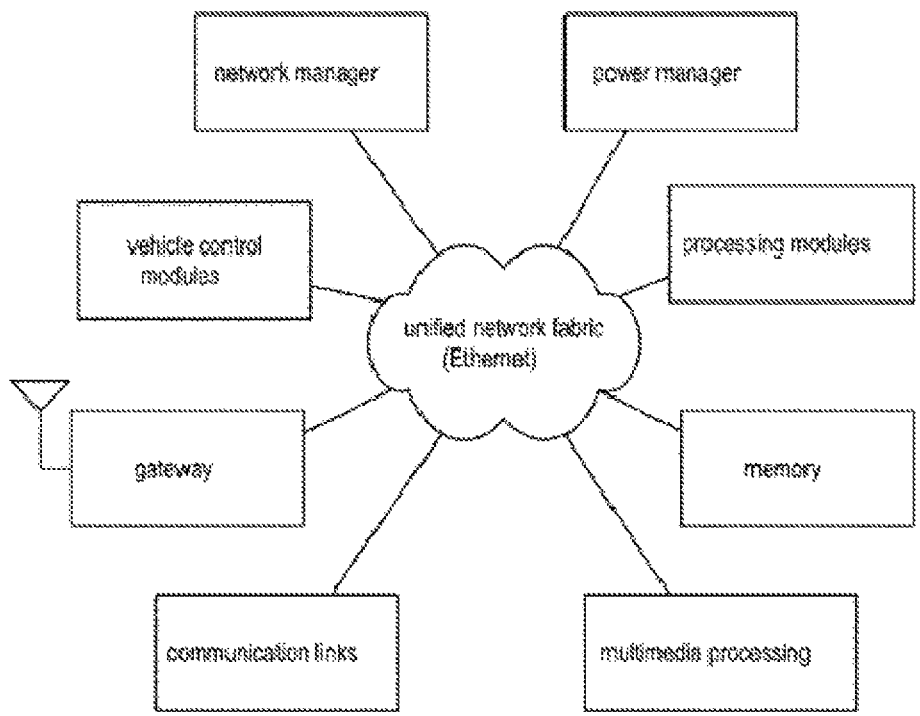
FIG. 11 shows a prior art unified network fabric system architecture.
Figure 12:
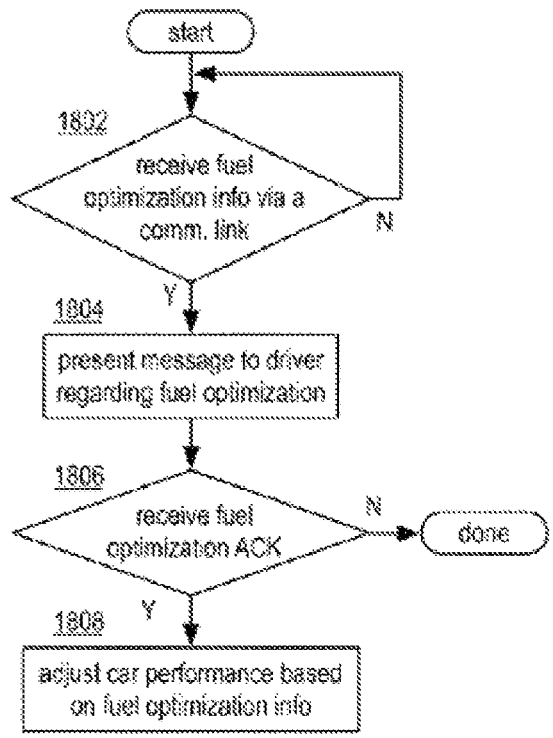
FIG. 12 shows a flowchart of a prior art fuel optimization method.
Figure 13:
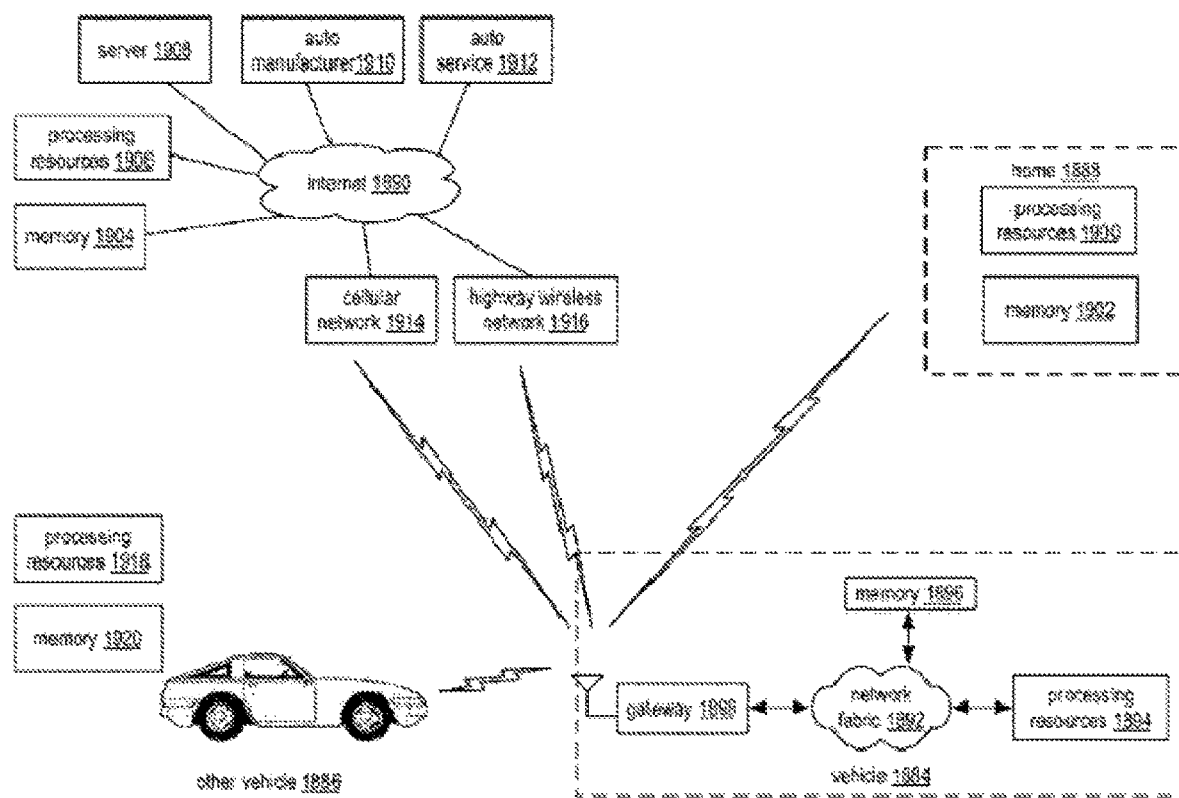
FIG. 13 shows a prior art automotive vehicle telematics system architecture.

FIG. 5. shows an embodiment in which a DataHub provides an application execution platform, supporting a generic application execution framework. The application execution framework enables distributed execution of applications, such that the application code can be run either on a remote (e.g. cloud) server(s), a DataHub, an application server of an Edge Fog or Virtual Edge Fog, or as a combination or sub-combination thereof.

In an implementation, the application platform may further employ a local 515 or remote 560 web server(s) to serve local 540 or remote 585 database data to a local 505 or remote 550 web client (e.g. a web browser running on a tablet, mobile phone, PC, etc.). The local web client 505 may also access remote data from a remote web server 560 as needed. Additionally, the local 540 and remote 585 databases may be synchronized via the configured Protocol Service 590 as needed and able.

A local 510 or remote 555 application(s) can access data directly using local 535 or remote 580 Data Access Functions or a local 530 or remote 575 Web Service API(s) where needed. For example, a user interface application running on a tablet, mobile phone, etc. may access data directly using local 535 or remote 580 Data Access Functions or a local 530 or remote 575 Web Service API(s). The local 510 or remote 555 application(s) can then communicate the results of execution, if any, through the local 535 or remote 580 Database Access Function(s) or a local 530 or remote 575 Web Service API(s) as a new, derived data series. The local 520 and/or remote 565 implementation of the Alerts and Notifications System can then utilize the resulting data series as an input and execute any configured alerts based on that input.

In an embodiment, the Alerts and Notifications System 520, 565 is a periodic and/or event-triggered alert evaluation and notification system that transmits alerts, as configured in the database 540, 585, via a multitude of systems, (e.g. SMS text messages, email, Apple Push Notification System, Google Cloud Messaging, Windows Notifications System, and others as needed). In an embodiment, an alert can be created by any warning, error, or other alarm message from an engine, generator, or other system as configured and/or a satisfied alert condition as configured in the Database(s) 540, 585. In an embodiment, a notification is a message or indication, often but not necessarily consumed by a user or user interface, of an alert, a group of alerts, or other alert related information.

In an implementation, the Alerts and Notifications System 520, 565 can be configured to generate or reset alerts based on a multitude of sensor conditions, including but not limited to, individual sensor values, combinations of sensor values, arbitrary mathematical expressions using one or more sensor values, statistical calculations on one or more sensor values, timers, external API inputs, etc. The Alerts and Notifications System 520, 565 can generate alerts using data of different types, for example, raw data, processed (e.g. statistically or algorithmically manipulated) data, and/or application data (e.g. data output from an engine analysis application). Alerts processing can be executed on a local device(s) 500 or a remote device(s) 545 or a combination of local execution and remote execution of sub-components as configured in the Database 540, 585. The Alerts and Notifications System 520, 565 can also integrate with a workflow server(s) 520, 570 such that alerts can start, update, or end workflow(s) and/or workflows can communicate to the Alerts and Notifications System 520, 565 to generate or reset alerts. Such workflows manage and/or track business processes such as fueling, maintenance, insurance, compliance, etc., which often involve multiple parties and may be complex and/or long-running in nature.

An example application may be a Fish Holding-Tank Monitoring (FHTM) Application for use on fishing vessels and/or fish processing vessels. Fish tank data such as tank temperatures, tank inlet and outlet water flow rate, tank level, etc. would be collected and stored in a local Database 540. The FHTM App executes logic to generate new time series data, which include a timestamp and configurable status codes for the tank (e.g. nominal, low tank level, high tank temperature) based on the raw, fish tank sensor data and any mathematical analysis of raw data and/or previously generated data models. Using a supplied configuration, the Alerts and Notifications System 520 can then generate alerts and notify stakeholders of tank conditions based on this derived time series.

As an additional example, an "Engine Analysis" application(s) could be implemented, which collects engine sensor data in order to build a machine-learning based engine model. By comparing near real-time data with expected values from the engine model, a time series of standardized errors can be generated. That standardized error time series and/or further analyzed or processed time series are stored in the local 540 or cloud 585 Database and the Alerts and Notifications System 520, 565 can then generate notifications to inform vehicle personnel and/or other stakeholders of potential engine problems.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system possibly networked with others in a data processing center, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

A computing device may be adapted to communicate with a plurality of other computing devices, such as clients or servers, over communications networks such as a wide area network a metropolitan area network, a local area network, a wireless network, the Internet, or any other network, using known protocols for such communication, whether wireless or wired. The computing device includes one or more central processing units (CPU), one or more interfaces, and one or more buses (such as a peripheral component interconnect (PCI) bus, USB, CAN bus, etc.). When acting under the control of appropriate software or firmware, CPU may be responsible for implementing specific functions associated with the functions of a specifically configured computing device or machine. For example, in at least one embodiment, a computing device may be configured or designed to function as a server system utilizing CPU, local memory and/or remote memory, and interface(s). In at least one embodiment, CPU may be caused to perform one or more of the different types of functions and/or operations under the control of software modules or components, which for example, may include an operating system and any appropriate applications software, drivers, and the like. CPU may include one or more processors such as, for example, a processor architecture such as Intel x86, Intel x64, ARM, Qualcomm, and AMD families of microprocessors, and may include a GPU or coprocessing capability. In some embodiments, processors may include specially designed hardware such as application-specific integrated circuits (ASICs), electrically erasable programmable read-only memories (EEPROMs), field-programmable gate arrays (FPGAs), and so forth, for controlling operations of computing device. In a specific embodiment, a local memory (such as non-volatile random access memory (RAM), Flash memory, and/or read-only memory (ROM), including for example one or more levels of cached memory) may also form part of CPU or CPU subsystem. However, there are many different ways in which memory may be coupled to system. Memory may be used for a variety of purposes such as, for example, caching and/or storing data, programming instructions, and the like. As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

Because information and program instructions may be employed to implement one or more systems or methods described herein, at least some embodiments may include nontransitory machine-readable storage media, which, for example, may be configured or designed to store program instructions, state information, and the like for performing various operations described herein. Examples of such non-transitory machine-readable storage media include, but are not limited to, flash memory, magnetic media such as hard disks, optical media such as CD-ROM and DVD disks; magneto-optical media such as optical disks, magnetic memory, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java compiler and may be executed using a Java virtual machine or equivalent, or files containing higher level code that may be executed by the computer using an interpreter (for example, scripts written in Python, Perl, Ruby, Javascript, or any other scripting language).

A standalone or network computing system architecture may be provided. The computing device may include processors that may run software that carry out one or more functions or applications of embodiments of the invention, such as for example a client application. Processors may carry out computing instructions under control of an operating system such as, for example, a version of Microsoft's Windows operating system (e.g., Windows 7, 8, 8.1, 10, etc.), Apple Mac OS/X, Apple iOS operating systems, some variety of the Linux operating system, Google's Android operating system, or the like. In many cases, one or more shared services may be operable in system, and may be useful for providing common services to client applications. Services may for example be Windows services, user-space common services in a Linux environment, or any other type of common service architecture used with operating system. Input devices may be of any type suitable for receiving user input, including for example a keyboard, touchscreen, microphone (for example, for voice input), mouse, touchpad, trackball, or any combination thereof. Output devices may be of any type suitable for providing output to one or more users, whether remote or local to system, and may include for example one or more screens for visual output, speakers, printers, or any combination thereof. Memory may be random-access memory having any structure and architecture known in the art, for use by processors, for example to run software. Storage devices may be any magnetic, optical, mechanical, memristor, or electrical storage device for storage of data in digital form. Examples of storage devices include flash memory, magnetic hard drive, CD-ROM, and/or the like.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", It's and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A method in a computing system borne by a vessel, comprising:
receiving a stream of status messages reporting on a propulsion system of the vessel;

storing the received stream of status messages;
extracting information from the received stream of status messages;
evaluating a telecommunications rule based, at least in part, on content of the extracted information, to obtain a telecommunications rule result indicating at least one of a time or modality for transmitting one or more subsets of the status messages to one or more receivers not borne by the vessel; and
transmitting at least a portion of the status messages to a receiver not borne by the vessel in accordance with the obtained telecommunication rule result by performing at least one of:
 transmitting the at least a portion of the status messages at the time indicated by the telecommunication rule result, or
 transmitting the at least a portion of the status messages using the modality indicated by the telecommunication rule result.

2. The method of claim 1 wherein the obtained telecommunication rule result specifies a time for transmission.

3. The method of claim 1 wherein the obtained telecommunication rule result specifies a communication modality for transmission.

4. The method of claim 1 wherein the obtained telecommunication rule result specifies a proper subset of the extracted information to transmit.

5. The method of claim 1, further comprising:
analyzing at least a portion of the extracted information to obtain an analysis result; and
based at least in part on the analysis result, proposing a vessel operating parameter value to be implemented in the vessel.

6. The method of claim 1, further comprising:
analyzing at least a portion of the extracted information to obtain an analysis result; and
based at least in part on the analysis result, automatically implementing a vessel operating parameter value in the vessel.

7. The method of claim 1, further comprising:
performing first analysis of at least a portion of the extracted information to obtain a first analysis result; and
transmitting the first analysis result information to a receiver not borne by the vessel in accordance with the obtained telecommunication rule result,
such that the first analysis result can be subjected to second analysis using computing resources not borne by the vessel.

8. The method of claim 1, further comprising:
performing real-time diagnostic analysis of at least a portion of the extracted information to obtain a diagnostic analysis result; and
based at least in part on the diagnostic analysis result, recommending pre-failure service to the propulsion system.

9. The method of claim 1 wherein transmitting at least a portion of the status messages to a receiver not borne by the vessel in accordance with the obtained telecommunication rule result comprises transmitting only information among the extracted information that differs from information extracted during an immediately-preceding time.

10. The method of claim 1, further comprising:
sending a stream of status messages reporting on a propulsion system of the vessel.

11. One or more instances of computer-readable media not constituting a transitory propagating signal per se, the one or more instances of computer-readable media collectively having contents configured to cause a computing system borne by vessel to perform a method, the method comprising:
receiving a stream of status messages reporting on a propulsion system of the vessel;
storing the received stream of status messages;
extracting information from the received stream of status messages;
evaluating a telecommunications rule based, at least in part, on content of a portion of the extracted information, to obtain a telecommunications rule result indicating at least one of a time or modality for transmitting one or more portions of the extracted information to one or more receivers not borne by the vessel; and
transmitting at least a portion of the extracted information to a receiver not borne by the vessel in accordance with the obtained telecommunication rule result by performing at least one of:
 transmitting the at least a portion of the extracted information at the time indicated by the telecommunication rule result, or
 transmitting the at least a portion of the extracted information using the modality indicated by the telecommunication rule result.

12. The one or more instances of computer-readable media of claim 11 wherein the obtained telecommunication rule result specifies a time for transmission.

13. The one or more instances of computer-readable media of claim 11 wherein the obtained telecommunication rule result specifies a communication modality for transmission.

14. The one or more instances of computer-readable media of claim 11 wherein the obtained telecommunication rule result specifies a subset of the extracted information to transmit.

15. The one or more instances of computer-readable media of claim 11, the method further comprising:
analyzing at least a portion of the extracted information to obtain an analysis result; and
based at least in part on the analysis result, proposing a vessel operating parameter value to be implemented in the vessel.

16. The one or more instances of computer-readable media of claim 11, the method further comprising:
analyzing at least a portion of the extracted information to obtain an analysis result; and
based at least in part on the analysis result, automatically implementing a vessel operating parameter value in the vessel.

17. The one or more instances of computer-readable media of claim 11, the method further comprising:
performing first analysis of at least a portion of the extracted information to obtain a first analysis result; and
transmitting the first analysis result information to a receiver not borne by the vessel in accordance with the obtained telecommunication rule result,
such that the first analysis result can be subjected to second analysis using computing resources not borne by the vessel.

18. The one or more instances of computer-readable media of claim 11, the method further comprising:
performing real-time diagnostic analysis of at least a portion of the extracted information to obtain a diagnostic analysis result; and based at least in part on the diagnostic analysis result, recommending pre-failure service to the propulsion system.

19. The one or more instances of computer-readable media of claim 11 wherein transmitting at least a portion of the extracted information to a receiver not borne by the vessel in accordance with the obtained telecommunication rule result comprises transmitting only information among the extracted information that differs from information extracted during a preceding time.

20. The one or more instances of computer-readable media of claim 11, the method further comprising:
sending a stream of status messages reporting on a propulsion system of the vessel.

21. A computing system borne by vessel, the computing system comprising:
one or more processors; and
memory storing contents that, when executed by the one or more processors, cause the computing system to perform actions comprising:
obtaining a stream of status messages reporting on a propulsion system of the vessel;
extracting information from the stream of status messages;
evaluating a telecommunications rule based, at least in part, on content of a portion of the extracted information, to determine a telecommunications rule result indicating at least one of a time or modality for transmitting one or more portions of the extracted information to at least one receiver not borne by the vessel; and
transmitting at least a portion of the extracted information to a receiver not borne by the vessel in accordance with the telecommunication rule result by performing at least one of:
transmitting the at least a portion of the extracted information at the time indicated by the telecommunication rule result, or
transmitting the at least a portion of the extracted information using the modality indicated by the telecommunication rule result.

22. The computing system of claim 21, the actions further comprising analyzing at least a portion of the extracted information to obtain an analysis result.

23. The computing system of claim 22, wherein analyzing at least a portion of the extracted information comprises performing real-time diagnostic analysis for pre-failure service to the propulsion system.

24. The computing system of claim 23, wherein analyzing at least a portion of the extracted information comprises analyzing one or more fault codes in combination with engine data, to determine whether an engine component should be replaced.

25. The computing system of claim 24, wherein the engine data comprises at least one of mileage, engine hours, number of starter cycles, or manufacturer data.

26. The computing system of claim 22, wherein analyzing at least a portion of the extracted information comprises assessing a severity level of a predicted failure.

27. The computing system of claim 26, wherein the actions further comprise recommending repair or replacement based, at least in part, on the severity level of the predicted failure.

28. The computing system of claim 22, wherein analyzing at least a portion of the extracted information comprises determining a cost associated with at least one effect caused by a predicted failure.

29. The computing system of claim 28, wherein the actions further comprise recommending repair or replacement based, at least in part, on the determined cost.

* * * * *